US007059516B2

(12) United States Patent
Matsuyama et al.

(10) Patent No.: US 7,059,516 B2
(45) Date of Patent: Jun. 13, 2006

(54) PERSON AUTHENTICATION SYSTEM, PERSON AUTHENTICATION METHOD, INFORMATION PROCESSING APPARATUS, AND PROGRAM PROVIDING MEDIUM

(75) Inventors: Shinako Matsuyama, Tokyo (JP); Yoshihito Ishibashi, Tokyo (JP); Ichiro Futamura, Kanagawa (JP); Masashi Kon, Kanagawa (JP); Hideaki Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/943,893

(22) Filed: Aug. 30, 2001

(65) Prior Publication Data

US 2002/0056747 A1 May 16, 2002

(30) Foreign Application Priority Data

Aug. 31, 2000 (JP) ........................... P2000-264520

(51) Int. Cl.
*G06K 5/00* (2006.01)

(52) U.S. Cl. ................... 235/382; 235/380; 235/382.5; 235/487

(58) Field of Classification Search ................ 235/382, 235/380, 382.5, 386, 487, 492; 340/825.54
See application file for complete search history.

(56) References Cited

U.S. PATENT DOCUMENTS 5,017,766 A * 5/1991 Tamada et al. ............. 235/492
5,229,764 A * 7/1993 Matchett et al. ........... 340/5.52
5,412,727 A * 5/1995 Drexler et al. .............. 713/186
5,831,547 A * 11/1998 Ohtsuki et al. .......... 340/10.41
5,907,149 A * 5/1999 Marckini .................... 235/487
6,088,802 A * 7/2000 Bialick et al. .............. 713/200
6,202,151 B1 * 3/2001 Musgrave et al. .......... 713/186
6,244,506 B1 * 6/2001 Hartmann et al. .......... 235/380
6,256,737 B1 * 7/2001 Bianco et al. .............. 713/186
6,310,966 B1 * 10/2001 Dulude et al. .............. 382/115
6,424,727 B1 * 7/2002 Musgrave et al. .......... 382/117
6,505,193 B1 * 1/2003 Musgrave et al. ............. 707/3
6,601,046 B1 * 7/2003 Epstein ........................ 705/57

* cited by examiner

*Primary Examiner*—Steven S. Paik
(74) *Attorney, Agent, or Firm*—Sonnenschein Nath & Rosenthal LLP

(57) ABSTRACT

A person authentication system, a person authentication method, an information processing apparatus, and a program providing medium authenticate a person who uses an information apparatus in data communication. A person authentication certificate storing a template which includes person authentication data is used in the person authentication system. A person authentication execution entity checks the validity of the certificate on the basis of a certificate expiration date, a certificate usage number limit, or a template expiration date in person authentication processing on the basis of the certificate. The person authentication is executed by comparing the template with sampling information input by a user if the validity is confirmed. A person identification certificate authority updates the certificate or the template according to the request of the entity or the authenticated person.

24 Claims, 89 Drawing Sheets

FIG. 3

| Item | Description | Value employed in the present IA |
|---|---|---|
| Version 1 | | |
| version | Version of the certificate format | V3 |
| serial Number | Serial number of the certificate assigned by the IA | Assigned in a serial fashion |
| signature algorithm Identifier<br>algorithm<br>parameters | Algorithm of the signature of the certificate and parameters thereof | Elliptic curve number/RSA<br>parameters when an elliptic curve is used<br>Key length when RSA is employed |
| issuer | IA name (in a distiguished name form) | Name of the present IA |
| validity<br>notBefore<br>notAfter | Period during which the certificate is valid<br>Start date<br>Expiration date | |
| subject | Name which identifies the user | User device ID or ID of the service subject |
| subject Public Key Info<br>algorithm<br>subject Public key | Information of the public key of the user<br>Algorithem of the key<br>Key | <br>Elliptic curve/RSA<br>Public key of the user |
| Version 3 | | |
| authority Key Identifier<br>key Identifier<br>authority Cert Issuer<br>authority Cert Serial Number | Key identifier used in verification of the IA<br>Key identification number (octal number)<br>Name of the IA (in a general name form)<br>Identification number | |
| subject key Identifier | Used when a plurality of keys are certified | Not used |
| key usage<br>(0)digital Signature<br>(1)non Repudiation<br>(2)key Encipherment<br>(3)data Encipherment<br>(4)key Agreement<br>(5)key CertSign<br>(6)cRL Sign | Specifying the purpose of the key<br>(0)for digital signature<br>(1)to prevent repudiation<br>(2)for encryption of the Key<br>(3)for encryption of a message<br>(4)for use in transmission of a symmetric key<br>(5)used to verify the certificate<br>(6)used to verify the signature of the certificate revolution list | 0,1,4, or 6 is used |
| private Key Usage Period<br>notBefore<br>notAfter | Period during which the private key stored in the user is valid | Usage period is the same for the certificate, the public key, and the private Key (default) |

FIG. 4

| | | |
|---|---|---|
| Certificate Policy<br>policy Identifier<br>policy Qualifers | Certificate policy of the certificate authority<br>Policy ID (according to ISO/IEC9834-1)<br>Certification criteria | |
| policy Mappings<br>issuer Domain Policy<br>subject Domain Policy | Required only when the CA is certificated. Mappings of the policy of the issuer domain policy and the subject domain policy are defined | default = none |
| supported Algorithms<br>algorithm Identifier<br>intended Usage<br>intended Certificate Policies | Attributes of the directory (X.500) are defined. Used to inform a receiving party of communication of the attributes the direction so that the recei-ving party can use the direction information | default = none |
| subject Alt Name | Alternative name of the user (in the form of GN) | not used |
| issuer Alt Name | Not used although this item is included in the certificate format (default = none) | default = none |
| subject Directory Attributes | Arbitrary attributes of the user | not used |
| basic Constraints | Specifies the public key to be certified | |
| cA<br>path Len Constraint | Indicates whether the public key is used by a user or by a certificate authority to write a signature | default<br>= used by a user |
| name Constraints<br>permitted Subtrees<br>base<br>minimum | Used only when the certification is to certify a certification authority (CA) | default = none |
| maximum<br>excluded Subtrees | | |
| policy Constraints<br>requier Explicit Policy<br>inhibit Policy Mapping | Constraints are described in terms of requirements of explicit policy ID or inhibit policy mapping for the re-maining certification path | |
| CRL Distribution Points | Indicates a reference point in the revocation list at which data is present which indicates whether the certificate of a user is revocated | Pointer which points to a location where the certificate is registered. The revocation list is managed by an issuer |
| Signature | Signature of the issuer | |

FIG. 5

| | Item | Description |
|---|---|---|
| Indis-pensable Items | Version | Version |
| | Serial Number | Identification Number |
| | signature algorithm Identifier<br>algorithm<br>parameters | Signature algorithem<br>Algorithm<br>Parameters |
| | Issuer | Name of the identification authority (in the form of a distinguished name) |
| | Validity<br>notBefore<br>notAfter | Period during which the certificate is valid<br>Start date<br>Expiration date |
| | Subject | Name of the subject to be certificated (in a DN form) |
| Extended Items | subject Template Info<br>encrypt Type<br>encrypt Unique ID<br>encryption Algorithm<br>parameter<br>validity<br>subject Template Source<br>subject Template | Template information<br>• encrypt Type<br>• The unique ID or the certificate number of a public key certificate used for encryption<br>• Algorithm<br>• parameter<br>• Validity period (start date, expiration date)<br>• Type of the template<br>• Template |
| | Subject PKC info<br>subject PKC serial Number<br>subject PKC Unique ID | Information about the public key certificate of the subject<br>• Certificate number of the subject public key certificate<br>• Unique ID of the subject of the subject public key certificate |
| | Issuer Unique ID | Unique ID of the issuer |
| | Subject Unique ID | Unique ID of the subject |
| | Public Key Certificate | Public key certificate |
| | Issuer Alt Name | Alternative name of the issuer |
| | subject Directory Attributes | Personal information (encrypted as required) information used to authenticate subject Age, sex, etc. |
| | Valid Count | Number of times the certificate is allowed to be used |
| | Control Table Link Info<br>Ctl Tbl Location<br>Ctl Tbl Unique ID | Link information describing group information<br>• Location of a link information control table (URL, IP address, etc.)<br>• Identification number of the link information |
| Indispen-sable | IDA Signature | Signature of the IDA |

FIG. 7

| PUBLIC KEY USED TO ENCRYPT TEMPLATES | EXAMPLES OF MANNERS IN WHICH TEMPLATE INFORMATION STORAGE IDC IS USED |
|---|---|
| PUBLEC KEY OF A USER OR A USER DEVICE | TO IDENTIFY AN AUTHORIZED USER OF A USER DEVICE (SUCH AS A PC) ON THE BASIS OF AN IDENTIFICATION CERTIFICATE OF THE USER |
| PUBLIC KEY OF A SERVICE PROVIDER | USED BY A SERVICE PROVIDER TO IDENTIFY A PARTICULAR USER SUCH AS A USER TO WHOM SERVICE IS TO BE PROVIDED, ON THE BASIS OF AN IDENTIFICATION CERTIFICATE (IDC) OF THE USER |
| PUBLIC KEY OF AN IDENTIFICATION AUTHORITY | IN DATA TRANSMISSION AMONG VARIOUS TERMINALS, A SENDER OR A RECEIVER IDENTIFIES |

FIG. 33

| USER ID | IDENTIFICATION CERTIFICATE (IDC) IDENTIFIER |
|---|---|
| ABC0001 | CDE00021 |
| ABC0002 | CDE00027 |
| ABC0003 | CDE03211 |
| ⋮ | ⋮ |
| BBC0231 | EED02333 |

FIG. 34

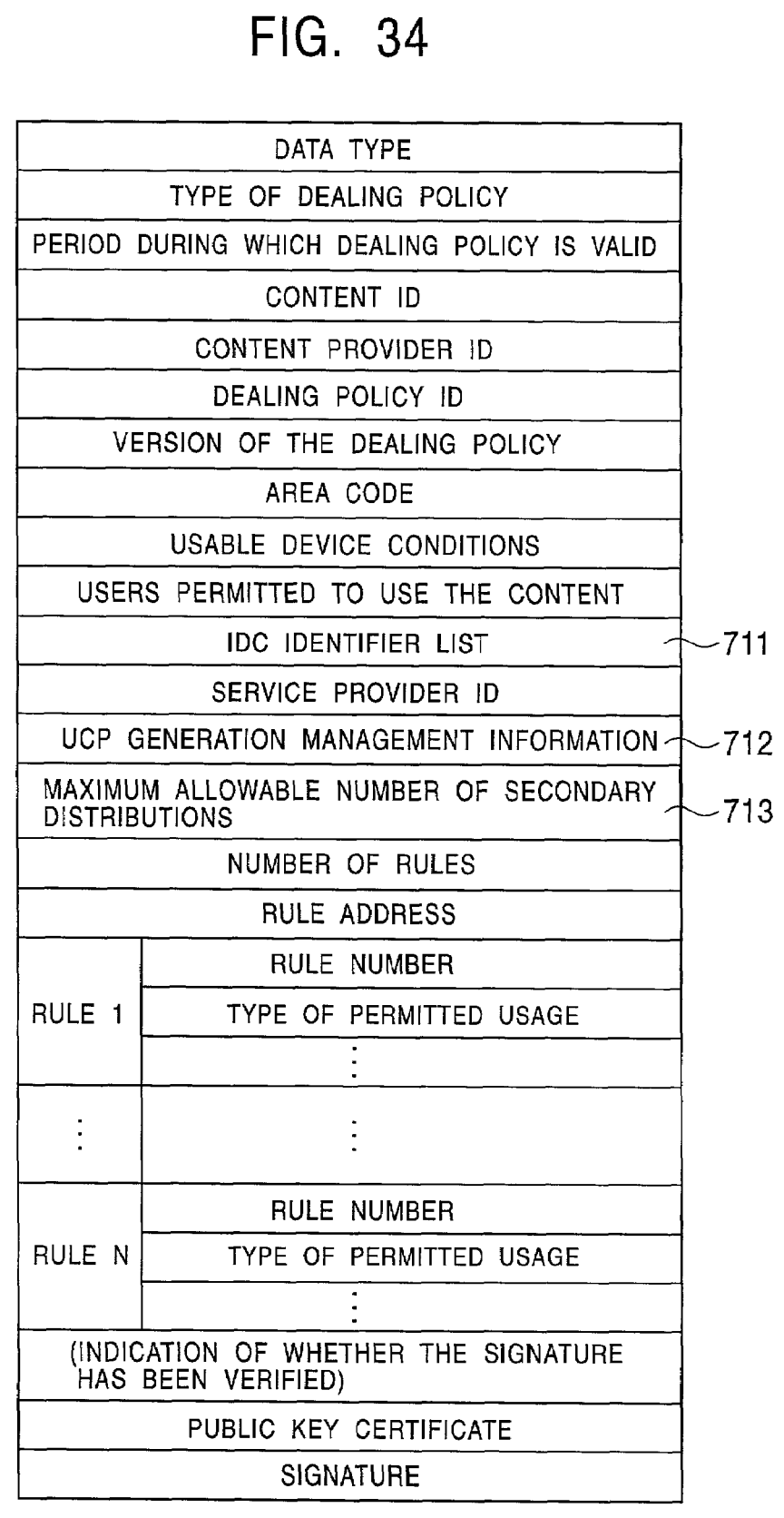

| | | |
|---|---|---|
| DATA TYPE | | |
| TYPE OF DEALING POLICY | | |
| PERIOD DURING WHICH DEALING POLICY IS VALID | | |
| CONTENT ID | | |
| CONTENT PROVIDER ID | | |
| DEALING POLICY ID | | |
| VERSION OF THE DEALING POLICY | | |
| AREA CODE | | |
| USABLE DEVICE CONDITIONS | | |
| USERS PERMITTED TO USE THE CONTENT | | |
| IDC IDENTIFIER LIST | | 711 |
| SERVICE PROVIDER ID | | |
| UCP GENERATION MANAGEMENT INFORMATION | | 712 |
| MAXIMUM ALLOWABLE NUMBER OF SECONDARY DISTRIBUTIONS | | 713 |
| NUMBER OF RULES | | |
| RULE ADDRESS | | |
| RULE 1 | RULE NUMBER | |
| | TYPE OF PERMITTED USAGE | |
| | ⋮ | |
| ⋮ | ⋮ | |
| RULE N | RULE NUMBER | |
| | TYPE OF PERMITTED USAGE | |
| | ⋮ | |
| (INDICATION OF WHETHER THE SIGNATURE HAS BEEN VERIFIED) | | |
| PUBLIC KEY CERTIFICATE | | |
| SIGNATURE | | |

FIG. 35

| RULE NUMBER | PERMITTED USAGE | PERIOD | NUMBER OF TIMES CONTENT IS USED | COPY |
|---|---|---|---|---|
| 1 | PLAYBACK | NOT LIMITED | NOT LIMITED | — |
| 2 | | LIMITED | NOT LIMITED | — |
| 3 | | NOT LIMITED | LIMITED | — |
| 4 | COPY | NOT LIMITED | NOT LIMITED | NOT LIMITED |
| 5 | | LIMITED | NOT LIMITED | NOT LIMITED |
| 6 | | NOT LIMITED | LIMITED | NOT LIMITED |
| 7 | | NOT LIMITED | NOT LIMITED | SCMS |
| 8 | | LIMITED | NOT LIMITED | |
| 9 | | NOT LIMITED | LIMITED | |
| 10 | | NOT LIMITED | NOT LIMITED | OTHERS |
| 11 | | LIMITED | NOT LIMITED | |
| 12 | | NOT LIMITED | LIMITED | |
| 13 | CHANGING OF PERMITTED USAGE | | | |
| 14 | REDISTRIBUTION | | | |
| 15 | UPGRADE TO AN ALBUM | | | |
| 16 | PERMISSION OF TRANSFERRING MANAGEMENT | | | |

FIG. 36

| | |
|---|---|
| DATA TYPE | |
| TYPE OF PRICE INFORMATION | |
| PERIOD DURING WHICH THE PRICE INFORMATION IS VALID | |
| CONTENT ID | |
| SERVICE PROVIDER ID | |
| PRICE INFORMATION ID | |
| VERSION OF THE PRICE INFORMATION | |
| AREA CODE | |
| USABLE DEVICE CONDITIONS | |
| USERS PERMITTED TO USE THE CONTENT | |
| IDC IDENTIFIER LIST | |
| CONTENT PROVIDER ID | |
| DEALING POLICY ID | |
| NUMBER OF RULES | |
| RULE ADDRESS | |
| RULE 1 | RULE NUMBER |
| | ⋮ |
| | ⋮ |
| ⋮ | ⋮ |
| RULE N | RULE NUMBER |
| | ⋮ |
| | ⋮ |
| (INDICATION OF WHETHER THE SIGNATURE HAS BEEN VERIFIED) | |
| PUBLIC KEY CERTIFICATE | |
| SIGNATURE | |

721

FIG. 38

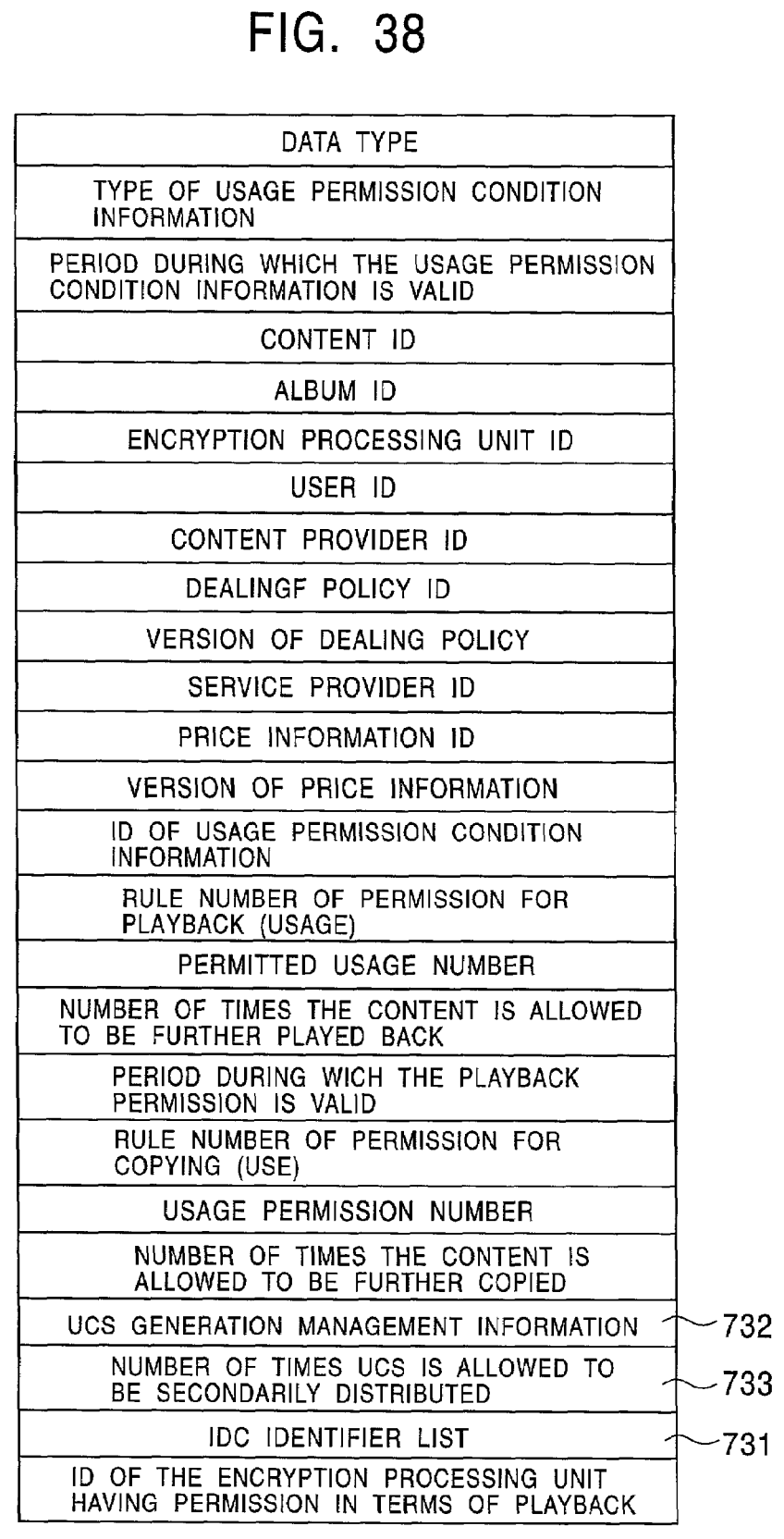

| | |
|---|---|
| DATA TYPE | |
| TYPE OF USAGE PERMISSION CONDITION INFORMATION | |
| PERIOD DURING WHICH THE USAGE PERMISSION CONDITION INFORMATION IS VALID | |
| CONTENT ID | |
| ALBUM ID | |
| ENCRYPTION PROCESSING UNIT ID | |
| USER ID | |
| CONTENT PROVIDER ID | |
| DEALINGF POLICY ID | |
| VERSION OF DEALING POLICY | |
| SERVICE PROVIDER ID | |
| PRICE INFORMATION ID | |
| VERSION OF PRICE INFORMATION | |
| ID OF USAGE PERMISSION CONDITION INFORMATION | |
| RULE NUMBER OF PERMISSION FOR PLAYBACK (USAGE) | |
| PERMITTED USAGE NUMBER | |
| NUMBER OF TIMES THE CONTENT IS ALLOWED TO BE FURTHER PLAYED BACK | |
| PERIOD DURING WICH THE PLAYBACK PERMISSION IS VALID | |
| RULE NUMBER OF PERMISSION FOR COPYING (USE) | |
| USAGE PERMISSION NUMBER | |
| NUMBER OF TIMES THE CONTENT IS ALLOWED TO BE FURTHER COPIED | |
| UCS GENERATION MANAGEMENT INFORMATION | 732 |
| NUMBER OF TIMES UCS IS ALLOWED TO BE SECONDARILY DISTRIBUTED | 733 |
| IDC IDENTIFIER LIST | 731 |
| ID OF THE ENCRYPTION PROCESSING UNIT HAVING PERMISSION IN TERMS OF PLAYBACK | |

PRECONDITIONS:
- IDC AND PKC HAVE BEEN ACQUIRED
- USER REGISTRATION IN THE CONTENTS PROVIDING SERVER HAS BEEN PERFORMED

PRECONDITION:
•IDC AND PKC HAVE BEEN ACQUIRED

FIG. 62

PRECONDITIONS:
- AN IDC OF INTEREST HAS NOT BEEN REGISTERED IN THE USER DEVICE
- THE USER DEVICE HAS NEITHER A PKC NOR A PAIR OF KEYS BUT THE USER DEVICE CAN CREATE THEM
- AN OFF-LINE PROCEDURE NEEDED TO ISSUE AN IDC HAS BEEN PERFORMED, AND INFORMATION (PIN, TEMPLATE, OR SIGNATURE ENCRYPTED USING A PRIVATE KEY) USED TO CHECK WHETHER A TEMPLATE SUPPLIER IS IDENTICAL TO AN APPLICANT HAS BEEN DETERMINED

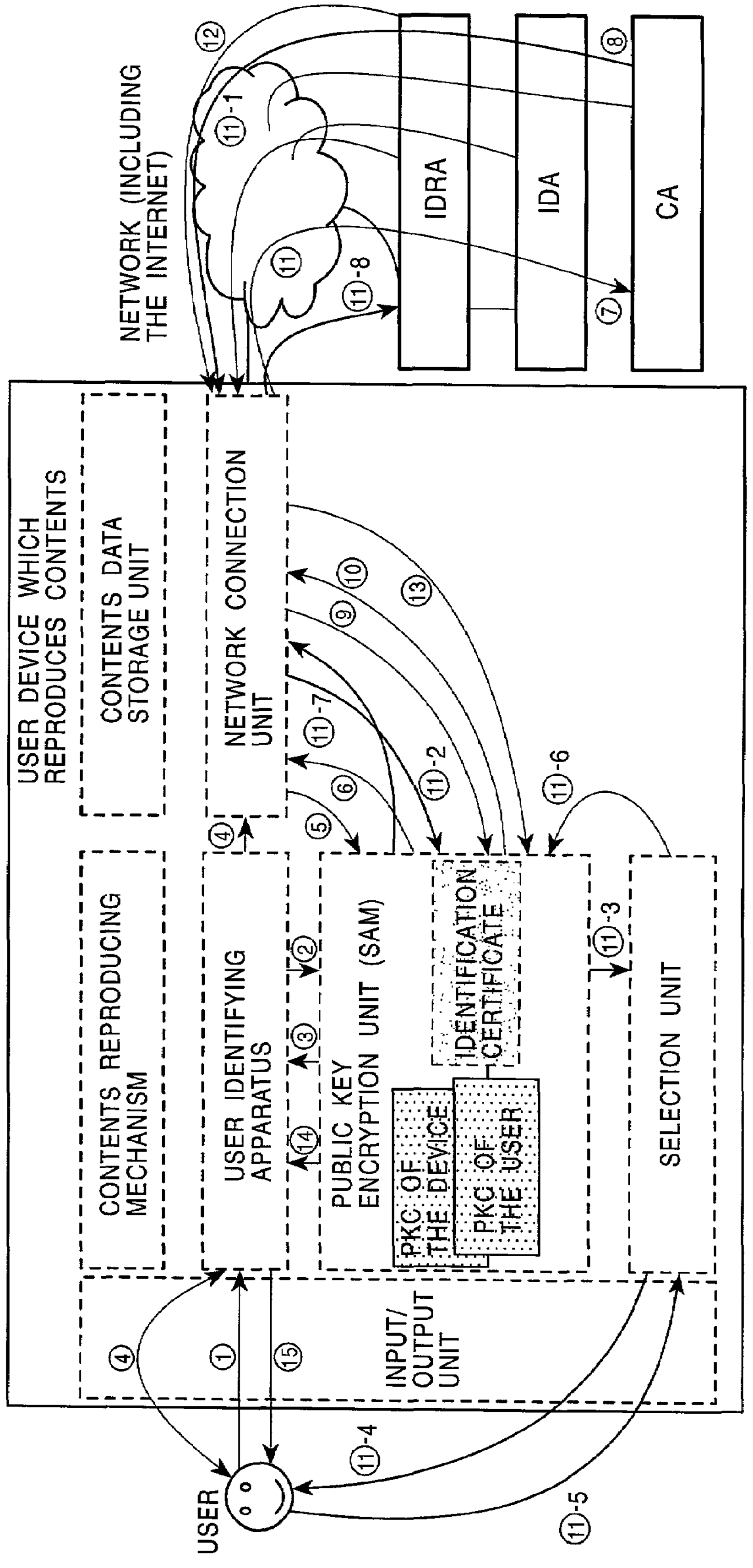

FIG. 71

| | Item | Description |
|---|---|---|
| Indis-pensable Items | Version | Version |
| | Serial Number | Identification Number |
| | signature algorithm Identifier<br>algorithm<br>parameters | Signature algorithm<br>Algorithm<br>Parameters |
| | Issuer | Identification authority name (in the form of a distinguished name) |
| | Validity<br>notBefore<br>notAfter | Validty period<br>• Start date<br>• Expiration date |
| | Subject | Subject Name (in a DN form) |
| | subject IDA Info<br>subject IDA serial Number<br>subject IDA Unique ID | Information about the identification cartificate of the subject<br>• Certificate number of the identification certificate of the subject<br>• Subject unique ID of the identification cerificate of the subject |
| | subject PKC info<br>subject PKC serial Number<br>subject PKC Unique ID | Information about the public key certificate of the subject<br>• Certificate Number of the public key certificate of the subject<br>• Subject unique ID of the public key certificate of the subject |
| Indispen-sable | IDA Signature | Signature of IDA |

PERSON AUTHENTICATION SYSTEM, PERSON AUTHENTICATION METHOD, INFORMATION PROCESSING APPARATUS, AND PROGRAM PROVIDING MEDIUM

BACKGROUND OF THE INVENTION

1. Field of the Invention

The present invention relates to a person authentication system, a person authentication method, an information processing apparatus, and a program providing medium. More particularly, the present invention relates to a person authentication system, a person authentication method, an information processing apparatus, and a program providing medium, which can be advantageously employed, in a communication network such as the Internet or in data communication performed via a medium, to identify a person at a receiving end or to authenticate a person who uses a particular information apparatus such as a personal computer.

2. Description of the Related Art

A data processing apparatus such as a personal computer (PC) is widely used in a company or by a person. In some cases, secret data is stored in such an apparatus. To prevent such secret data from being accessed by an unauthorized user, techniques of preventing information stored in a PC from being leaked have been developed. One known technique for this purpose is to identify a user on the basis of a password input by the user or on the basis of biotic information of the user.

Now, it is popular to distribute various kinds of software data such as a game program, audio data, image data, and a document generating program (hereinafter, such software data will be referred to as a content) via a network such as the Internet or a storage medium such as a DVD or a CD which can be distributed. In such a situation, it is highly desired to quickly identify a user in a highly reliable fashion in various processes such as distribution of a content or reception of a fee for usage of a content. Furthermore, in the user identification process, it is very important to prevent personal information from being leaked.

One widely-used user identification method is to compare input data with preassigned data such as a user ID or a password. However, in this method, there is always a possibility that a registered user ID or password is leaked. Once a user ID or password has been leaked, the same user ID or password becomes unusable. One known method to avoid the above problem is to identify a user using biotic information.

An example of a conventional process of identifying a person using biotic information is described below. A representative example of biotic information for the above purpose is a fingerprint. A person authentication apparatus which reads a fingerprint and verifies it is described below with reference to FIG. 1. In FIG. 1, a user of a PC 20 registers his/her fingerprint information in a person authentication apparatus 10 including a reading apparatus, and data indicating the fingerprint is stored in a secure memory 14. The fingerprint information stored therein is called a template. When the user uses data on the personal computer 20, his/her fingerprint is read and compared with the template by the person authentication apparatus 10 serving as a fingerprint reading apparatus.

More particularly, reading of fingerprint information of a user is performed by a personal information acquisition unit 11 formed of a CCD camera or the like. After being read, the fingerprint information is subjected to a feature extraction process performed by an information conversion unit 12, and resultant data is compared, by a comparator 13, with the template stored in the secure memory 14.

The comparator 13 determines whether or not the data is identical to the template on the basis of a threshold value preset in the comparator. If the data and the template match with each other to a degree higher than the threshold value, the comparator 13 outputs an OK signal, while a NG signal is output when the matching degree is lower than the threshold value. The fingerprint information is stored in the form of fingerprint image data, and the data indicating the feature extracted by the information converter 12 is compared with the image data to check the matching degree relative to the threshold value.

In the case where the comparator 13 determines that the input information and the registered information match with each other, an authentication success message is transmitted to the personal computer 20 via a communication unit 16, and the user is permitted to access the personal computer 20. If it is determined that the input data does not match with the registered information, an authentication failure message is transmitted, and accessing to the personal computer 20 is refused. The person authentication apparatus 10 may include fingerprint information templates of a plurality of users (user ID=ID1 to IDn) stored in the secure memory as shown in FIG. 1, and a user may be permitted to access the PC if the person authentication apparatus 10 determines that a fingerprint of the user matches with some stored template. This makes it possible for a single person authentication apparatus to deal with a plurality of users.

However, the above-described person authentication apparatus has the following problems arising from the construction in which templates are stored in a memory of the fingerprint reading/comparing apparatus.

(a) To use the comparison result, it is required that a template be included in the fingerprint reading/comparing apparatus.

(b) In the case where a fingerprint is compared at a plurality of different locations, it is required to register, beforehand, the fingerprint in a plurality of fingerprint read/comparison apparatuses.

(c) Because templates are stored in the fingerprint reading/comparing apparatus, there is a risk that data representing templates may be tampered with or may be read by an unauthorized person.

(d) When the comparison result is transmitted to a PC or the like, the comparison result can be easily attacked.

As described above, the conventional person authentication system is coupled in an inseparable fashion to a particular data processing apparatus such as a personal computer which deals with secret information, in which the person authentication system is assumed to authenticate only users who deal with that personal computer, and thus the person authentication system cannot be used to authenticate a user who uses another device in which no template is stored. Furthermore, because templates are stored in the fingerprint reading/comparing apparatus itself, there is a problem in terms of security and reliability of templates.

Furthermore, in data transmission in which encrypted data is transmitted via a network or in data distribution via a medium, data is generally encrypted using a public key, and a public key certificate is widely used to guarantee the reliability of the public key. However, although a public key certificate certifies a public key itself, the public key certificate cannot guarantee the relationship between the public key and a person who owns that public key. That is, (e) No technique is known to guarantee the relationship between a public key used in transmission of encrypted data or the like and an owner of that public key, and a good enough means for identifying the owner of the public key is not known.

As described above, the conventional person authentication system has various problems to be solved. In particular, in a recent social situation in which advanced communication systems via networks such as the Internet have become very popular, a large amount of secret information and personal information are frequently dealt with using various communication devices and data processing devices at various locations and at various times. Furthermore, in pay contents distribution systems/services in which contents are distributed to specific users such as registered members, it is required to identify users when contents are distributed or services are provided. Thus, it is highly desired to realize a person authentication system which is usable without having limitations in terms of locations, times, and devices used.

SUMMARY OF THE INVENTION

Accordingly, it is an object of the present invention to provide a person authentication system and a person authentication method, which allow person authentication to be performed in various situations and environments in a highly reliable fashion, and which allow template information to be stored and used in a highly secure manner, and furthermore, which can be used in conjunction with a public key certificate, thereby allowing person authentication to be used in various fields.

It is another object of the present invention is to provide a person authentication system, which executes management the validity of the person identification certificate, and a person authentication method, which allow person authentication to be performed by comparing a template, which stored in the person identification certificate, with sampling information input by a user if the validity is confirmed by checking the validity of the person identification certificate on the basis of the certificate expiration date, the certificate usage number limit, or the expiration date when the person authentication is executed on the basis of the person authentication certificate storing the template which is person identification data.

According to a first aspect of the present invention, there is provided a person authentication system for executing person authentication by comparing a template, which is person authentication data, with sampling information input by a user, the person authentication system including a person authentication authority issuing a person authentication certificate storing template information including the template; and a person authentication execution entity obtaining the template from the person authentication certificate issued by the person authentication authority and executing person authentication on the basis of the obtained template;

wherein the person authentication certificate issued by the person authentication authority stores usage restriction information which includes at least either a certificate expiration date or a certificate usage number limit; and the person authentication execution entity checks the validity of the person authentication certificate on the basis of the certificate expiration date or the certificate usage number limit when the person authentication is executed on the basis of the person authentication certificate.

In an embodiment of the person authentication system according to the present invention, the person authentication execution entity checks the validity of the person authentication certificate on the basis of a certificate expiration date or a certificate usage number limit in person authentication processing the basis of the person authentication certificate, and then executes the person authentication by comparing the template, stored in the person authentication certificate, with sampling information input by a user on the condition that the validity of the person authentication certificate has been confirmed on the basis of the certificate expiration date or the certificate usage number limit.

In an embodiment of the person authentication system according to the present invention, the person authentication execution entity has a person authentication executing device, and the person authentication executing device executes the following processing when usage restriction information of a certificate usage number limit is stored in a person authentication certificate: storing a set usage count in a memory of the person authentication executing device; updating usage count data stored in the memory every time the person authentication certificate is used; determining whether the usage count data is within the limits of the set usage count of the person authentication certificate; and executing person authentication by comparing user input sampling information with a template stored in the person authentication certificate if the usage count data is within the certificate usage number limit.

In an embodiment of the person authentication system according to the present invention, a person identification certificate issued by the person identification certificate authority stores a template expiration date which is information on an expiration date of a template stored in the person identification certificate; and the person authentication execution entity checks the validity of the template on the basis of the template expiration date in person authentication processing on the basis of the person authentication certificate.

In an embodiment of the person authentication system according to the present invention, the person authentication execution entity checks the validity of a template on the basis of the template expiration date in person authentication processing on the basis of the person authentication certificate, and then executes the person authentication by comparing the template, stored in the person authentication certificate, with sampling information input by a user on the condition that the validity of the template expiration date has been confirmed.

In an embodiment of the person authentication system according to the present invention, the person authentication execution entity functions as an information processing apparatus, and the information processing apparatus checks the validity of the template expiration date or the expiration date of a person authentication certificate which is set in the certificate stored in the apparatus and then outputs a request for issuing the person authentication certificate to a person identification certificate authority which issues the person authentication certificate when the validity can not be confirmed; the person identification certificate authority makes the person authentication certificate in which a new expiration date is set and then issues the person identification certificate to the information processing apparatus; and the information processing apparatus has storage means and stores the person identification certificate, which is issued by the person identification certificate authority, in the storage means.

In an embodiment of the person authentication system according to the present invention, the person identification certificate authority checks the validity of a template expiration date or an expiration date of an issued person identification certificate, and then gives notice to an entity received the person identification certificate of which a expiration date is approaching.

In an embodiment of the person authentication system according to the present invention, the person identification certificate authority receives a request for updating an issued person authentication certificate from an entity received the person identification certificate, makes a person authentication certificate in which a updated expiration date or a updated certificate usage number limit is set according to the request, and then issues the person authentication certificate.

In an embodiment of the person authentication system according to the present invention, the person identification certificate authority receives a request for updating the template, stored in a person identification certificate which has been issued, from an authenticated user of a person identification certificate; and the person identification certificate authority nullifies the person identification certificate according to the request and then makes a person identification certificate on the basis of an updated template.

In an embodiment of the person authentication system according to the present invention, the person identification certificate authority receives data of a request for setting a template expiration date from an authenticated user of a person identification certificate, and then makes a person identification certificate in which a template expiration date is set on the basis of the data of the request for setting a template expiration date.

In an embodiment of the person authentication system according to the present invention, the person identification certificate authority and the person authentication executing entity execute mutual authentication, when data communication is performed therebetween, a data transmitter puts a digital signature on transmitted data, and a data receiver verifies the digital signature.

In an embodiment of the person authentication system according to the present invention, the template is personal biotic information such as fingerprint information, retina pattern information, iris pattern information, voice print information, and handwriting information; personal nonbiotic information such as seal information, passport information, driver's license information, and card information; any combination of the personal biotic information and the personal nonbiotic information; or a combination of the above information and a password.

In an embodiment of the person authentication system according to the present invention, the person identification certificate authority puts a digital signature on a person authentication certificate issued by the person identification certificate authority.

According to a second aspect of the present invention, there is provided a person authentication method for executing person authentication by comparing a template, which is person authentication data, with sampling information input by a user, the method comprising: causing a person authentication authority to issue a person authentication certificate storing template information including the template; causing a person authentication execution entity to obtain the template from the person authentication certificate issued by the person authentication authority and to execute person authentication on the basis of the obtained template; storing usage restriction information, which includes at least either a certificate expiration date or a certificate usage number limit, in the person authentication certificate issued by the person authentication authority; and causing the person authentication execution entity to check the validity of the person authentication certificate on the basis of the certificate expiration date or certificate usage number limit in person authentication processing on the basis of the person authentication certificate.

In an embodiment of the person authentication system according to the present invention, the person authentication execution entity checks the validity of the person authentication certificate on the basis of a certificate expiration date or a certificate usage number limit in person authentication processing on the basis of the person authentication certificate, and then executes the person authentication by comparing the template, stored in the person authentication certificate, with sampling information input by a user on the condition that the validity of the person authentication certificate has been confirmed on the basis of the certificate expiration date or the certificate usage number limit.

In an embodiment of the person authentication system according to the present invention, the person authentication execution entity has a person authentication executing device, and the person authentication executing device executes the following processing when usage restriction information of a certificate usage number limit is stored in a person authentication certificate: storing a set usage count in a memory of the person authentication executing device; updating usage count data stored in the memory every time the person authentication certificate is used; determining whether the usage count data is within the limits of the set usage count of the person authentication certificate; and executing person authentication by comparing sampling information, input by a user, with a template stored in the person authentication certificate if the usage count data is within the limits.

In an embodiment of the person authentication system according to the present invention, the person identification certificate authority stores a template expiration date, which is information on an expiration date of a template stored in a person identification certificate made by the person identification certificate authority; and a person authentication execution entity checks the validity of the template on the basis of a template expiration date in person authentication processing on the basis of the person authentication certificate.

In an embodiment of the person authentication system according to the present invention, the person authentication execution entity checks the validity of a template on the basis of a template expiration date in person authentication processing on the basis of a person authentication certificate, and then executes the person authentication by comparing the template, stored in the person authentication certificate, with sampling information input by a user on the condition that the validity of the template expiration date has been confirmed.

In an embodiment of the person authentication system according to the present invention, the person authentication execution entity functions as an information processing apparatus; the information processing apparatus checks the validity of a template expiration date or a expiration date of a person authentication certificate which is set in the person authentication certificate stored in the apparatus, and then outputs a request for issuing the person authentication certificate to a person identification certificate authority which issues the person authentication certificate when the validity can not be confirmed; the person identification certificate authority makes the person authentication certificate in which a new expiration date is set and then issues the person identification certificate to the information processing apparatus; and the information processing apparatus has storage means and stores the person identification certificate, which is issued by the person identification certificate authority, in the storage means.

In an embodiment of the person authentication system according to the present invention, the person identification certificate authority checks the validity of a template expiration date or an expiration date of an issued person identification certificate, and then gives notice to an entity received the person identification certificate of which a expiration date is approaching.

In an embodiment of the person authentication system according to the present invention, the person identification certificate authority receives a request for updating an issued person authentication certificate from an entity received the person identification certificate, then issues a person authentication certificate in which a updated expiration date or a updated certificate usage number limit is set according to the request, and issues a certificate usage number limit.

In an embodiment of the person authentication system according to the present invention, the person identification certificate authority receives a request for updating a template, stored in a person identification certificate which has been issued, from an authenticated user of a person identification certificate; and the person identification certificate authority nullifies the person identification certificate according to the request and then makes a person identification certificate on the basis of a updated template.

In an embodiment of the person authentication system according to the present invention, the person identification certificate authority receives data of a request for setting a template expiration date from an authenticated user of a person identification certificate, and then makes the person identification certificate in which a template expiration date is set on the basis of the data of the request for setting a template expiration date.

In an embodiment of the person authentication system according to the present invention, the person identification certificate authority and the person authentication executing entity executes mutual authentication, when data communication is performed therebetween, a data transmitter puts a digital signature on transmitted data, and a data receiver verifies the digital signature.

According to a third aspect of the present invention, there is provided an information processing apparatus for executing person authentication by comparing a template, which is person authentication data, with sampling information input by a user, the apparatus including: a section for storing the template to execute person authentication on the basis of a person authentication certificate issued by a person authentication certificate authority which is a third party; and a section for checking the validity of the person authentication certificate on the basis of a certificate expiration date or certificate usage number limit in person authentication processing on the basis of the person authentication certificate, and then executes the person authentication by comparing the template, stored in the person authentication certificate, with the sampling information input by a user on the condition that the validity of the person authentication certificate has been confirmed on the basis of the certificate expiration date or certificate usage number limit.

According to a fourth aspect of the present invention, there is provided an information processing apparatus for executing person authentication by comparing a template, which is person authentication data, with sampling information input by a user, the apparatus including: a section for storing the template to execute person authentication on the basis of a person authentication certificate issued by a person authentication certificate authority which is a third party; a section for executing the following processing when usage restriction information of valid certificate usage number is stored in a person authentication certificate: storing a set usage count in a memory of the device; updating usage count data stored in the memory every time the person authentication certificate is used; and determining whether the usage count data is within the limits of the set usage count of the person authentication certificate; and executing person authentication by comparing user input sampling information with a template stored in the person authentication certificate if the usage count data is within the limits.

According to a fifth aspect of the present invention, there is provided an information processing apparatus for executing person authentication by comparing a template, which is person authentication data, with sampling information input by a user, the apparatus comprising: a section for storing the template to execute person authentication on the basis of a person authentication certificate issued by a person authentication certificate authority which is a third party; and a section for checking the validity of the template on the basis of the template expiration date in person authentication processing on the basis of the person authentication certificate, and then executes the person authentication by comparing the template, stored in the person authentication certificate, with sampling information input by a user on the condition that validity of the template expiration date has been confirmed.

According to a sixth aspect of the present invention, there is provided a program proving medium for proving a computer program which executes person authentication on the computer program by comparing a template, which is person authentication data, with sampling information input by a user, the computer program comprising: a step of confirming whether usage restriction information, which includes either a certificate expiration date, a certificate usage number limit, or a template expiration date, is stored in a person authentication certificate issued by a person authentication certificate authority; a step of checking the validity of the person authentication certificate on the basis of the certificate expiration date, the certificate usage number limit, or the template expiration date in person authentication processing on the basis of the person authentication certificate; and a step of executing the person authentication by comparing the template, stored in the person authentication certificate, with sampling information input by a user on the condition that the validity of the person authentication certificate has been confirmed on the basis of the certificate expiration date, certificate usage number limit, or the template expiration date.

The program providing medium according to the sixth aspect of the present invention is used to provide a computer program in a computer-readable format to a computer system capable of executing various program codes. There is no particular limitation in the form of the medium, and various types of media can be used. Specific examples include a storage medium such as a CD, FD, MO, and DVD and a transmission medium such as a network.

Such a program providing medium defines a cooperative relationship in structure or function between the computer program and the providing medium so that the computer program functions on a computer system. In other words, the program providing medium operates in a cooperative fashion on a computer system when the computer program is installed on the computer system via the program providing medium, thereby achieving functions similar to those which can be achieved according to the other aspects of the present invention. Other objects, aspects, and advantages of the present invention will become apparent from the following description of embodiments with reference to the accompanying drawings.

As described above, the person authentication system, the person authentication method, and the information processing apparatus according to the present invention allow various devices to perform person authentication in an easy fashion by comparing a template serving as person identification data with sampling information input by a user. For example, a service provider (SP) or user device (UD) can execute person authentication by acquiring a template from a person identification certificate (IDC) generated by a third-party agency serving as a person identification certificate authority (IDA). The person identification certificate (IDC) is issued by the person identification certificate authority (IDA), in response to a request from a person, on the basis of a template serving as identification data which is acquired from the person after verifying the identification of the person, and, when the person identification certificate (IDC) is distributed to a service provider (SP) or a user device (UD), the distribution is performed after adding a signature of the IDA thereto, thereby ensuring that the validity of the data is guaranteed and high-reliability person authentication can be performed.

Furthermore, the person authentication system, the person authentication method, the information processing apparatus, and the program providing medium according to the present invention cause the validity of the certificate to be checked on the basis of a certificate expiration date, a certificate usage number limit, or a template expiration date in person authentication processing on the basis of the certificate storing the template which is person identification data. The person identification certificate authority manages the validity of the certificate because the person authentication is executed by comparing the template, stored in the certificate, with sampling information input by a user if the validity is confirmed.

Furthermore, the person authentication system, the person authentication method, the information processing apparatus, and the program providing medium according to the present invention allow the person identification certificate authority to update the certificate or the template according to a request of the authentication execution entity, so that the certificate or the template is updated at any timing.

BRIEF DESCRIPTION OF THE DRAWINGS

FIG. 3 is a diagram illustrating a data format of a public key certificate;

FIG. 4 is a diagram illustrating the data format of the public key certificate;

FIG. 5 is a diagram illustrating an example of a format of a person identification certificate;

FIG. 7 is a table illustrating the types of keys used to encrypt a template of a person identification certificate and also illustrating processing manners;

FIG. 33 is a diagram illustrating a form of a list of person identification certificates (IDCs);

FIG. 34 is a diagram illustrating a specific example of a form of sales restriction (UCP) information;

FIG. 35 is a diagram illustrating an example of a format of a permitted usage data;

FIG. 36 is a diagram illustrating an example of a data format of price information included in a secure container;

FIG. 38 is a diagram illustrating an example of a data format of usage control status (UCS) information;

FIG. 62 is a diagram illustrating a flow of data in the process of requesting a person identification certificate (IDC), which is to be stored in a device, to be issued;

FIG. 71 is a diagram illustrating an example of a format of a verification certificate;

DESCRIPTION OF THE PREFERRED EMBODIMENT

Figure 1:
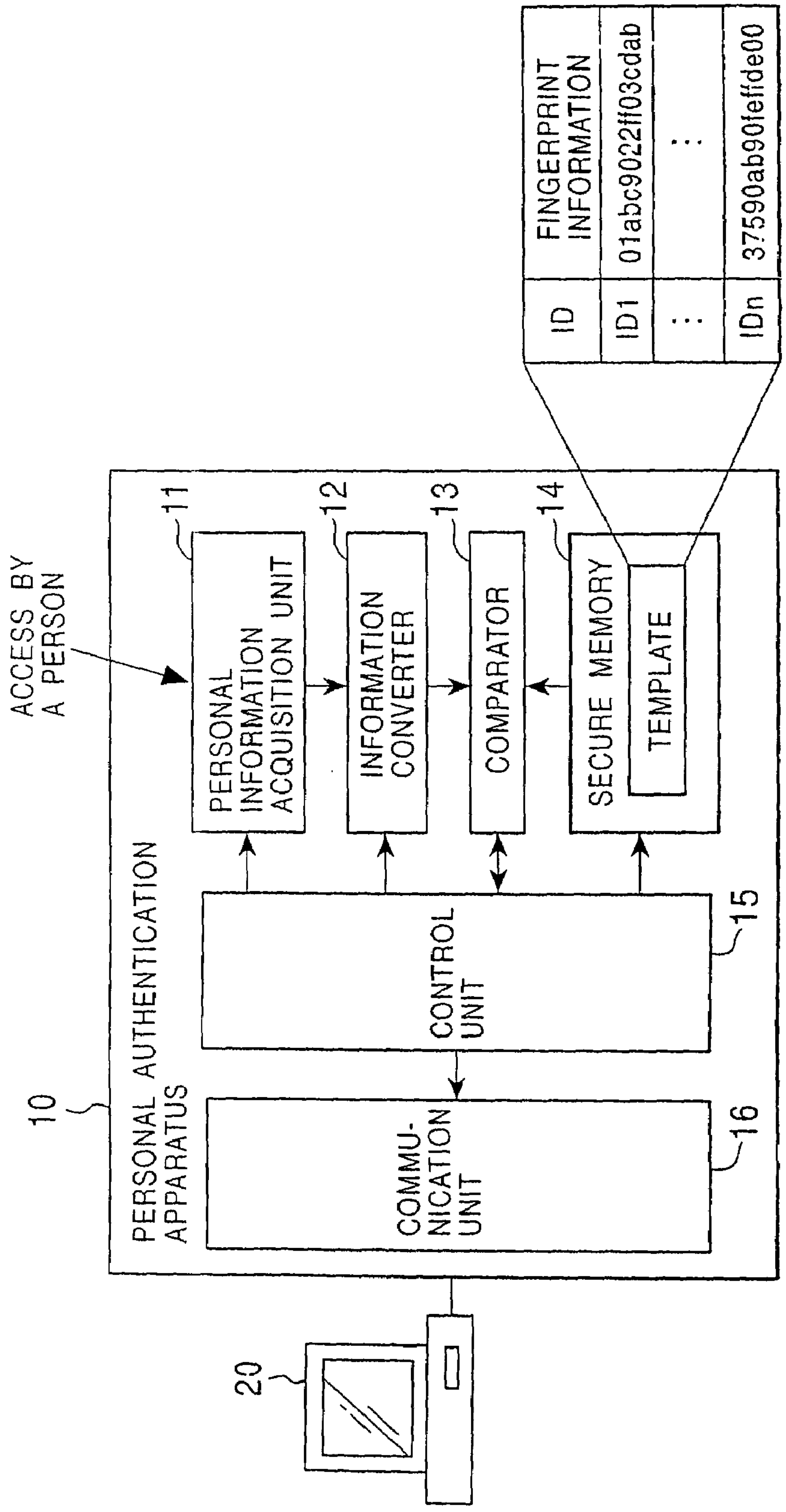
FIG. 1 RELATED ART
FIG. 1 is a diagram illustrating a conventional person authentication apparatus which reads and verifies a fingerprint.

The present invention is described in further detail below with reference to preferred embodiments in conjunction with the accompanying drawings.

The present invention is described below in terms of items listed below.

1. Concepts of the Present Invention and the Outline of Certificates
2. Encryption of Template
3. Registration and Change of Template and Person Identification Certificate (IDC)
4. Basic Manners of Using Person Identification Certificate (IDC)
5. Authentication Using Person Identification Certificate (IDC)
6. Control of Permission of Usage of Content According to User Authentication on the Basis of Person Identification Certificate
7. Link between Person Identification Certificates (IDCs) and Public Key Certificates (PKCs)
8. Using a Content on the Basis of Person Identification Certificate (IDC) and Public Key Certificate (PKC)
9. One-Time Public Key Certificate (One-Time PKC)
10. Verification Certificate
11. Downloading of Person Identification Certificate (IDC) and Usage of a Content
12. Setting the Validity Period of Person Identification Certificate (IDC)

[1. Concepts of the Invention and Outline of Certificates]

(1.1 Basic Concepts of the System According to the Invention)

First, basic concepts of the person authentication system according to the present invention are described. In the present invention, authentication of a person is realized using a person identification certificate (IDC). A person identification certificate (IDC) is issued for each person who wants to be certified by an identification authority (IDA), which is a reliable third-party agency, after verifying the identification of the person.

Each person identification certificate (IDC) includes information (template information) which identifies a corresponding person. Specific examples usable as personal identification information include fingerprint information, retina pattern information, iris pattern information, voice print information, and handwriting information. Personal identification information other than biotic information such as a seal, a passport, a driver's license, or a card can also be used. Any combination of the personal identification information described above can also be used. Furthermore, a combination of a password and any personal identification described above may also be used. That is, information that only a person himself/herself can possess is used as the person identification information and is stored as template information wherein the template information is generally encrypted.

A person identification certificate (IDC) issued by an identification authority (IDA) is used by a registered user himself/herself, a service provider (SP) which provides a content to the registered user, or an agency or an organization (such as a settling financial institution) which needs to authenticate an user. A person identification certificate (IDC) is also issued by the person identification certificate authority (IDA) in response to a request from a user device which needs the person identification certificate (IDC) for authentication of an user. Specific examples of manners of using person identification certificates will be described in detail later.

Furthermore, in embodiments according to the present invention, a person identification certificate (IDC) is effectively used in conjunction with a public key certificate (PKC). For example, when a service provider (SP) distributes an encrypted content to an user, the service provider (SP) authenticates the user on the basis of a person identification certificate (IDC), and the service provider (SP) transmits the encrypted content to the user only when the user is verified as an authorized user, wherein the content is encrypted using a public key described in a public key certificate so that only the authorized user can decrypt the content.

Figure 2:
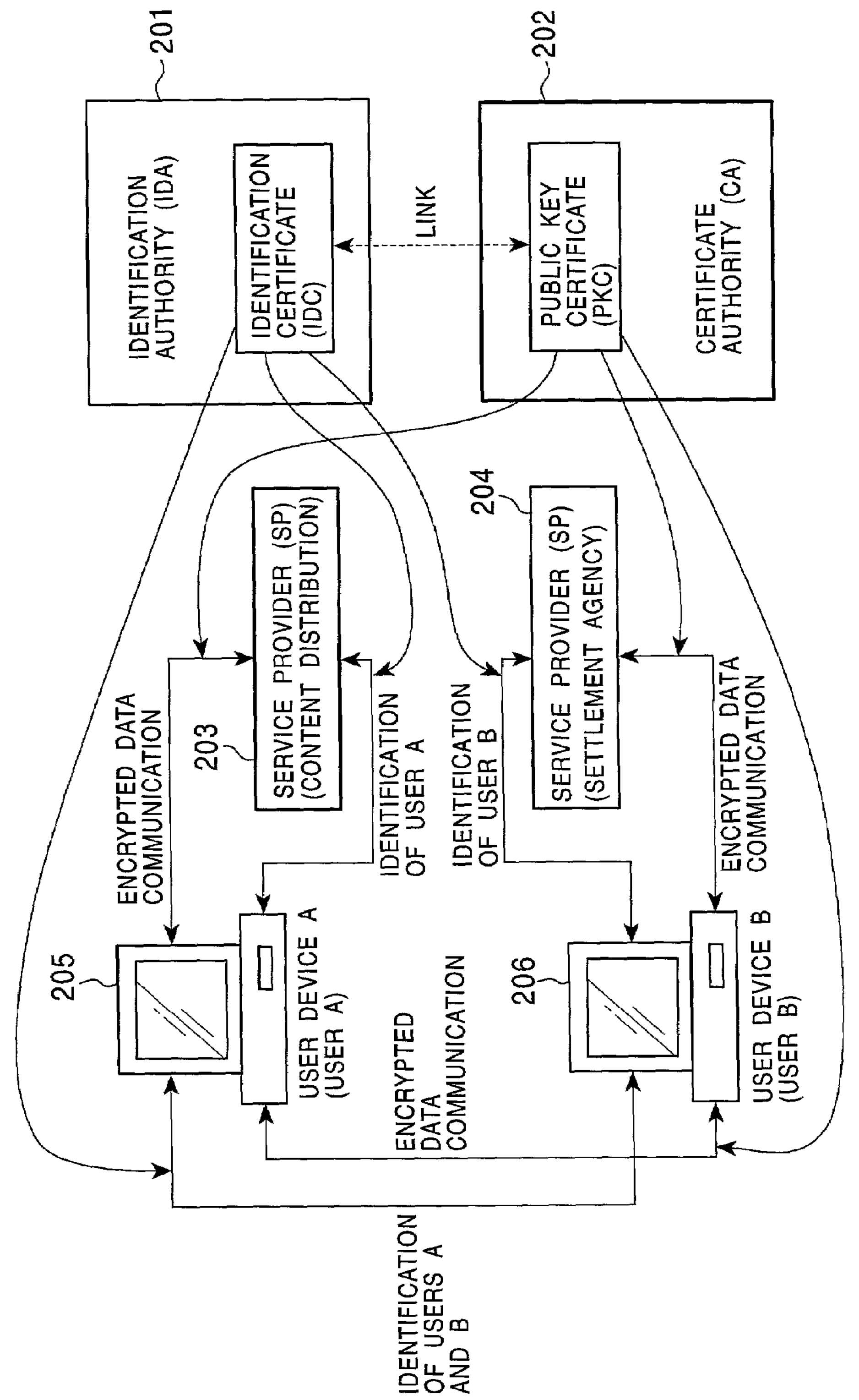
FIG. 2 is a diagram illustrating encrypted data communication performed, using a public key certificate, by a personal authentication system according to the present invention.

FIG. 2 is a diagram illustrating encrypted data communication performed by a person authentication system, using a public key certificate, according to the present invention. A person identification certificate (IDC) and a public key certificate (PKC) are issued by an identification authority (IDA) 201 and a certificate authority (CA) 202, respectively, in accordance with predetermined procedures.

Encrypted data communication is performed, for example, between a user device A205 and a service provider (SP) 203 which distributes a content. In the encrypted data communication, the service provider (SP) 203 first confirms that the user device A is used by a user A and then transmits a content after converting the content into encrypted data which can be decrypted by the user A.

The user A registers his/her personal information in the person identification certificate authority (IDA) 201, and the person identification certificate authority (IDA) 201 issues a person identification certificate (IDC) to the user A. The service provider (SP) 203 verifies the authenticity of the user A on the basis of the person identification certificate (IDC). In this case, the service provider (SP) 203 is an entity which executes person authentication on the basis of the person identification certificate (IDC). The authentication may be performed in various manners on the basis of an identification certificate, as will be described in detail later.

The user A presents his/her public key to the certificate authority 202 and receives a public key certificate including a digital signature written by the certificate authority. After the service provider (SP) 203 authenticates the user A on the basis of the person identification certificate (IDC), the service provider (SP) 203 extracts the public key from the public key certificate of the user A and transmits a content to the user A after encrypting the content using the extracted public key. When the user A of the user device A205 receives the encrypted content, the encrypted data is decrypted using a private key corresponding to the public key, and the decrypted data is used by the user A.

Authentication and transmission of encrypted data are also performed in a similar manner between a service provider (SP) 204 serving as a settling institution and a user device B206. That is, the service provider (SP) 204 authenticates the user B on the basis of an identification certificate of the user B and transmits data (such as a content or electronic settlement data) after encrypting the data using a public key certificate of the user B. In this case, the user device is an entity which executes personal authentication on the basis of the person identification certificate (IDC).

Furthermore, in data communication between the user device A205 and the user device B206, authentication of users A and B is performed on the basis of the person identification certificates of users A and B, and data is transmitted by means of encryption using the public key certificate of the use A or B.

As described above, identification certificates and public key certificates can be used in various situations in which data is transmitted. A person identification certificate can also be used singly. For example, when a user accesses secret information stored in a PC, the authenticity of the user is verified on the basis of a person identification certificate. A wide variety of entities, such as a service provider (SP), a user device, and a person identification certificate authority (IDA), execute person authentication on the basis of a person identification certificate.

In an embodiment of a system according to the present invention, as shown in FIG. 2, a person identification certificate (IDC) issued by a person identification certificate authority (IDA) 201 is linked with a public key certificate (PKC) issued by a certificate authority 202. The link may be achieved by incorporating a public key certificate (PKC) into a person identification certificate or by creating group information indicating link information. Manners of forming links will be described in detail later.

In the public key cryptography described above, different keys are used by a sender and a receiver, wherein one of the keys is used as a public key which are opened for use by any unspecified user, while the other key is used as a private key which is kept secret. In the public key cryptography, unlike the symmetric key cryptography in which encryption and decryption are performed using a symmetric key, only a particular one person has a private key which should be kept secret, and thus it is easy to manage keys. An representative example of a public key encryption algorithm is the RSA (Rivest-Shamir-Adleman) encryption algorithm. In this technique, a product of two very large prime numbers (for example, 150-digit prime numbers) is used because it is difficult to factorize the product of two very large prime numbers (such as 150-digit prime numbers) into prime numbers.

In the public key cryptography, a large number of unspecified users are allowed to use the same public key, and the validity of a distributed public key is generally certified by a certificate called a public key certificate. For example, a user A creates a pair of a public key and a private key and sends the created public key to a certificate authority to acquire a public key certificate from the certificate authority. The user A opens the public key certificate to the public. An unspecified user acquires the public key from the public key certificate via a predetermined procedure and transmits, to the user A, a document or the like after encrypting it using the public key. Upon reception of the document, the user A decrypts the received document using the private key. The user A may also attach his/her signature encrypted with the private key to a document or the like, and unspecified user may verify the signature using the public key extracted from the public key certificate via the predetermined procedure. Before describing the person authentication system according to the present invention in further detail, the data structures of the public key certificate (PKC) and the person identification certificate (IDC) used in the system of the present invention are described.

(1.2 Public Key Certificate)

Public key certificates are described with reference to FIGS. 3 and 4. In the public key cryptography, a public key certificate is issued by a certificate authority (CA) which is also called an issuer authority (IA), wherein in response to receiving an ID and a public key from an user, the certificate authority issues a certificate after adding information such as an ID of the certificate authority and a validity period and also adding a signature of the certificate authority.

An example of a format of a public key certificate is described. In this specific example, the format is according to the public key certificate format X.509 V3.

Version indicates the version of the certificate format.

Serial Number indicates a serial number assigned by a public key issuer authority (IA) to a public key certificate.

Signature algorithm Identifier and algorithm parameters are fields in which the signature algorithm of the public key certificate and parameters thereof are described. Either the elliptic curve cryptography or the RSA can be used as the signature algorithm, wherein in the case where the elliptic curve cryptography is employed, parameters and the key length are described, while the key length is described in the case where the RSA is employed.

Issuer is a field in which the issuer of the public key certificate, that is, the name of the public key certificate issuer (IA) is described in the form of a distinguished name.

Validity is a field to describe a period during which the certificate is valid, wherein a start date and an expiration date are described.

Subject is a field in which the name of a subject or a user is described. More specifically, for example, the ID of a user device or the ID of a subject which supplies services is described.

In subject Public Key Info, algorithm and subject Public key, information about the public key of the user including the key algorithm is described.

The fields described above are defined in the public key certificate format X.509 V1, and fields described below are fields added thereto according to the public key certificate format X.509 V3.

In authority Key Identifier, key Identifier, authority Cert Issuer, authority Cert Serial Number, information which identifies the key of the public key certificate issuer (IA) is described, wherein, more specifically, a key identification number (octal number), the name of the public key issuer authority (IA), and a certificate number are described.

In subject key Identifier, identifiers are described in the case where a plurality of keys are certified in the public key certificate.

Key usage is a field to specify the purpose of the key, wherein a purpose is selected from the group consisting of (0) digital signature, (1) prevention of repudiation, (2) encryption of the key, (3) encryption of a message, (4) distribution of a symmetric key, (5) verification of the signature of the certificate, and (6) verification of the signature of a revocation list.

In private Key Usage Period, a period is described during which the private key of the user is valid.

In certificate Polices, certificate policies of certificate authorities, that is, the public key certificate issuer authority (IA) and the registration authority (RA), are described. For example, a policy ID or a certification criterion according to the ISO/IEC9384-1 is described.

Policy Mapping is described only when a CA (public key certificate issuer (IA)) is certified, wherein mapping is described in terms of the policy of the public key certificate issuer (IA) which issues the certificate and the policy of the certificate authority which is certified.

In supported Algorithms, attributes of a directory (X.500) are defined. This field is used, in communication, to inform a receiving party of the attribute of the directory.

Subject Alt Name is a field to describe an alternative name of the subject.

Issuer Alt Name is a field to describe an alternative name of the certificate issuer.

Subject Direction Attribute is a field in which an arbitrary attribute of the user is described.

Basic Constraint is a field to describe whether the public key to be certified is used for signature of the certificate authority (public key certificate issuer authority (IA)) or is used by the user.

Name Constraints permitted Subtrees is a field to describe the area where the certificate is effective, wherein this field is used only when a certificate authority (public key certificate authority (CA) is certified.

In policy Constraints, constrains are described in terms of requirements of explicit policy ID or inhibit policy mapping for the remaining certification path.

CRL (Certificate Revocation List) Distribution Points is a filed to describe a reference point in the revocation list (FIG. 9) at which data is present which indicates whether the certificate of a user is revoked, wherein this field is used to confirm, when the user uses the certificate, that the certificate is not revoked.

Signature is a field in which a signature of the public key certificate issuer (public key certificate authority (IA) is written. The signature is data which is created by generating a hash value by applying a hash function to the whole of a certificate and then encrypting the resultant hash value using a public key of a certificate authority.

A certificate authority issues a public key certificate in the format shown in FIGS. 3 and 4 and also updates a public key certificate which has expired. Furthermore, the certificate authority generates, manages, and distributes an illegal user list (revocation list) to shut out users who have made an illegal act. The certificate authority also generates a public key and a private key, as required.

When a user uses the public key certificate, the user verifies the digital signature of the public key certificate using the public key of the certificate authority the user has. If the verification of the digital signature is successfully passed, the user extracts the public key from the public key certificate. Therefore, all users, who want to use the public key certificate, need to have the common public key of the certificate authority.

(1.3 Person Identification Certificate)

Each person identification certificate (IDC) used in the person authentication system according to the present invention includes information which identifies a person (hereinafter, this person identification information included in the IDC is referred to as template information). An example of template information is biotic information of a person such as fingerprint information, retina pattern information, iris pattern information, voice print information, and handwriting information. Personal identification information other than biotic information is also usable. Specific examples of such personal identification information includes a seal, a passport, a driver's license, and a card. Any combination of the personal identification information described above can also be used. Furthermore, a combination of a password and any personal identification described above may also be used. That is, information that only a person himself/herself can possess is used as the person identification information. It is desirable that the template information be stored in the IDC after being encrypted so as to prevent the template information from being leaked to an unauthorized third party. However, encryption of the template is not necessarily required if the distribution of the person identification certificate is very limited and if the template is thus prevented from being leaked.

A digital signature of a person identification authority (IDA) is written in a person identification certificate (IDC) so that the person identification certificate is prevented from being tampered with.

FIG. 5 illustrates an example of a person identification certificate format. The person identification certificate format shown in FIG. 5 includes indispensable item fields, extended item fields, and a signature field. The respective items are described below.

First, the respective fields of the indispensable items are described.

Version indicates the version of the certificate format.

Serial Number indicates a serial number assigned by a person identification authority (IDA) to a person identification certificate (IDC).

In Signature algorithm Identifier algorithm parameter, the signature algorithm of the person identification certificate and parameters thereof are described.

Either the elliptic curve cryptography or the RSA can be used as the signature algorithm, wherein in the case where the elliptic curve cryptography is employed, parameters and the key length are described, while the key length is described in the case where the RSA is employed.

Issuer is a field in which the issuer of the person identification certificate, that is, the name of the person identification certificate authority (IDA) is described in the form of a distinguished name.

Validity is a field to describe a period during which the certificate is valid, wherein a start date and an expiration date are described.

Subject is a field in which the name of a subject or a user is described. In this field, more specifically, the ID or the name of the user is described.

Subject Template Info is a field to describe identification information of an user, wherein data representing biotic information such as a fingerprint of the user is stored after being encrypted. More specifically, the encryption algorithm used to encrypt the template, the unique identifier (ID) or the certificate number of the public key certificate used in encryption, an encryption algorithm, a parameter, a start date and an expiration date indicating the validity period of the template, the type of the template, and the template (encrypted) are described.

The fields described above are set as the indispensable item fields.

Now, extended fields of the person identification certificate (IDC) are described.

Subject PKC info is a field to describe the public key certificate information of the subject to be certified, including the certificate number of the public key certificate of the subject and the subject unique ID of the public key certificate of the subject.

In Issuer Unique ID, the unique ID of the person identification certificate authority (IDA) is described.

In Subject Unique ID, the unique ID of the subject to be certified is described.

In Public Key Certificate, the public key certificate described above is stored.

In Issuer Alt Name, an alternative name of the person identification certificate authority is described.

In Subject Directory Attribute, an arbitrary attribute of an user, such as an age, sex, address, telephone number, is encrypted as required to identify the user.

Valid Count is a field to describe the maximum number of times the person identification certificate is allowed to be used. More specifically, after a certificate is issued, the certificate is allowed to be used as many times as described in this field.

In Control Table link informal group information indicating the link between the person identification certificate (IDC) and the public key certificate (PKC) is described. For example, information is described which indicates a link to a public key certificate used in data communication or data processing which is executed only when a user is successfully authenticated on the basis of the person identification certificate. The link information and the group information will be described in detail later.

The extended fields of the person identification certificate (IDC) have been described above.

The digital signature is data which is created by generating a hash value by applying a hash function to all fields of the certificate and then encrypting the resultant hash value using the public key of the person identification certificate authority (IDA).

Other information may also be described in the extended fields of the person identification certificate (IDC). For example, when the template information is encrypted using not the public key but a common private key, and the common key used in the encryption is encrypted using the public key of the user device, the service provider, or the person identification certificate authority (IDA), the encrypted public key is described in an extended field. The process performed in this case will be described later.

[2. Encryption of Template]

The person identification certificate (IDC) described above includes information (template information) used to identify a person. An example of template information is biotic information of a person such as fingerprint information, retina pattern information, iris pattern information, voice print information, and handwriting information. Personal identification information other than biotic information is also usable. Specific examples of such personal identification information includes a seal, a passport, a driver's license, and a card. Any combination of the personal identification information described above can also be used. Furthermore, a combination of a password and any personal identification described above may also be used. That is, information that only a person himself/herself can possess is used as the person identification information.

It is desirable that the template be stored after being encrypted to prevent the template from being leaked to a third party, unless the distribution of the certificate is limited so as to keep a secret. The manners of encrypting and storing a template are described below.

A template may be stored and encrypted in various manners as described below.

1) The template is stored without being encrypted.

2) The template is encrypted using the public key of the user (identified by the person identification certificate).

3) The template is encrypted using the symmetric key Kt, and the symmetric key Kt is encrypted using the public key of the user.

4) The template is encrypted using a public key of a service provider (SP) (which identifies a user to which a service is to be provided, by means of using a person identification certificate).

5) The template is encrypted using the symmetric key Kt and the symmetric key Kt is encrypted using the public key of the service provider (SP).

6) The template is encrypted using the public key of the person identification certificate authority (IDA).

7) The template is encrypted using the symmetric key Kt, and the symmetric key Kt is encrypted using the public key of the person identification certificate authority (IDA).

Figure 6A:
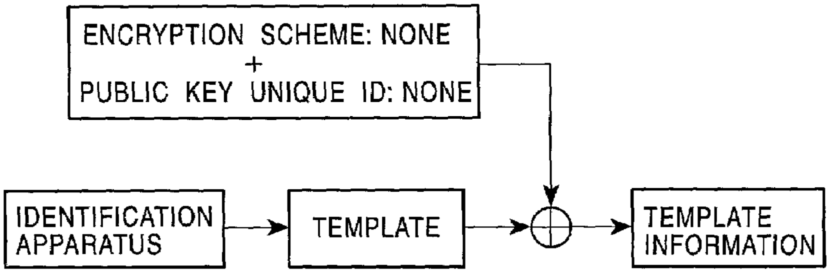
FIGS. 6A to 6C are diagrams illustrating manners of encrypting a template of a person identification certificate.

The template may be stored after being encrypted or without being encrypted in one of the above manners, each of which will be described in further detail below with reference to FIGS. 6, 7, and 8. FIG. 6A illustrates an example in which a template is not encrypted, and data representing biotic information such as a fingerprint acquired via a person identifying apparatus is directly stored as template information in a person identification certificate (IDC).

Figure 6B:
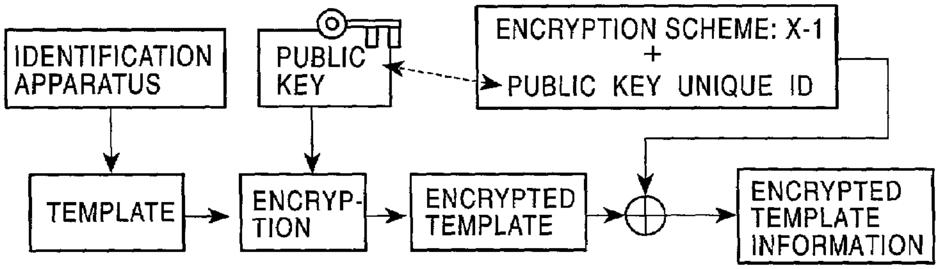

FIG. 6B illustrate an example in which encryption and decryption are performed using only a public key, wherein in encryption shown in FIG. 6B, a template of a user acquired as identification information via a person identifying apparatus is encrypted using a public key of the user or a user device, a public key of a service provider (SP) (which identifies a user to which a service is to be provided, by means of using a person identification certificate), or a public key of a person identification certificate authority (IDA). Encryption may be performed in accordance with, for example, the elliptic curve cryptography (ECC) or the RSA (Rivest-Shamir-Adleman) cryptography. The encrypted template is stored in the person identification certificate (IDC), together with the identifier (unique ID) of the public key and data indicating the encryption algorithm employed in the encryption of the template.

The public key used herein is a public key which can be identified by the unique ID of the public key. The unique ID of the public key is information which can identify a public key certificate, wherein specific examples include a user ID and a user name stored in a public key certificate. The public key used herein is selected, depending upon the manner in which the person identification certificate (IDC) is used, from the group consisting of the public key of the user, the public key of the service provider (SP) (which identifies a user to which a service is to be provided, by means of using a person identification certificate), and the public key of the person identification certificate authority (IDA).

FIG. 7 shows various manners of using a public key to encrypt a template. In the case of a person identification certificate (IDC) in which a public key of a user or a user device is used to encrypt a template, an example of usage of the person identification certificate (IDC) is to identify a particular user who is authorized to use a user device (such as a PC). When a user wants to use a PC, the template stored in the person identification certificate (IDC) is decrypted using the private key of the user and is compared with an input template to verify the authenticity of the user.

An example of usage of a person identification certificate (IDC) in which a template is encrypted using a public key of a service provider is to identify a particular user to whom a service is to be provided by the service provider. The service provider extracts the encrypted template information from a person identification certificate (IDC) of an user, which is stored in the service provider or transmitted from the user or the person identification certificate authority (IDA), and the service provider decrypts the encrypted template information using the private key of the service provider. The service provider then compares the decrypted template with sampling information (such as fingerprint data) presented by a person to be verified.

A person identification certificate (IDC) in which a template is encrypted using a public key of the person identification certificate (IDC) is used, for example, in data transmission between terminals, to identify transmitting and receiving users on the basis of the person identification certificate (IDC) issued by the person identification certificate authority (IDA). As described above, the template information is encrypted in a different manner depending upon the usage of the person identification certificate (IDC).

Figure 6C:
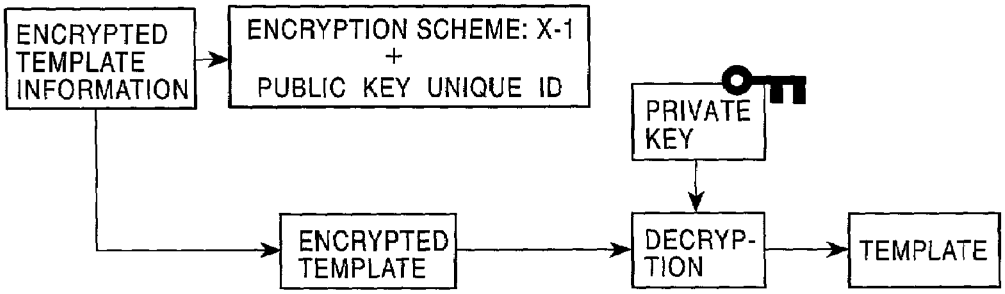

FIG. 6C shows a process of decrypting a template encrypted with a public key. An encrypted template is extracted from a person identification certificate (IDC), and then data indicating the encryption algorithm and the unique ID of a public key are extracted. Furthermore, a private key corresponding to the public key specified by the public key unique ID is extracted, and the encrypted template is decrypted using the extracted private key thereby extracting the template. Each entity which executes the person verification, such as a user device or a service provider which verifies an user, includes an encryption unit for decrypting and encrypting data.

Figure 8A:
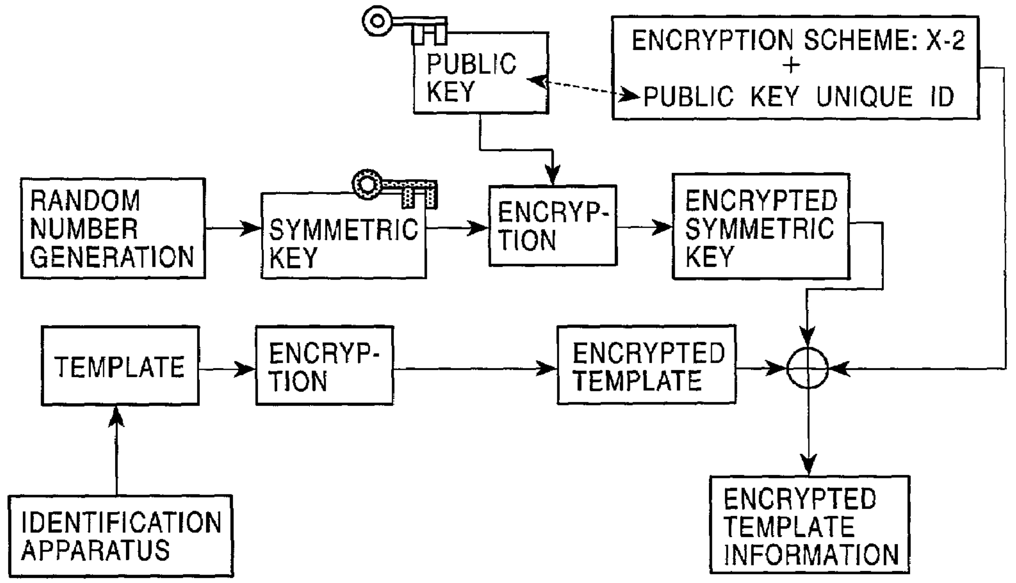
FIGS. 8A and 8B are diagrams illustrating manners of encrypting a template of a person identification certificate.
Figure 8B:
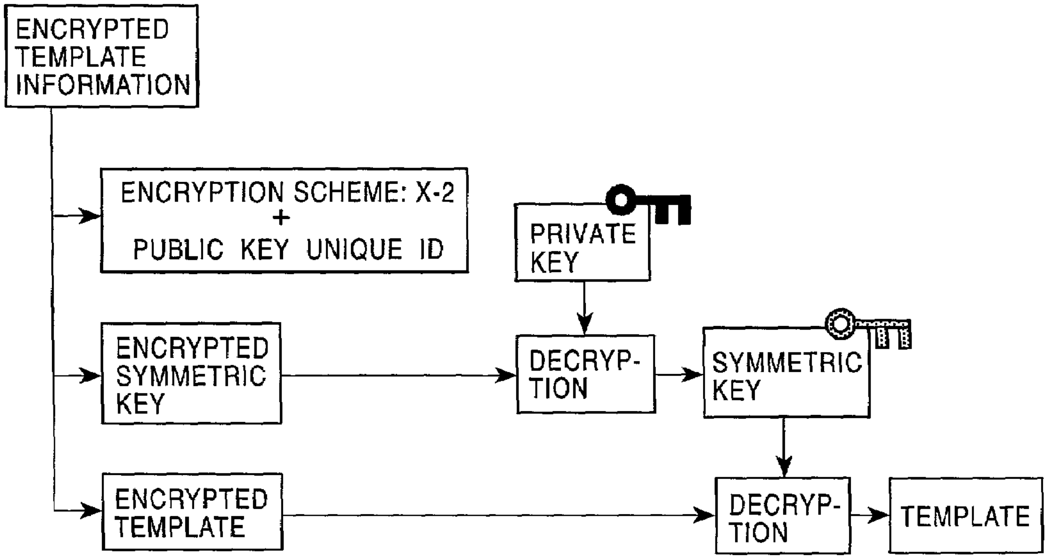

FIGS. 8A and 8B are diagrams each illustrating a manner of encrypting and decrypting a template of a person identification certificate, using a symmetric key and a public key. FIG. 8A illustrates an encrypting process. First, for example, in a person identification certificate authority (IDA) which wants to generate encrypted template information, a symmetric key is generated using a random number, and a template input via a person identifying apparatus is encrypted using the symmetric key. Furthermore, a public key employed, that is, one of a public key of the user or of a user device, a public key of a service provider (SP), and a public key of the person identification certificate authority (IDA) is encrypted using the symmetric key. The public key is selected depending upon the usage manner described above with reference to FIG. 7.

The resultant encrypted template and encrypted symmetric key are stored in the person identification certificate (IDC) together with the identifier (unique ID) of the public key and the data indicating the encryption algorithm applied to the encryption of the template and the encryption of the symmetric key.

FIG. 8B illustrates a decrypting process using the symmetric key and the private key. The encrypted template is extracted from the encrypted template information of the person identification certificate (IDC). Furthermore, the encrypted symmetric key, the data indicating the encryption algorithm, and the public key unique ID are extracted. The encrypted symmetric key is decrypted using the private key specified by the public key specified by the public key unique ID, and the encrypted template is decrypted using the symmetric key obtained via the above decryption process, thereby extracting the template.

[3. Registration and Change of Template and Person Identification Certificate (IDC)]

Processes of registering, deleting, changing, adding, suspending, and canceling of suspension of a person identification certificate (IDC) in which data is described in the above-described manner are described below. Herein, the suspending of an IDC is a process of temporarily invalidating the IDC, and the canceling of suspension is a process of re-validating the temporarily suspended IDC.

(3.1 Registration of Template)

To effectively register a person identification certificate (IDC), a person to be certified with a person identification certificate (IDC) first presents sampling information to register his/her template. As described earlier, an example of template information is biotic information of a person such as fingerprint information, retina pattern information, iris pattern information, voice print information, and handwriting information. Personal identification information other than biotic information is also usable. Specific examples of such personal identification information includes a seal, a passport, a driver's license, and a card. Any combination of the personal identification information described above can also be used. Furthermore, a combination of a password and any personal identification described above may also be used. That is, information that only a person himself/herself can possess is used as the person identification information.

Figure 9:
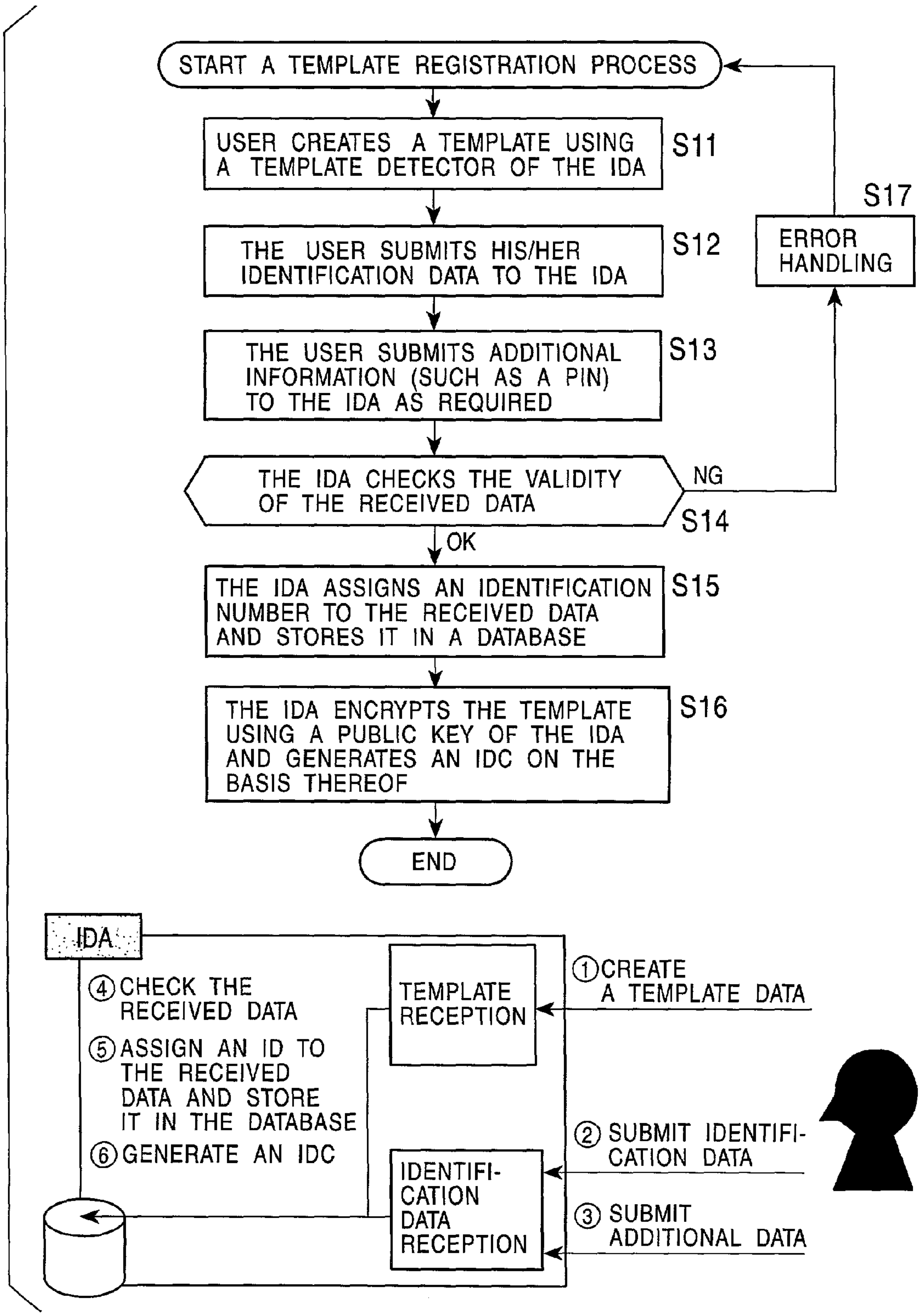
FIG. 9 is a diagram illustrating a processing flow and a data flow in registration of a template and generation of an IDC.

FIG. 9 illustrates a flow in terms of registration of a template and creation of an IDC. Registration of a template is performed on the basis of information (sampling information) acquired using an apparatus capable of acquiring personal information in one of the various forms described earlier. For example, in the case where fingerprint information is used as a template, a fingerprint reading apparatus is used, while a voice print acquisition apparatus is used in the case where voice print information is used as a template (S11). The acquired data is transmitted online or offline to a person identification certificate authority (IDA) (S12). A user transmits his/her personal information (PIN) identifying the user to the person identification certificate authority (IDA) (S13).

In the case where the data described above are transmitted online, mutual authentication is performed between the device of the user and the person identification certificate authority (IDA), wherein data is transmitted together with a digital signature, and the signature is verified at a receiving end. The person identification certificate authority (IDA) checks the data to confirm that the data has not been tempered with, identifies the user, and verifies the data (S14). If it is determined that the data is not valid, error handling is performed (S17) without performing registration.

In the registration of the template, the person identification certificate authority (IDA) verifies the identification of the user on the basis of user identification data which identifies the user. The person identification certificate authority (IDA) also acquires personal information such as an address or a telephone number, as required. After verifying the identification of the user and the verifying other necessary data, the person identification certificate authority (IDA) assigns a person identifier to the template and stores it in a database (S15). The person identification certificate authority (IDA) encrypts the template using the public key of the person identification certificate authority (IDA) and creates a person identification certificate (IDC) in which the encrypted template is stored (S16). The key used to encrypt the template stored in the IDC may be different depending upon the location where the IDC is used, that is, depending upon the entity which executes authentication of a person. For example, a public key of a service provider or a user device is used depending upon the situation.

(3.2 Deleting of Template)

Figure 10:
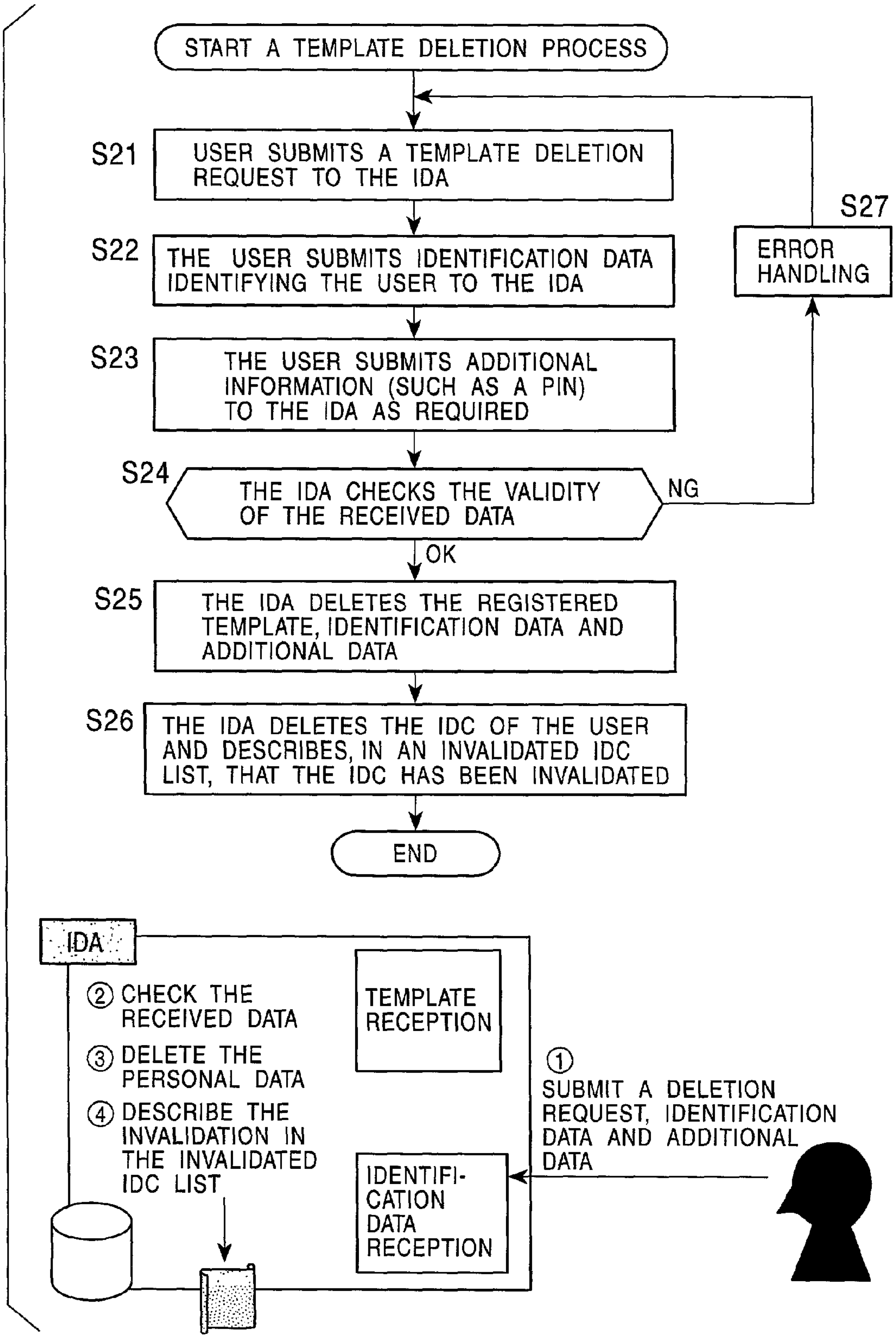
FIG. 10 is a diagram illustrating a processing flow and a data flow in a process of deleting a template.

A template registered in a person identification certificate authority (IDA) may be deleted by performing a template deleting process. The deleting process is performed in response to a deleting request issued by an user. FIG. 10 shows a flow of the template deleting process. When a user requests deletion of a template (S21), the user submits his/her identification data which identifies the user to a person identification certificate authority (IDA) (S22). Furthermore, the user transmits his/her personal information (PIN) used for identification to the person identification certificate authority (IDA) (S23).

In the case where the data described above are transmitted online, mutual authentication is performed between the device of the user and the person identification certificate authority (IDA), wherein data is transmitted together with a digital signature, and the signature is verified at a receiving end. The person identification certificate authority (IDA) checks the data to confirm that the data has not been tempered with, identifies the user, and verifies the data (S24). If it is determined that the data is not valid, error handling is performed (S27) without performing the deleting process.

After identifying the user on the basis of the person identification data to confirm that the request has been issued by the user himself/herself (S24), the person identification certificate authority (IDA) deletes the requested template and the associated person identification data and other additional information (S25). Furthermore, the person identification certification authority (IDA) deletes the person identification certificate (IDC) in which the template was present, and registers the deleted IDC in a revocation list (S26). More specifically, the IDC identifier corresponding to the deleted IDC is registered in the revocation list.

(3.3 Changing of Template)

Figure 11:
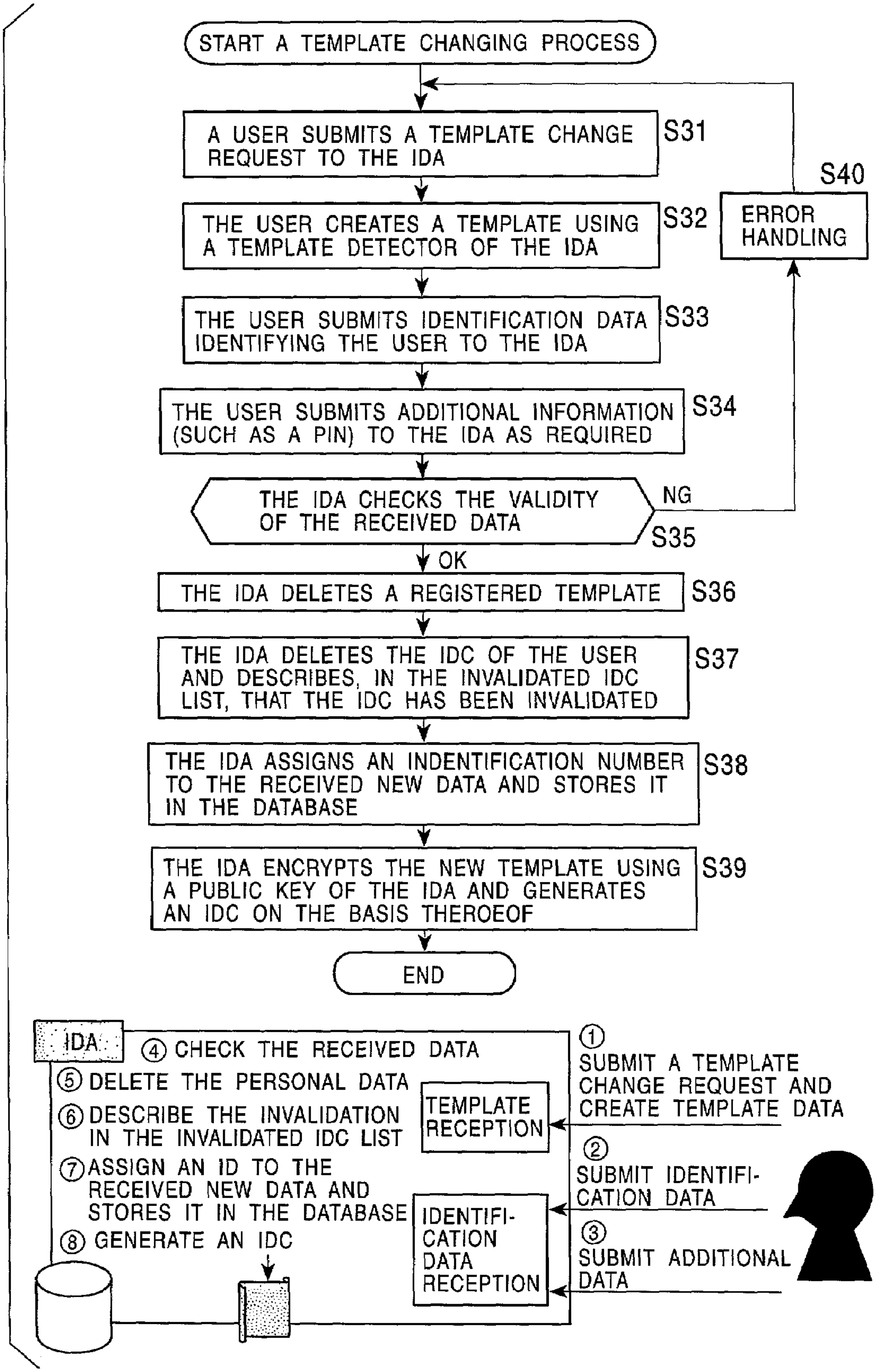
FIG. 11 is a diagram illustrating a processing flow and a data flow in a process of changing a template.

A template registered in a person identification certificate authority (IDA) may be changed by performing a template changing process. FIG. 11 illustrates a flow of the template changing process. A user submits a template changing request to a person identification certificate authority (IDA) (S31), creates sampling information or the like used to create a new template (S32), and transmits identification data identifying the user and additional information (PIN) as required to the person identification certificate authority (IDA) (S33, S34). The person identification certificate authority (IDA) identifies the user on the basis of the identification data (S35), deletes the person identification certificate (IDC) based on the current template (S36), and registers the deleted IDC in the revocation list (S37). Furthermore, the person identification certificate authority (IDA) assigns an identification number to the new template and stores it in the database (S38), encrypts the template using the public key of the person identification certificate authority (IDA), and creates a person identification certificate (IDC) in which the encrypted template is stored (S39). In on-line data communication between the user device and the person identification certificate authority (IDA), mutual authentication, addition of a signature to data to be transmitted, and verification of the signature are performed in a similar manner to the processes described above.

(3.4 Addition of Template)

Figure 12:
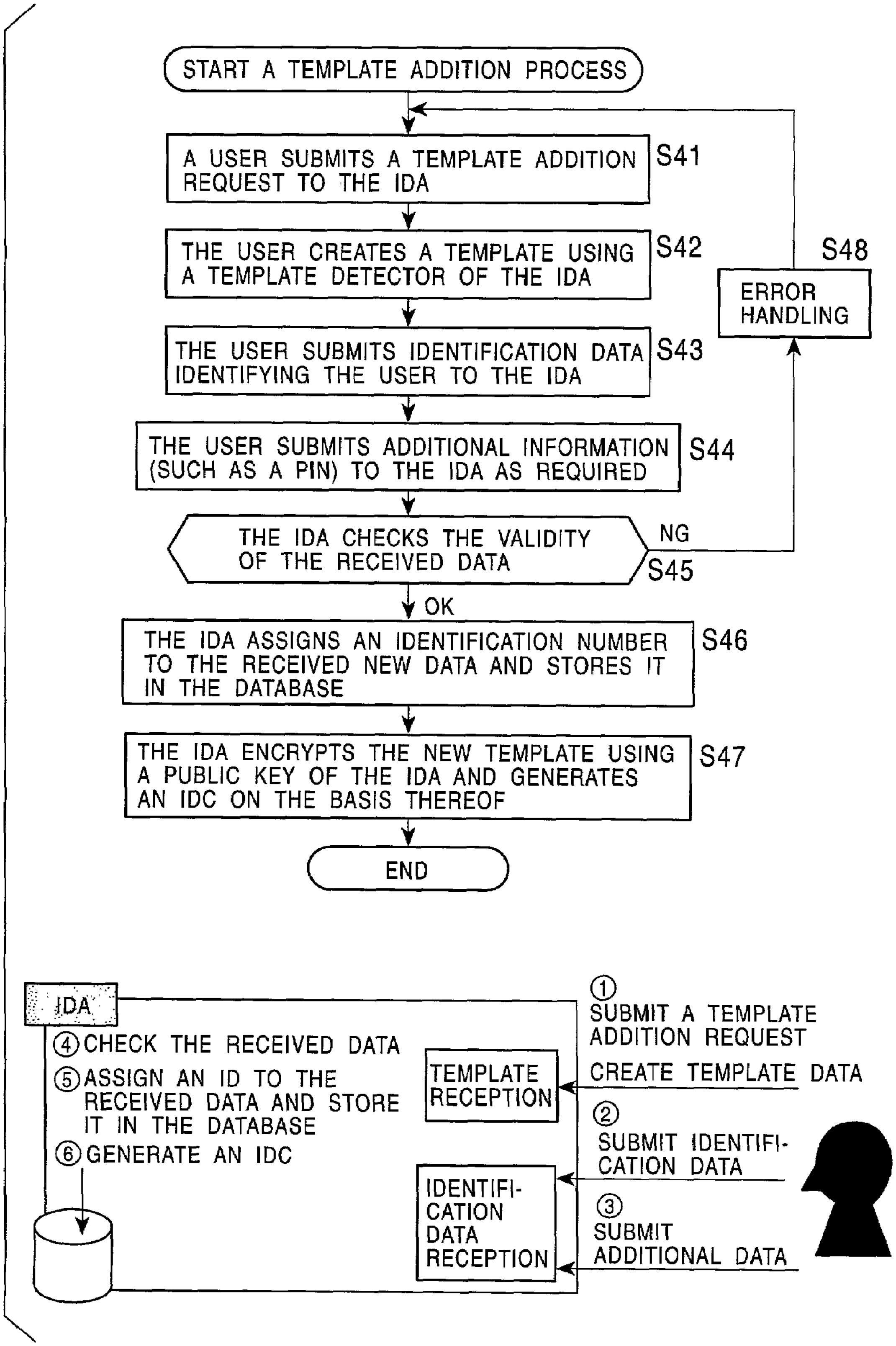
FIG. 12 is a diagram illustrating a processing flow and a data flow in a process of adding a template.

A user may add another identification data as an additional template to the template which has been already registered in a person identification certificate authority (IDA). FIG. 12 illustrates the template addition process. A user issues a template addition request to a person identification certificate authority (IDA) (S41), creates a new template using a template acquisition apparatus (S42), and transmits it together with identification data to the person identification certificate authority (IDA) (S43, S44). The person identification certificate authority (IDA) verify the received identification data (S45) to authenticate the user, assigns a person identifier (number) to the template to be added and stores it in the database (S46), encrypts the template to be added using the public key of the person identification certificate authority (IDA), and creates a person identification certificate (IDC) in which the encrypted template is stored (S47). In on-line data communication between the user device and the person identification certificate authority (IDA), mutual authentication, addition of a signature to data to be transmitted, and verification of the signature are performed in a similar manner to the processes described above.

(3.5 Suspension of Template)

Figure 13:
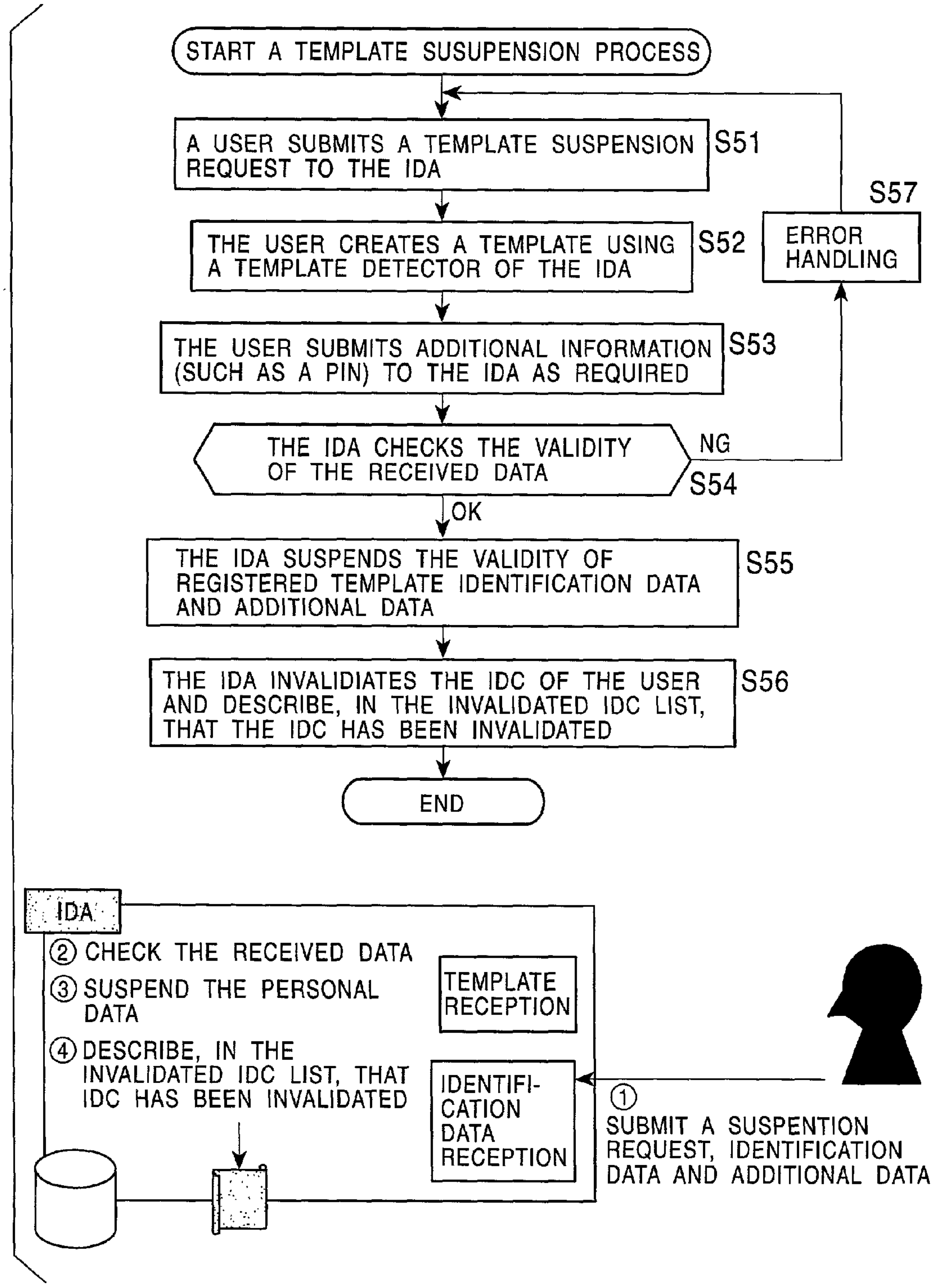
FIG. 13 is a diagram illustrating a processing flow and a data flow in a process of suspending a template.

A template registered in a person identification certificate authority (IDA) may be suspended temporarily in response to a suspension request issued from an user. FIG. 13 illustrates a flow of a template suspension process. If a user issues a template suspension request to a person identification certificate authority (IDA) (S51) and submits identification data and addition data to the person identification certification authority (IDA) (S52, S53), the person identification certificate authority (IDA) identifies the user on the basis of the identification data (S54) and suspends the validity of the requested template of the user and the associated identification data and additional information (S55). In this suspension process, the person identification certificate authority (IDA) also revokes the person identification certificate (IDC) of that user and registers it in the revocation list (S56). More specifically, the IDC identifier corresponding to the deleted IDC is registered in the revocation list. In on-line data communication between the user device and the person identification certificate authority (IDA), mutual authentication, addition of a signature to data to be transmitted, and verification of the signature are performed in a similar manner to the processes described above.

(3.6 Cancellation of Suspension of Template)

Figure 14:
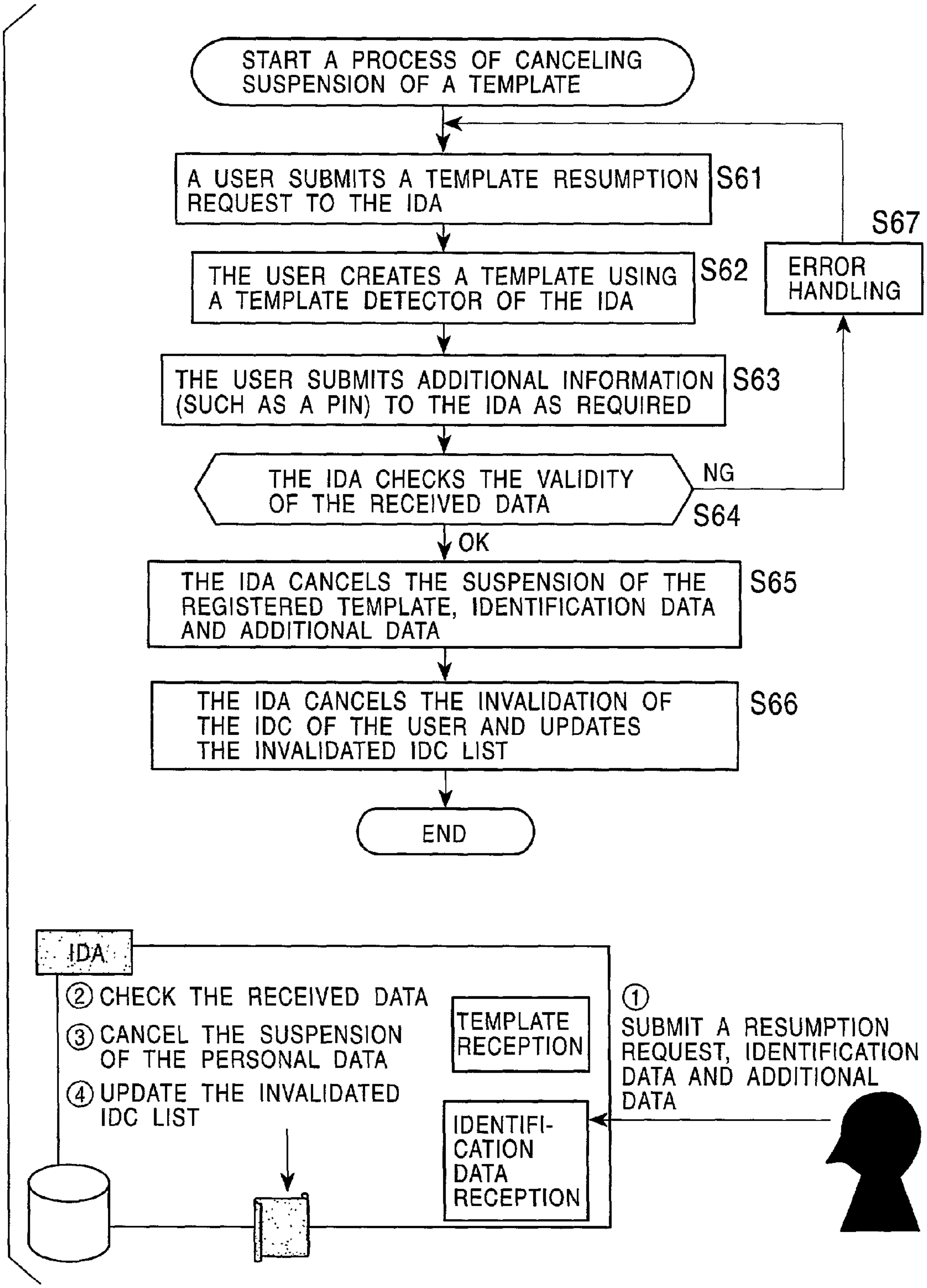
FIG. 14 is a diagram illustrating a processing flow and a data flow in a process of canceling suspension of a template.

A template whose validity was suspended via the suspension process may be re-validated in response to a suspension cancel request issued by an user. FIG. 14 illustrates a template suspension canceling process. A user issues a template suspension cancel request to a person identification certificate authority (IDA) (S61) and submits identification data and additional information to the person identification certificate authority (IDA) (S62, S63). After verifying identification of the user on the basis of the identification data (S64), the person identification certificate authority (IDA) cancels the suspension of validity of the requested template of the user and the associated identification data and additional information (S65). Furthermore, the person identification certificate authority (IDA) removes the person identification certificate (IDC) of that user from the revocation list (S66). More particularly, the corresponding IDC identifier is removed from the revocation list. In on-line data communication between the user device and the person identification certificate authority (IDA), mutual authentication, addition of a signature to data to be transmitted, and verification of the signature are performed in a similar manner to the processes described above.

(3.7 Distribution of Person Identification Certificate (IDC))

Distribution of a person identification certificate (IDC) created on the basis of a template registered after being supplied from a user is described below.

Figure 15:
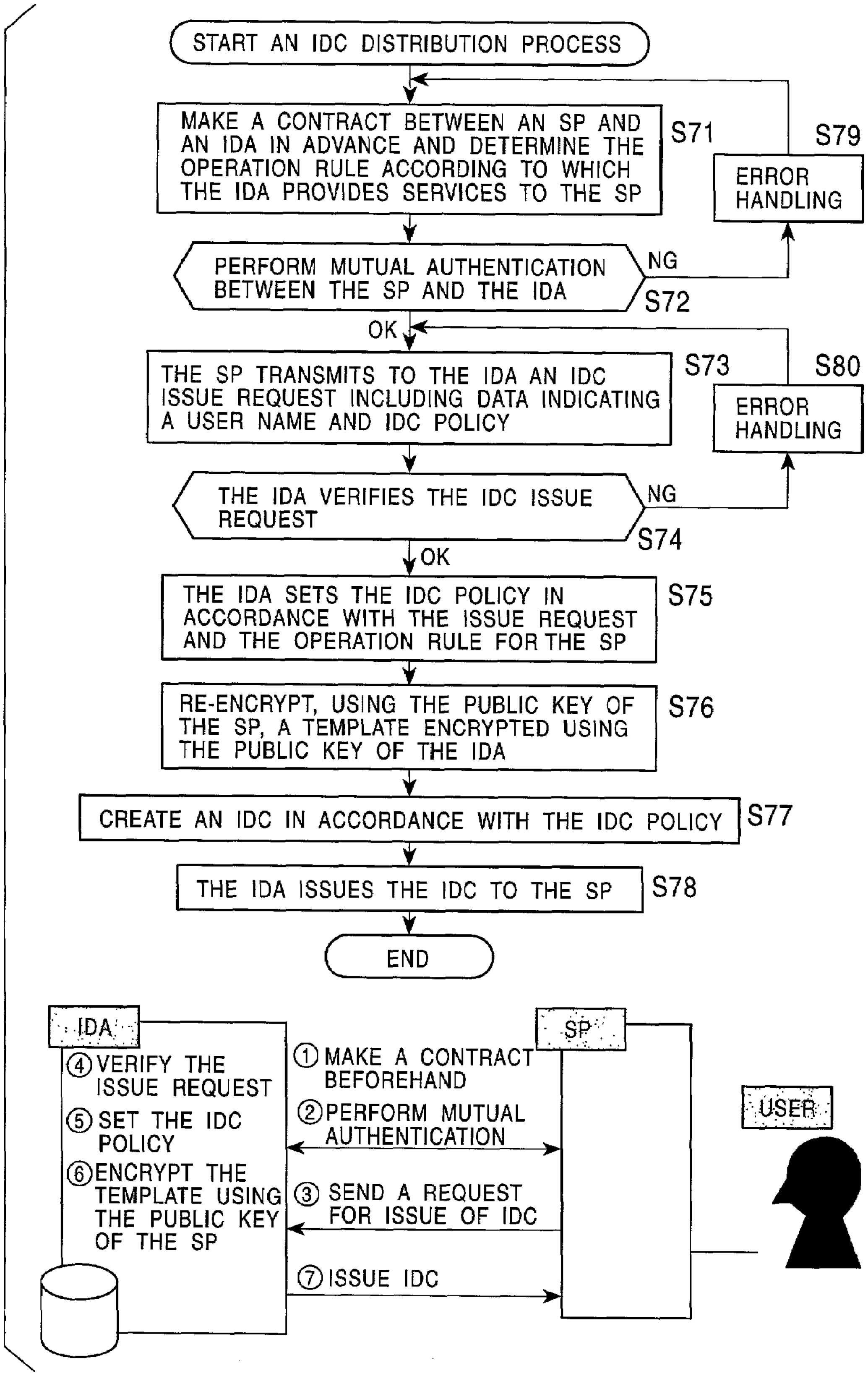
FIG. 15 is a diagram illustrating a processing flow and a data flow in a process of distributing an IDC.

FIG. 15 illustrates a flow of a process of distributing a person identification certificate (IDC) to service providers (SPs). A service provider who wants to use a person identification certificate (IDC) makes, in advance, a contract including a rule of using IDCs with a person identification certificate authority (IDA) (S71). Thereafter, mutual authentication is performed between the person identification certificate authority (IDA) and the service provider (SP) (S72). The mutual authentication may be performed, for example, via a process using symmetric key encryption or public key encryption.

If a success is achieved in mutual authentication, the service provider (SP) transmits to the person identification certificate authority (IDA) a request for issuing person identification certificate (IDC) together with user identification data or data indicating the name of a user to whom a service is to be provided and also data indicating the desired policy of the person identification certificate (IDC) (S73). The person identification certificate authority (IDA) verifies the person identification certificate issuing request (S74), sets the policy of the person identification certificate (IDC) in accordance with the usage rule (S75), extracts the requested person identification certificate (IDC) of the user from the database, decrypts the user template encrypted with the public key of the person identification certificate authority (IDA), encrypts the user template using the public key of the service provider (S76), creates a person identification certificate (IDC) according to the policy (S77), and supplies the created IDC to the service provider (SP) (S78). In the case where the template stored in the database is not encrypted, or in the case where encryption is not required, the encryption of the template is not necessary.

(3.8 Updating of Person Identification Certificate (IDC))

Now, a process of updating a person identification certificate (IDC) created on the basis of a registered template of a user is described below. In most cases, updating is performed to reset the validity period of a person identification certificate (IDC) being used.

Figure 16:
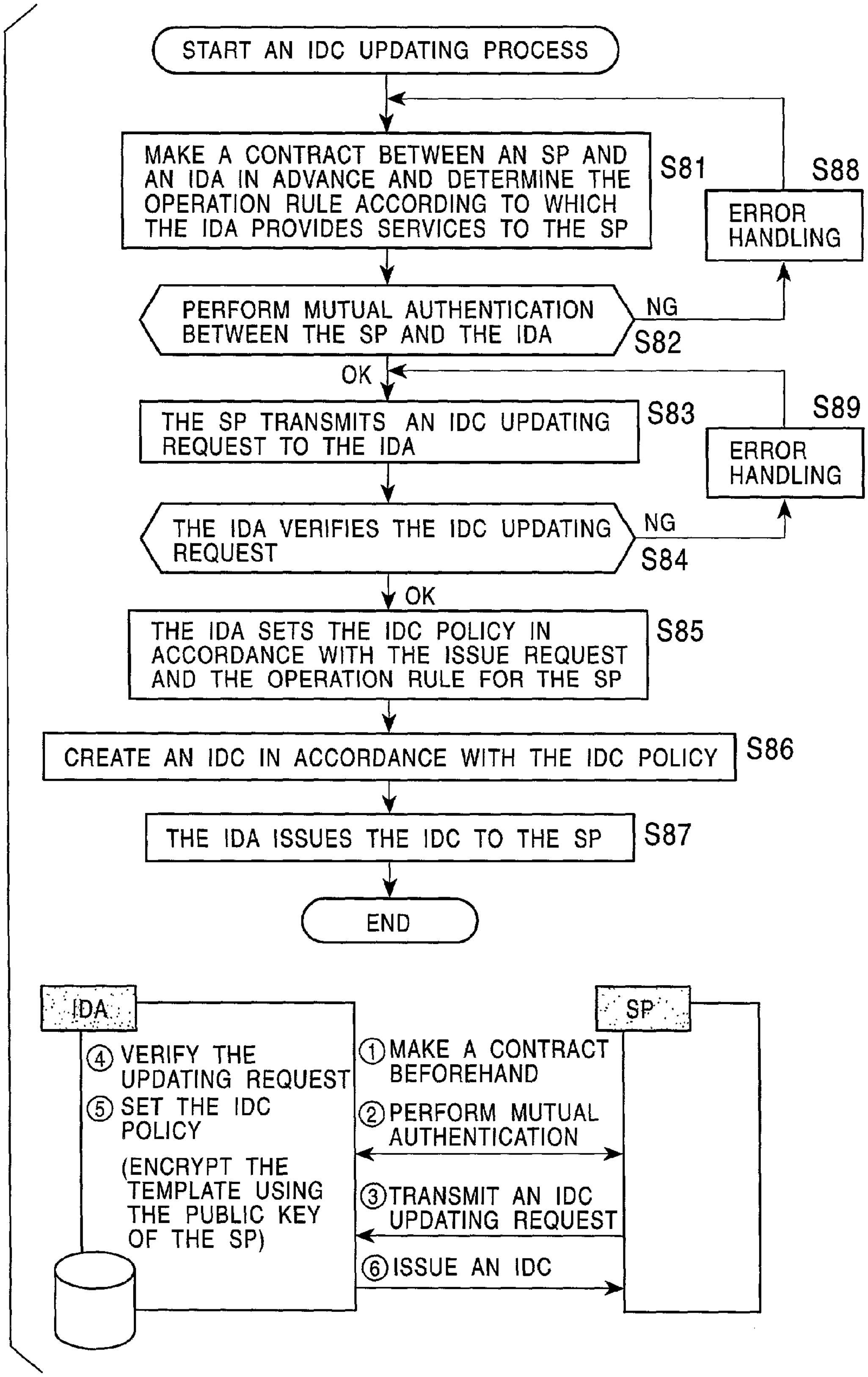
FIG. 16 is a diagram illustrating a processing flow and a data flow in a process of updating an IDC.

FIG. 16 illustrates a flow performed in response to a person identification certificate (IDC) updating request issued from a service provider (SP). A service provider who wants to use a person identification certificate (IDC) makes, in advance, a contract including a rule of using IDCs with a person identification certificate authority (IDA) (S81). Thereafter, mutual authentication is performed between the person identification certificate authority (IDA) and the service provider (SP) (S82). The mutual authentication may be performed, for example, via a process using symmetric key encryption or public key encryption.

If a success is achieved in the mutual authentication, the service provider (SP) transmits to the person identification certificate authority (IDA) a request for updating a desired person identification certificate (IDC) (S83). The person identification certificate authority (IDA) verifies the updating request (S84), sets the policy of the person identification certificate (IDC) in accordance with the usage rule (S85), extracts the requested person identification certificate (IDC) of the user from the database, decrypts the user template encrypted with the public key of the person identification certificate authority (IDA), encrypts the user template using the public key of the service provider, creates a person identification certificate (IDC) according to the policy (S86), sets the validity period, and supplies the created IDC to the service provider (SP) (S87). In the case where the template stored in the database is not encrypted, or in the case where encryption is not required, the encryption of the template is not necessary.

(3.9 Deleting of Person Identification Certificate (IDC))

Deleting of a person identification certificate (IDC) created on the basis of a template registered after being supplied from a user is described below.

Figure 17:
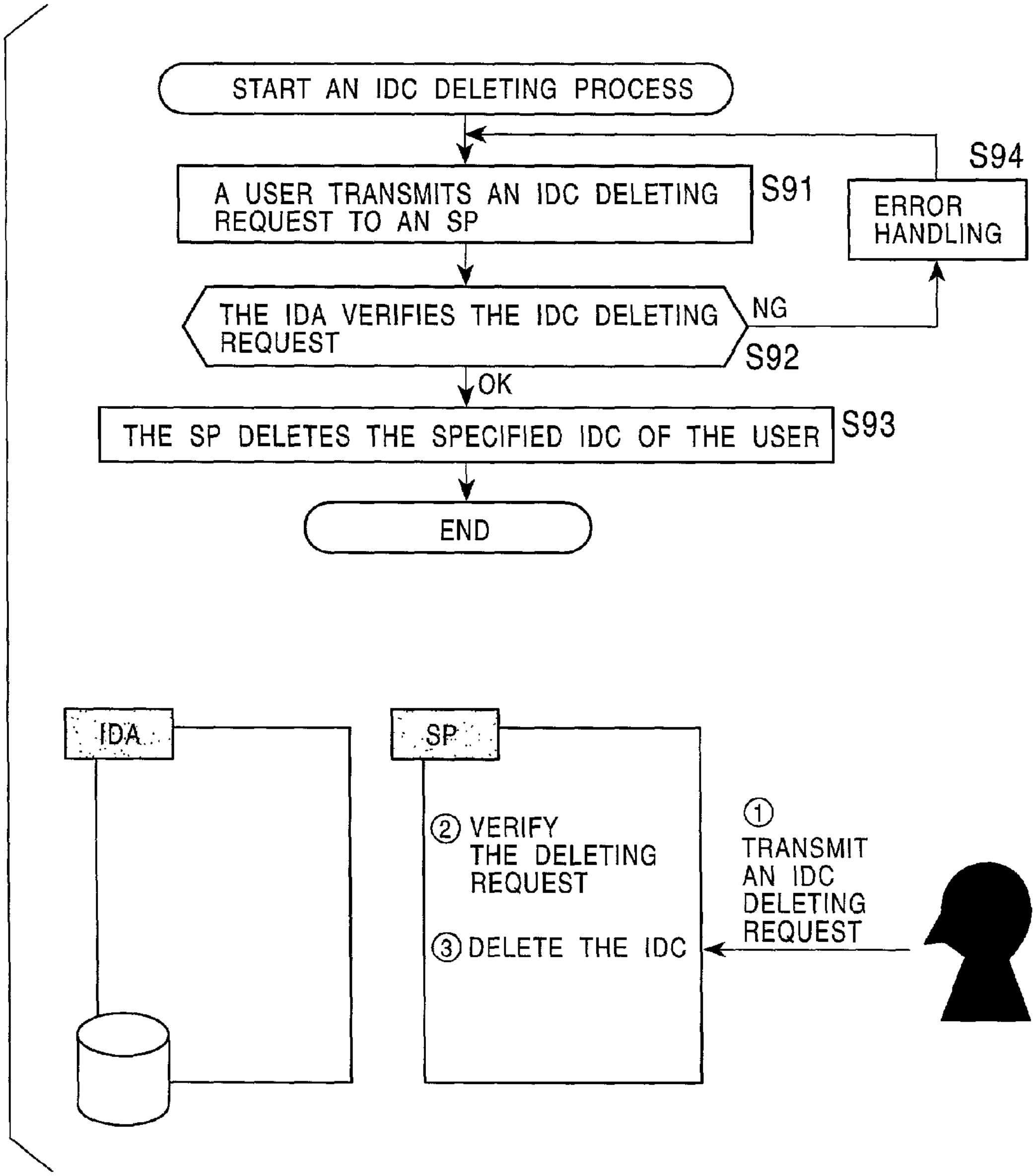
FIG. 17 is a diagram illustrating a processing flow and a data flow in a process of deleting an IDC.

FIG. 17 illustrates a process performed in response to a person identification certificate (IDC) deleting request issued by an user. When a user wants to delete a person identification certificate (IDC), the user transmits to a person identification certificate authority (IDA) a request for deleting a particular person identification certificate (IDC) (S91). The person identification certificate authority (IDA) verifies the deleting request (S92) and deletes the specified person identification certificate (IDC) (S93).

(3.10 Inquiring about Person Identification Certificate (IDC))

Inquiring about a person identification certificate (IDC) created on the basis of a template registered after being supplied from a user is described below. Inquiring is performed, for example, when a service provider (SP), who does not have a person identification certificate (IDC), transmits sampling data received from a user to a person identification certificate authority (IDA) to inquire about the authenticity of the user. In response to the inquiry, the person identification certificate authority (IDA) verifies the authenticity of the user on the basis of the person identification certificate (IDC) stored in the person identification certificate authority (IDA), and the person identification certificate authority (IDA) returns only the authentication result to the service provider.

Figure 18:
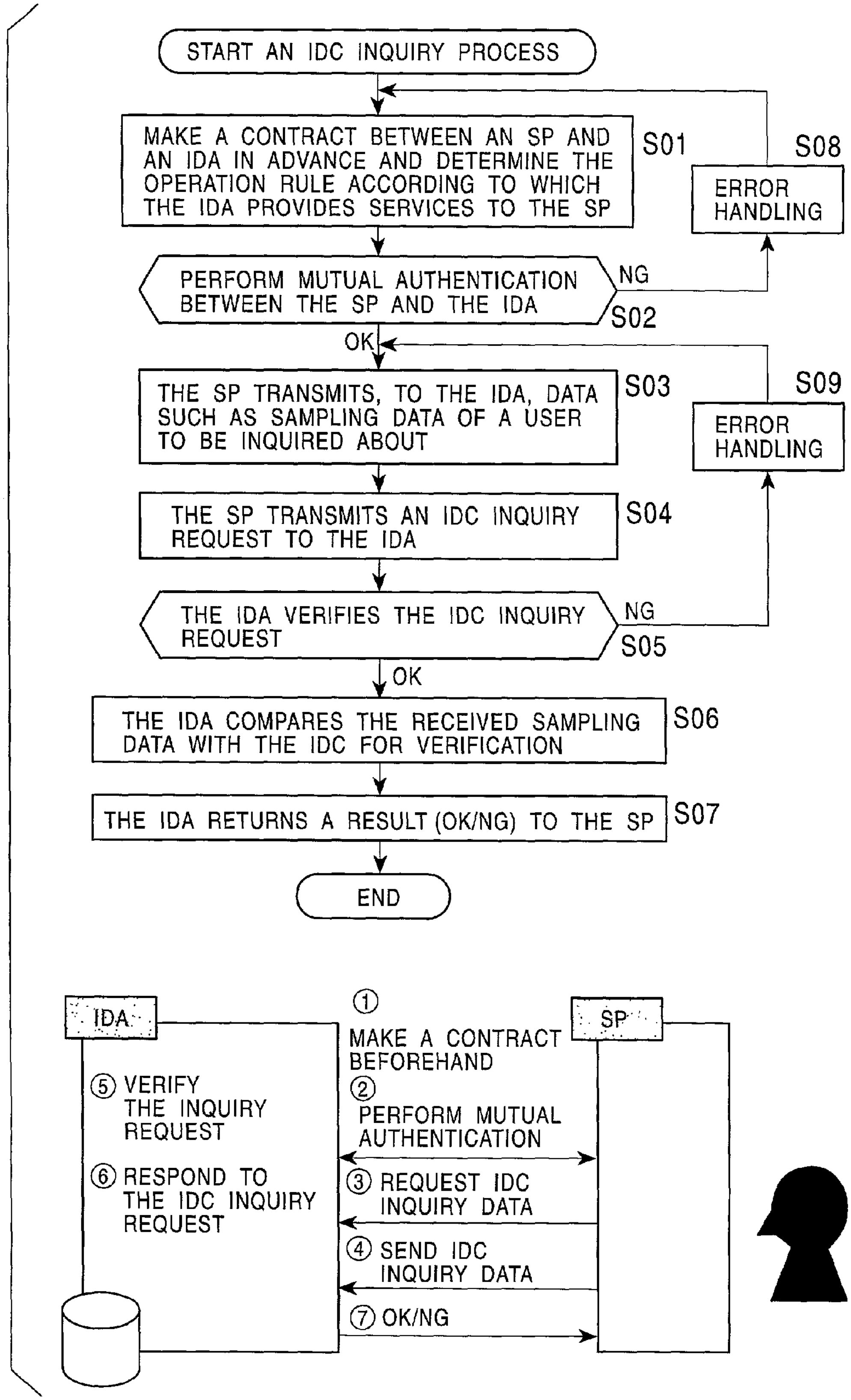
FIG. 18 is a diagram illustrating a processing flow and a data flow in a process of inquiring about an IDC.

FIG. 18 illustrates a flow of a process performed in response to a person identification certificate (IDC) inquiry request issued by a service provider (SP). A service provider, who wants to make an inquiry in terms of a person identification certificate (IDC), makes a contract including an usage rule of person identification certificates (IDCs) with a person identification certificate authority (IDA) (S01). Thereafter, mutual authentication is performed between the person identification certificate authority (IDA) and the service provider (SP) (S02). The mutual authentication may be performed, for example, via a process using symmetric key encryption or public key encryption.

If a success is achieved in the mutual authentication, the service provider (SP) transmits to the person identification certificate authority (IDA) a request for inquiry about a person identification certificate (IDC) of a particular user together with sampling data or the like of that user (S03, S04). The person identification certificate authority (IDA) verifies the inquiry request (S05), verifies the received sampling data on the basis of the corresponding person identification certificate (IDC) (S06), and transmits a verification result (OK or NG) to the service provider (SP) (S07).

[4. Basic Manners of Using Person Identification Certificate (IDC)]

Basic manners of using a person identification certificate (IDC) are described below. In particular, relationships between a certificate authority (CA) which issues a public key certificate (PKC), a person identification certificate authority (IDA) which issues a person identification certificate (IDC), and a device which uses those certificates are described.

Figure 19:
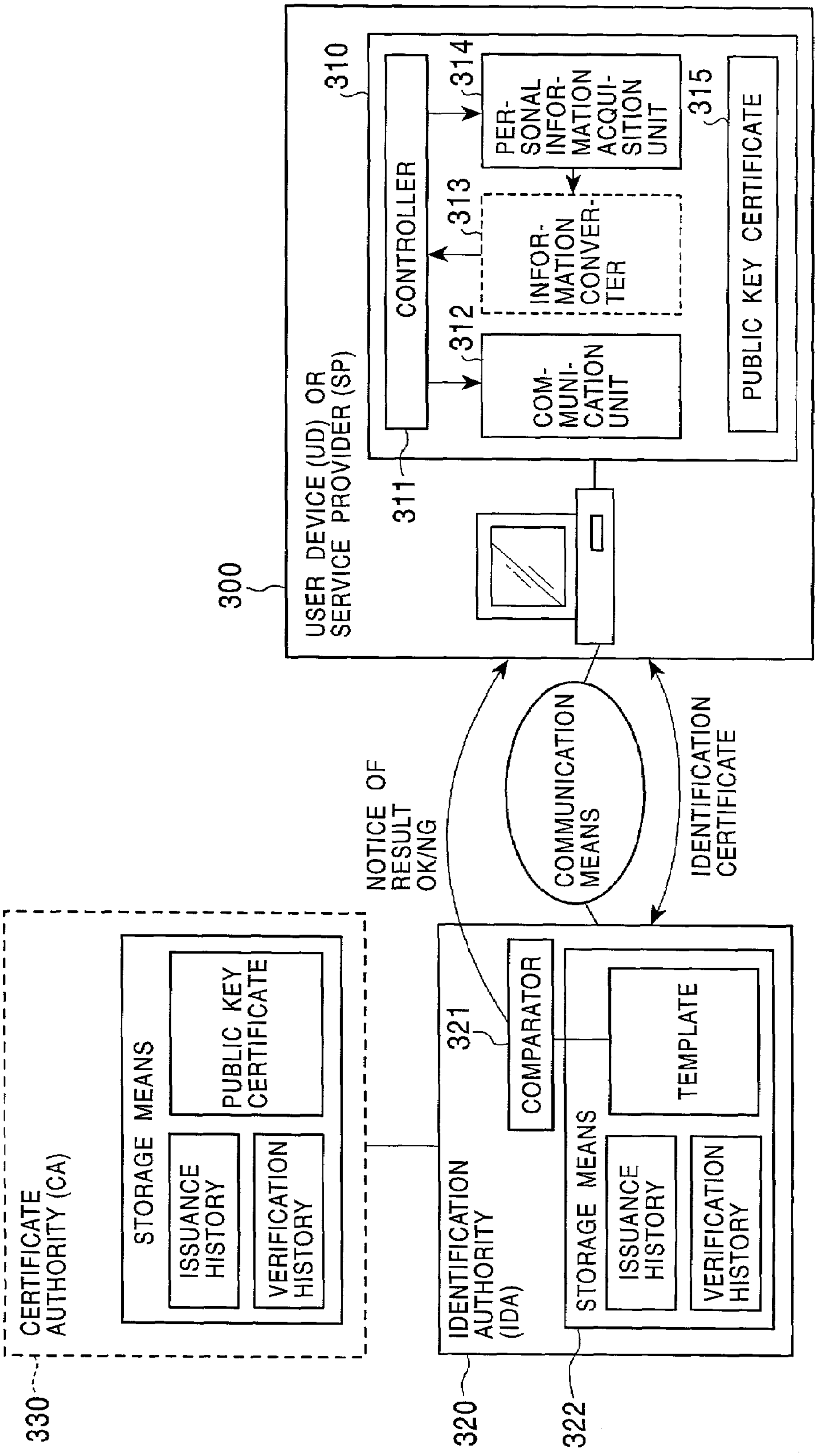
FIG. 19 is a diagram illustrating examples of configurations of a certificate authority (CA) which issues a public key certificate (PKC), a person identification certificate authority (IDA) which issues a person identification certificate (IDC), and a device which uses a certificate.
Figure 20:
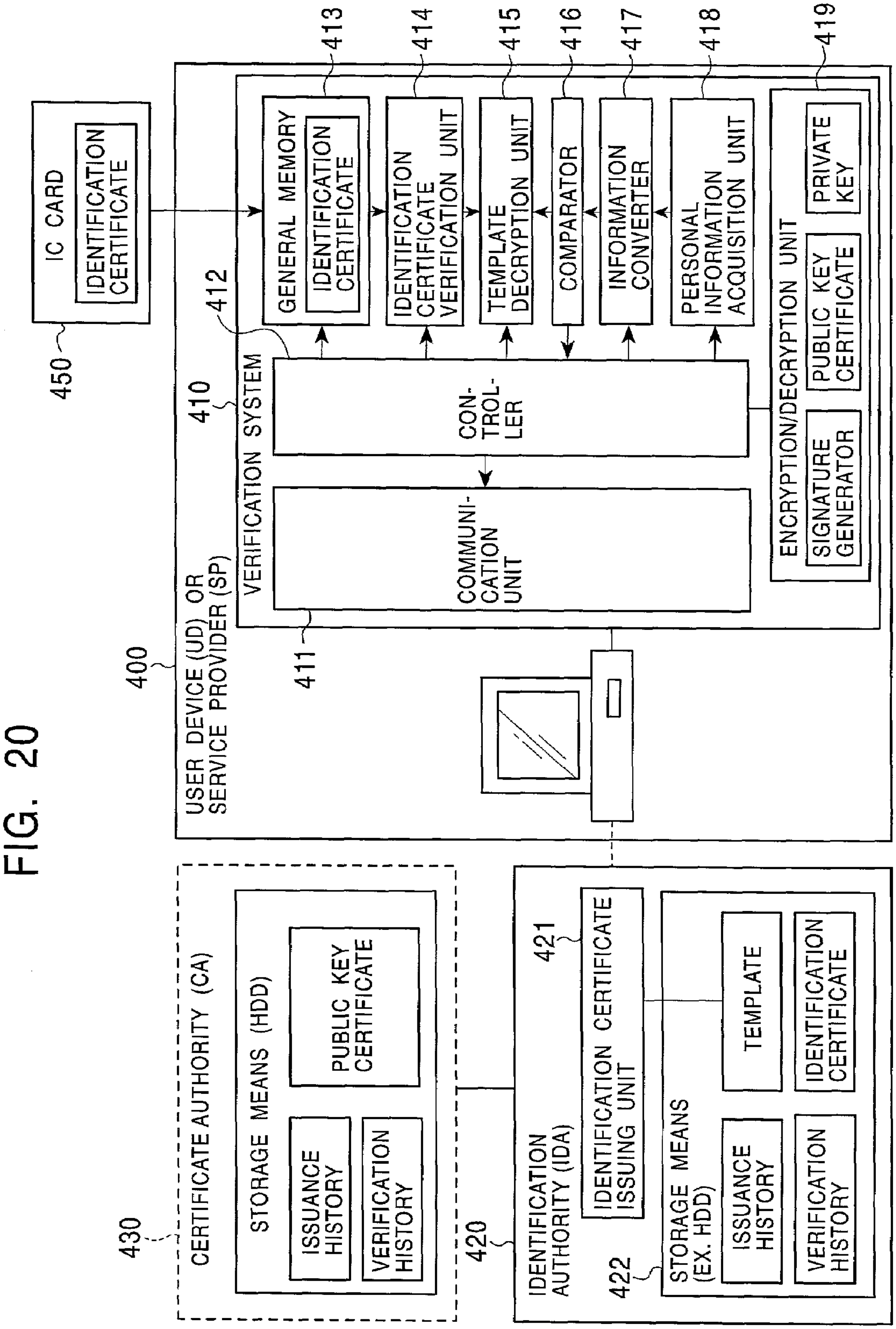
FIG. 20 is a diagram illustrating examples of configurations of a certificate authority (CA) which issues a public key certificate (PKC), a person identification certificate authority (IDA) which issues a person identification certificate (IDC), and a device which uses a certificate.

FIGS. 19 and 20 illustrate two examples of systems including a certificate authority (CA) which issues a public key certificate (PKC), a person identification certificate authority (IDA) which issues a person identification certificate (IDC), and a device which uses those certificates. In the example shown in FIG. 19, a comparison between sampling information and a template of a person identification certificate (IDC) is made by a person identification certificate authority (IDA), while a comparison between sampling information and a template of a person identification certificate (IDC) is made by a service provider (SP) or a user device (UD) in the example shown in FIG. 20.

In FIG. 19, the user device (UD) or the service provider (SP) 300 includes a sampling information processing unit 310 for acquiring personal information such as fingerprint data of various users and processing the acquired personal information, wherein the sampling information processing unit 310 includes a personal information acquisition unit 314 for acquiring sampling information, an information converter 313 for converting fingerprint data or the like into a code, and a communication unit 312 for transmitting the converted code to a person identification certificate authority 320, and wherein the sampling information processing unit 310 stores a public key certificate for use in encryption/decryption of data in various communication processes. A controller 311 controls the operations of the personal information acquisition unit 314, the information converter 313, and the communication unit 312.

The person identification certificate authority (IDA) 320 includes a comparator 321 and storage means 322, wherein the comparator compares sampling data received from the user device (UD) or the service provider (SP) 300 with a template, stored in the storage means, of a user to be certified (preferably, the template is encrypted and stored in the person identification certificate). The storage means stores, in addition to templates, data indicating the history of issuing person identification certificates and data indicating the history of comparison.

A certificate authority (CA) 330 is an agency which issues a public key certificate (PKC) of a user in response to a request from the user, wherein the public key certificate includes a signature of the certificate authority. The certificate authority stores and manages data indicating the history of issuing public key certificates and the verification history.

If the person identification certificate authority (IDA) 320 receives sampling information from the user device (UD) or the service provider (SP) 300, the person identification certificate authority (IDA) 320 compares the received sampling information with a stored template, wherein an OK or NG message is transmitted as a comparison result to the user device (UD) or the service provider (SP) 300 depending upon whether the received sampling information matches with the stored template. Herein, a verification certificate in a predetermined format may be issued, as will be described later. In the case where a verification certificate is issued, the person identification certificate authority describes the history of issuing verification certificates.

Communication among the certificate authority (CA), the person identification certificate authority (IDA) 320, and the user device (UD) or the service provider (SP) 300 is performed only when a success is achieved in mutual authentication, wherein it is desirable that secret data be encrypted using a session key created via the mutual authentication or using public keys of two parties.

In the case of the system shown in FIG. 20, a comparison between sampling information and a template of a person identification certificate (IDC) is made by a service provider (SP) or a user device (UD).

The user device (UD) or the service provider (SP) 400 shown in FIG. 20 includes a verification system 410 for acquiring personal information such as fingerprint of various users and performing verification, wherein the verification system 410 includes a general memory 413 for storing person identification certificates, a person identification certificate verification unit 414 for checking whether a person identification verification has been tempered with, a template decryption unit 415 for decrypting an encrypted template described in a person identification certificate, a personal information acquisition unit 418 for acquiring sampling information such as fingerprint data, an information converter 417 for converting fingerprint data or the like into a code, a comparator 416 for comparing the decrypted template with the coded sampling information, a communication unit 411 for communication with a person identification certificate authority 420, and an encryption/decryption unit 419 including a signature generator and storing public key certificates and a public key for use in encryption/decryption of data in various communication processes. A controller 412 controls the operation of the respective units.

The person identification certificate authority (IDA) 420 includes a person identification certificate issuing unit 421 and a storage means 422, and the person identification certificate authority (IDA) 420 issues a person identification certificate in which a template of a person to be certified is stored, in response to a request from the user device (UD) or the service provider (SP) 400. The storage means 422 stores templates, person identification certificates, data representing the history of issuing person identification certificates, and data representing the history of verification.

A certificate authority (CA) 430 is an agency which issues a public key certificate (PKC) of a user in response to a request from the user, wherein the public key certificate includes a signature of the certificate authority. The certificate authority stores and manages data indicating the history of issuing public key certificates and the verification history.

As in the system shown in FIG. 19, communication among the certificate authority (CA), the person identification certificate authority (IDA) 320, and the user device (UD) or the service provider (SP) 300 is performed only when a success is achieved in mutual authentication, wherein it is desirable that secret data be encrypted using a session key created via the mutual authentication or using public keys of two parties.

[5. Authentication Using Person Identification Certificate (IDC)]

Various manners of authentication using a person identification certificate (IDC) are described below. The authentication using a person identification certificate (IDC) can be classified into two modes described below.

(5.1 On-Line Mode)

Static IDC Verification

A template of a person identification certificate (IDC) is encrypted using a public key of a site at which verification is performed, such as a person identification certificate authority (IDA), a service provider (SP), or a user device (PC), and is registered and stored in a person identification certification authority (IDA). In response to a request from the service provider (SP) or the user device (PC), the person identification certificate authority (IDA) supplies the IDC for verification.

Dynamic IDC Verification

A template of a person identification certificate (IDC) is encrypted using a public key of a person identification certificate authority (IDA) and registered in the IDA. In response to a request from a service provider (SP) or a user device (PC), the template is re-encrypted using a public key of a site such as the SP or the PC at which verification is performed, that is, using a public key of an entity which performs person verification, and the person identification certificate (IDC) is dynamically distributed for verification.

(5.2 Off-Line Mode)

Static IDC Verification

A template of a person identification certificate (IDC) is encrypted using a public key of a site at which verification is performed, such as a person identification certificate authority (IDA), a service provider (SP), or a user device (PC), that is, using a public key of an entity which performs person verification, or a template is encrypted using a symmetric key and this symmetric key is encrypted using a public key of a person identification certificate authority (IDA), a service provider (SP) or a user device (PC) and is registered in a person identification certificate authority (IDA) and distributed to each user. When person verification is performed, an IDC and sampling information are transmitted to a site at which verification is performed. The verification processes in the respective modes are described below.

(5.1.1 On-Line Mode Static Verification)

In on-line mode static verification, when sampling data input by a person is compared, for verification, with a template of a person identification certificate (IDC), the person identification certificate (IDC) is dynamically issued by a person identification certificate authority (IDA), and comparison for verification is performed in a system, that is, by a user device (PC), a service provider (SP), or a person identification certificate authority (IDA). That is, a comparison between sampling data input by a person and a template of a person identification certificate (IDC) is made by an entity which executes a person verification process. The person identification certificate authority (IDA) retrieves, from a database, template information encrypted with a public key of a system which performs comparison and transmits the retrieved template information to the system, at which input sampling data is compared with the template obtained by decrypting the received IDC thereby identifying the person.

Figure 21A:
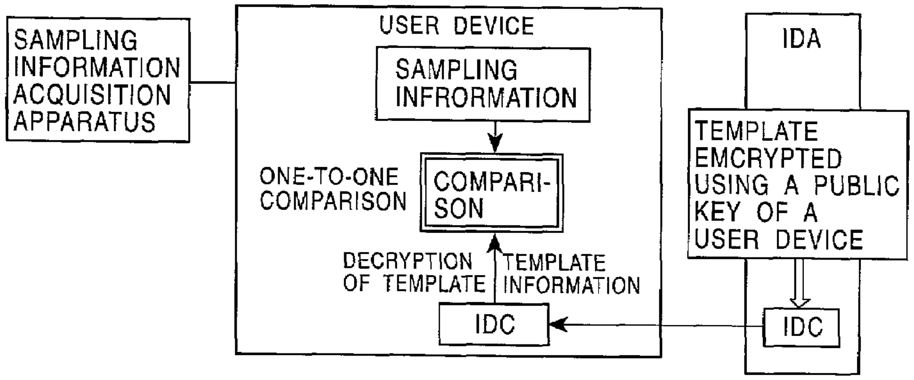
FIGS. 21A to 21C are diagrams illustrating manners of performing verification by a user device, a service provider (SP), or a person identification certificate authority (IDA) in a system.
Figure 21B:
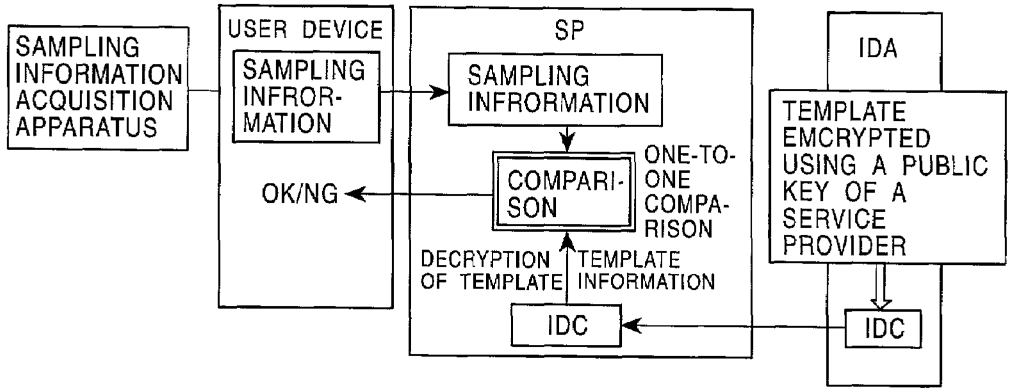
Figure 21C:
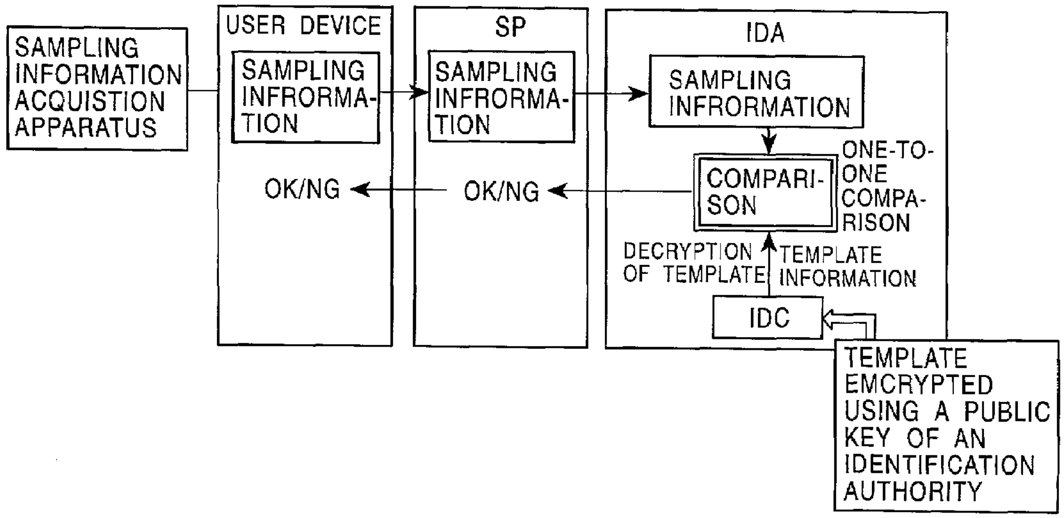

FIGS. 21A to 21C are diagrams illustrating manners of performing verification by a system such as a user device (such as a PC), a service provider (SP), or a person identification certificate authority (IDA). Data transfer among the respective systems including the user device, the service provider (SP), and the person identification certificate authority (IDA) shown in FIGS. 21A to 21C is performed, basically, only when a success is achieved in mutual authentication between a transmitting system and a receiving device, wherein the data is transmitted after being encrypted using a session key created via the authentication process.

FIG. 21A shows an example in which comparison for verification is performed by a user device. A person identification certificate authority (IDA) stores a person identification certificate (IDC) including a template encrypted using a public key of the user device, wherein when the user device performs verification, the user device acquires a person identification certificate (IDC) of a person to be authenticated by requesting the person identification certificate authority (IDA) to provide the person identification certificate (IDC) of that person.

The acquisition of the person identification is performed, for example, such that the user device transmits to the person identification certificate authority (IDA) the unique ID of the public key certificate (PKC) of the user to be authenticated or the user device, and the person identification certificate authority (IDA) extracts the corresponding IDC of the person from the stored IDCs in accordance with the received unique ID and transmits the extracted IDC to the user device. Public key certificates (PKC) and person identification certificates (IDCs) may be linked in various manners. IDC identification data depending upon the manner of forming the link is transmitted from a user device to a person identification certificate authority (IDA), and the person identification certificate authority (IDA) retrieves a person identification certificate (IDC) using the received data as a key. The manners of linking public key certificates (PKC) and person identification certificates (IDCs) will be described in further detail later.

The user device acquires a template by decrypting, using a private key of the user device, an encrypted template in a person identification certificate (IDC) received from the person identification certificate authority (IDA) and performs verification by comparing the acquired template with personal data, for example, sampling data such as fingerprint data acquired via a sampling data extracting apparatus. Depending upon whether they match with each other, verification is concluded as OK or NG. It is required that the sampling data and the template stored in the IDC should be of the same type. For example, when one of them is fingerprint data, the other one should also be fingerprint data. When one is iris data, the other should be iris data. A plurality of different identification data may be stored as templates in a person identification certificate (IDC), and input sampling data may be regarded as valid when the input sampling data matches with one of the plurality of identification data.

Only when verification is successfully passed, for example, a particular application program installed on the user device is allowed to be executed to perform data processing such as accessing to a database, updating of data, or inputting of data. If verification fails, execution of data processing is not allowed. In this case, the user device serving as a data processing apparatus having the comparison/verification capability is the entity which requests person authentication and executes person authentication.

In the system shown in FIG. 21B, comparison for verification is performed by a service provider (SP). A person identification certificate authority (IDA) stores a person identification certificate (IDC) including a template encrypted using a public key of the service provider (SP), wherein when the service provider performs verification, sampling information of a person to be verified and a public key certificate (PKC) of that person are transmitted to the service provider (SP) from a user device. In the case where the service provider (SP) already has the PKC, identification data identifying the PKC may be transmitted. It is desirable that sampling data be transmitted to the service provider (SP) after encrypting the sampling data using a session key created via mutual authentication or using the public key of the service provider (SP), so that the sampling data can be decrypted by only the service provider (SP). In this system, the entity which requests verification of a person is the user device, and the entity which executes the verification of the person is a service provider which provides a service to the user device.

The service provider (SP) transmits the unique ID of a public key certificate (PKC) of a person or a user device to the person identification certificate authority (IDA) to request the person identification certificate authority (IDA) to provide a person identification certificate (IDC) of the person to be verified. In accordance with the received unique ID, the person identification certificate authority (IDA) retrieves the IDC of the person from the stored IDCs and transmits the retrieved IDC to the service provider (SP). Herein, the IDC includes a template encrypted using a public key of the service provider (SP).

The service provider (SP) acquires the template by decrypting, using the private key of the service provider (SP), the encrypted template included in the person identification certificate (IDC) received from the person identification certificate authority (IDA), and the service provider (SP) performs verification by comparing the template with data which is obtained by decrypting encrypted sampling data such as fingerprint data which is acquired via a sampling data extracting apparatus and transmitted from the user device. Depending upon whether they match with each other, verification is concluded as OK or NG. The verification result (OK or NG) is transmitted to the user device, and, depending upon the verification result, it is determined whether or not the following process such as requesting the service provider (SP) to transmit a content or requesting for viewing of data should be allowed.

In the system shown in FIG. 21C, comparison for verification is performed by a person identification certificate authority (IDA). The person identification certificate authority (IDA) stores a person identification certificate (IDC) including a template encrypted using a public key of the person identification certificate authority (IDA). When the person identification certificate authority (IDA) performs verification, sampling information of a person to be verified and a public key certificate (PKC) of that person or of a user device are transmitted to the person identification certificate authority (IDA) via a service provider (SP). In the case where the person identification certificate authority (IDA) already has the PKC, identification data identifying the PKC may be transmitted. It is desirable that the sampling data be transmitted to the person identification certificate authority (IDA) after being encrypted using a public key of the person identification certificate authority (IDA) so that the sampling data can be decrypted only by the person identification certificate authority (IDA). In this system, the entity which requests verification of a person is the user device or the service provider, and the entity which executes the verification of the person is the person identification certificate authority (IDA).

The person identification certificate authority (IDA) retrieves the IDC of the person of interest from the stored IDCs on the basis of the unique ID of the public key certificate (PKC) and acquires the template by decrypting the encrypted template included in the person identification certificate (IDC) using the private key of the person identification certificate authority (IDA), and furthermore, the person identification certificate authority (IDA) performs verification by comparing the template with data which is obtained by decrypting encrypted sampling data such as fingerprint data which is acquired via a sampling data extracting apparatus and transmitted from the user device via the service provider (SP). Depending upon whether they match with each other, verification is concluded as OK or NG. The verification result (OK or NG) is transmitted to the service provider (SP) and the user device, and, depending upon the verification result, it is determined whether or not the following process such as requesting by the user device the service provider (SP) to transmit a content or requesting for viewing of data should be allowed.

(5.1.2 On-Line Mode Dynamic Verification)

In on-line mode dynamic verification, when sampling data input by a person is compared, for verification, with a template of a person identification certificate (IDC), the person identification certificate (IDC) is dynamically issued by a person identification certificate authority (IDA), and comparison for verification is performed in a system, that is, by a user device (PC), a service provider (SP), or a person identification certificate authority (IDA). The template information encrypted with the public key of the person identification certificate authority (IDA) is decrypted by the person identification certificate authority (IDA) and the IDC is transmitted, after being re-encrypted using a public key of a system at which verification is to be performed, to the system, at which the template is decrypted and compared with input sampling data thereby identifying a person.

Figure 22:
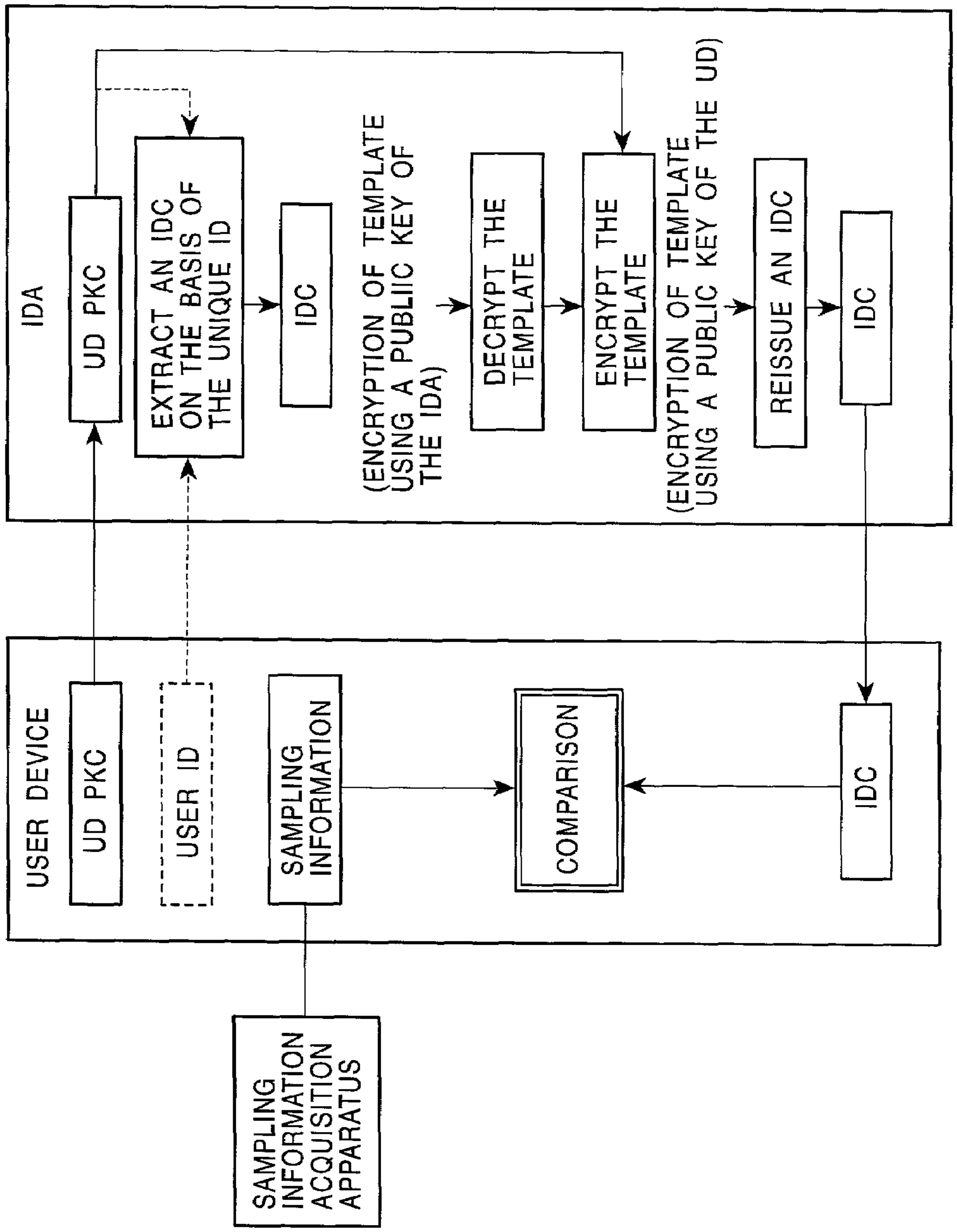
FIG. 22 is a diagram illustrating a system in which verification is performed by a user device.

FIG. 22 shows a system in which comparison for verification is performed by a user device. A person identification certificate authority (IDA) stores a person identification certificate (IDC) including a template encrypted using a public key of the person identification certificate authority (IDA), wherein when the user device performs verification, the user device acquires a person identification certificate (IDC) of a person to be authenticated by requesting the person identification certificate authority (IDA) to provide the person identification certificate (IDC) of that person.

In the process of acquiring the person identification certificate (IDC), a public key certificate (PKC) of a person to be certificated or of a user device, or the unique ID of the public key certificate (PKC) if the person identification certificate authority (IDA) already has the public key certificate (PKC) of that user or the user device, is transmitted to the person identification certificate authority (IDA) from the user device, and the person identification certificate authority (IDA) retrieves the IDC of the person from the stored IDCs on the basis of the received unique ID or the unique ID extracted from the PKC.

The person identification certificate authority (IDA) decrypts the encrypted template extracted from the retrieved IDC using the private key of the person identification certificate authority (IDA), re-encrypts the template using the public key of the user device, re-issues the person identification certificate (IDC), and transmits the reissued IDC to the user device.

The user device acquires the template by decrypting, using the private key of the user device, the encrypted template included in the person identification certificate (IDC) received from the person identification certificate authority (IDA), and the user device performs verification by comparing the acquired template with personal data, for example, sampling data such as fingerprint data acquired via a sampling data extracting apparatus. Depending upon whether they match with each other, verification is concluded as OK or NG. Only when verification is successfully passed, for example, a particular application program installed on the user device is allowed to be executed to perform data processing such as accessing to a database, updating of data, or inputting of data. If verification fails, execution of data processing is not allowed.

Figure 23:
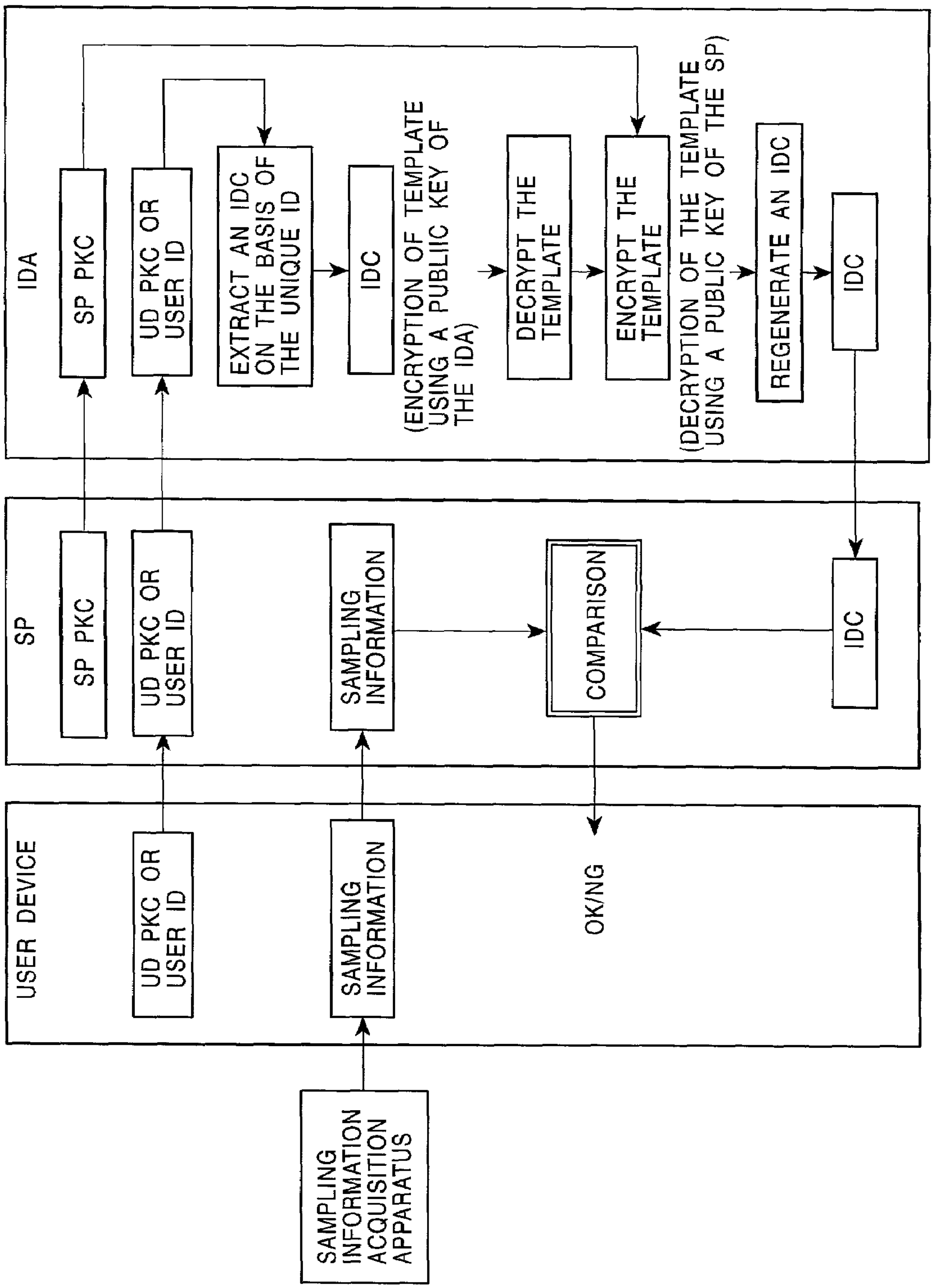
FIG. 23 is a diagram illustrating a system in which verification is performed by a service provider (SP)

FIG. 23 shows a system in which comparison for verification is performed by a service provider (SP). A person identification certificate authority (IDA) stores a person identification certificate (IDC) including a template encrypted using a public key of the person identification certificate authority (IDA). When verification is performed in the service provider (SP), the service provider (SP) transmits a public key certificate (PKC) of the service provider (SP) to the person identification certificate authority (IDA). In the case where the person identification certificate authority (IDA) already has the PKC of the service provider (SP), identification data identifying the PKC may be transmitted.

Thereafter, a public key certificate (PKC) of a person to be verified or of a user device is transmitted from the user device to the person identification certificate authority (IDA) via the service provider (SP). In the case where the person identification certificate authority (IDA) already has the PKC of the user device, identification data identifying the PKC may be transmitted.

The person identification certificate authority (IDA) retrieves the IDC of the person from the stored IDCs on the basis of the received unique ID and decrypts the encrypted template included in the retrieved IDC, using the private key of the person identification certificate authority (IDA), re-encrypts the template using the public key of the service provider (SP), re-issues the person identification certificate (IDC), and transmits the re-issued IDC to the service provider (SP).

The service provider (SP) acquires the template by decrypting, using the private key of the service provider (SP), the encrypted template included in the person identification certificate (IDC) received from the person identification certificate authority (IDA), and the service provider (SP) performs verification by comparing the template with data which is obtained by decrypting encrypted sampling data such as fingerprint data which is acquired via a sampling data extracting apparatus and transmitted from the user device. Depending upon whether they match with each other, verification is concluded as OK or NG. The verification result (OK or NG) is transmitted to the user device, and, depending upon the verification result, it is determined whether or not the following process such as requesting a service provider (SP) to transmit a content or requesting for viewing of data should be allowed.

(5.2 Off-Line Mode)

In the off-line mode, verification is performed statically, unlike the on-line mode in which a person identification certificate authority (IDA) dynamically issues a person identification certificate (IDC) when the IDC is required in verification of sampling information. Therefore, person authentication is performed in a different manner depending upon the encryption algorithm used to encrypt the template information included in the person identification certificate (IDC) and also depending upon the location where comparison for verification is performed. In the off-line mode, because an encrypted template included in a person identification certificate (IDC) is decrypted by a device such as a user device or a service provider (SP) which performs comparison for verification, it is necessary that the encryption of the template be performed such that the user device or the service provider (SP) can decrypt the encrypted template.

In the off-line mode, static verification is performed as described below.

(5.2.1) Verification Performed by Device a. Verification is performed by a user device in which both a person identification certificate (IDC) and a public key certificate (PKC) are stored.

b. Verification is performed by a user device in which both a person identification certificate (IDC) and a public key certificate (PKC) are not stored.

(5.2.2) Verification Performed by Service Provider c. Verification is performed by a service provider when template information included in a person identification certificate (IDC) is encrypted using a public key of the service provider (SP).

d. Verification is performed by a service provider when template information included in a person identification certificate (IDC) is encrypted using a public key of a user device or a symmetric key.

The manners of verification are described below in further detail below.

(5.2.1) Verification Performed by Device a. In the case where verification is performed by a user device in which both a person identification certificate (IDC) and a public key certificate (PKC) are stored.

A user device can include both an IDC and a PKC, for example, when the user device is designed to execute a process of comparing sampling information with a template included in a person identification certificate (IDC), provided that a person identification certificate (IDC) of a user to be authenticated and a public key certificate (PKC) exist, template information included in the person identification certificate (IDC) is encrypted using a public key of the device described in the public key certificate (PKC), and the public key certificate (PKC) can be specified by the person identification certificate (IDC). When comparison for verification is performed, the encryption algorithm of the template included in a person identification certificate (IDC) and a public key certificate (PKC) describing a public key used as an encryption key are detected, and a private key corresponding to the detected public key is then detected and the template is decrypted using the private key.

Figure 24:
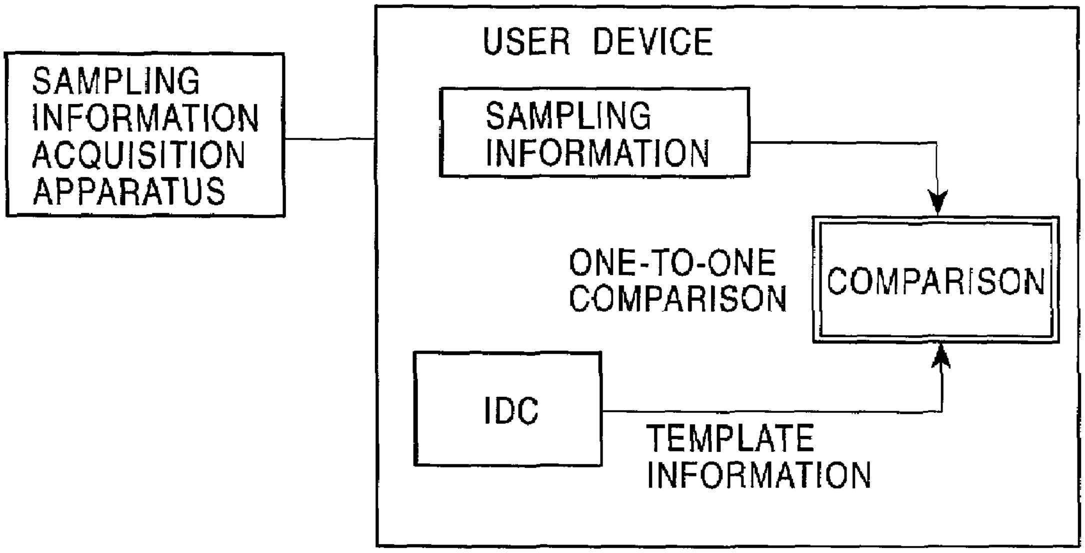
FIG. 24 is a diagram illustrating a verification process performed by a user device storing an IDC and a PKC.

FIG. 24 is a diagram illustrating a verification process performed by a user device storing an IDC and a PKC. The user device inputs personal data, that is, sampling information such as fingerprint information acquired via a sampling information acquisition apparatus. The user device reads a person identification certificate (IDC) stored in the user device and detects a public key certificate (PKC) in which the public key applied to the encryption of the template is stored, on the basis of the information about the template encryption algorithm. Furthermore, the user device detects the private key corresponding to the detected public key. The private key is one element of a pair of the public key and the private key of the user device, and is stored in the secure memory of the user device. Using this private key stored in the secure memory, the encrypted template of the person identification certificate (IDC) is decrypted. Thereafter, the decrypted template is compared with the sampling information.

Only when verification is successfully passed, for example, a particular application program installed on the user device is allowed to be executed to perform data processing such as accessing to a database, updating of data, or inputting of data. If verification fails, execution of data processing is not allowed.

b. In the case where an IDC and a PKC are not stored in the same device.

In the case where a device is used by a great number of users (that is, in the case of a shared user device), it is difficult to store person identification certificates (IDCs) of all users in the device. In such a case, the person identification certificate (IDC) of each user is transferred into the user device from a personal terminal (such as an IC card or other mobile terminal), the process is performed on the basis of the transferred IDC. The process is performed in one of three manners described below.

(b-1) IDC stored in a personal terminal is transmitted to a shared user device to perform verification.

(b-2) Template information is decrypted by a personal terminal and transmitted to a shared user device to perform verification.

(b-3) Verification is performed by a personal terminal.

The processes in the respective modes are described below.

(b-1) IDC Stored in a personal terminal is transmitted to a shared user device to perform verification.

Figure 25:
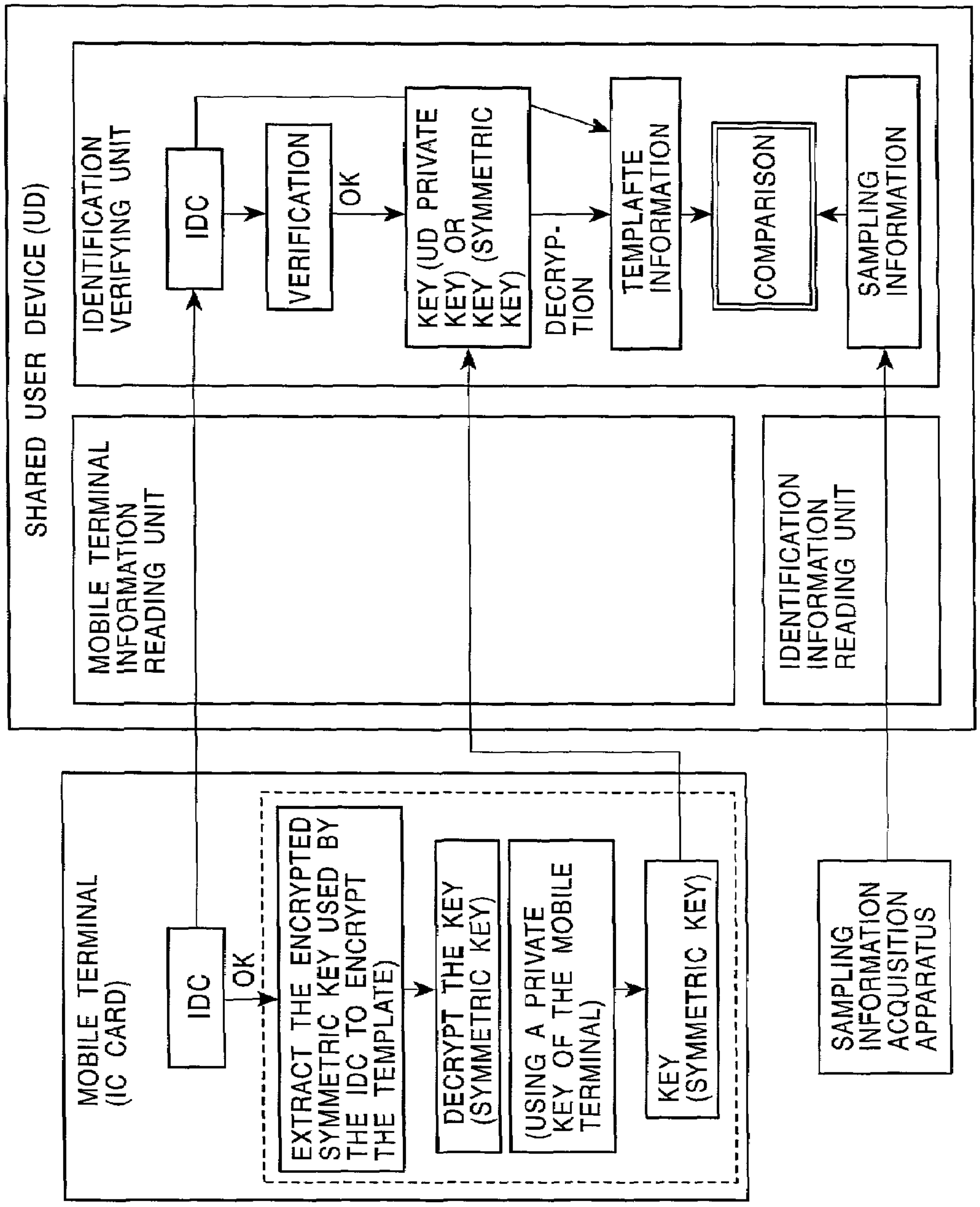
FIG. 25 is a diagram illustrating a system in which verification is performed by transmitting a person identification certificate (IDC) stored in a personal terminal such as an IC card to a shared user device.

FIG. 25 is a diagram illustrating a system in which verification is performed by transmitting a person identification certificate (IDC) stored in a personal terminal such as an IC card to a shared user device.

When a user wants to execute some data processing using an application program installed on the shared user device, the user inserts a mobile terminal such as an IC card into the shared user device. A person identification certificate (IDC) issued by a person identification certificate authority (IDA) is stored in the IC card. In this mode, the shared user device is an entity which executes a person verification process.

After inserting the mobile personal terminal such as an IC card into the shared user device, the person identification certificate (IDC) is transmitted from the mobile terminal to the shared user device. It is desirable that, before transmitting the IDC, mutual authentication be performed between the mobile terminal and the shared user device and the IDC is transmitted after being encrypted using a session key created in the mutual authentication process.

Upon receiving the person identification certificate (IDC) from the mobile terminal, the shared user device verifies the signature of the person identification certificate authority (IDA) added to the IDC to check whether the IDC is tampered with. If it is determined that the IDC has not been tampered with (OK), the encrypted template information is extracted from the IDC. Note that the encryption of the template was performed using the public key of the shared user device or the symmetric key. In the case where the template was encrypted using the public key of the shared user device, the template can be decrypted using the private key of the shared user device.

In the case where the template was encrypted using the symmetric key, the process described in blocks surrounded by a broken line in FIG. 25 is performed by the personal terminal. The symmetric key used to encrypt the template is encrypted using a public key of the personal terminal and stored in a person identification certificate (IDC). The personal terminal extracts the encrypted symmetric key from the person identification certificate (IDC) and decrypts the symmetric key using the private key of the personal terminal. The obtained symmetric key is transmitted to the shared user device. It is desirable that the symmetric key be transmitted after being encrypted using a session key created during the mutual authentication. Alternatively, the symmetric key may be transmitted after being encrypted using the public key of the user device.

The shared user device decrypts the encrypted template using the private key of the shared user device and the symmetric key, and compares the template with sampling information input via the sampling information acquisition apparatus.

(b-2) In the case where template information is decrypted by a personal terminal and transmitted to a shared user device to perform verification.

Figure 26:
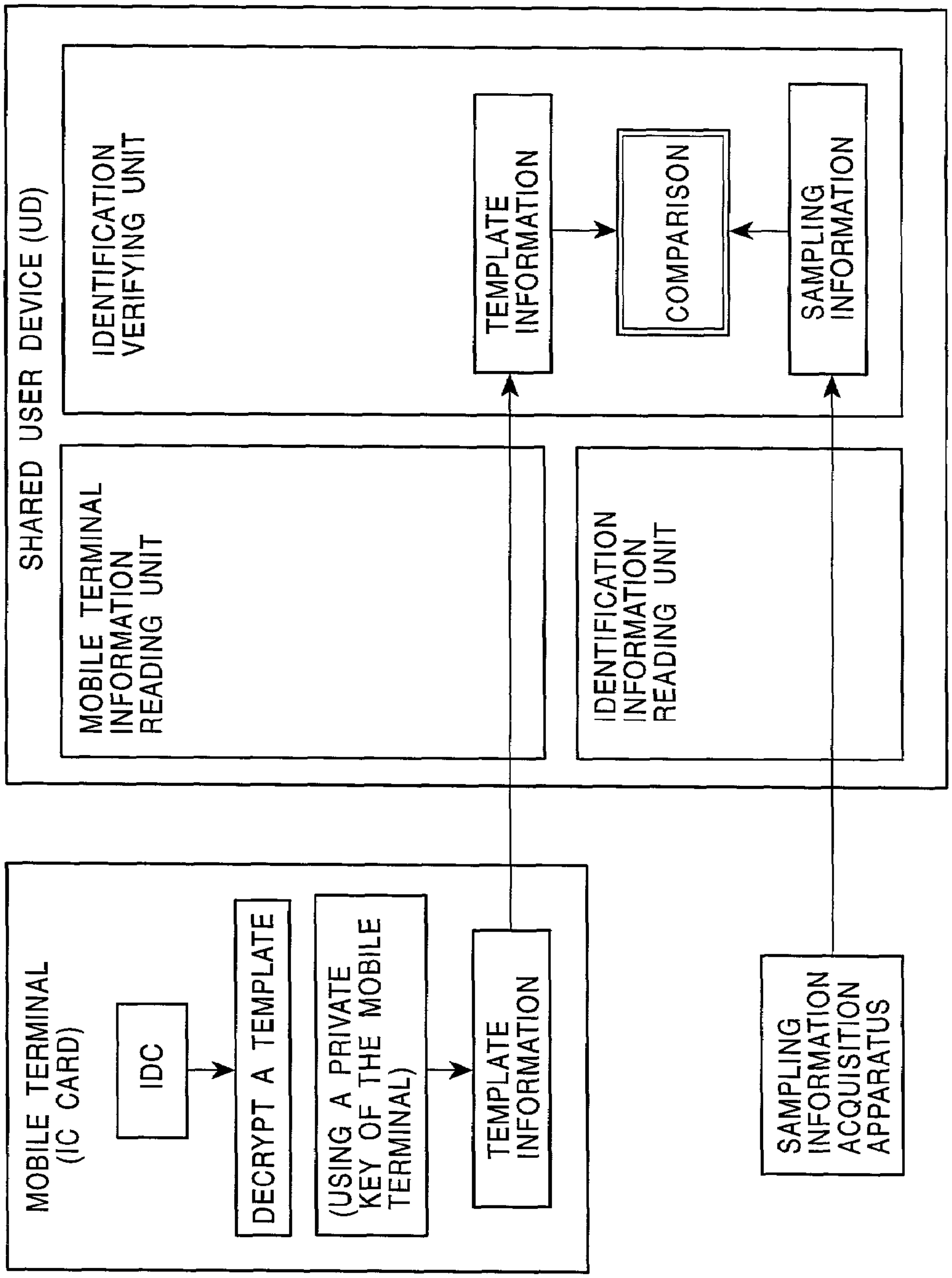
FIG. 26 is a diagram illustrating a system in which verification is performed by decrypting a person identification certificate (IDC) stored in a personal terminal such as an IC card and then transmitting the decrypted IDC to a shared user device.

FIG. 26 is a diagram illustrating a system in which verification is performed by decrypting a person identification certificate (IDC) stored in a personal terminal such as an IC card and then transmitting the decrypted IDC to a shared user device.

After a user inserts a mobile personal terminal such as an IC card into a shared user device, a person identification certificate (IDC) decrypted by the mobile terminal is transmitted to the shared user device. Herein, the IDC includes template information which is encrypted with a public key assigned to the particular mobile terminal of each user such that the encrypted template information can be decrypted using a private key assigned to each mobile terminal. The encrypted template information extracted from the IDC is decrypted using the private key assigned to the mobile terminal and transmitted to the user device. It is desirable that, before transmitting the template, mutual authentication be performed between the mobile terminal and the shared user device and the template is transmitted after being encrypted using a session key created in the mutual authentication process. Alternatively, the template may be transmitted after being encrypted using the public key of the user device.

Upon receiving the template from the mobile terminal, the shared user device extracts the template information and compares it with sampling information input via the sampling information acquisition apparatus.

(b-3) Verification performed by a personal terminal

Figure 27:
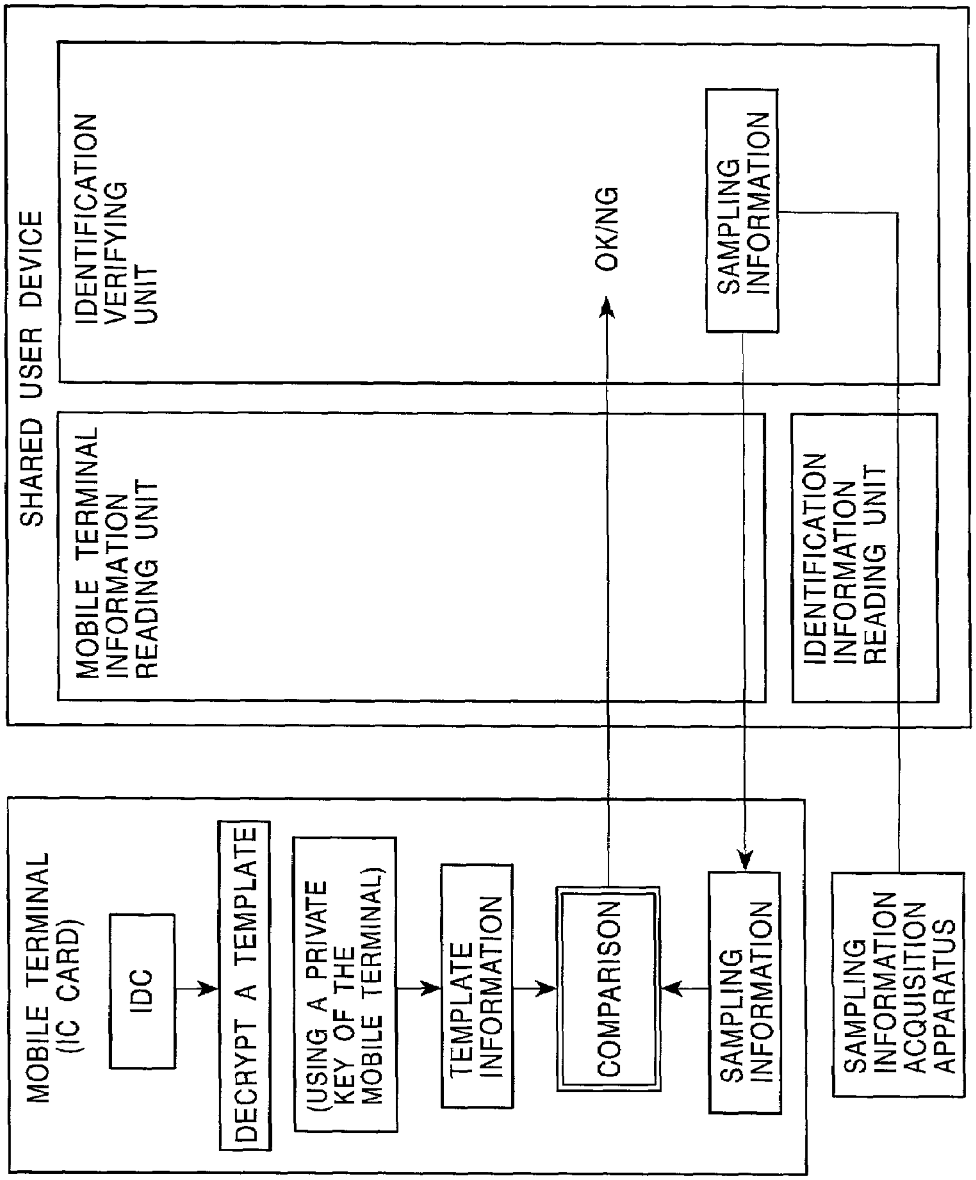
FIG. 27 is a diagram illustrating a system in which verification is performed by a personal terminal such as an IC card using a person identification certificate (IDC) stored in the personal terminal and only the result of the verification is transmitted to a shared user device.

FIG. 27 is a diagram illustrating a system in which verification is performed by a personal terminal such as an IC card using a person identification certificate (IDC) stored in the personal terminal and only the result of the verification is transmitted to a shared user device.

When a user inserts a mobile personal terminal such as an IC card into a shared user device, an encrypted template included in a person identification certificate (IDC) is decrypted by the mobile terminal. Herein, the IDC includes template information which is encrypted with a public key assigned to the particular mobile terminal of each user such that the encrypted template information can be decrypted using a private key assigned to each mobile terminal. The encrypted template information extracted from the IDC is decrypted using the private key assigned to the mobile terminal.

Sampling information is acquired via a sampling information acquisition apparatus and transmitted to the personal terminal such as an IC card via the user device. It is desirable that, before transmitting the sampling information, mutual authentication be performed between the mobile terminal and the shared user device and the sampling information is transmitted after being encrypted using a session key created in the mutual authentication process. Upon receiving the sampling information from the user device, the personal terminal compares the decrypted template with the sampling information and returns the comparison result to the user device. In this mode, the IC card employed as the mobile terminal is an entity which executes a person verification process.

(5.2.2) Verification Performed by Service Provider

Manners in which a service provider (SP) authenticates an use to whom a service is to be provided are described below.

c. Verification performed by a service provider when template information included in a person identification certificate (IDC) is encrypted using a public key of the service provider (SP).

Figure 28:
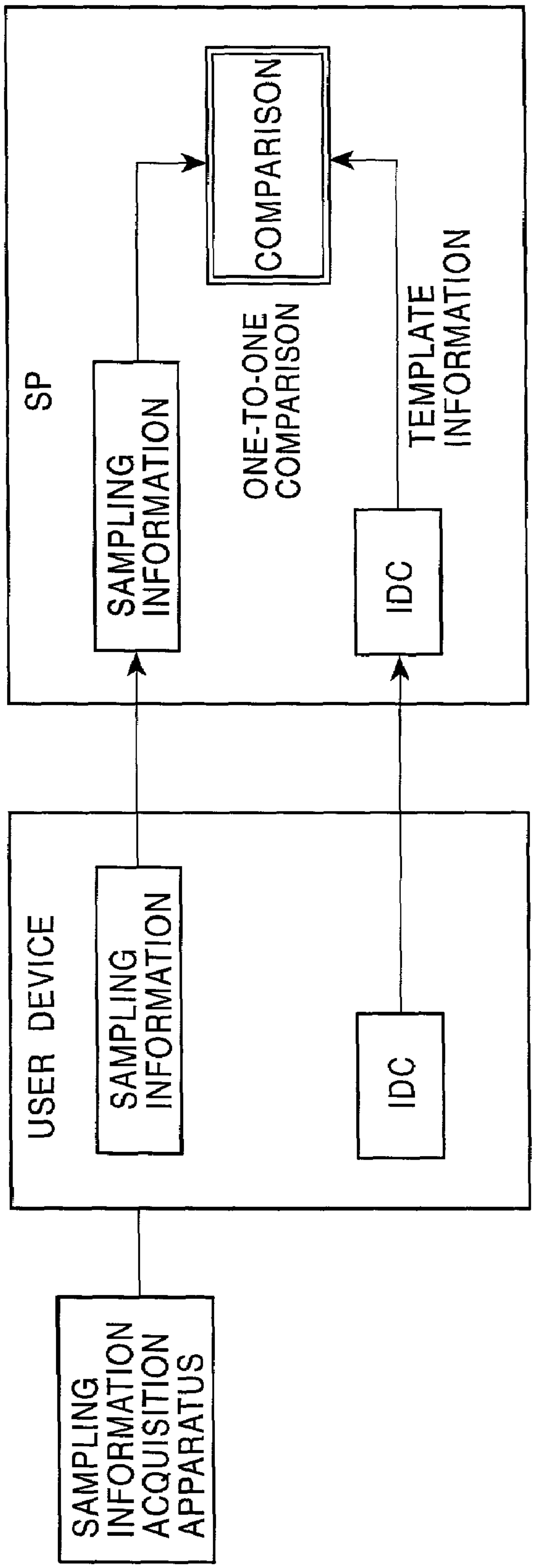
FIG. 28 is a diagram illustrating a process performed when template information of a person identification certificate (IDC) is encrypted using a public key of a service provider (SP)

First, a process performed when template information of a person identification certificate (IDC) is encrypted using a public key of a service provider (SP) is described below with reference to FIG. 28.

A user device, which wants to receive a service such as content distribution or settlement from a service provider (SP), acquires a personal information such as a fingerprint of a user via a sampling information acquisition apparatus. Thereafter, mutual authentication is performed between the user device and the service provider (SP). If the mutual authentication is successfully completed, the user device transmits the sampling information to the service provider (SP). In the transmission of the sampling information, the sampling information is encrypted using a session key created during the mutual authentication or using a public key of the service provider. Furthermore, the user device transmits a person identification certificate (IDC) of the user device to the service provider (SP). The person identification certificate (IDC) includes template information encrypted using the public key of the service provider.

Upon receiving the sampling information and the person identification certificate (IDC) from the user device, the service provider (SP) decrypts the encrypted template information stored in the person identification certificate (IDC), using the private key of the service provider (SP) and compares the decrypted template information with the sampling information.

If they match with each other, the user is regarded as an authorized user, and the service provider provides a service such as content distribution or settlement to the user (user device). In the case where the verification by comparison fails, the user is regarded as an unauthorized user, and service is not provided.

d. Verification performed by a service provider when template information included in a person identification certificate (IDC) is encrypted using a public key of a user device or a symmetric key.

When template information included in a person identification certificate (IDC) is encrypted using a public key of a user device or a symmetric key, user authentication may be performed by a service provider (SP) as described below. In this case, user authentication may be performed in one of the three modes described below.

(d-1) A symmetric key used by a user device to encrypt a template is transmitted to a service provider (SP) and the service provider (SP) performs comparison for verification.

(d-2) Template information is decrypted by a user device and transmitted to a service provider (SP) for use in verification.

(d-3) Comparison for Verification is Performed by a User Device.

The processes in the respective modes are described below.

(d-1) IDC stored in a user device is transmitted to a shared user device, and the shared user device performs comparison for verification.

Figure 29:
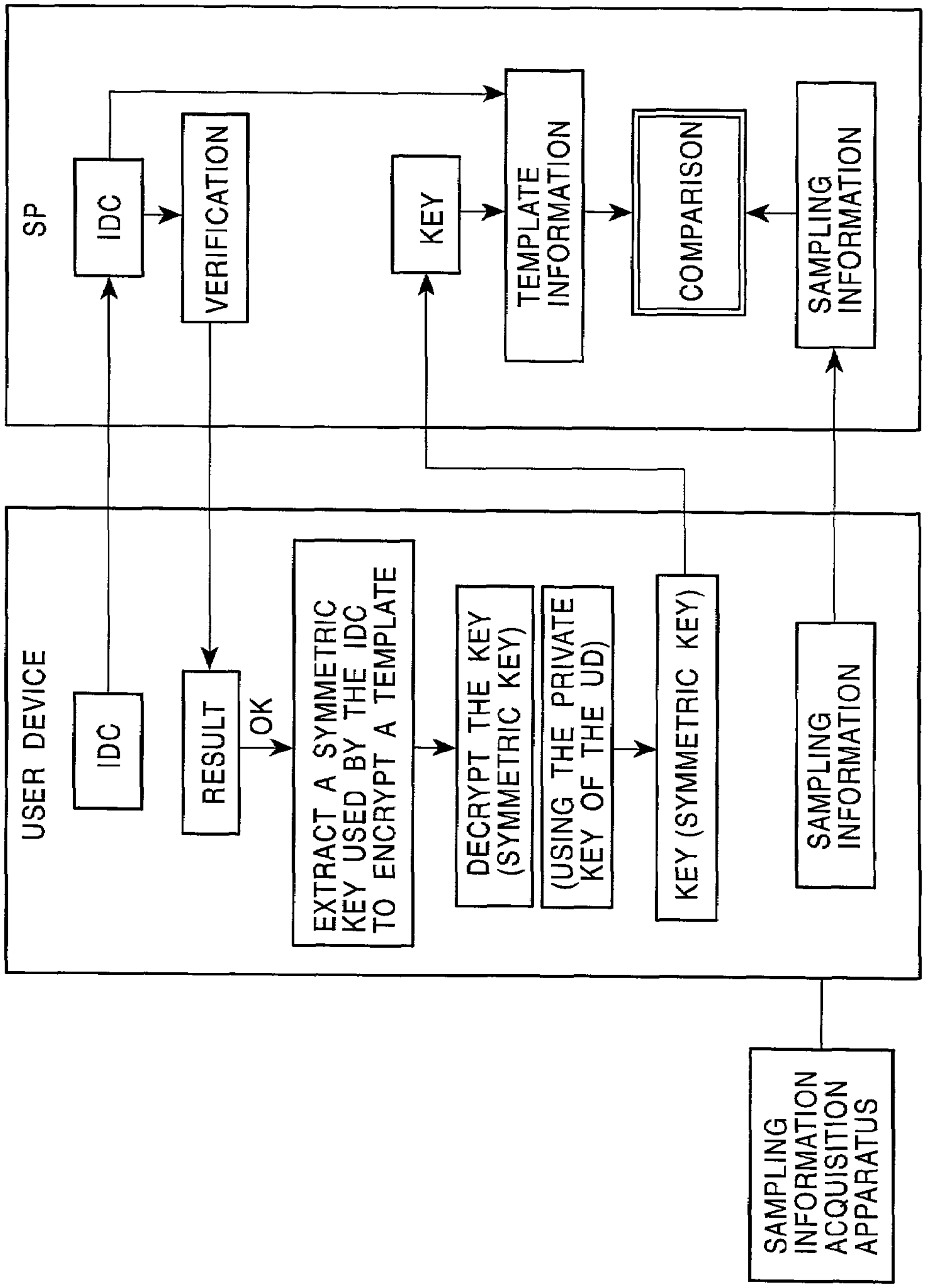
FIG. 29 is a diagram illustrating a system in which verification is performed by transmitting a person identification certificate (IDC) stored in a user device to a service provider (SP)

FIG. 29 is a diagram illustrating a system in which a person identification certificate (IDC) stored in a user device is transmitted to a service provider (SP) and the service provider (SP) performs comparison for verification.

When a user of a user device wants to receive a service from a service provider (SP), mutual authentication between the user device and the service provider (SP) is performed. If the mutual authentication is successfully completed, a person identification certificate (IDC) of the user is transmitted to the service provider. In the transmission of the IDC, the IDC is preferably encrypted using a session key created during the mutual authentication or using a public key of the service provider (SP).

Upon receiving the person identification certificate (IDC) from the user device, the service provider (SP) verifies a signature of a person identification certificate authority (IDA) written in the IDC to check whether or not the IDC has been tampered with. If it is determined that the IDC has not been tampered with (OK), the service provider (SP) extracts encrypted template information from the IDC, wherein a symmetric key is used in encryption of the template.

The symmetric key used to encrypt the template has been encrypted using the public key of the user device and stored in the person identification certificate (IDC). The user device extracts the encrypted symmetric key from the person identification certificate (IDC) and decrypts it using the private key of the user device. The obtained symmetric key is transmitted to the service provider (SP). It is desirable that the symmetric key be transmitted after being encrypted using a session key created during the mutual authentication. Alternatively, the symmetric key may be transmitted after being encrypted using the public key of the service provider (SP).

The service provider (SP) acquires the symmetric key by performing decryption using the private key of the service provider (SP) or the session key, and the service provider (SP) further decrypts the encrypted template using the acquired symmetric key. The service provider (SP) then compares the obtained template with sampling information which is input via a sampling information acquisition apparatus and transmitted therefrom via the user device. Mutual authentication is performed between the user device and the service provider (SP). If the mutual authentication is successfully completed, the user device transmits the sampling information to the service provider (SP). In the transmission of the sampling information, the sampling information is encrypted using a session key created during the mutual authentication or using a public key of the service provider.

(d-2) Template information is decrypted by a user device and transmitted to a service provider (SP) for use in verification.

Figure 30:
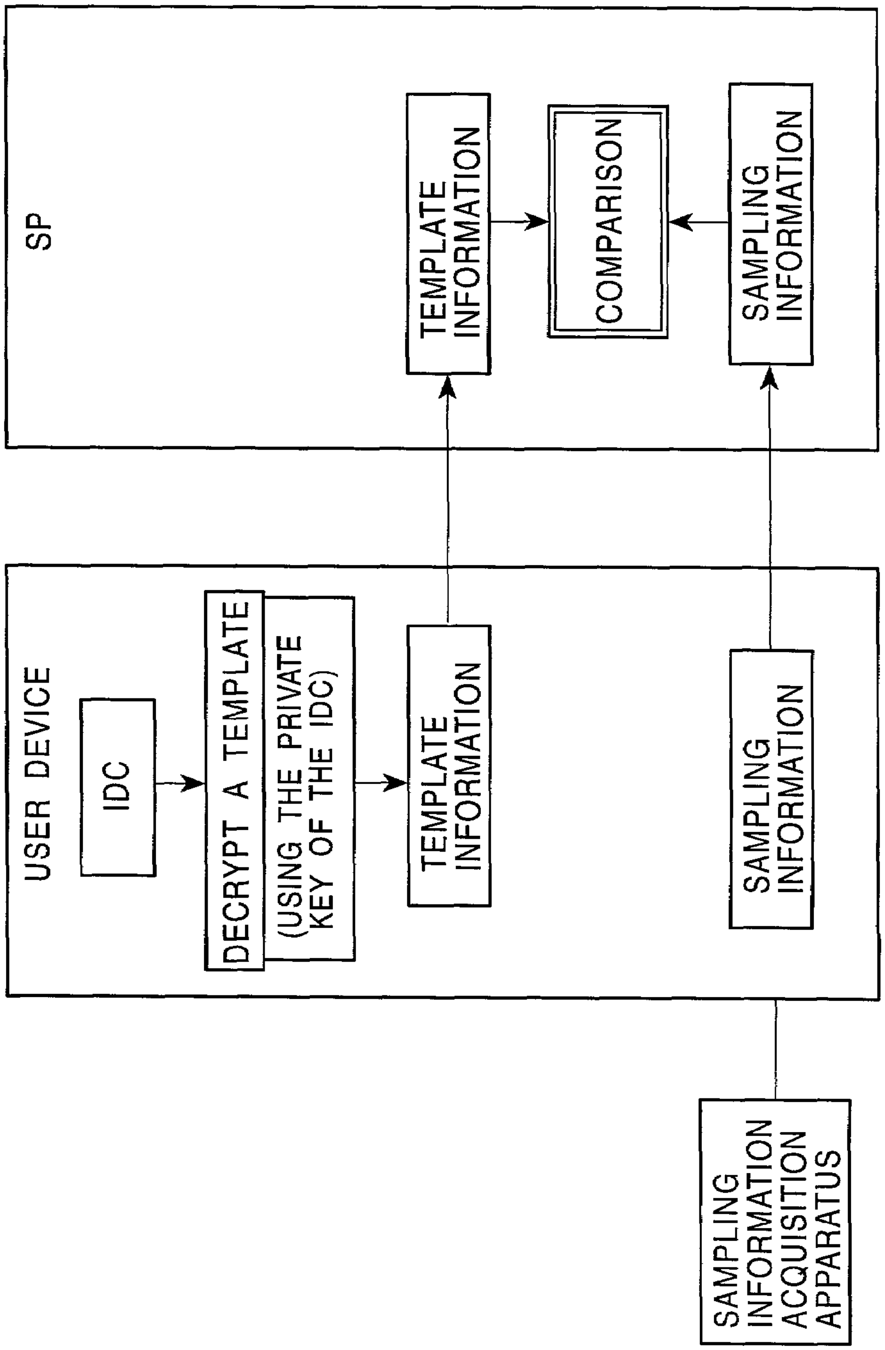
FIG. 30 is a diagram illustrating a system in which verification is performed by decrypting a person identification certificate (IDC) stored in a user device and then transmitting the decrypted IDC to a service provider (SP)

FIG. 30 is a diagram illustrating a system in which verification is performed by decrypting a person identification certificate (IDC) stored in a user device and then transmitting the decrypted IDC to a service provider (SP).

A person identification certificate (IDC) is decrypted by a user device and transmitted to a service provider (SP). Herein, the IDC includes template information which is encrypted with a public key assigned to the particular user device such that the encrypted template information can be decrypted using a private key assigned to the user device. The encrypted template information extracted from the IDC is decrypted using the private key assigned to the user device, and then transmitted to the service provider (SP). It is desirable that, before transmitting the template, mutual authentication be performed between the user device and the service provider (SP) and the template is transmitted after being encrypted using a session key created in the mutual authentication process. Alternatively, the template may be transmitted after being encrypted using a public key of the service provider (SP).

Upon receiving the template from the user device, the service provider (SP) extracts the template information and compares it with sampling information which is input via a sampling information acquisition apparatus and transmitted from the user device.

(d-3) Comparison for verification is performed by a user device.

Figure 31:
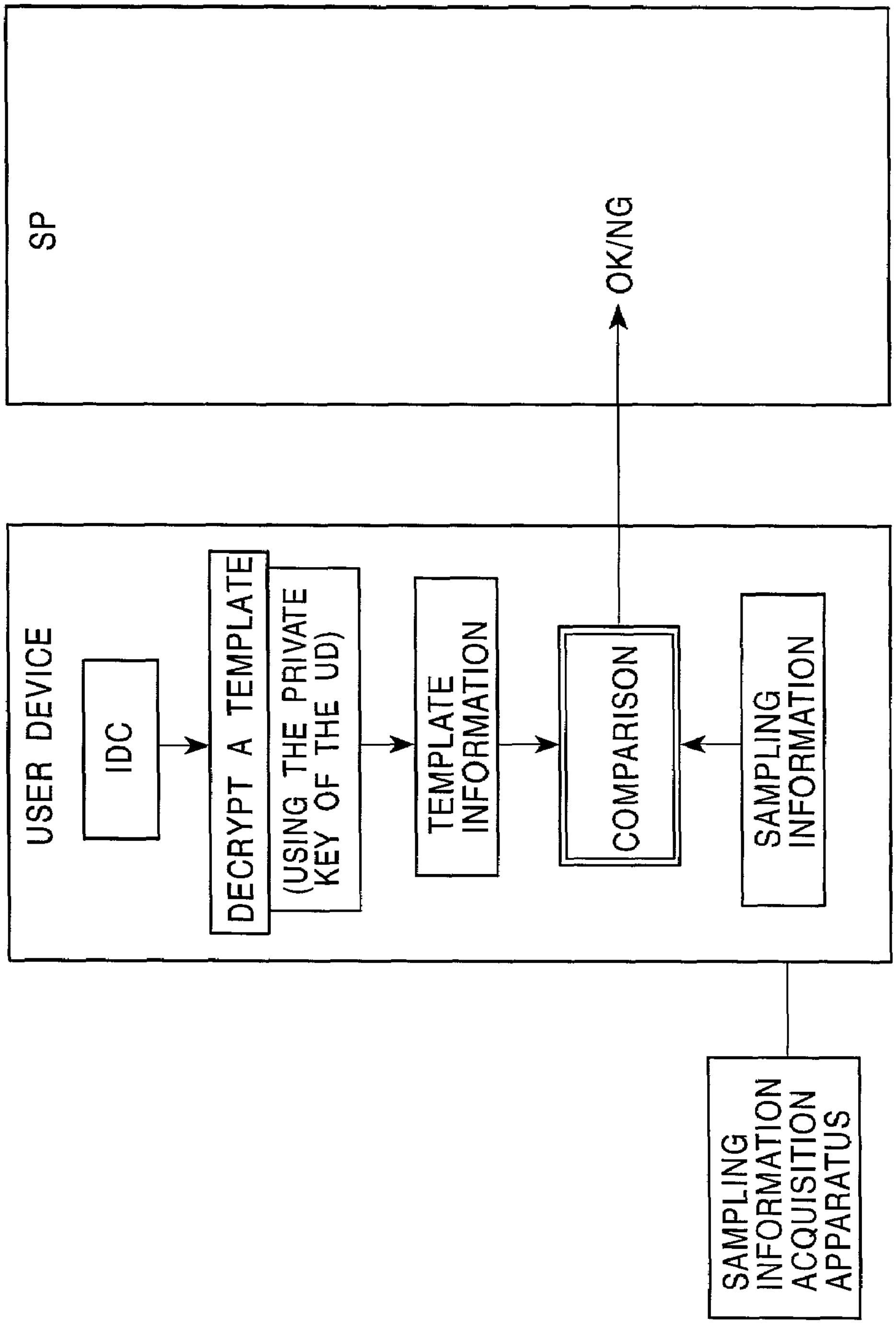
FIG. 31 is a diagram illustrating a system in which verification is performed by a user device using a person identification certificate (IDC) stored in the user device and only the result of the verification is transmitted to a service provider (SP)

FIG. 31 is a diagram illustrating a system in which verification is performed by a user device using a person identification certificate (IDC) stored in the user device and only the result of the verification is transmitted to a service provider (SP).

The user device decrypts the encrypted template included in the person identification certificate (IDC). Herein, the IDC includes template information which is encrypted with a public key assigned to the particular user device such that the encrypted template information can be decrypted using a private key assigned to the user device. The encrypted template information extracted from the IDC is decrypted using the private key assigned to the user device.

Sampling information is acquired via a sampling information acquisition apparatus and input to the user device. The user device performs verification by comparing the decrypted template with the sampling information and transmits the verification result to the service provider (SP). In accordance with the result, the service provider (SP) determines whether or not a service should be provided.

[6. Control of Permission of Usage of Content According to User Authentication on the Basis of Person Identification Certificate]

A process of controlling permission of usage of various contents such as music data or image data and various programs such as a game in accordance with user authentication on the basis of a person identification certificate (IDC) is described below.

Figure 32:
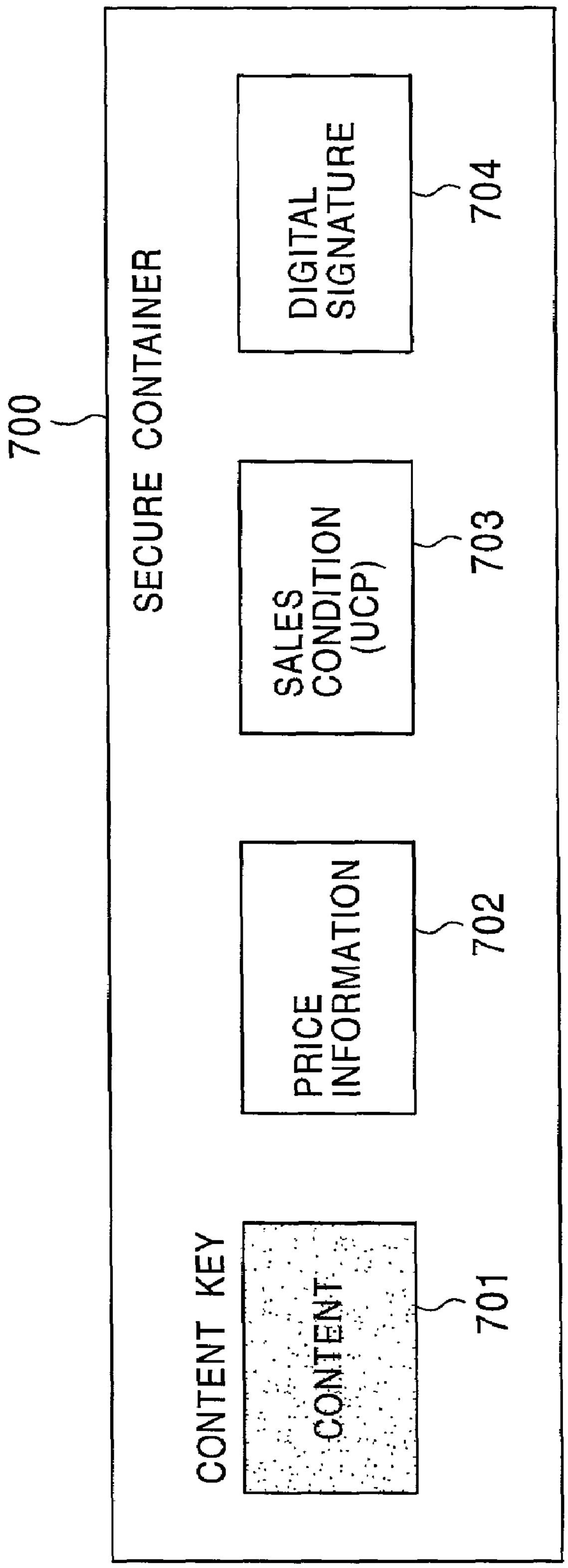
FIG. 32 is a diagram illustrating a configuration of a secure container containing a content to be distributed via content transaction.

FIG. 32 illustrates a configuration of a secure container containing a content to be distributed via content transaction. The secure container shown in FIG. 32 may be used to distribute a content from a service provider to a user device and may also be used to distribute a content from a user device to another user device.

A secure container can be distributed not only from a service provider to users but also among users. When a content is distributed among users, the distribution may be performed in either one of the two manners described below. In a first manner, a content is transmitted for sales in series from one user to another, for example, from a user A to a user B and then from the user B to a user C, and so on. The series distribution of contents among users is referred to as "intergeneration distribution". In a second manner, a content purchased by a user A is distributed in parallel from the user A to an users B, C, D, etc. That is, the same content is distributed from one user to a plurality of users. This parallel content distribution is referred to as "secondary distribution".

As shown in FIG. 32, a secure container 700 includes a content 701 encrypted using a content key, price information 702 including information about the price of the content, sales restriction information (USP) 703 indicating the restriction on the usage of the content, and a digital signature 704 of a producer of the secure container, such as a service provider, wherein the sales restriction information (UCP) 703 indicates, for example, that the content is permitted to be used only once and reselling among users via "intergeneration distribution" or "secondary distribution" is not permitted, or that the content is permitted to be resold among users a plurality of times. In the case where the content is permitted to be resold among users a plurality of times, the sales restriction information (UCP) 703 may indicate the details of the restriction on the reselling. For example, the sales restriction information (UCP) 703 indicates that "intergeneration distribution" is allowed up to two times or that "secondary distribution" is allowed up to three times. The price information 702 and the sales restriction information (UCP) 703 of the secure container are generically referred to as container information. At least either one of or both of the price information 702 and the sales restriction information (UCP) 703 of the container information of the secure container include a list of person identification certificates (IDCs) of users who are authorized to use the content.

FIG. 33 is a diagram illustrating a form of a list of person identification certificates (IDCs). The list of person identification certificates (IDCs) includes user IDs or user identifiers and identifiers of the person identification certificates (IDCs) of the respective users.

The container information including the price information 702 and the sales restriction information (UCP) 703 is management information which is set by one of a content producer, a content provider, and a service provider. For example, a service provider produces data such that a list of person identification certificates (IDCs) of registered users is included in the price information 702 or the sales restriction information 703. The digital signature is written by an agency or an organization which manages the distribution of contents. In the case where the distribution of contents is managed by a service provider, the digital signature is written by the service provider.

FIG. 34 illustrates a specific example of a form of sales restriction information (UCP) 703. As shown in FIG. 34, the sales condition information (UCP) includes a person identification certificate (IDC) list 711 which is data indicating of a list of identifiers of person identification certificates (IDCs) of users who are permitted to use a content. The sales condition information (UCP) further includes a content identifier (ID), usable device conditions indicating user devices on which the content can be used, an area code indicating an area where the content can be used, and the type of permitted usage indicating the manners in which the content is permitted to be used (for example, the maximum number of times the content is allowed to be reproduced, the maximum number of time the content is allowed to be copied (downloaded)).

The type of permitted usage is data indicating the manners in which the content is permitted to be used. FIG. 35 illustrates an example of a format of the permitted usage data. Rule numbers are assigned to respective items of the permitted usage, such as whether reproduction is permitted, whether copying is permitted, how long the copy is allowed to be reproduced or copied, and how many times the copy is allowed to be reproduced or copied. In FIG. 35, SCMS is copy restriction information which indicates the maximum number of times the content is allowed to be copied. A user is permitted to reproduce and copy the content within the restriction defined in the sales restriction information of the secure container, wherein the respective items of the restriction are denoted by the rule numbers.

As shown in FIG. 34, the sales restriction information (UCP) also includes "UCP generation management information" 712 indicating the maximum number of times the content is permitted to be distributed among user devices via "intergeneration distribution", and "maximum allowable number of secondary distributions" 713 indicating the maximum number of times the content is permitted to be distributed via "secondary distribution". The maximum number of times the content is permitted to be distributed among users defined in "UCP generation management information" is inherited into the usage control status (UCS) information (FIG. 38) stored in a user device depending upon the usage of the secure container. In accordance with the maximum number of times the content is permitted to be distributed among users defined in "UCP generation management information", "UCS generation management information" and "UCS allowable number of secondary distributions" are described in the usage control status (UCS) information. The "UCS generation management information" is updated each time intergeneration distribution of the content is performed and the "UCS allowable number of secondary distributions" is updated each time secondary distribution of the content is performed. The usage control status (UCS) information will be described in further detail later.

FIG. 36 is a diagram illustrating an example of a data format of price information included in a secure container. The price information includes information indicating the content ID as in the sales restriction information (UCP) shown in FIG. 34. In addition, the price information includes information indicating a price information ID and information indicating a price information version. Furthermore, as in the sales restriction information (UCP) shown in FIG. 34, the price information includes a person identification certificate (IDC) list 721. That is, data indicating the list of identifiers of person identification certificates (IDCs) of users who are permitted to use the content is included in the sales restriction information (UCP).

Figure 37:
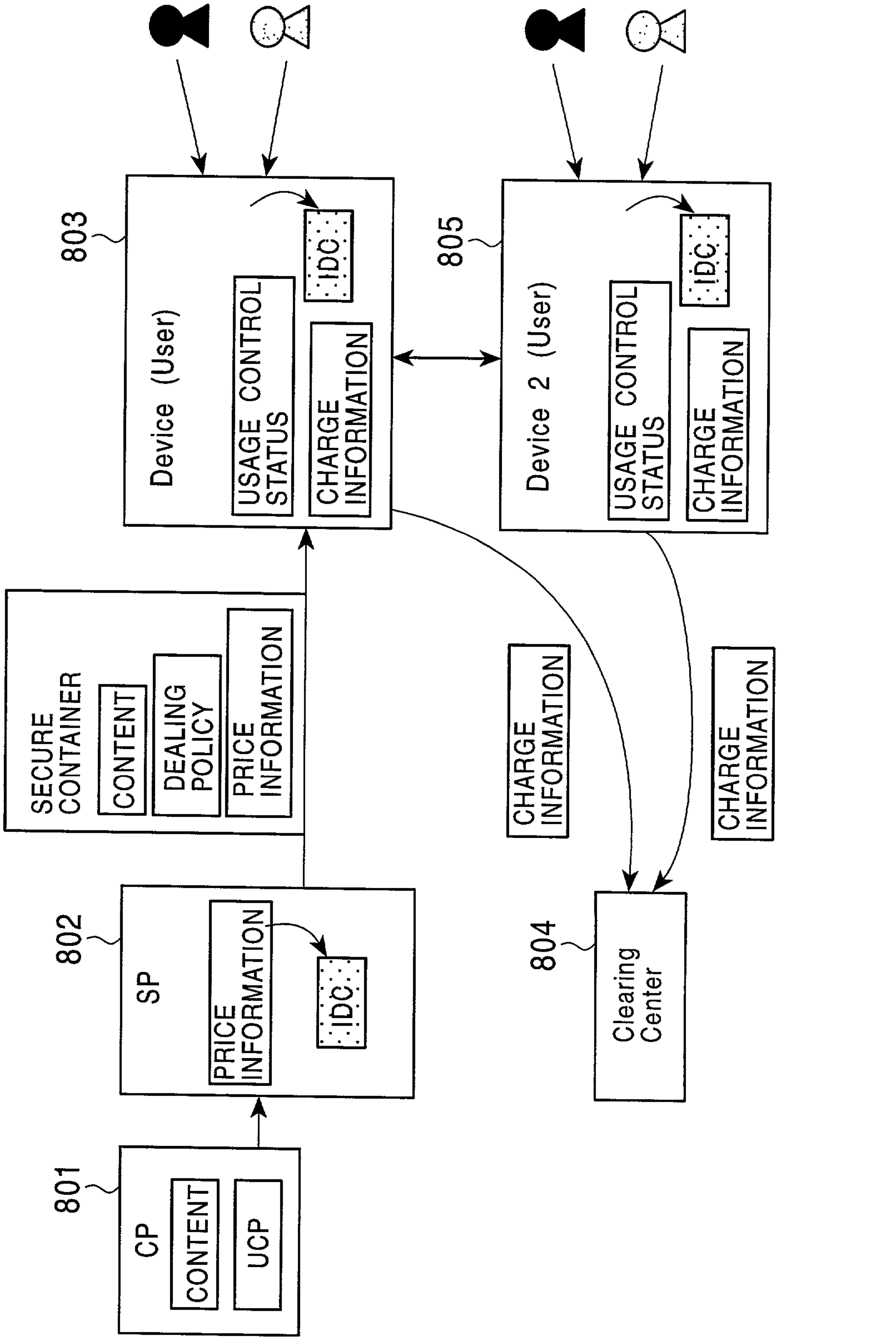
FIG. 37 is a diagram illustrating a manner of distributing a content using a secure container.

FIG. 37 is a diagram illustrating a manner of distributing a content using a secure container. A content provider (CP) 801 generates or acquires a content which is to be stored in a secure container, and the content provider (CP) 801 provides the generated or acquired content together with sales restriction (UCP) data of the content to a service provider (SP) 802 which distributes the content to users. The service provider (SP) 802 generates price information of the content and stores a list of person identification certificates (IDC) of users who are permitted to use the content into at least one of or both of the price information and the sales restriction information (UCP). The service provider (SP) 802 further writes a digital signature thereby forming a secure container and transmits the resultant secure container to a user device 803.

The user device 803 verifies the signature of the secure container. Furthermore, the user device 803 verifies other information such as the sales restriction (UCP) data and the price information included in the secure container to check that the data has not been tampered with. The user device 803 then extracts the IDC identifier of the user device 803 from the person identification certificate (IDC) list from either the sales restriction (UCP) data or the price information, and acquires the person identification certificate (IDC) indicated by the IDC identifier. The user device 803 then compares the template included in the IDC with sampling information. The comparison for verification is performed by one of the user device, the service provider, and the person identification certificate authority (IDA). In the case where the person verification has been successfully passed, it becomes possible for the user to use the content, that is, decrypt the content. More specifically, provided that the verification has been passed, the content key used to encrypt the content is transmitted from the service provider to the user device. This makes it possible for the user device to reproduce and copy the content included in the secure container using the content key.

The user device stores the secure container onto a storage medium of the user device 803. The user device 803 then generates charge information indicating the charge for use of the content and transmits it to a clearing center 804 which performs settlement. The charge information is generated on the basis of the data described in the price information described earlier. The clearing center transfers the charge from, for example, an electronic money account from the user in accordance with the charge information. The user device 803 is allowed to distribute the secure container to another user device 805, as will be described in detail later. When storing the secure container, the user devices 803 and 805 generate usage control status (UCS) information and store it into a memory.

FIG. 38 illustrates an example of usage control status (UCS) information which is generated by a user device and stored in a memory of a user device, when the secure container is stored. As shown in FIG. 38, the usage control status (UCS) information includes, in addition to the data indicating the content ID and the service provider ID, information indicating the content usage restriction such as the number of times the content is allowed to be further reproduced or the number of times the content is allowed to be further copied. Note that the number of times the content is allowed to be further reproduced or copied indicates the number of times the content is allowed to be further reproduced or copied using the same user device. The usage control status (UCS) information is generated, updated, and inherited in accordance with the permitted usage data which is included in the sales restriction (UCP) data of the content and which defines the permitted usage of the content. Thus, a user device uses the content in accordance with the content usage restriction data included in the content sales restriction (UCP) data indicating the content usage restriction or in accordance with the usage control status information generated in accordance with the usage restriction data.

The usage control status (UCS) information further includes a person identification certificate (IDC) list 731. That is, data indicating the list of identifiers of person identification certificates (IDCs) of users who are permitted to use the content is included in the usage control status (UCS) information. This list is generated by inheriting the data described in the sales restriction (UCP) information. The usage control status (UCS) information further includes "UCS generation management information" 732 and "UCS allowable number of secondary distributions" 733.

As described earlier, the "UCS generation management information" indicates the number of times intergeneration distribution of the content is allowed to be performed. For a user device which first purchases a content, the same number as the number defined in the "UCP generation management information" is set in the UCS generation management information. For a user device which receives the content from a user via the intergeneration distribution, the number equal to the value obtained by subtracting the number of times intergeneration distribution has been performed from the number defined in the "UCP generation management information" is set in the UCS generation management information.

"UCP allowable number of secondary distributions" 733 is a field in which the number of times secondary distribution of the content is allowed. For a user device which first purchases the content, the same number as the number defined in the "UCP allowable number of secondary distributions" in the sales restriction (UCP) information is set, and is updated, that is, decremented, each time secondary distribution is performed thereafter.

As described above, distribution of the content among users is allowed or forbidden depending upon the "UCS generation management information" or "UCS allowable number of secondary distributions" in the usage control status (UCS) information stored in the memory of the user device together with the content. The "UCS generation management information" is updated each time intergeneration distribution of the content is performed, and the "UCS allowable number of secondary distributions" is updated each time secondary distribution of the content is performed.

Figure 39:
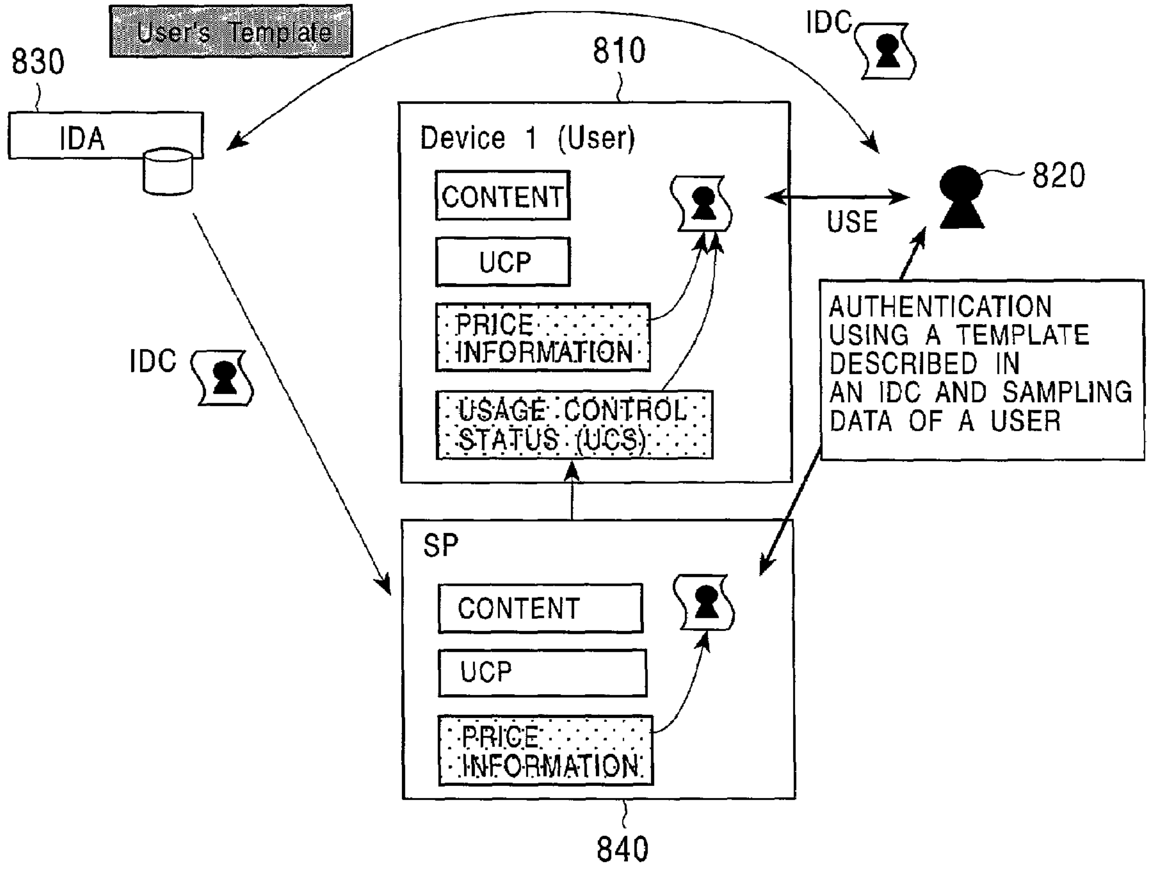
FIG. 39 is a diagram illustrating a manner of using a person identification certificate (IDC) when a secure container containing a content is distributed from a service provider to a user device.

FIG. 39 is a diagram illustrating a manner of using a person identification certificate (IDC) when a secure container containing a content is distributed from a service provider to a user device.

First, a user 820 of a user device 810 request a person identification certificate authority (IDA) 830 to issue a person identification certificate (IDC) of the user 820. When the user 820 issues the request, the user 820 presents his/her biotic information and other personal information to the person identification certificate authority (IDA) 830. After verifying the authenticity of the user, the person identification certificate authority (IDA) 830 generates template information in accordance with sampling information and further generates a person identification certificate (IDC) in which encrypted template information is stored.

In response to a request, the generated person identification certificate (IDC) is distributed to the user device 810 or a service provider 840 and stored therein. For example, when the user 820 wants to receive a content from the service provider 840, the service provider 840 authenticates the user 820 on the basis of the person identification certificate (IDC) stored in the service provider 840. That is, the service provider 840 compares the sampling information received from the user with the template information included in the person identification certificate (IDC), and, if they match with each other, the service provider 840 regards the user who provided the sampling information as an authorized user corresponding to the person identification certificate (IDC) and distributes the content to the user.

When the user 820 wants to use the user device 810, authentication is also performed on the basis of the person identification certificate (IDC) stored in the user device 810. That is, sampling information input by the user is compared with the template information included in the person identification certificate (IDC), and, if they match with each other, the user device 810 determines that the user who provides the sampling information is an authorized user corresponding to the person identification certificate (IDC) and permits the user to use the user device for data processing.

As described above, user authentication may be performed individually using a person identification certificate (IDC) by a user device or a service provider at various locations. Note that, as described earlier, the template stored in the person identification certificate (IDC) is encrypted using a public key of a system which performs comparison for verification.

Figure 40:
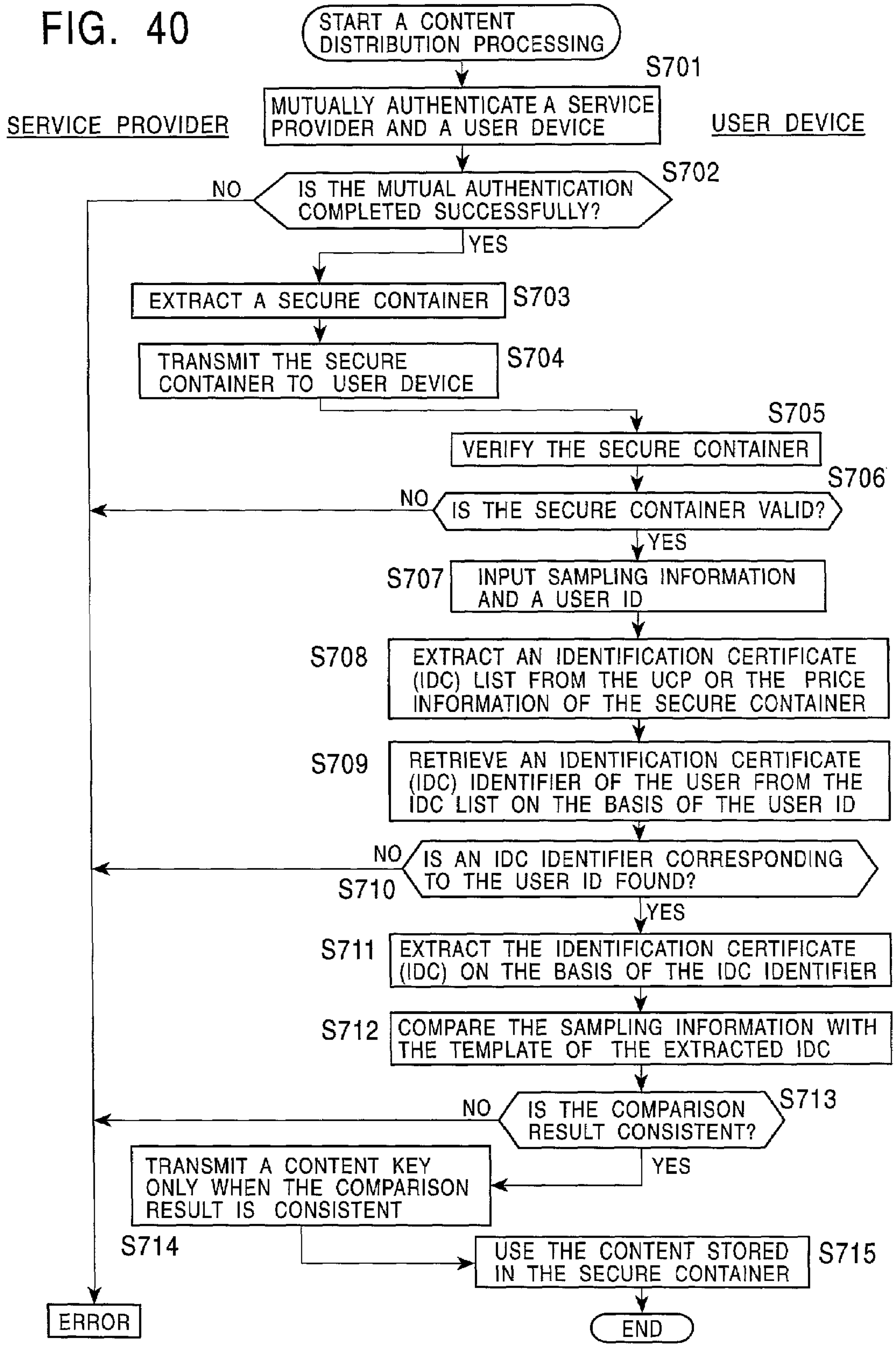
FIG. 40 is a flow chart of a process in which a secure container is received from a service provider and a person authentication is performed by a user device so that the content can be used only by authorized users.

FIG. 40 is a flow chart of a process in which a secure container is received from a service provider and a person authentication is performed by a user device so that the content can be used only by authorized users. The respective steps in the flow are described below.

In step S701, mutual authentication is performed between a service provider and a user device. Only when the mutual authentication is successfully completed (Yes in S702), the service provider extracts a secure container (S703) and transmits the extracted secure container to the user device (S704). In the mutual authentication, a session key is created, and used, as required, to encrypt data which is transferred between the service provider and the user device.

The user device verifies the received secure container (S705). Herein, the verification includes the verification of the signature of the secure container itself and the signatures of the respective data such as the price information and the sales restriction (UCP) information described in the container.

If the verification of the container is successfully passed (Yes in S706), a user inputs sampling information and a user ID to the user device (S707). The user device extracts a person identification (IDC) list from the price information or the sales restriction (USP) information of the secure container (S708) and retrieves an IDC identifier corresponding to the user ID (S709). In the case where an IDC identifier corresponding to the input user ID is not found, it is determined that the user is not a user authorized by the service provider and an error is returned (No in S710). In this case, the following process is not performed.

If an IDC identifier corresponding to the input user ID is found in the person identification certificate (IDC) list (Yes in S710), a person identification certificate (IDC) is acquired on the basis of the IDC identifier (S711). More specifically, in the case where the person identification certificate (IDC) is stored in the user device, the IDC stored in the user device is employed, while the person identification certificate (IDC) is received from the person identification certificate authority (IDA) or the service provider if the IDC is not stored in the user device. A template is extracted from the acquired person identification certificate (IDC) and decrypted using the private key of the user device. The template is then compared with the sampling information for verification (S712). If the verification fails (No in S713), an error is returned and the following process is not performed. More specifically, the decryption of the content is not performed and thus the usage of the content is limited. In the case where the verification is affirmative (Yes in S713), the service provider is informed of the success of the verification, and the service provider transmits to the user device a content key to be used in decryption of an encrypted content stored in the secure container (S714). The user device decrypts the encrypted content using the content key received from the service provider and uses the content (S715).

In this system, as described above, a content stored in a secure container is allowed to be used only when a user is verified as an authorized user via a user verification process using a template of a person identification certificate (IDC), thereby preventing the content from being used by an unauthorized user.

Figure 41:
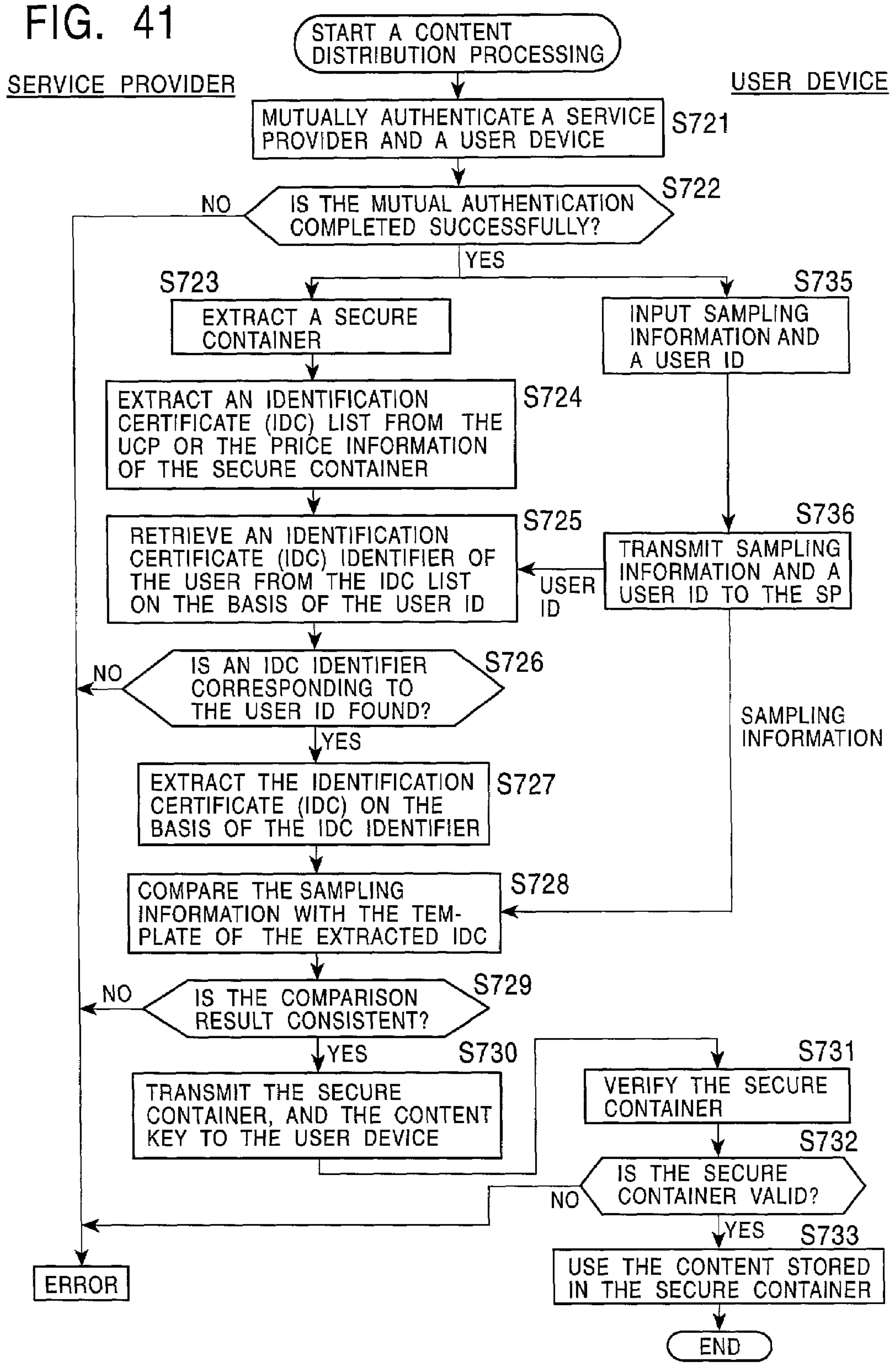
FIG. 41 is a flow chart of a process in which a person authentication is performed by a service provider and a secure container is distributed only to authorized users.

FIG. 41 is a flow chart of a process in which a person authentication is performed by a service provider and a secure container is distributed only to authorized users. The respective steps in the flow are described below.

In step S721, mutual authentication is performed between a service provider and a user device. In the mutual authentication, a session key is created, and used, as required, to encrypt data which is transferred between the service provider and the user device.

Only when the mutual authentication is successfully completed (Yes in S722), the service provider extracts a secure container (S723), and a user inputs sampling information and a user ID to the user device (S735) and transmits them to the service provider (S736).

The service provider extracts a person identification (IDC) list from the price information or the sales restriction information (UCP) of the secure container (S724) and retrieves an IDC identifier corresponding to the user ID (S725). In the case where an IDC identifier corresponding to the input user ID is not found, it is determined that the user is not a user authorized by the service provider and an error is returned (No in S726). In this case, the following process is not performed.

If an IDC identifier corresponding to the input user ID is found in the person identification certificate (IDC) list (Yes in S726), a person identification certificate (IDC) is acquired on the basis of the IDC identifier (S727). More specifically, in the case where the person identification certificate (IDC) is stored in the service provider, the IDC stored in the service provider is employed, while the person identification certificate (IDC) is received from the person identification certificate authority (IDA) if the IDC is not stored in the service provider. A template is extracted from the acquired person identification certificate (IDC) and decrypted using the private key of the service provider. The template is then compared with the sampling information for verification (S728). If the verification fails (No in S729), an error is returned and the following process is not performed. More specifically, distribution of the secure container is not performed. In the case where the verification is affirmative (Yes in S729), the user is regarded as an authorized user and the following process is performed. More specifically, the service provider distributes the secure container and the content key to the user device (S730).

The service provider transmits a secure container to the user device, and the user device verifies the received secure container (S731). Herein, the verification includes the verification of the signature of the secure container itself and the signatures of the respective data such as the price information and the sales restriction (UCP) information described in the container. If the verification of the container is successfully completed (Yes in S732), it becomes possible to use, on the user device, the content in the secure container.

In this system, as described above, a content is allowed to be distributed only when a user is verified as an authorized user via a user verification process using a template of a person identification certificate (IDC), thereby preventing the content from being distributed to an unauthorized user.

Manner of using a person identification certificate (IDC) in distribution of a secure container among user devices are described below.

Figure 42:
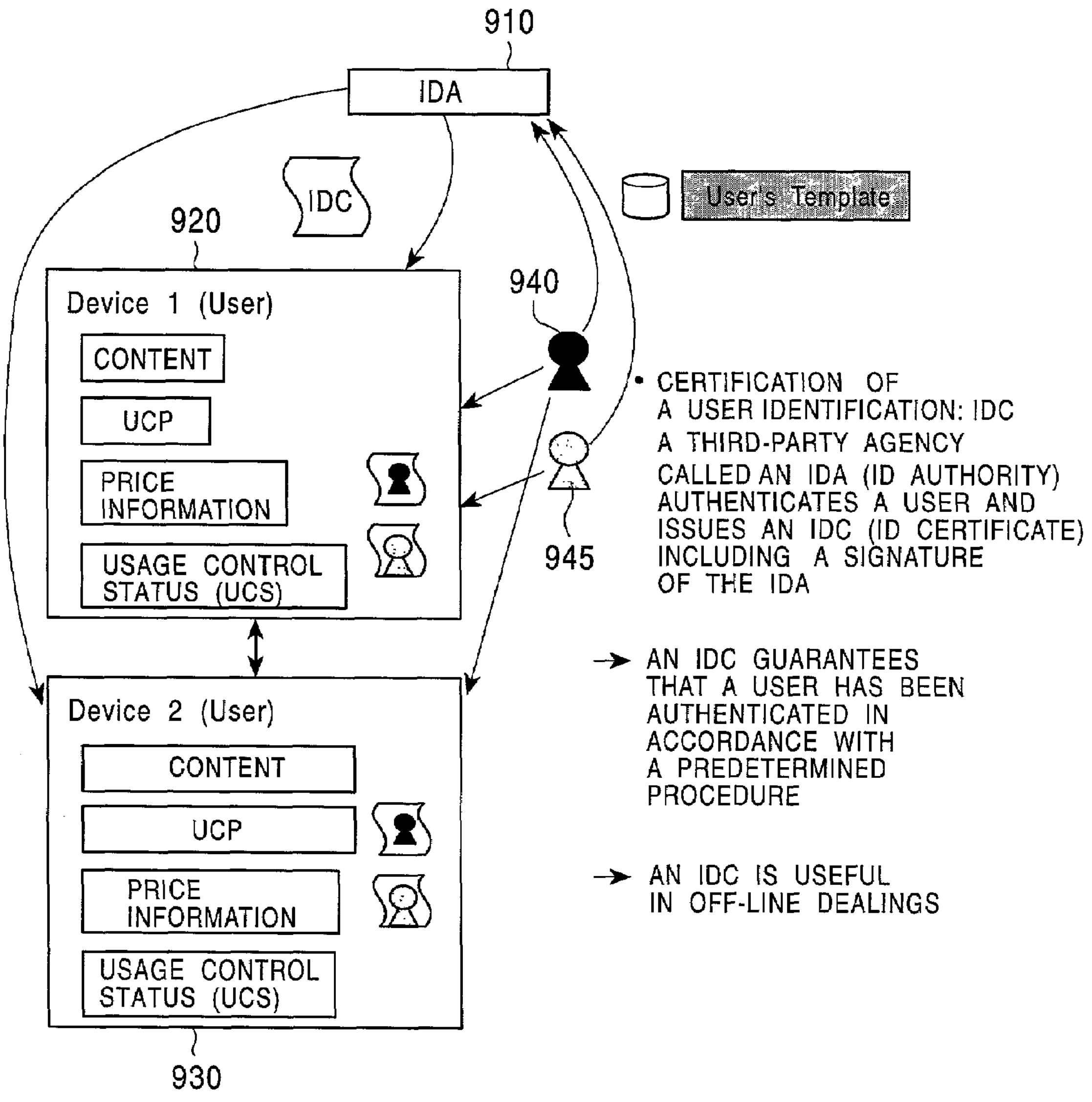
FIG. 42 is a diagram illustrating a manner of distributing a content among users using a secure container.

FIG. 42 is a diagram illustrating a manner of distributing a content between users using a secure container. A service provider (SP) generates price information of the content and stores a list of person identification certificates (IDC) of users who are permitted to use a content into at least one of or both of price information and sales restriction information (UCP). The service provider (SP) further writes a digital signature thereby forming a secure container and transmits the resultant secure container to a user device 1 (920).

If users 940 and 945 who want to use the user device 1 (920) are authorized users permitted to use the content, the IDC identifiers of the user are described in a list of person identification certificates (IDCs) stored in price information or sales restriction (UCP) information of a secure container corresponding to the content or stored in usage control status (UCS) information which is generated by the user device and stored in the user device when the secure container is stored in the user device. When a user wants to use the content stored in the user device 1 (920), authentication of the user is performed on the basis of the IDC list in the secure container. That is, the user who wants to use the content is requested to input sampling information. The user device 1 (920) compares the input sampling information with the template included in the stored person identification certificate (IDC). Only when they match with each other, the user device 1 (920) permits the user to use the content.

As described earlier, the secure container may also be distributed among user devices. In the case where the secure container has been moved from the user device 1 (920) to a user device 2 (930), when users 940 and 945 use the content on the user device 2 (930), user authentication is performed on the basis of the IDC list described in the price information or sales restriction (UCP) information of the secure container or in the usage control status (UCS) information. That is, a user who wants to use the content is requested to input sampling information. The user device 2 (930) compares the input sampling information with the template included in the stored person identification certificate (IDC). Only when they match with each other, the user device 2 (930) permits the user to use the content.

As described above, when the secure container is moved, the person identification certificate (IDC) list which was originally stored in the price information or sales restriction (UCP) information of the secure container is maintained unchanged, and the IDC list in the usage control status (UCS) information generated in accordance with the sales restriction (UCP) information of the secure container is also maintained unchanged, thereby ensuring that the usage of the content is limited to only authorized users in accordance with the IDC list.

Figure 43:
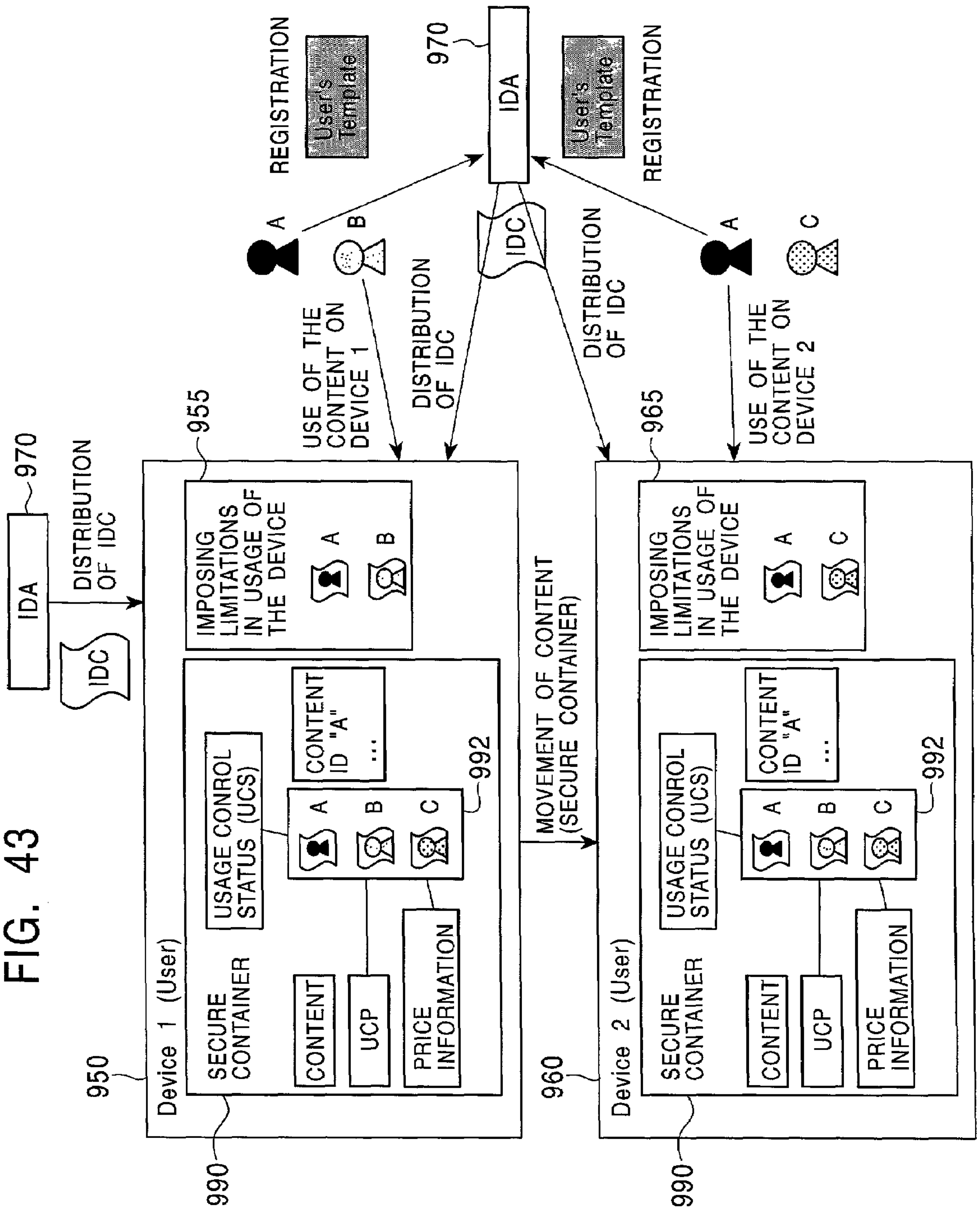
FIG. 43 illustrates another manner in which a content is distributed using a secure container among users and a manner in which user authentication is performed.

FIG. 43 illustrates another manner in which a content is distributed using a secure container among users and a manner in which user authentication is performed. In the process shown in FIG. 43, usage of a user device, that is, access to the user device, is restricted in accordance with user authentication on the basis of a person identification certificate (IDC) stored in the user device, and, furthermore, use of a content is restricted in accordance with user authentication on the basis of price information, sales restriction (UCP) information, or an IDC list described in usage control status (UCS) information. That is, user authentication is performed for two different purposes.

Before staring to use a user device 1 (950), a user A and a user B present sampling information to a person identification certificate authority (IDA) 970 and request the person identification certificate authority (IDA) 970 to issue person identification certificates (IDCs) in which template information is stored in accordance with the sampling information. The issued person identification certificates (IDCs) are stored in the user device 1 (950).

When a user issues a request for usage of the user device 950, the user device 950 performs user authentication on the basis of the person identification certificate (IDC) 955 stored in the user device 950. That is, the user who wants to use the content is requested to input sampling information. The user device 950 compares the input sampling information with the template included in the stored person identification certificate (IDC). Only when they match with each other, the user is permitted to use the user device 1 (950).

When a user issues a request for usage of a content stored in a secure container 990, user authentication is performed on the basis of the IDC list described in the price information or sales restriction (UCP) information of the secure container or described in the usage control status (UCS) information. When the user is not found in the IDC list or when, even if the user is found in the IDC list, the input sampling information does not match with the template information, the user is not permitted to use the content.

That is, a user can use the content of the secure container 990 on the user device 1 (950) only when the user authentication on the basis of the person identification certificate (IDC) stored in the user device 1 (950) is passed and furthermore when the user authentication on the basis of the IDC list described in the price information or the sales restriction (UCP) information of the secure container or described in the usage control status (UCS) information is passed.

The secure container is allowed to be moved among devices. In the case where the secure container has been moved to a user device 2 (960), user authentication on the basis of person identification certificate (IDC) stored in the user device 2 (960) and user authentication on the basis of the IDC list described in the price information or the sales restriction (UCP) information of the secure container or described in the usage control status (UCS) information are performed in a similar manner.

In the system shown in FIG. 43, person identification certificates (IDCs) 955 of users A and B are stored in the user device 1 (950) and a list 992 of users A, B, and C are stored in the secure container. Therefore, only users A and B are allowed to use the content using the user device 1 (950). On the other hand, person identification certificates (IDCs) 965 of users A and C are stored in the user device 2 (960) and a list 992 of users A, B, and C is stored in the secure container. Therefore, only users A and C are allowed to use the content using the user device 2 (960).

In the example shown in FIG. 43, the system is constructed on the assumption that each user device performs user authentication by comparing sampling information with a template of an IDC which is stored in the user device. When it is desirable that the device can be used by any user whose person identification certificate (IDC) has been registered in a person identification certificate authority (IDA), user authentication may be performed by comparing input sampling information with templates not only in IDCs stored in the device but also in person identification certificates (IDCs) stored in the person identification certificate authority (IDA), and users who have passed the user authentication may be allowed to use the device.

An example of a process of performing user authentication on the basis of a person identification certificate (IDC) in an IDC list described in a secure container before distributing the secure container among user devices thereby restricting the usage of the content is described below with reference to the flow charts shown in FIGS. 44 and 45. Note that it is assumed herein that accessing to user devices is not limited.

Figure 44:
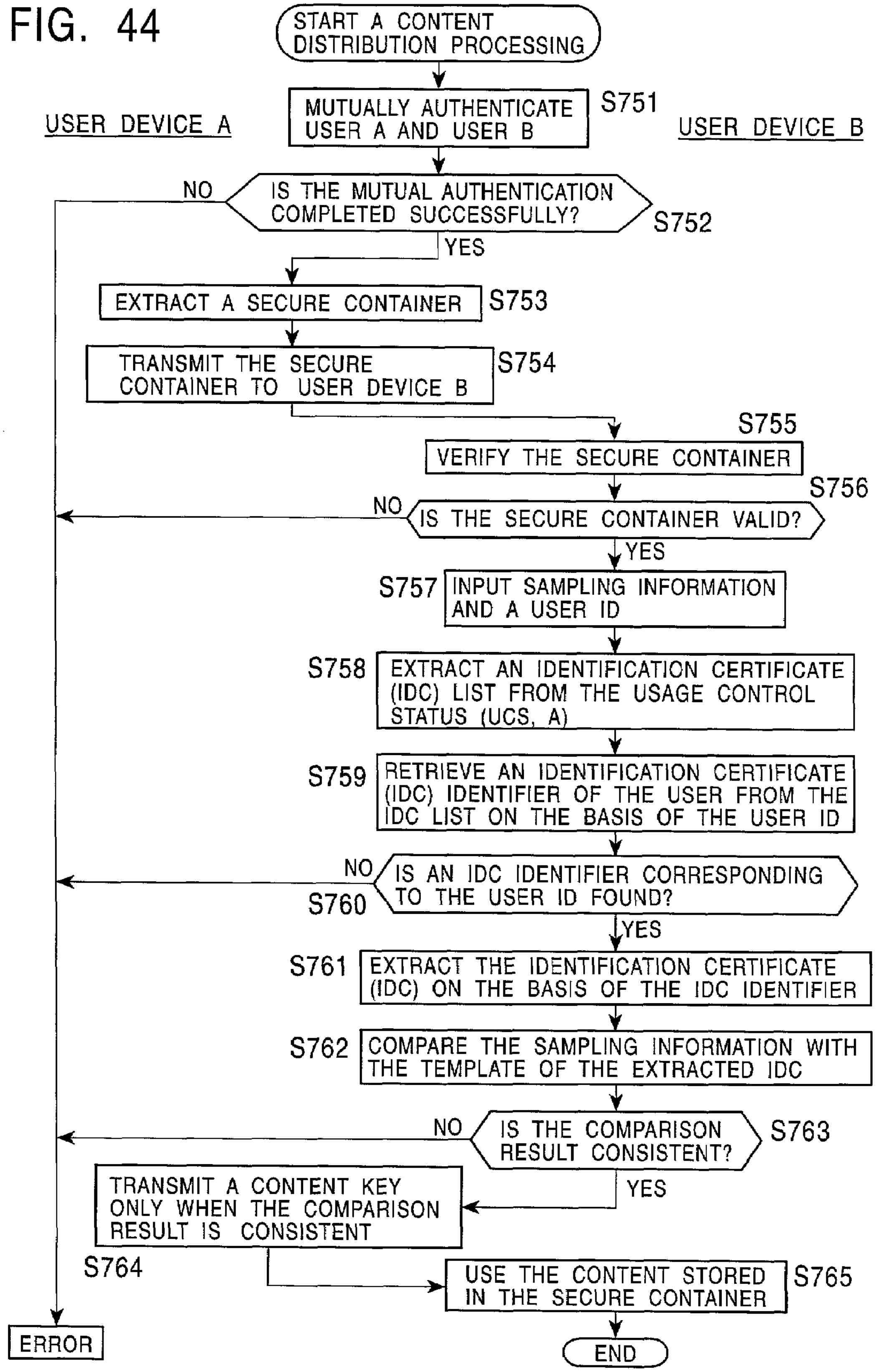
FIG. 44 is a flow chart of a process in which a secure container is received from a user device A and person authentication is performed by a user device B so that only authorized users can use the content.

FIG. 44 is a flow chart of a process in which a secure container is received from a user device A and person authentication is performed by a user device B so that only authorized users can use the content. The respective steps in the flow are described below.

In step S751, mutual authentication is performed between a user device A and a user device B. Only when the mutual authentication is successfully completed (Yes in S752), the user device A extracts a secure container (S753) and transmits the extracted secure container to the user device B (S754). In the mutual authentication, a session key is created, and used, as required, to encrypt data which is transferred between the service provider and the user device.

The user device B verifies the received secure container (S755). Herein, the verification includes the verification of the signature of the secure container itself and the signatures of the respective data such as the price information and the sales restriction (UCP) information described in the container.

If the verification of the container is affirmative (Yes in S756), a user who wants to use a content inputs sampling information and a user ID to the user device B (S757). The user device B extracts a person identification certificate (IDC) from the usage control status (UCS) information and retrieves an IDC identifier corresponding to the user ID (S759). In the case where an IDC identifier corresponding to the input user ID is not found, it is determined that the user is not a user authorized by the service provider and an error is returned (No in S760). In this case, the following process is not performed.

If an IDC identifier corresponding to the input user ID is found in the person identification certificate (IDC) list (Yes in S760), a person identification certificate (IDC) is acquired on the basis of the IDC identifier (S761). More specifically, in the case where the person identification certificate (IDC) is stored in the user device B, the IDC stored in the user device B is employed, while the person identification certificate (IDC) is received from the person identification certificate authority (IDA) or the service provider if the IDC is not stored in the user device B. A template is extracted from the acquired person identification certificate (IDC) and decrypted using the private key of the user device B. The template is then compared with the sampling information for verification (S762). If the verification fails (No in S763), an error is returned and the following process is not performed. More specifically, the decryption of the content is not performed and thus the usage of the content is limited. In the case where the verification is affirmative (Yes in S763), the user device A is informed of the success of the verification, and the user device A transmits to the user device B a content key to be used in decryption of an encrypted content stored in the secure container (S764). The user device B decrypts the encrypted content using the content key received from the user device A and uses the content (S765).

In this system, as described above, a content stored in a secure container is allowed to be used only when a user is verified as an authorized user via a user verification process using a template of a person identification certificate (IDC), thereby preventing the content from being used by an unauthorized user even after a secure container has been distributed among user devices.

Figure 45:
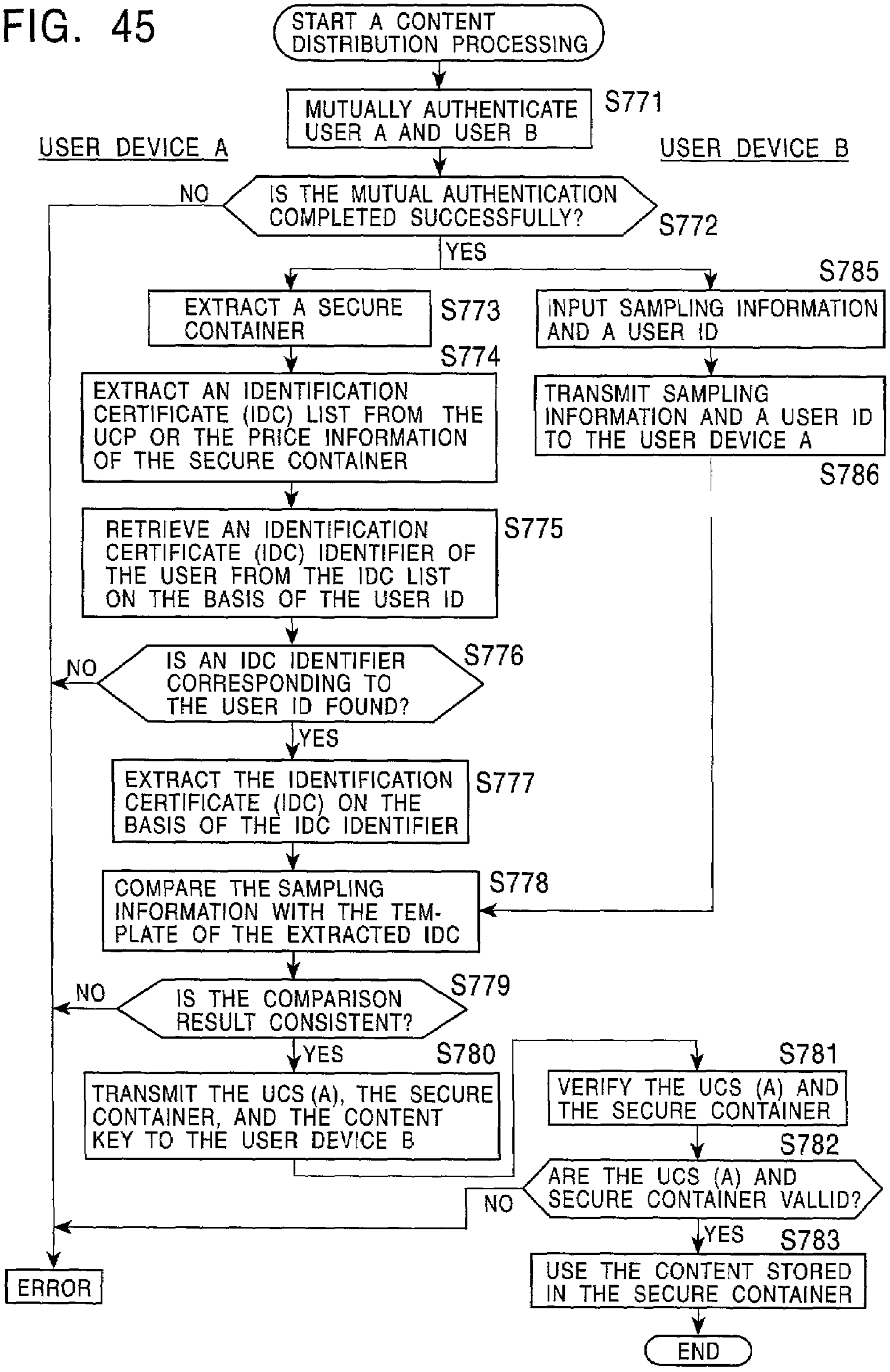
FIG. 45 is a flow chart of a process in which person authentication is performed by a content distributor before distributing a content and a secure container is distributed only to authorized users.

FIG. 45 is a flow chart of a process in which person authentication is performed by a content distributor before distributing a content and a secure container is distributed only to authorized users. The respective steps in the flow are described below.

In step S771, mutual authentication is performed between a user device A and a user device B. In the mutual authentication, a session key is created, and used, as required, to encrypt data which is transferred between the service provider and the user device.

Only when the mutual authentication is successfully completed (Yes in S772), the user device A extracts a secure container (S773), and a user inputs sampling information and a user ID to the user device B (S785) and transmits them to the user device A (S786).

The user device A extracts a person identification (IDC) list from the price information, the sales restriction (UCP) information, or the usage control status (UCS) information of the secure container (S774) and retrieves an IDC identifier corresponding to the user ID (S775). In the case where an IDC identifier corresponding to the input user ID is not found, it is determined that the user is not a user authorized by the service provider and an error is returned (No in S776). In this case, the following process is not performed.

If an IDC identifier corresponding to the input user ID is found in the person identification certificate (IDC) list (Yes in S776), a person identification certificate (IDC) is acquired on the basis of the IDC identifier (S777). More specifically, in the case where the person identification certificate (IDC) is stored in the service provider, the IDC stored in the service provider is employed, while the person identification certificate (IDC) is received from the person identification certificate authority (IDA) if the IDC is not stored in the service provider. A template is extracted from the acquired person identification certificate (IDC) and decrypted using the private key of the service provider. The template is then compared with the sampling information for verification (S778). If the verification fails (No in S779), an error is returned and the following process is not performed. More specifically, distribution of a secure container and a content key is not performed. In the case where the verification is affirmative (Yes in S779), the user is regarded as an authorized user and the following process is performed. More specifically, distribution of a secure container and a content key to the user device B is performed.

If the user device B receives a secure container from the user device A, the user device B verifies the received secure container (S781). Herein, the verification includes the verification of the signature of the secure container itself and the signatures of the respective data such as the price information and the sales restriction (UCP) information described in the container. If the verification of the container is successfully completed (Yes in S782), it becomes possible to use, on the user device B, the content in the secure container.

In this system, as described above, a content is allowed to be distributed only when a user is verified as an authorized user via a user verification process performed by the user device A using a template of a person identification certificate (IDC), thereby preventing the content from being distributed to an unauthorized user.

Figure 46:
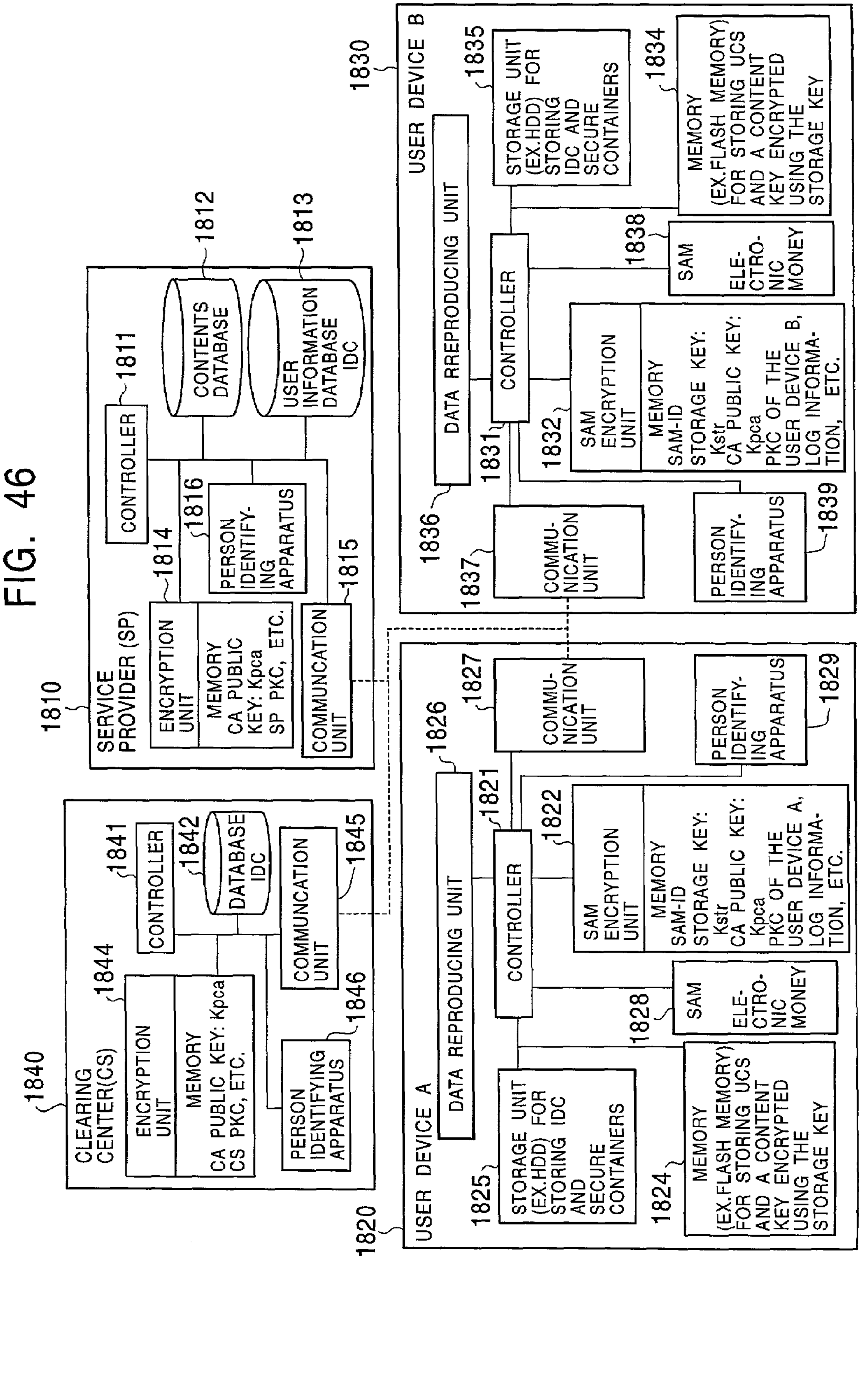
FIG. 46 is a block diagram mainly illustrating configurations of user devices which transmit a secure container to each other.
Figure 47A:
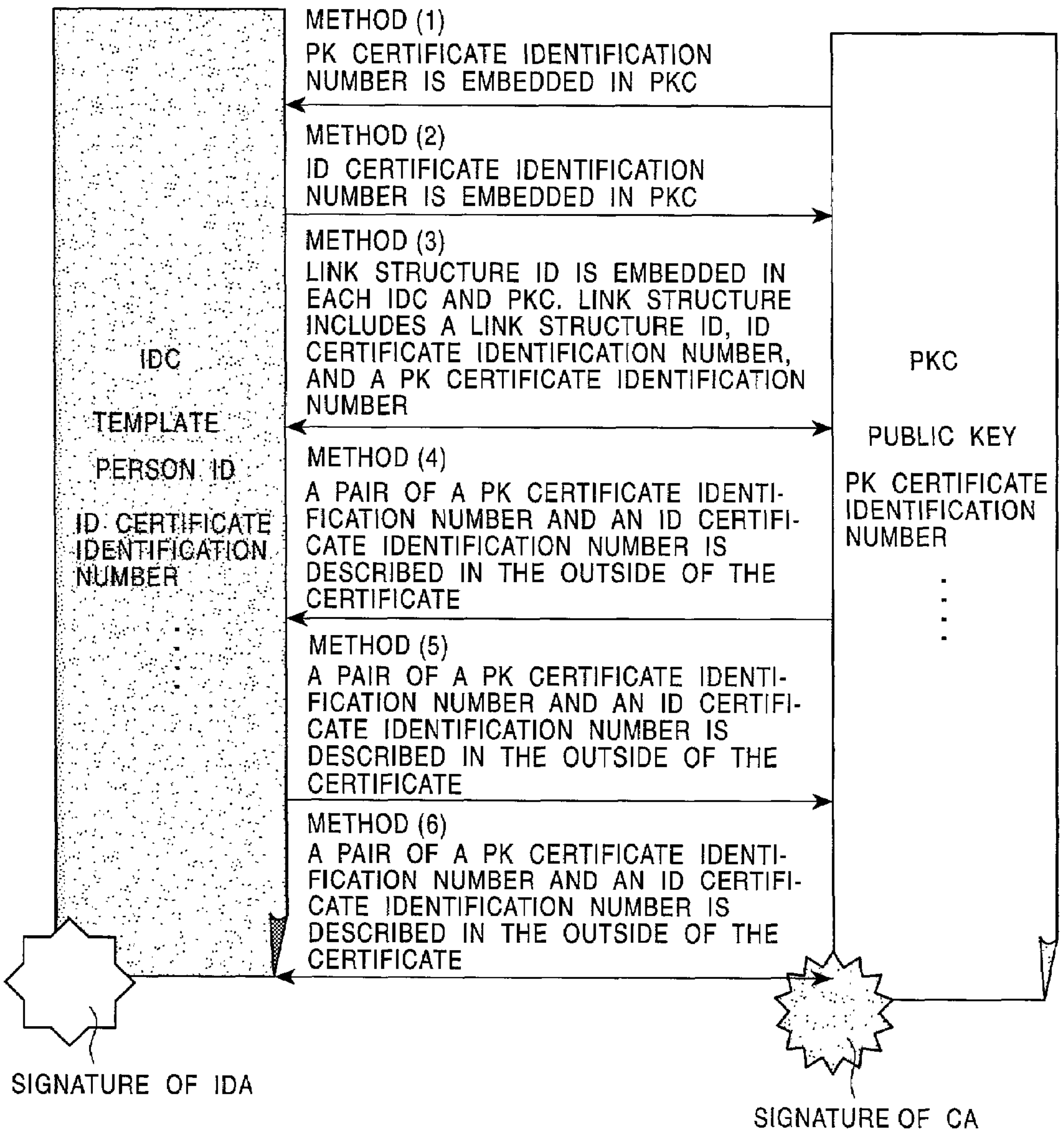
FIGS. 47A and 47B are diagrams illustrating various manners of linking a personal identification certificate (IDC) and a public key certificate (PKC) to each other.
Figure 47B:
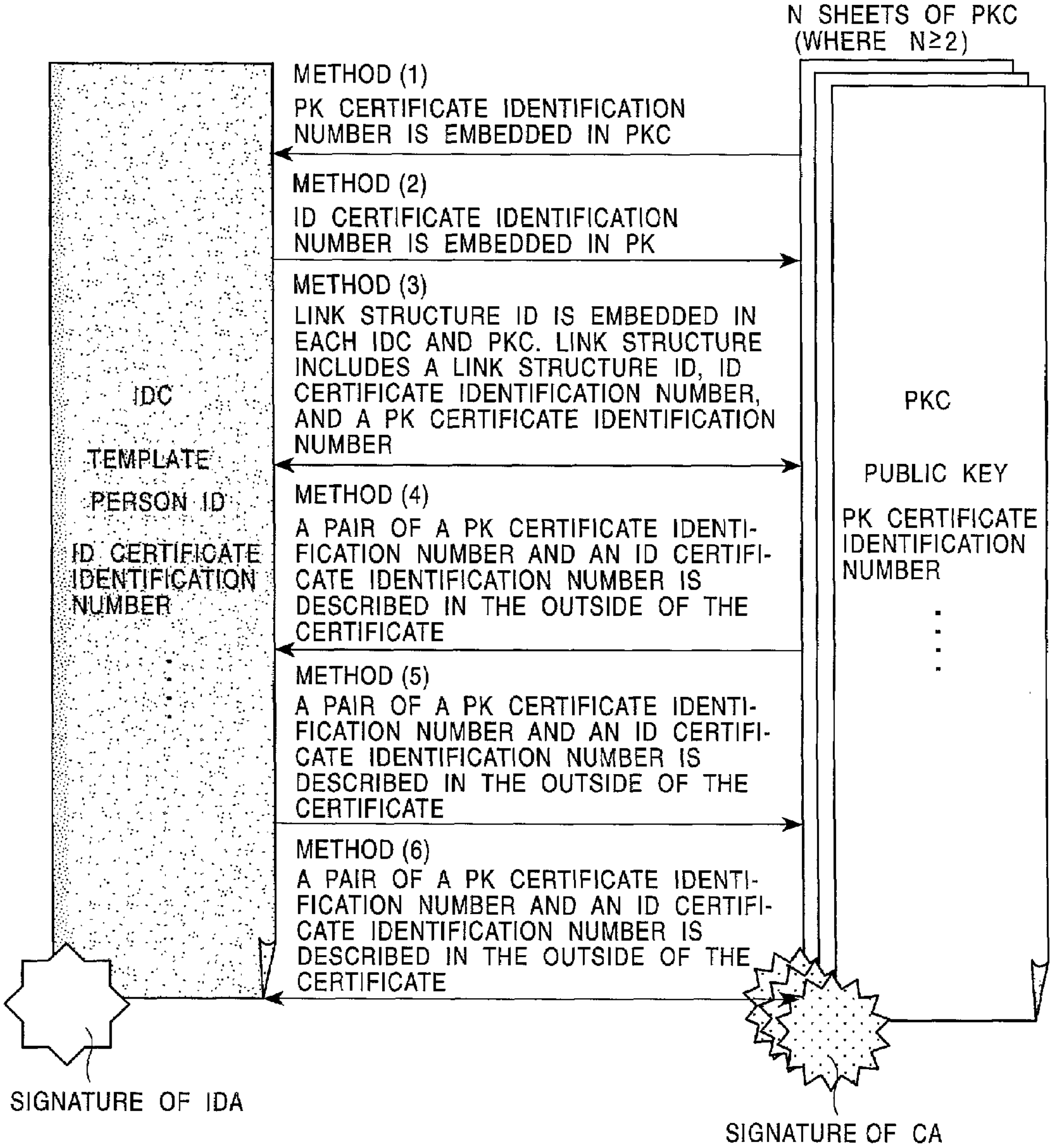
Figure 48A:
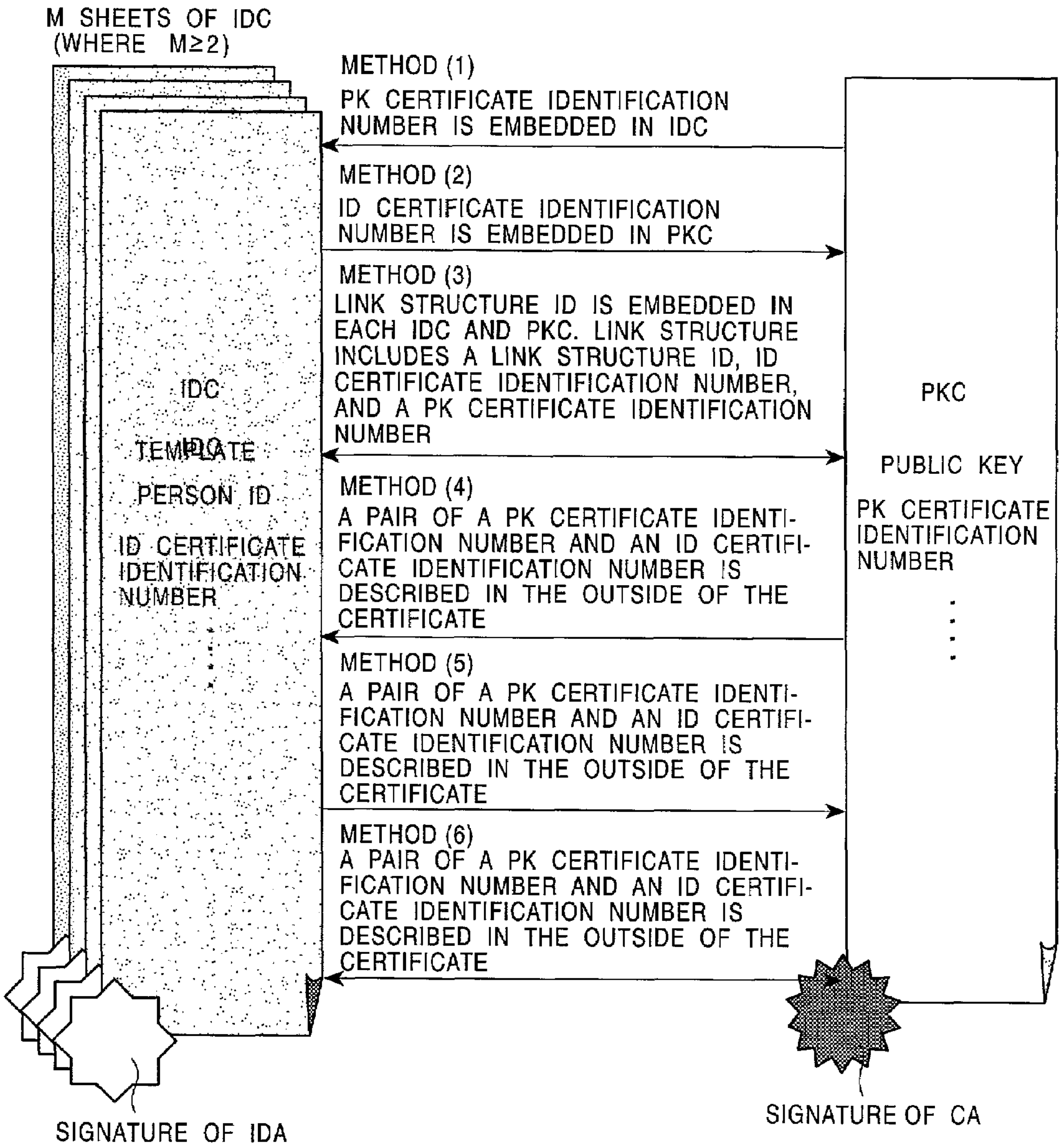
FIGS. 48A and 48B are diagrams illustrating various manners of linking personal identification certificates (IDCs) and public key certificates (PKC) to one another.
Figure 48B:
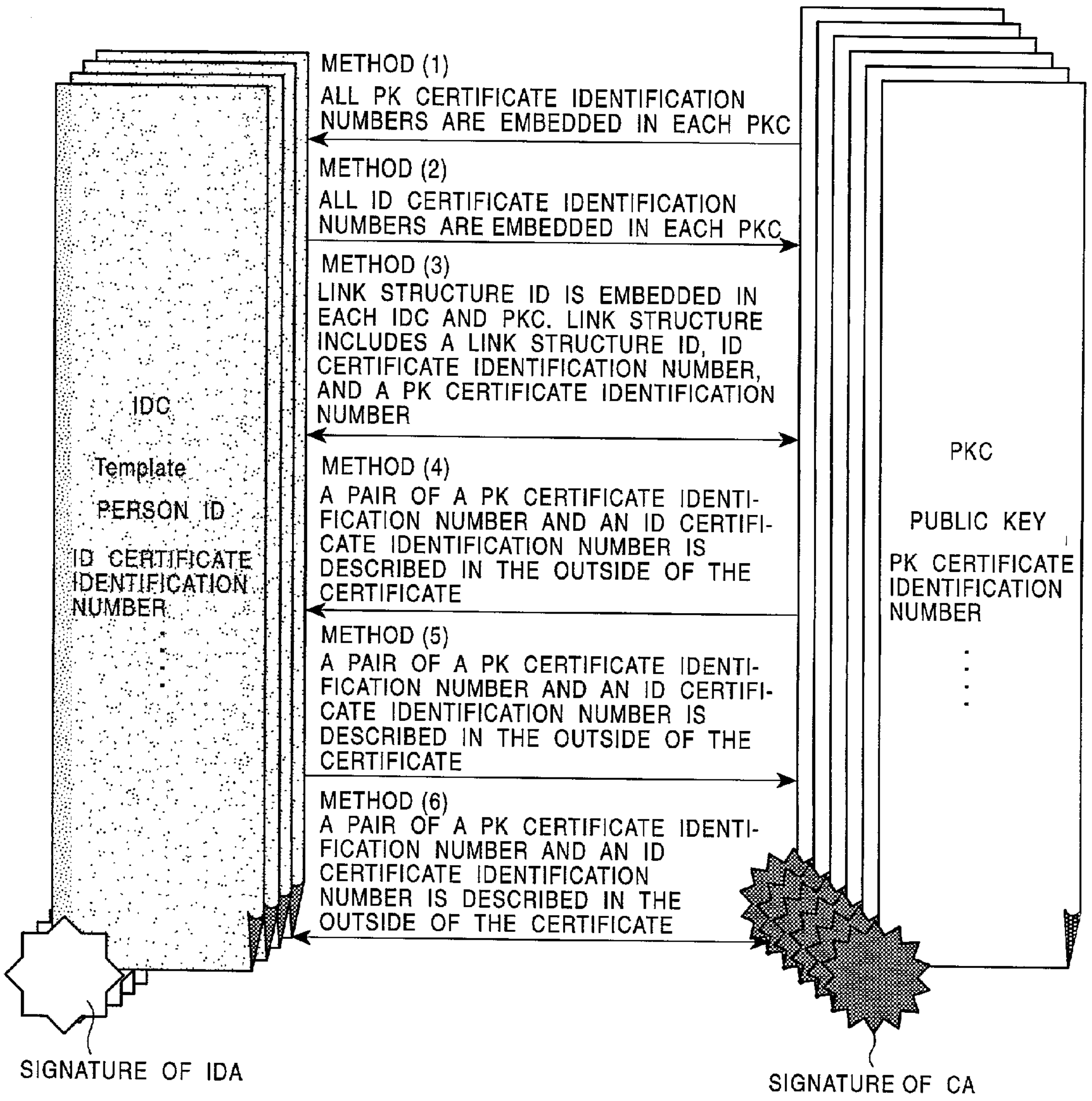

FIG. 46 is a block diagram mainly illustrating configurations of user devices which transmit a secure container to each other. A process of transferring a secure container, generating content usage control status (UCS) information, and storing the secure container is described with reference to FIG. 46.

A service provider 1810 shown in FIG. 46 performs a first distribution (primary distribution) of a secure container. The service provider 1810 stores the content in a content database 1812 and also stores user information in a user information database 1813. In the service provider 1810, under the control of a controller 1811, an encryption unit 1814 performs mutual authentication with a device to which a secure container is to be transferred and also writes a signature on data to be transferred. The encryption unit 1814 includes a memory for storing key information needed in the encryption process, the above-described public key of the public key certificate authority (CA), and the public key certificate issued by the public key certificate authority (CA). The database 1813 stores person identification certificates (IDCs) of users to whom services are provided. A user identifying apparatus 1816 performs user authentication, as required, by comparing sampling information with information described in an IDC.

The service provider 1810 transfers a secure container to a user device A1820 via a communication unit 1815. As described earlier, the secure container includes sales restriction (UCP) information and price information wherein a person identification certificate (IDC) list is described in at least either the sales restriction (UCP) information or the price information.

A clearing center 1840 shown in FIG. 46 settles the charges for use of distributed contents (by processing electronic money data, for example). The clearing center 1840 includes an encryption unit 1844 which executes mutual authentication with respective devices in reception/transmission of logs and which adds a signature to data to be transmitted and verifies a signature of received data. The clearing center 1840 also includes a database 1842 in which various data such as user management data and user account management data. The encryption unit 1844 includes a memory for storing key information necessary in the encryption process, the public key of the public key certificate authority (CA), and the public key certificate issued by the public key certificate authority (CA). A controller 1841 controls the operations such as transmission/reception of data and transfer of data performed by the encryption unit during the encryption process. The database 1842 includes person identification certificates (IDC) of users to whom services are provided. A user identifying apparatus 1846 authenticates an user, as required, by comparing sampling information with information described in the IDCs.

The service provider 1810 transfers a secure container to a user device A1820 via a communication unit 1815. When the user device A1820 receives the secure container via a communication unit 1827, the user device A 1820 performs a purchasing process. In the purchasing process, user authentication is performed on the basis of the person identification certificate (IDC) stored in a storage unit 1825. In the case where the person identification certificate (IDC) is not stored in the storage unit 1825, user authentication may be performed by the service provider 1810. In the user device A1820, under the control of a controller 1821, an encryption unit 1822 generates a content usage control status (UCS) information in accordance with the sales restriction (UCP) information of the secure container and stores it in a memory such as a flash memory 1824. As described earlier, the content usage control status (UCS) information includes a list inherited from the person identification certificate (IDC) list stored in the sales restriction (UCP) information.

The user device A1820 performs a content usage charge payment process using, for example, electronic money 1828. The encryption unit 1822 generates an usage log and transmits it to the service provider 1810 via the communication unit 1827. The secure container received by the user deice A1820 is stored in a storage unit 1825 such as a hard disk. The service provider 1810 verifies the usage log transmitted from the user device A1820. After completion of the verification, service provider 1810 encrypts a content key using a session key and transmits the encrypted content key to the user device A1820. The user device A1820 decrypts the encrypted content key using the session key, encrypts the content key using an unique storage key of the user device A1820, and stores it in the memory 1824.

In usage of a content, such as reproduction of a content using a data reproducing unit 1826, the user device A1820 decrypts the content key stored in the memory 1824 using the storage key, decrypts the content in the secure container stored in the storage unit 1825 using the decrypted content key, and reproduces the content via the data reproducing unit 1826. In order to perform the above-described decryption of the content in the secure container, it is required that, in the previous decision step, the number of times the content is permitted to be further reproduced indicated by the content usage restriction (UCS) information stored in the memory 1824 be read and the number should indicate that further reproduction is permitted.

When a secure container is transmitted from the user device A1820 to the user device B1830, the user device A1820 reads the content usage control status (UCS) information from the memory 1824, decrypts it using the storage key via the decryption unit 1822 (decryption is unnecessary if the UCS information is not encrypted), and detects the "UCS generation management information" and "UCS allowable number of secondary distributions" described in the UCS. If it is determined that further distribution is permitted, the user device A1820 transfers the secure container to the user device B1830 via the communication unit 1827. The user device B1830 receives the secure container via the communication unit 1837 and performs a purchasing process.

When the secure container is transmitted, the user authentication described earlier is performed. The user authentication is performed by the user identifying apparatus 1829 of the user device A which transmits the secure container as described earlier with reference to the flow chart shown in FIG. 45, or by user identifying apparatus 1839 of the user device B which receives the secure container as described earlier with reference to the flow chart shown in FIG. 44. Alternatively, the user authentication may be performed by the service provider or the person identification certificate authority (IDA).

If the user authentication is passed, the user device B1830 generates a content usage control status (UCS-B) information in which "UCS generation management information" and "UCS allowable number of secondary distributions" are newly set, using the encryption unit 1832 under the control of the controller 1831, in accordance with the sales restriction (UCP) information of the secure container and in accordance with the UCS information of the user device A 1820. The resultant content usage control status (UCS-B) is stored in the memory 1834 such as a flash memory.

In the generated UCS-B, the content usage history of the user device A1820 is inherited. The "UCS generation management information" of the UCS-B is set to be smaller by one than the "UCS generation management information" of the UCS-A. The "UCS allowable number of secondary distribution" of the UCS-B is set to be smaller by one than the "UCS allowable number of secondary distribution" of the UCS-A, or newly set to be equal to the "UCP allowable number of secondary distributions" described in the secure container.

The user device B1830 performs a content usage charge payment process using the electronic money 1838. That is, an usage log is generated by the encryption unit 1832 and transmitted to the user device A1820 via the communication unit 1837. The secure container received by the user deice B1830 is stored in a storage unit 1835 such as a hard disk. The user device A1820 verifies the usage log transmitted from the user device B1830. If the verification is passed, the user device A1820 reads the content key from the memory 1824, decrypts the content key using the storage key, decrypts the content key using the session key, and transmits it to the user device B1830. The user device B1830 decrypts the encrypted content key using the session key, encrypts the content key using an unique storage key of the user device B1830, and stores it in the memory 1834.

If the content is used beyond the upper limit by means of illegal tampering, the number of reception logs generated in accordance with the same secure container exceeds the number set in the "UCS generation management information" in the sales restriction (UCP) information in the secure container. As a result, when the data is transmitted to the clearing center 1840, the data is determined to be invalid. The reception log includes, as well as information indicating the content ID, "UCP generation management information" described in the secure container. Thus, in the settlement performed by the clearing center 1840, if the reception log indicates that the number of distributions exceeds the number set in the "UCP generation management information", the reception log is determined to be invalid. In the case where a reception log is generated on the basis of a content which is not permitted distributed among users, the reception log is regarded as invalid.

In usage of a content, such as reproduction of a content using a data reproducing unit 1836, the user device B1830 decrypts the content key stored in the memory 1834 using the storage key, decrypts the content in the secure container stored in the storage unit 1835 using the decrypted content key, and reproduces the content via the data reproducing unit 1836. In the above-described decryption of the content in the secure container, the usage status such as the number of times the content is permitted to be further reproduced, described in the content usage control status (UCS) information stored in the memory 1834 is checked, the content is used, that is, decryption is performed, within the restriction set therein.

In the content distribution using secure containers, when primary distribution is performed from a service provider to a user device or when secondary distribution (intergeneration distribution or secondary transmission) is performed among a plurality of user devices, user authentication is performed using a person identification certificate (IDC). Furthermore, use of a content is limited within the restriction defined in the "UCP generation management information" and the "UCP allowable number of secondary distributions" included in the sales restriction (UCP) information in the secure container. Furthermore, reception of the content usage charge resulting from primary distribution or secondary distribution (intergeneration distribution or secondary transmission) can be automatically performed in accordance with the reception log generated in accordance with the price information and the sales restriction information described in the secure container. Thus, an additional process for settlement is not necessary.

[7. Link Between Person Identification Certificates (IDC) and Public Key Certificates (PKC)]

Manners of relating person identification certificates (IDCs) to public key certificates (PKC), that is, manners of forming links therebetween are described below.

In many situations, it is useful to manage person identification certificates (IDCs) and public key certificates (PKCs) by relating them with each other. For example, a person identification certificate (IDC) may be linked to a public key certificate of a public key applied to encryption of a template stored in the person identification certificate, or, a link may be formed between a person identification certificate and a public key certificate which are used in person authentication, mutual authentication, and transmission of encrypted data during a process of establishing a connection for data communication with a party such as a particular service provider, so that one certificate can be pointed to by the other certificate.

Links between person identification certificates (IDCs) and public key certificates (PKCs) may be formed not only in a one-to-one fashion in which one person identification certificate (IDC) is linked to one public key certificate (PKC), but also in a one-to-many, many-to-one, or many-to-many fashions. There is a one-to-one correspondence between PKCs and IDCs when an unique person identified by a person identification certificate (IDC) corresponds to an unique public key certificate (PKC). For example, when one device and one user of that device correspond to each other in a one-to-one fashion, a one-to-one link may be formed.

PKCs and IDCs may be linked in a one-to-N ({>=}2) fashion, when, for example, a plurality persons identified by a plurality of person identification certificates (IDCs) do not correspond to one public key certificate, that is, one device is shared by a plurality of users. PKCs and IDCs may be linked in a one-to-M ({>=}2) fashion, when, for example, there are a plurality of public key certificates that an unique person identified by a person identification certificate (IDC) uses or can use. PKCs and IDCs may be linked in a M-to-N (M, N {>=}2) fashion, when, for example, there are a plurality of public key certificates that a plurality of persons identified by a plurality of person identification certificates (IDCs) use or can use and a device is shared by the plurality of persons.

Furthermore, person identification certificates (IDCs) and public key certificates (PKCs) may be linked in a one-way fashion (one direction link, directional link) in which only one type of certificates can be pointed to by the other type of certificates or in a two-way fashion in which any type of certificates can be pointed to by the other type of certificates.

Specific examples of manners of forming links between person identification certificates (IDCs) and public key certificates (PKCs) are described below with reference to FIGS. 47A and 47B and FIGS. 48A and 48B for the respective cases of one-to-one, one-to-many, many-to-one, and many-to-many links. In any example described below, it is assumed that person identification certificates (IDCs) are issued by a person identification certificate authority (IDA) and a signature of the person identification certificate authority (IDA) is written therein, and it is also assumed that public key certificates (PKCs) are issued by a certificate authority (CA) and a signature of the certificate authority (CA) is written therein.

In any case, links can be formed in one of various manners described below.

(1) A PKC identification number is embedded in an IDC (one-way link from the IDC to the PKC)

(2) An IDC identification number is embedded in a PKC (one-way link from the PKC to the IDC)

(3) A link structure ID is embedded in an IDC and a PKC.

The link structure is identified by a link structure ID, and the link structure has an IDC identification number and a PKC identification number of the linked IDC and PKC.

(two-way link between the IDC and the PKC)

(4) A pair of a PKC identification number and an IDC identification number is described in the outside of certificates.

(one-way link from the IDC to the PKC)

(5) A pair of a PKC identification number and an IDC identification number is described in the outside of certificates.

(one-way link from the PKC to the IDC)

(6) A pair of a PKC identification number and an IDC identification number is described in the outside of certificates.

(two-way link between the PKC and the IDC)

(7) A PKC is stored in an IDC (one-way link from the IDC to the PKC)

(8) An IDC is stored in a PKC (one-way link from the PKC to the IDC)

(9) A link information inquiry number or inquiry information is stored in each certificate (one-way link from one of the PKC and the IDC to the other or two-way link between them)

As described above, link information may be stored in such a manner that an identification number of a linked certificate is stored (embedded) in a person identification certificate (IDC) itself or a public key certificate (PKC) itself as in (1) and (2), or in such a manner that a link structure indicating a correspondence between identification numbers of linked certificates is created and an identifier (ID) of the link structure is described in a person identification certificate (IDC) or a public key certificate (PKC), that is, the link structure identifier serving as link identification data and identifiers of linked public key certificate identifiers and person identification certificates are stored as in (3). Furthermore, as in (4), (5), and (6), link information indicating links between person identification certificates (IDCs) and public key certificates (PKCs) is collected and managed in the outside of the certificates in an integral fashion by an agency or an organization, for example, by a link information management center or the like located on a network, and ink information is extracted as required. Specific examples of the manners of forming links are described below.

(PKC is Stored in IDC)

Figure 49A:
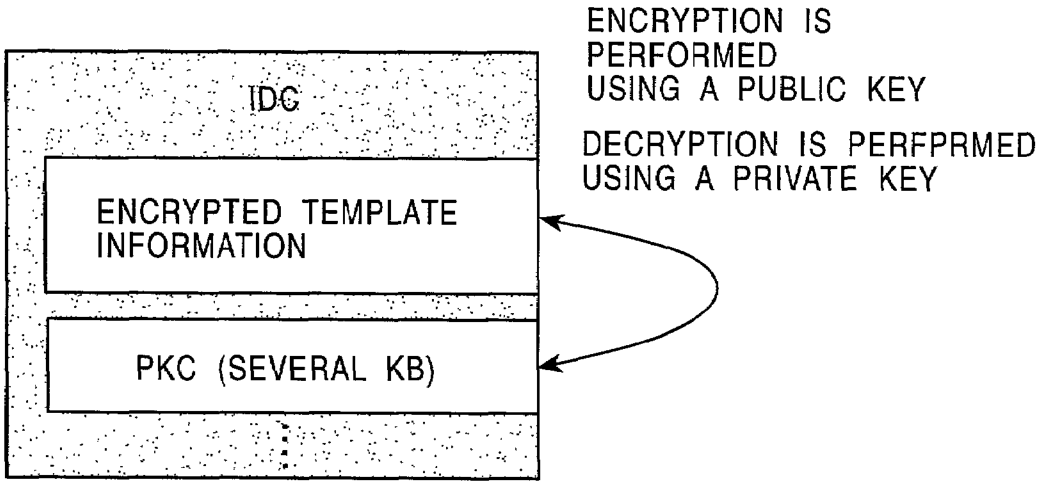
FIGS. 49A and 49B are diagrams illustrating manners of storing a public key certificate (PKC) linked to a person identification certificate (IDC) into the person identification certificate (IDC)

As described earlier, one manner of storing template information identifying a person in a person identification certificate (IDC) is to encrypt the template using a public key and store the encrypted template in the person identification certificate (IDC). A public key certificate (PKC) which is generated in correspondence with the public key used to encrypt the template is set as a linked public key certificate (PKC) of the person identification certificate (IDC), and this linked public key certificate (PKC) is stored in the person identification certificate (IDC). FIG. 49A illustrates a manner in which a linked public key certificate (PKC) is stored in a person identification certificate (IDC).

As shown in FIG. 49A, the encrypted template and the public key certificate (PKC) of the public key applied to encryption of the template are stored in the person identification certificate (IDC). As described earlier, the public key applied to the encryption of the template is one of a public key of a user or a user device, a public key of service provider (SP), and a public key of a person identification certificate authority (IDA), and the public key certificate (PKC) stored in the person identification certificate (IDC) is that of the public key employed to encrypt the template. By forming the link in the above-described manner, the person identification certificate (IDC) and the public key certificate (PKC) of the public key used to encrypt the template are combined together, that is two types of certificates are combined together in an inseparable fashion. When certificates are linked in this manner, it is desirable that the expiration dates of the certificates be set such that the expiration date of the IDC {<=} the expiration date of the PKC. That is, it is desirable that the expiration dates be set such that the PKC stored in the IDC becomes valid during the entire period in which the IDC is valid.

(IDC is Stored in PKC)

Figure 49B:
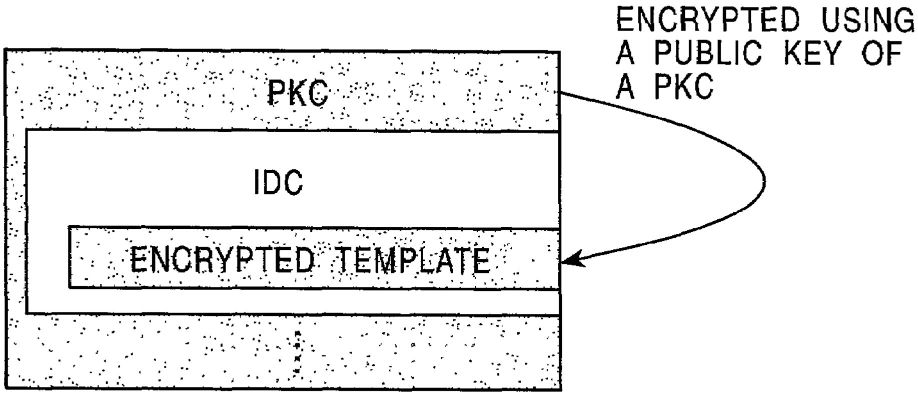

FIG. 49B illustrates a manner in which a linked person identification certificate (IDC) of a public key certificate (PKC) is stored in the public key certificate (PKC) which is generated in correspondence with a public key employed to encrypt a template.

As shown in FIG. 49B, the linked person identification certificate (IDC) including template information encrypted with the public key corresponding to the public key certificate (PKC) is stored in the public key certificate (PKC). As described earlier, the public key applied to the encryption of the template is one of a public key of a user or a user device, a public key of a service provider (SP), and a public key of a person identification certificate authority (IDA), and the public key certificate (PKC) in which the person identification certificate (IDC) is stored is that of the public key employed to encrypt the template. By forming the link in the above-described manner, the person identification certificate (IDC) and the public key certificate (PKC) of the public key used to encrypt the template are combined together, that is, two types of certificates are combined together in an inseparable fashion. Note that the person identification certificate (IDC) itself exists independently. When certificates are linked in this manner, it is desirable that the expiration dates of the certificates be set such that the expiration date of the PKC {<=} the expiration date of the IDC. That is, it is desirable that the expiration dates be set such that the IDC stored in the PKC becomes valid during the entire period in which the PKC is valid.

(Identifier of a Linked Certificate is Stored in a Certificate)

A manner is described in which an identifier of a certificate such as an unique identification number assigned to that certificate is stored in a certificate to be linked to the former certificate.

Figure 50A:
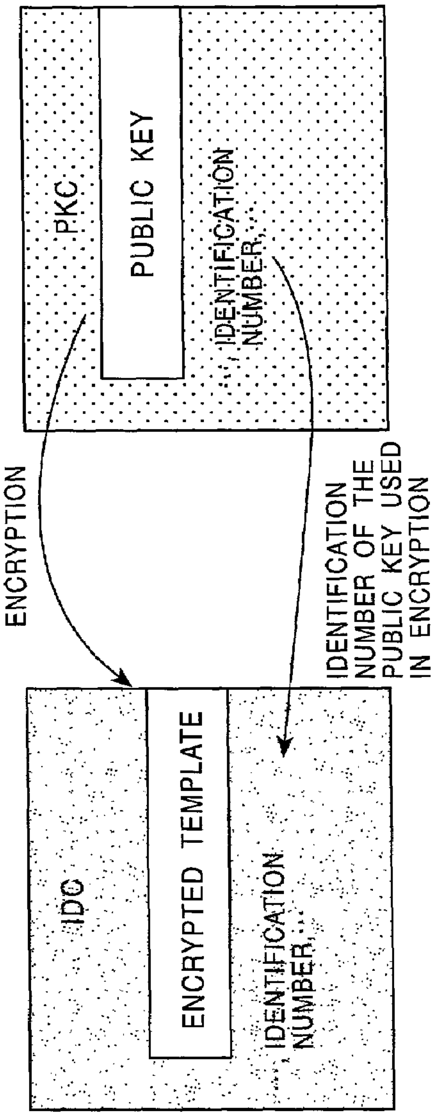
FIGS. 50A and 50B illustrate manners of storing an identification number of a certificate into another certificate.
Figure 50B:
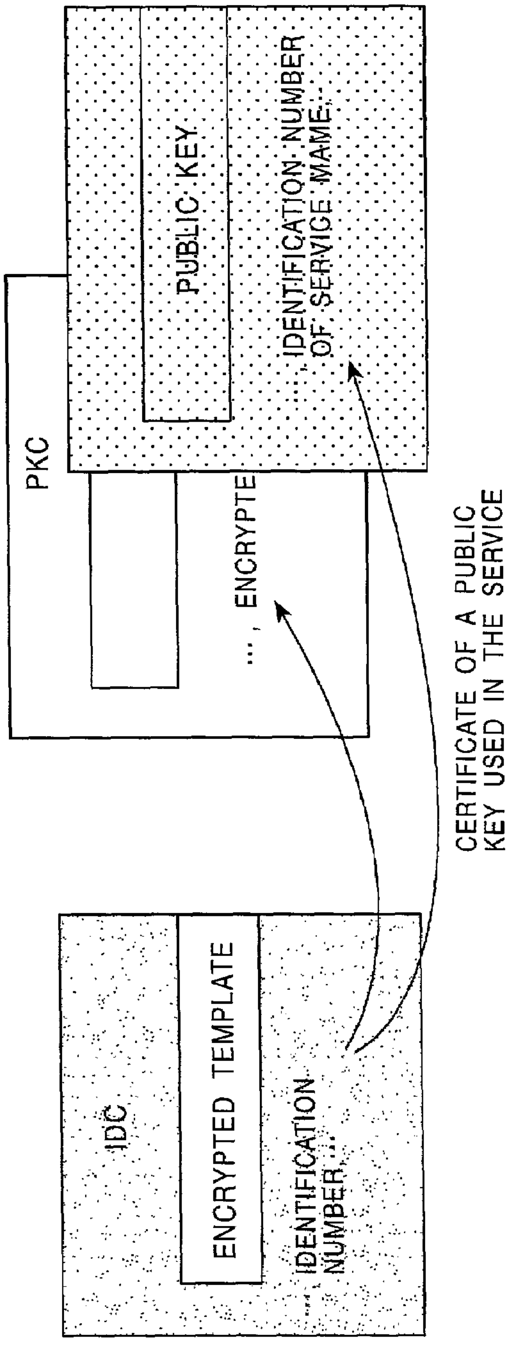

FIG. 50A shows a manner in which an identification number of a public key certificate (PKC) is stored in a person identification certificate (IDC), and FIG. 50B shows a manner in which an identification number of a person identification certificate (IDC) is stored in a public key certificate (PKC).

In the example shown in FIG. 50A in which the identification number of the public key certificate (PKC) is stored in the person identification certificate (IDC), the public key certificate (PKC) is that corresponding to a public key used to encrypt a template stored in the person identification certificate (IDC), as in the previous example. In this case, it is required that the public key certificate (PKC) should have been issued before the person identification certificate (IDC) was issued. Because it is meaningless to store link information of a public key certificate (PKC) which has expired, it is desirable that the expiration dates be set such that the expiration date of the IDC {<=} the expiration date of the PKC. This link information storage manner is employed, for example, when it is not necessary to store a PKC in an IDC and when it is not desirable to distribute the PKC together with the IDC.

In the example shown in FIG. 50B in which an identification number of a person identification certificate (IDC) is stored in a public key certificate (PKC), not only an identifier of a public key certificate (PKC) corresponding to a public key employed to encrypt a template stored in the person identification certificate (IDC) but also an identifier of a public key certificate (PKC) having some relationship with the person identification certificate (IDC) may also be stored. It is possible to relate a plurality of person identification certificates (IDCs) to a single person identification certificate (IDC). The expiration dates of the IDC and the PKC are not influenced by the validity of the respective certificates. However, only for the certificate of the public key used to encrypt the temple of the IDC, the expiration date should be such as IDC {<=} PKC.

This link information storage manner may be employed, for example, when after performing user authentication on the basis of a person identification certificate (IDC) in response to a request for access to a device, a plurality of linked public key certificates (PKCs) are used because a public key pair is necessary for each service.

(Group Information is Managed Separately from PKC and IDC)

Now, a manner is described in which link management data or group information (link information) indicating a link between a person identification certificate (IDC) and a public key certificate (PKC) is formed separately from both the person identification certificate (IDC) and the public key certificate (PKC), and information which makes it possible to access the link management data is stored in the IDC and the PKC.

FIGS. 51A and 51B and FIGS. 52A and 52B show examples of manners of managing links using link management data. In the example shown in FIG. 51A, group information (link information) is created and maintained which includes the identifiers (numbers) of a person identification certificate (IDC) and a public key certificate (PKC) and also includes the validity periods of the respective certificates. This method has the feature that the registering/issuing timing of the respective certificates can be independent of each other. Another feature is that a record indicating a relationship between certificates can be generated and managed at a location where the record is required without imposing an influence upon any certificate. It is desirable that the validity period of the group information be set to be equal to the shortest validity period of those of the certificates related to each other. This method may be advantageously employed to mange link information, for example, when user authentication for a plurality of services is performed using one IDC and when different public key pairs are necessary for the respective services.

Figure 51A:
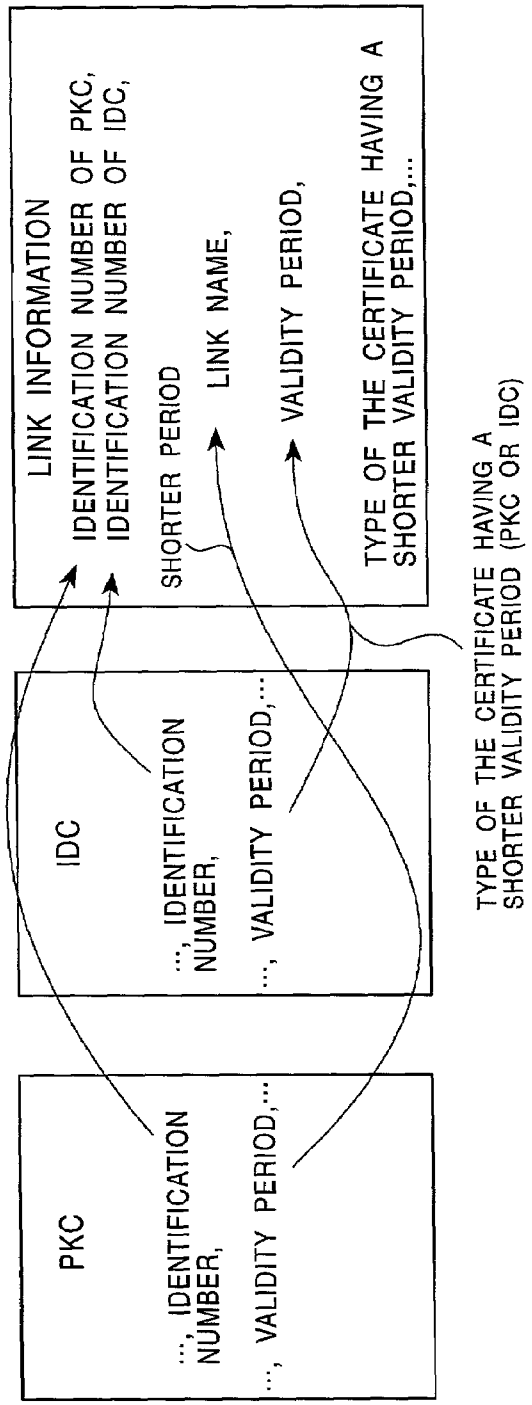
FIGS. 51A and 51B are diagrams illustrating examples of manners of management using link management data.
Figure 51B:
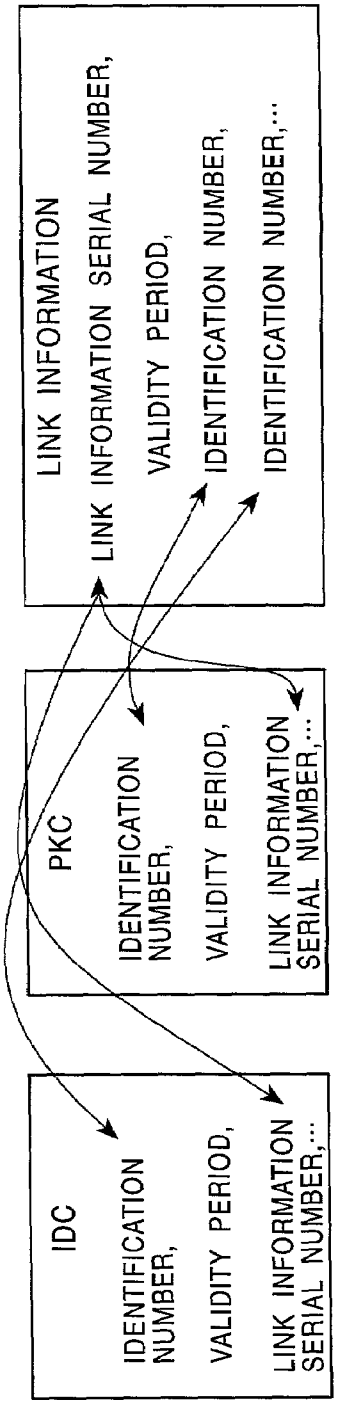

In the example shown in FIG. 51B, group information (link information) is created and maintained which includes the identifiers (numbers) of a person identification certificate (IDC) and a public key certificate (PKC) and also includes the validity periods of the respective certificates, wherein a group information serial number serving as an identifier of group information is stored in each certificate. The serial number of the group information is identification data uniquely assigned to each group information by a subject which manages the group information. When a PKC and an IDC linked to each other are issued, data indicating the serial number of the corresponding group information is stored as internal data in each certificate. This method has the feature that addition, change, and deletion of link information described in the group information is possible without causing an influence upon the certificates. This method may be advantageously employed to manage, using group information, the IDCs and PKCs of users to whom services are provided, when it is required that a service provider manage the IDC, PKC, and information related to services.

Figure 52A:
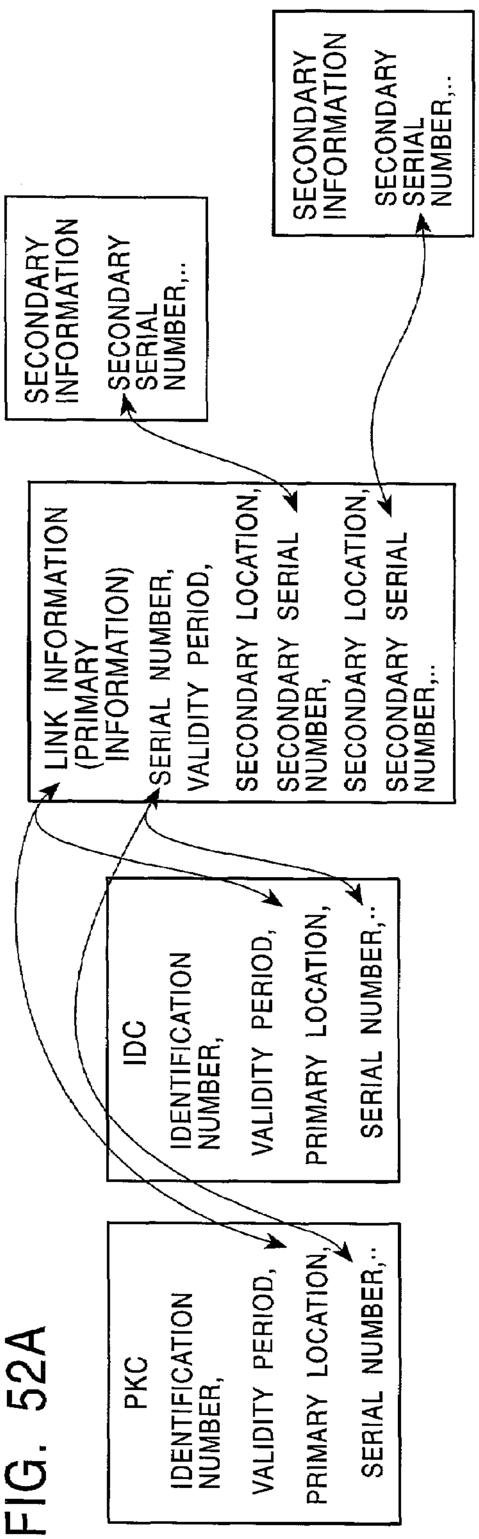
FIGS. 52A and 52B are diagrams illustrating another examples of manners of management using link management data.

In the example shown in FIG. 52A, group information serial number serving as an identifier of group information defined as primary information is stored in a person identification certificate (IDC) and a public key certificate (PKC). Furthermore, related information is created as secondary information such that the secondary information can be accessed from the primary information. Accessing to the primary information from the secondary information may also be possible if necessary. Plural pieces of secondary information may be related to primary information and may be managed separately. When a PKC and an IDC are requested to be registered or issued, the serial number of the linked group information is requested to be stored in the PKC and the IDC. Addition, change, deletion of related information does not have an influence upon the certificates.

Figure 52B:
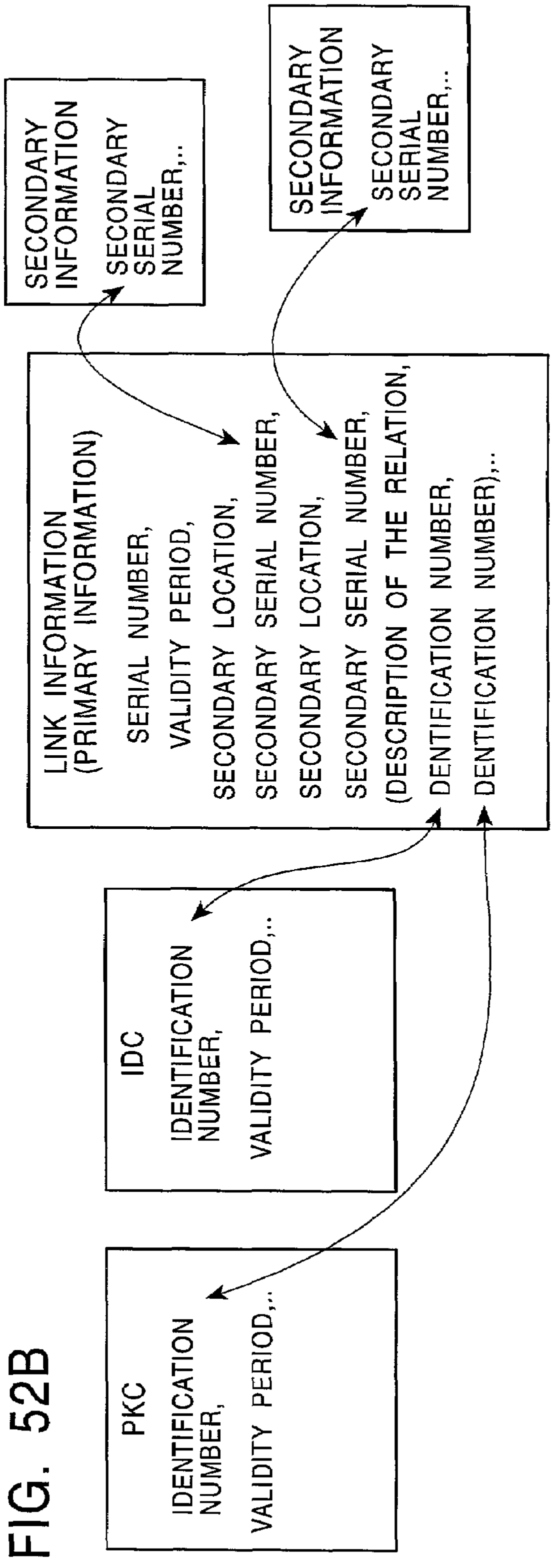

In the example shown in FIG. 52B, group information (link information) is created and maintained as primary information which includes the identifiers (numbers) of a person identification certificate (IDC) and a public key certificate (PKC), and related information is linked as secondary information such that the secondary information can be accessed from the primary information. The link may also be formed, if necessary, such that accessing to the primary information from the secondary information may also be possible.

In the case where related information is stored and managed at a plurality of different locations, secondary information identification data and index information are described in primary information so that information can be used and managed flexibly. For example, various service providers (SPs) may be subjects which manage primary information or secondary information, and the respective service providers (SPs) may access person identification certificates (IDCs) and public key certificates (PKCs) of users to which services are to be provided by using the management information as customer information.

As described above, in various aspects, a person identification certificate (IDC) may be linked to a public key certificate of a public key applied to encryption of a template stored in the person identification certificate (IDC), or a link may be formed between a person identification certificate and a public key certificate which are used in person authentication, mutual authentication, and transmission of encrypted data during a process of establishing a connection for data communication with a party such as a particular service provider, so that one certificate can be easily reached from the other certificate, thereby making it possible to quickly identify a key used in encryption or decryption of a template or to quickly identify data necessary in, for example, mutual authentication on the basis of a public key certificate after person authentication for a service provider on the basis of a person identification certificate.

[8. Using a Content on the Basis of Person Identification Certificate (IDC) and Public Key Certificate (PKC)]

A process of performing person authentication on the basis of a person identification certificate (IDC) and receiving (downloading) a content such as music data or image data from a service provider is described below with reference to specific examples.

As can be understood from the above description, to perform person authentication on the basis of a person identification certificate, the system is required to be capable of comparing sampling information with a template and outputting the comparison result. Herein, a system is described which includes a user device used by a user as a content reproducing device and also includes a mechanism of comparing sampling information with a template, and which also has the capability of downloading a content from a service provider via a network depending upon the comparison result, performing user registration in a service provider, making a contract therewith, and erasing user registration therefrom, and requesting a person identification certificate authority (IDA) to issue a person identification certificate (IDC). The associated processes are also described below.

Figure 53:
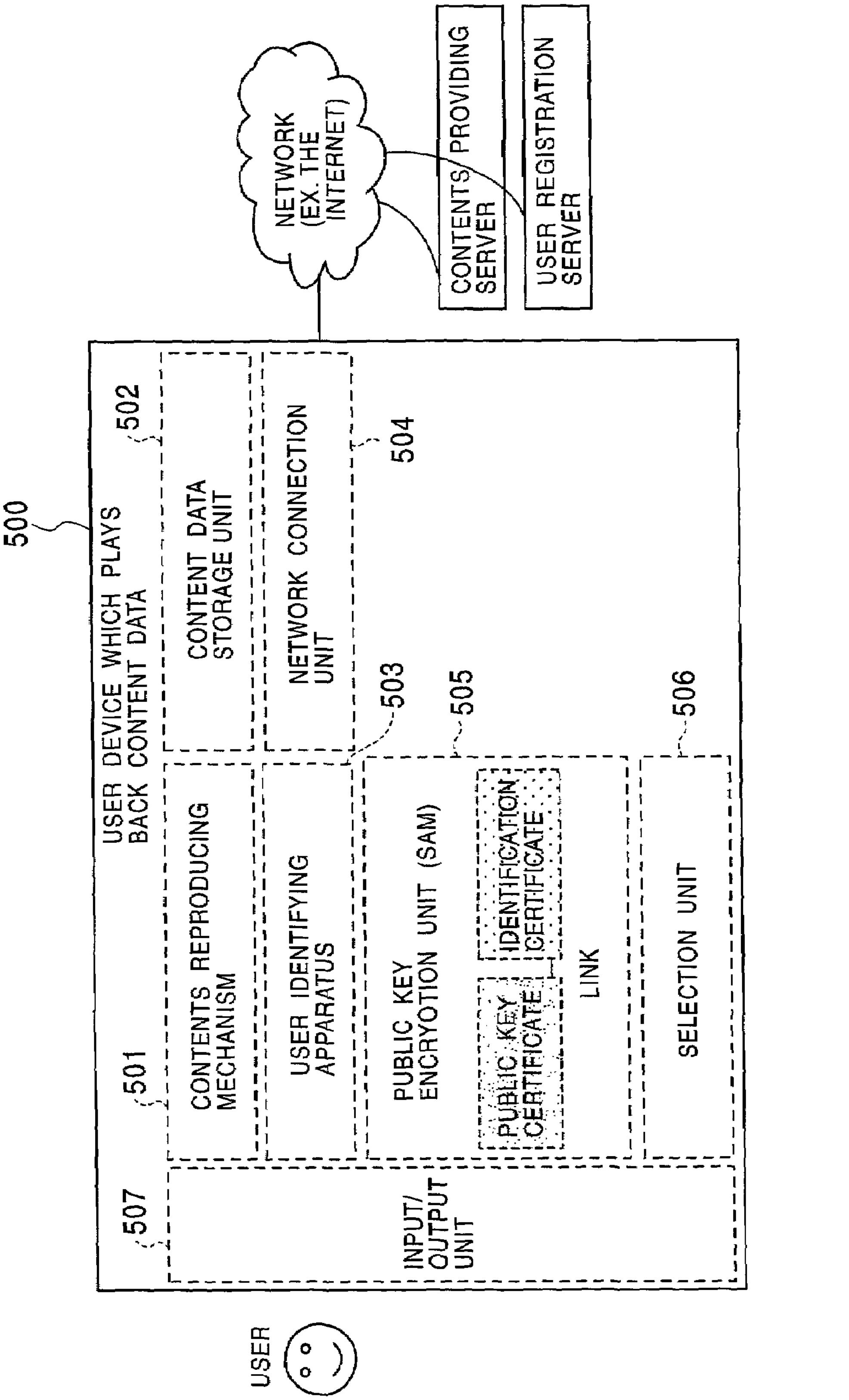
FIG. 53 is a diagram illustrating a configuration of a user device capable of performing person authentication and reproducing a content.

FIG. 53 is a diagram illustrating a configuration of a user device capable of performing person authentication and reproducing a content. A user device 500 includes a contents reproducing mechanism 501, a contents data storage unit 502, a user identifying apparatus 503, a network connection unit 504, a public key encryption unit 505, a selection unit 506, and an input/output unit 507.

The contents reproducing mechanism 501 is capable of reproducing a content by reading data from the contents data storage unit. The contents data storage unit 502 serves to download content data via a network and store it therein. The user identifying apparatus 503 serves to input sampling information used to identify an user and convert the input sampling information into digital data and also serves to verify the sampling information by comparing the converted digital data with a template which has already been registered. The network connection unit 504 serves to make a connection to a user device via a network. The public key encryption unit 505 serves to add a signature to specified data, decrypt specified encrypted data, encrypt specified data, create a pair of a public key and a private key, and make a link between an arbitrary public key certificate and certain data. The public key encryption unit 505 is built in the form of a SAM (Secure Application Module). The selection unit 506 serves to select data in a reproducing operation, select a party to which a connection via a network is to be made, and select a content title to be downloaded. The input/output unit 507 serves as a user interface. More specifically, the input/output unit 507 controls a display device and an input device so that specified information is displayed or information input by a user is converted into data having a processable form.

The public key encryption unit 505 of the user device 500 stores a public key certificate (PKC) and a person identification certificate (IDC), wherein the public key certificate (PKC) and the person identification certificate (IDC) are described in a mutually linked data format such that either one of the public key certificate (PKC) and the person identification certificate (IDC) can be pointed to by the other one. The specific manner of forming the link has been described above in [Link between Person Identification Certificates (IDC) and Public Key Certificates (PKC)]. A user executes a user authentication process using a person identification certificate (IDC) stored in the public key encryption unit 505, and the user uses a public key certificate (PKC) in transaction with a service provider.

(Downloading of Content)

Figure 54:
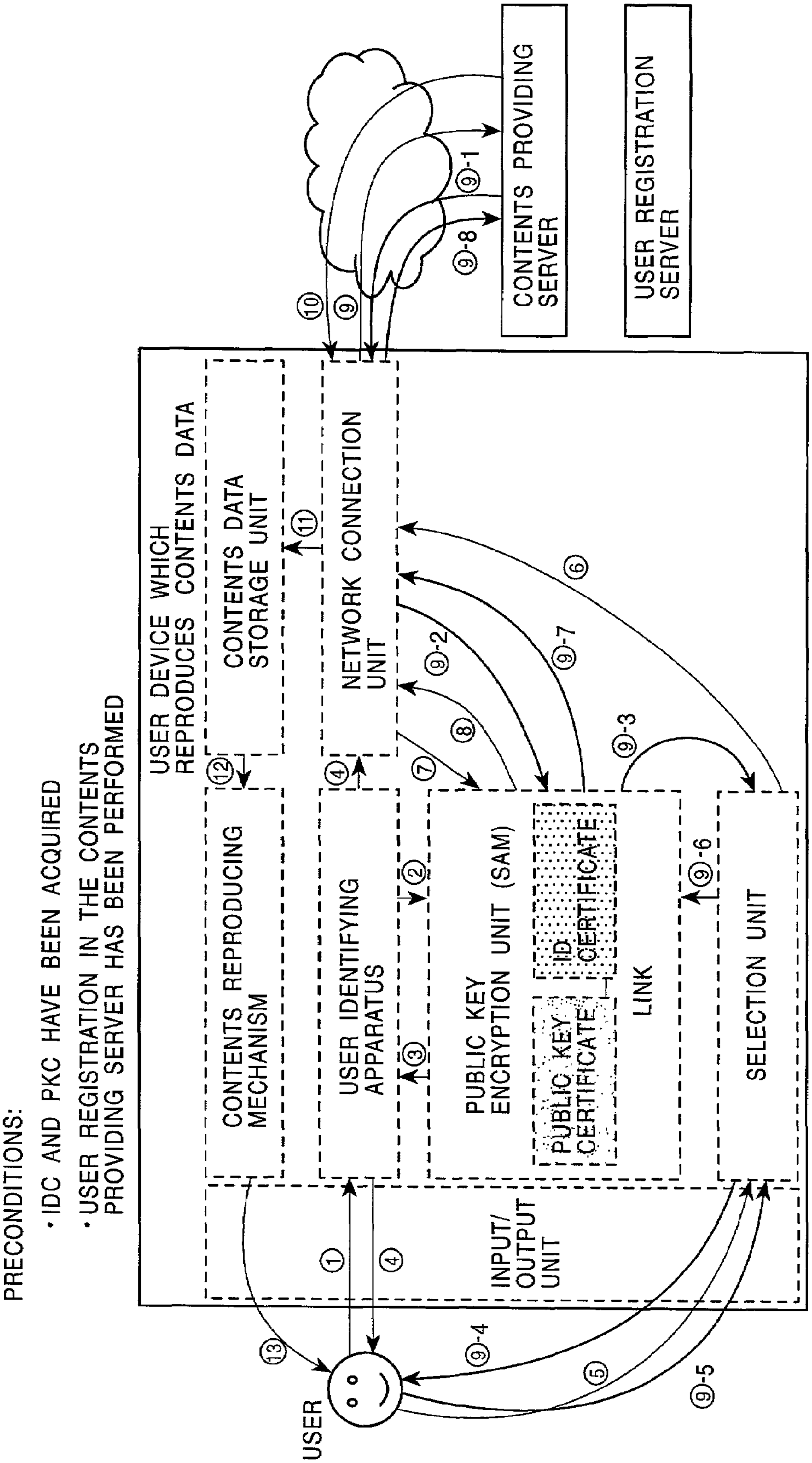
FIG. 54 is a diagram illustrating a data flow in a process of downloading a content.
Figure 55:
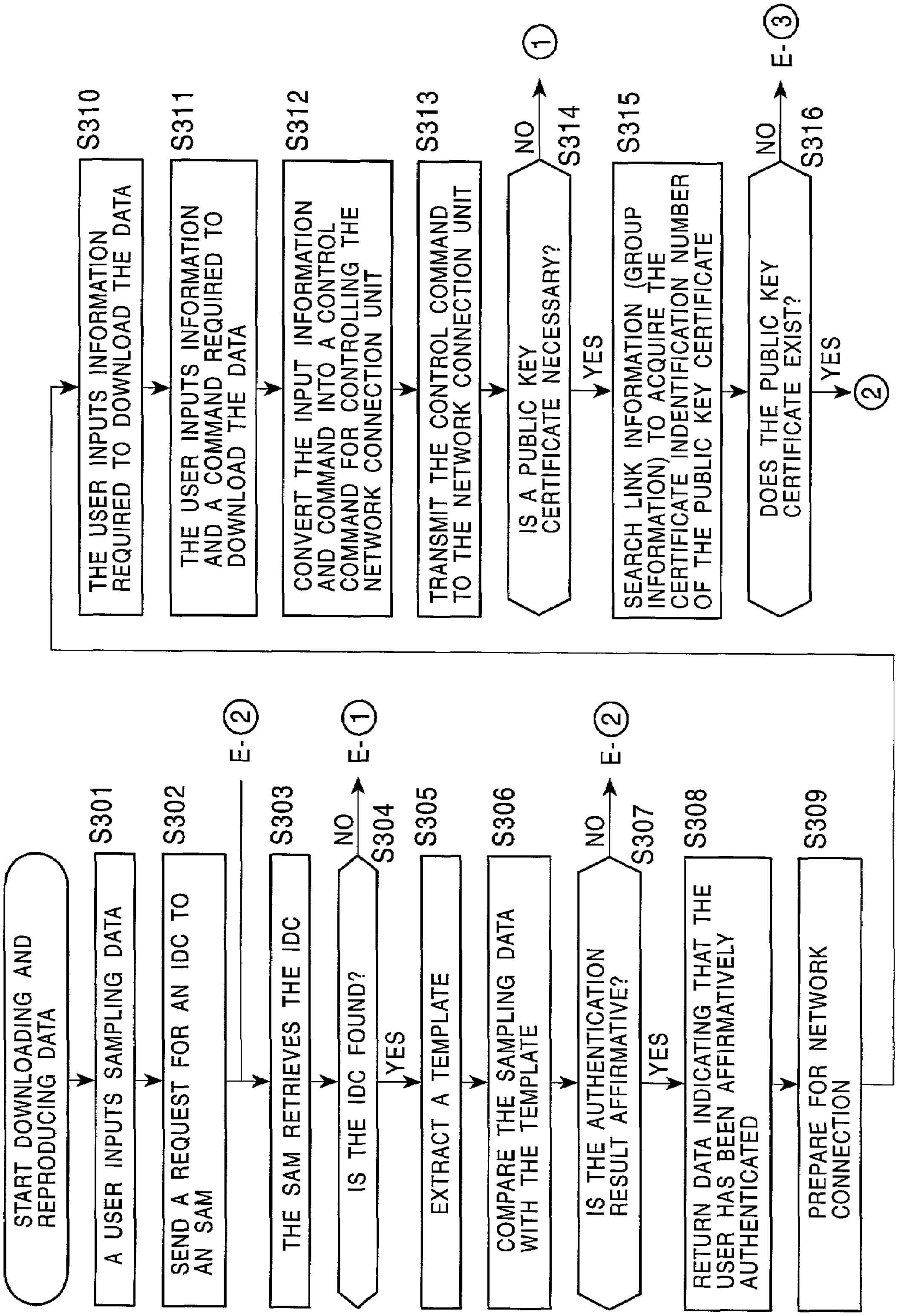
FIG. 55 is a diagram illustrating the details of the data flow in the process of downloading a content.
Figure 56:
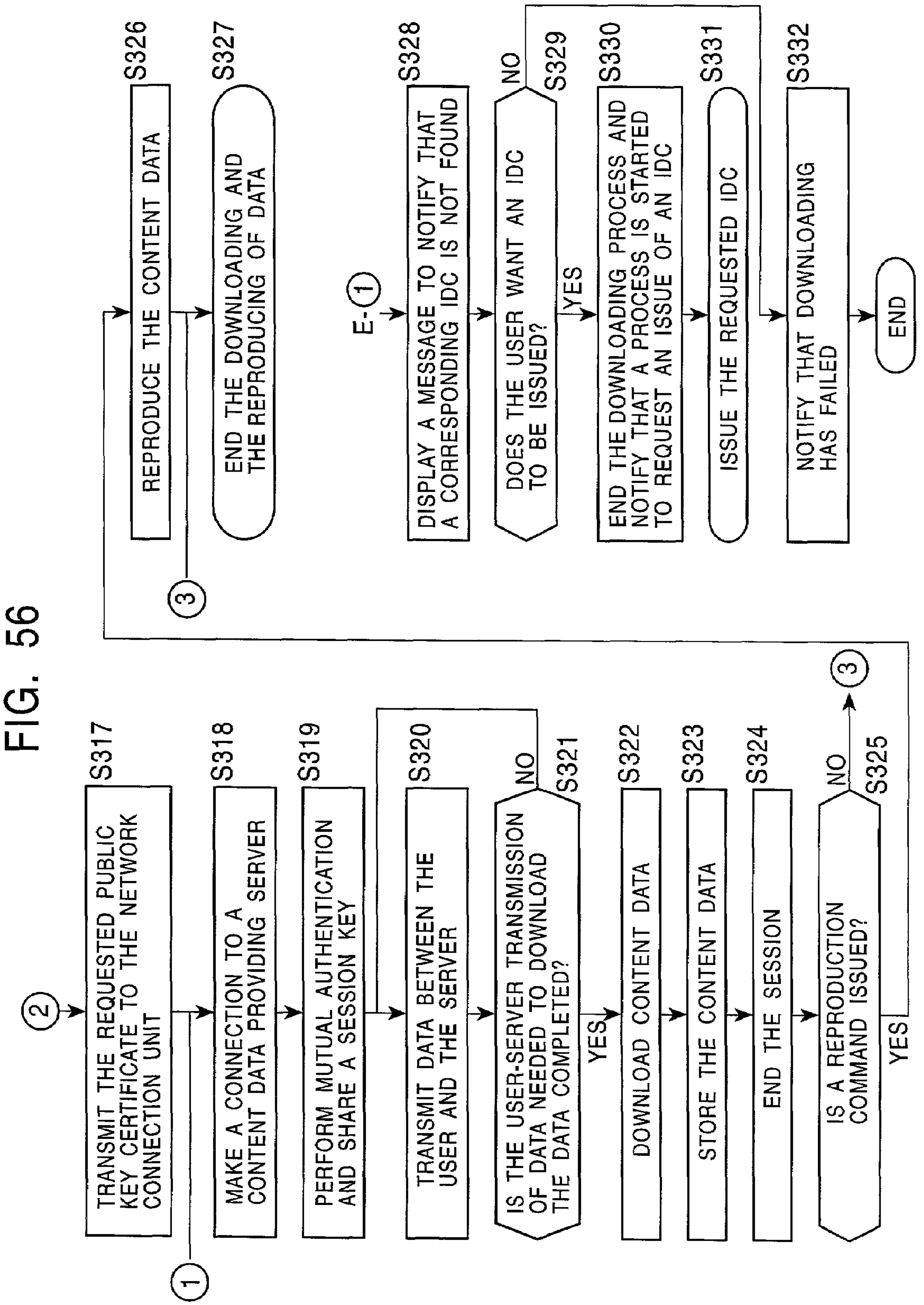
FIG. 56 is a diagram illustrating the details of the data flow in the process of downloading a content.
Figure 57:
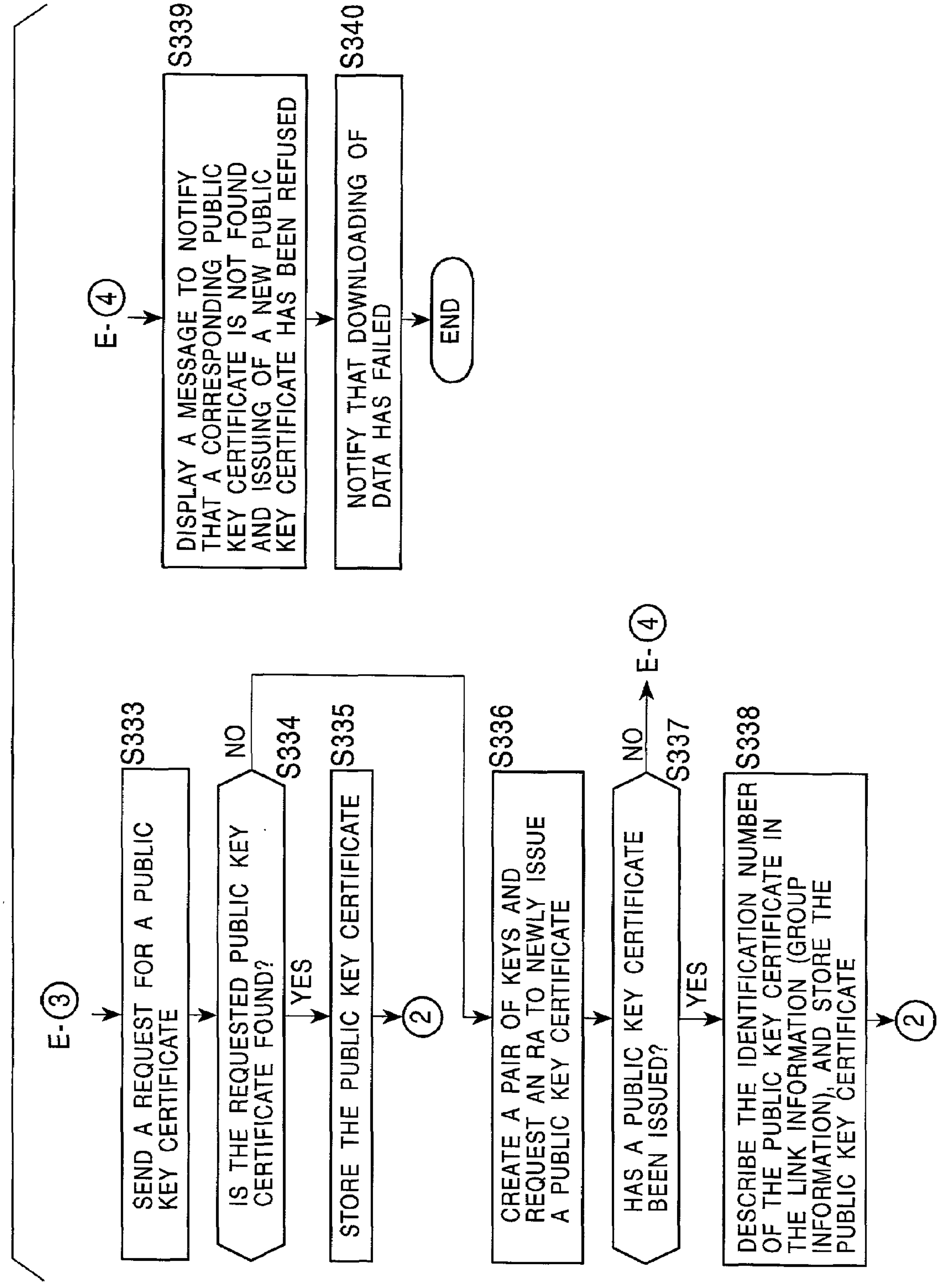
FIG. 57 is a diagram illustrating the details of the data flow in the process of downloading a content.

A process is described below which is performed by a user device constructed in the above-described manner to download a content such as music data or image data from a service provider and reproduce it, depending upon the result of comparison/verification of sampling information with a template. FIG. 54 illustrates a flow of data in the contents downloading process, wherein the details of the flow are shown in the FIGS. 55, 56, and 57. The process is described below with reference to these figures. Note that in the following description, the process numbers shown in FIG. 54 are denoted by (n) and the step numbers in FIGS. 55 to 57 are denoted by (Snnn).

(1) First, to use a device, a user inputs sampling data such as fingerprint information into the device (S301). (2) In order to compare the input sampling data with a template of a person identification certificate (IDC) which has already been stored in the SAM, the user identifying apparatus requests the SAM to provide the person identification certificate (IDC) (S302).

(3) The SAM retrieves the requested person identification certificate (IDC) on the basis of the link information and returns the retrieved IDC or a template extracted from the IDC to the user identifying apparatus (S303 to S305). (4) The user identifying apparatus compares the sampling data with the template (S306). If the comparison result is affirmative, that is, if the user is verified as an authorized user, the user and the network connection unit are informed of the success of the user verification (S307, S308). Only when the user verification is affirmative, the network connection unit prepares for connection via the network (S309).

(5) The user specifies desired data to be reproduced, via the interface provided by the input/output unit (S310, S311). (6) The selection unit converts the command accepted via the interface so as to generate a command for controlling the network connection unit (S311, S312) and transmits the control command to the network connection unit (S313).

(7) The network connection unit requests the public key encryption unit to provide a public key certificate (PKC) necessary in transaction of content data (S314 to S316). (8) The public key encryption unit transmits the requested public key certificate (PKC) to the network connection unit (S317). In this process, as required, the public key encryption unit retrieves the requested PKC by examining the IDC-PKC link and returns the retrieved PKC to the network connection unit.

(9) The network connection unit accesses a contents data providing server via a local network or the Internet (S318). Mutual authentication between the device and the server is performed on the basis of public key certificates, and a shared session key is created thereby establishing a secret communication path (S319). In FIG. 54, processes (9-1) to (9-8) are performed when a user communicates with a server in an interactive fashion to receive a service, wherein these processes are performed as many times as required (S320, S321). Data is transmitted from the contents providing server to the user via the processes (9-1) to (9-4), and data is transmitted from the user to the contents providing server via the processes (9-5) to (9-8). In this data transmission/reception, it is desirable that data be encrypted as required using the session key, signatures be added using the respective private keys, and the signatures be verified using the public key.

(10) After completion of transmission of all data, the network connection unit downloads requested content data from the contents providing server (S322). (11) The network connection unit transfers the downloaded content data to the contents data storage unit to store it therein (S323), and the session is ended (S324).

(12) In the case where reproducing of data is requested by the user, the content data is transferred to the contents reproducing unit (Yes in S325). (13) The user executes an operation for reproducing the content using the contents reproducing mechanism (S326), and uses the content via the input/output unit.

The flow of downloading and reproducing a content has been described above. Note that the process described above is performed in an easy situation in which a public key certificate (PKC) and a person identification certificate (IDC) are used when a content is downloaded, and these two certificates are stored in the SAM. FIGS. 55 to 57 also show processes which are performed when there is no certificate or when a certificate is not required. The processes performed in such situations are described below.

In FIG. 56, steps S328 to S332 are performed when a person identification certificate (IDC) corresponding to a user is not found in a user device. In this case, the user device displays a message via an input/output unit to inform the user that the IDC is not found (S328) and to request the user to determine whether or not to make a request for issuing an IDC (S329). In the case where the user inputs a command indicating that the user does not want the request to be made, the user device informs the user that the downloading has failed (S332). On the other hand, if the user inputs a command indicating that the user wants the request for issuing an IDC to be generated, the user device terminates the process of downloading the content and informs the user via the input/output unit that a process of generating a request for issuing an IDC is started (S330). Thereafter, the user device executes the process of generating a request for issuing an IDC (S331). The details of this process have been described above in [Registration and Change of Template and Person Identification Certificate (IDC)].

In FIG. 57, step S333 and steps following that are performed when the public key certificate (PKC) is not stored in the user device. If acquisition of a public key certificate (PKC) from a certificate authority (CA) located outside is wanted (S333), it is determined whether the public key certificate (PKC) has already been registered (S334). If the registered public key certificate (PKC) is found, the public key certificate (PKC) is acquired from the certificate authority (CA) and stored in the user device (S335).

If the registered public key certificate (PKC) is not found, it is required to newly issue a public key certificate (PKC). In this case, a pair of a public key and a private key is generated and a request for newly issuing a public key certificate (PKC) is sent to a registration authority (RA), that is, an agency which issues public key certificates (PKCs) (S336). If a public key certificate (PKC) has been newly issued, group information indicating a link to a person identification certificate (IDC) is generated, and the public key certificate is stored (S338). However, the link information may be stored in various manners as described earlier, and thus the above-described process of generating and storing the group information is not necessarily required if the certificate includes link data therein.

Step S339 and steps following that are performed when issuing of the public key certificate (PKC) is refused. In this case, the user device informs the user via the input/output unit that downloading has failed and the user device terminates the process.

(User Registration, Erasure of User Registration, and Making Service Contract)

Figure 58:
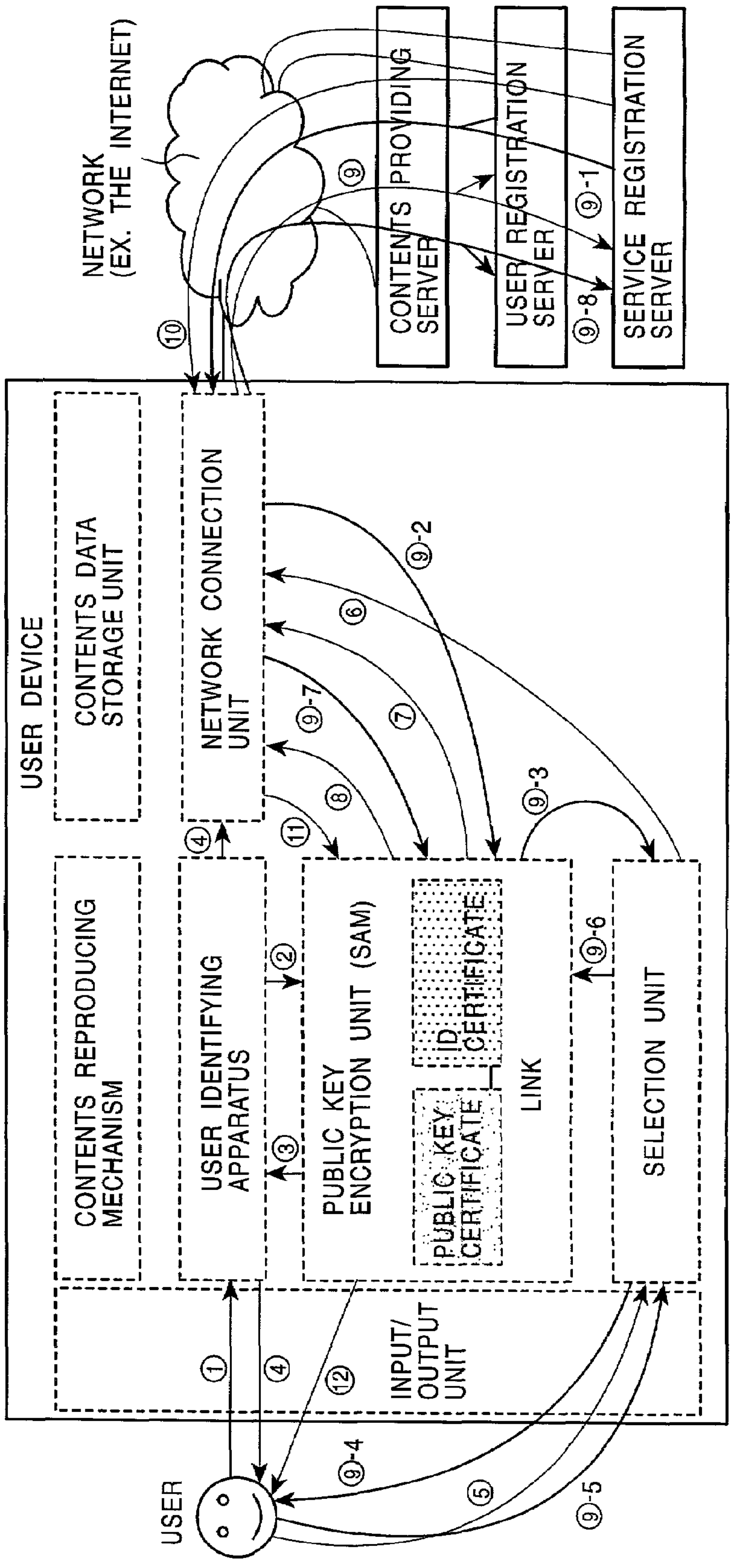
FIG. 58 is a diagram illustrating a data flow in processes of user registration, erasure of user registration, and making a service contract.
Figure 59:
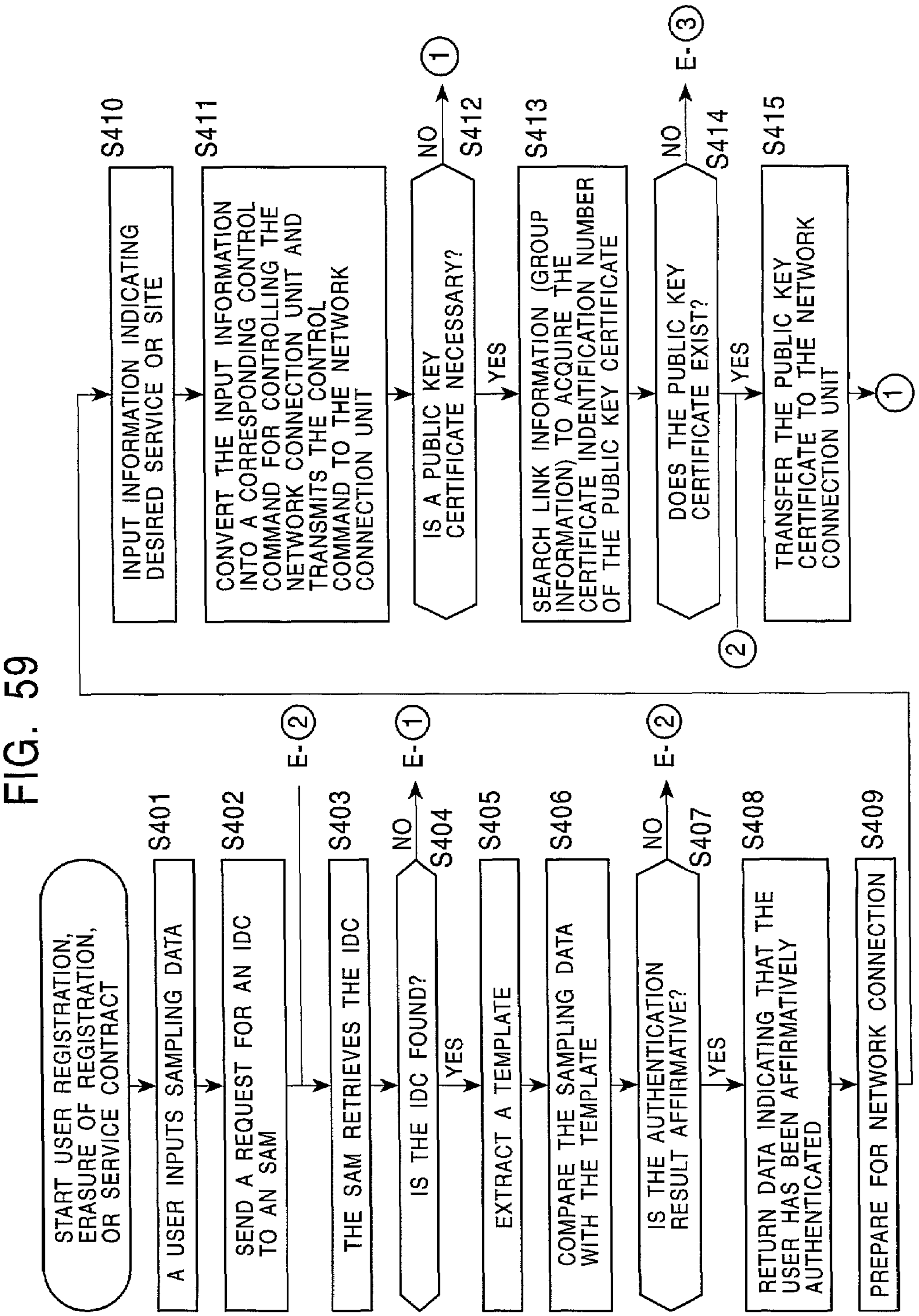
FIG. 59 is a diagram illustrating the details of the data flow in the processes of user registration, erasure of user registration, and making a service contract.
Figure 60:
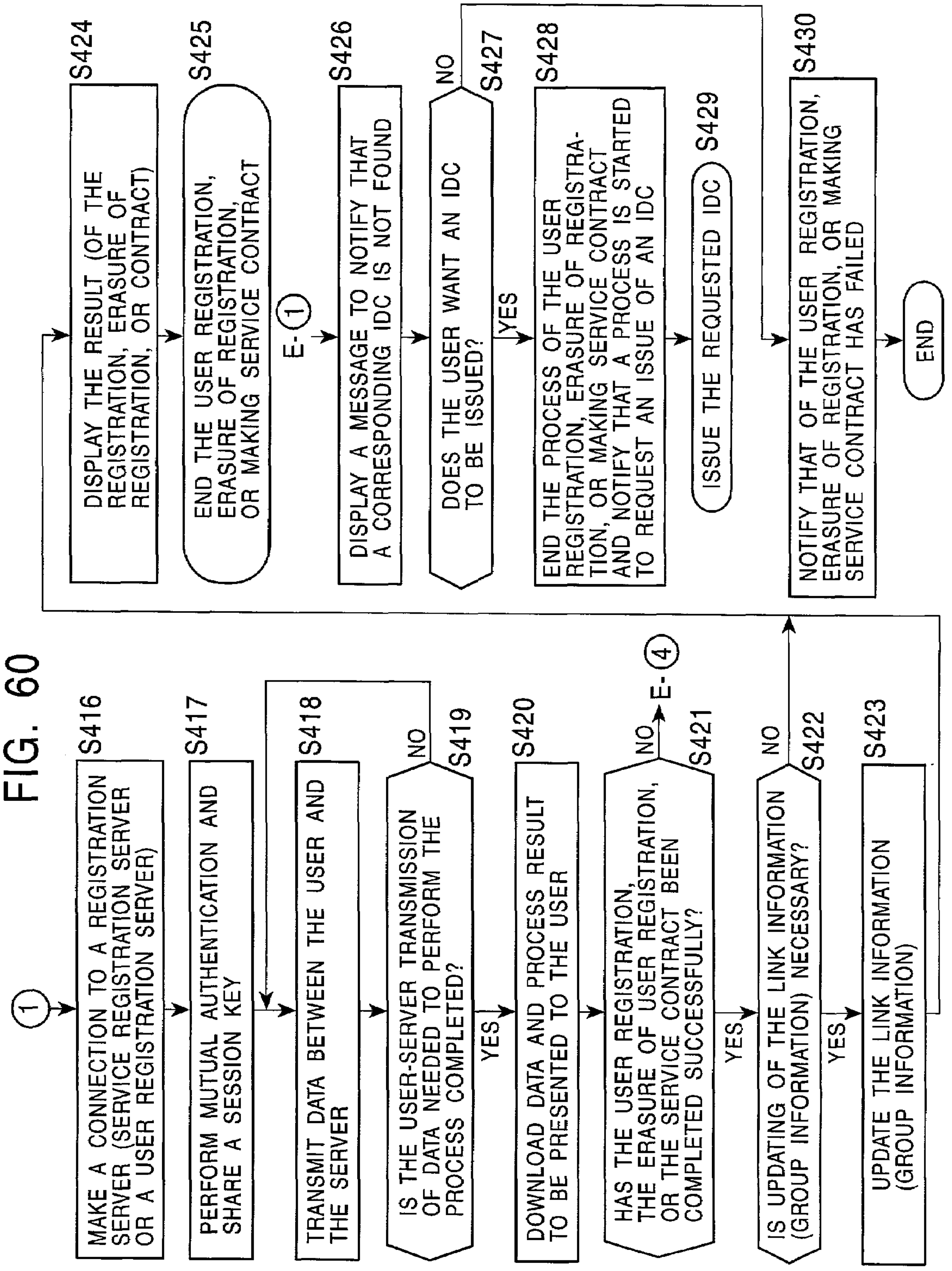
FIG. 60 is a diagram illustrating the details of the data flow in the processes of user registration, erasure of user registration, and making a service contract.
Figure 61:
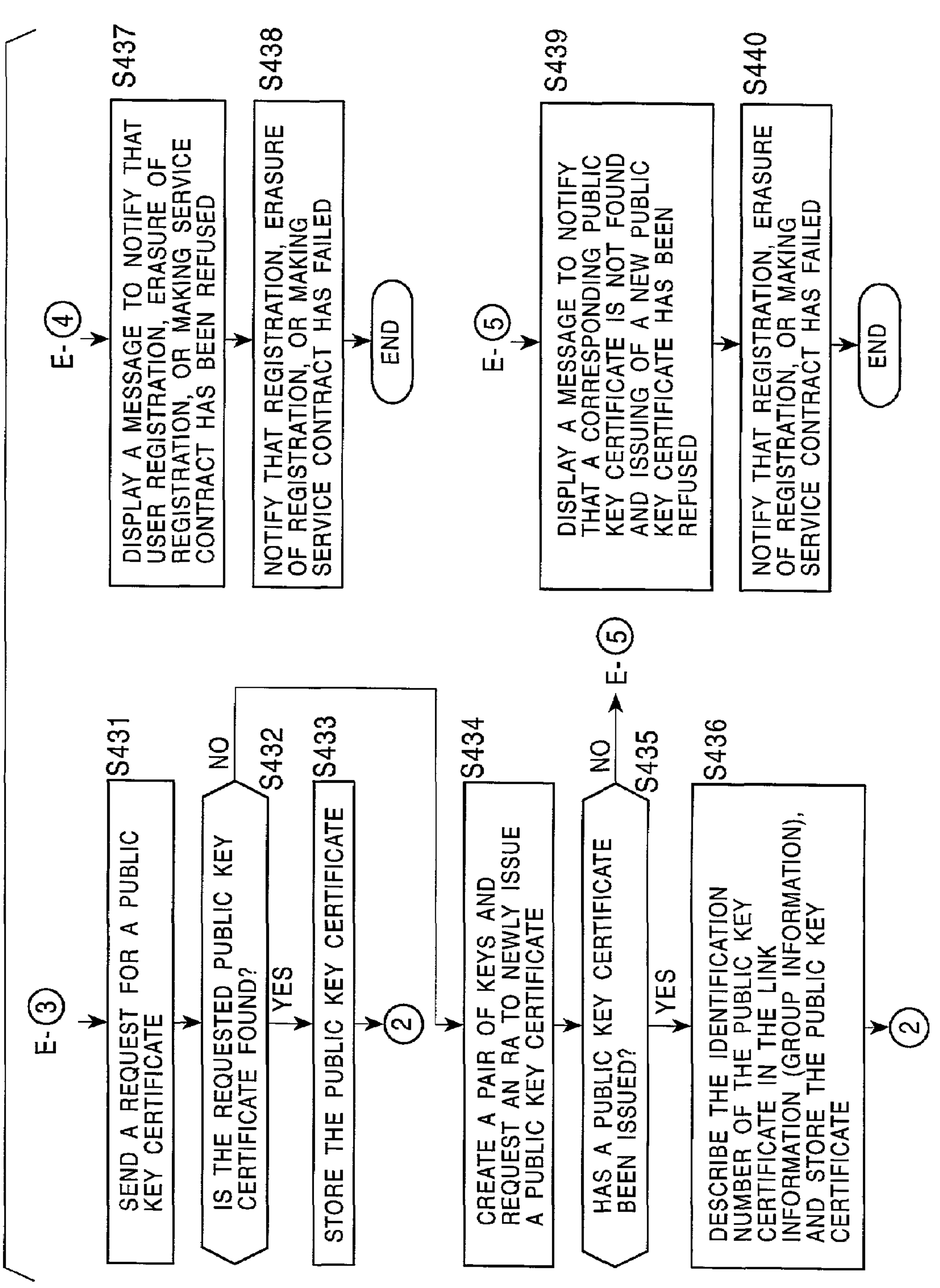
FIG. 61 is a diagram illustrating the details of the data flow in the processes of user registration, erasure of user registration, and making a service contract.

Now, there is described a process associated with user registration in a service provider which provides various services such as providing of contents, selling of goods, and settlement, erasure of user registration, and making a service contract. Herein, it is assumed that the above process is performed in accordance with user authentication by means of comparison of a template with sampling information, performed by a user identifying apparatus included in a user device shown in FIG. 53. FIG. 58 illustrates a flow of data in user registration, erasure of user registration, and making a service contract, wherein the details of the flow are shown in the FIGS. 63, 64, and 65. The process is described below with reference to these figures. Note that in the following description, the process numbers shown in FIG. 58 are denoted by (n) and the step numbers in FIGS. 59 to 61 are denoted by (Snnn).

(1) First, to use a device, a user inputs sampling data such as fingerprint information into the device (S401). (2) In order to compare the input sampling data with a template of a person identification certificate (IDC) which has already been stored in the SAM, the user identifying apparatus requests the SAM to provide the person identification certificate (IDC) (S402).

(3) The SAM retrieves the requested person identification certificate (IDC) on the basis of the link information and returns the retrieved IDC or a template extracted from the IDC to the user identifying apparatus (S403 to S405). (4) The user identifying apparatus compares the sampling data with the template (S306). If the comparison result is affirmative, that is, if the user is verified as an authorized user, the user and the network connection unit are informed of the success of the user verification (S407, S408). Only when the user verification is affirmative, the network connection unit prepares for connection via the network (S409).

(5) The user inputs data corresponding to a process to be performed, via the interface provided by the input/output unit. More specifically, in the case of user registration, data indicating a desired site to be registered is input. Data indicating a site the registration of which is to be erased is input in the case of erasure of user registration. In the case of making a contract, data indicating a desired site a contract of which is to be made is input (S410). (6) The selection unit converts the command accepted via the interface so as to generate a command for controlling the network connection unit and transmits the control command to the network connection unit (S411).

(7) The network connection unit requests the public key encryption unit to provide a public key certificate (PKC) necessary in transaction of content data (S412). (8) The public key encryption unit transmits the requested public key certificate (PKC) to the network connection unit (S413 to S415). In this process, the public key encryption unit retrieves the requested PKC by examining the IDC-PKC link and returns the retrieved PKC to the network connection unit.

(9) The network connection unit accesses a service registration server or a user registration server via a local network or the Internet (S416). Mutual authentication between the device and the server is performed on the basis of public key certificates, and a shared session key is created thereby establishing a secret communication path (S417). In FIG. 58, processes (9-1) to (9-8) are performed when a user communicates with a server in an interactive fashion to receive a service, wherein these processes are performed as many times as required (S418, S419). Data is transmitted from the service registration server or the user registration server to the user via the processes (9-1) to (9-4), and data is transmitted from the user to the service registration server or the user registration server via the processes (9-5) to (9-8). In this data transmission/reception, it is desirable that data be encrypted as required using the session key, signatures be added using the respective private keys, and the signatures be verified using the public key.

(10) After completion of transmission of all data, the network connection unit downloads necessary data from the service registration server or the user registration server (S420). (11) If the process (user registration, erasure of user registration, making a contract) has been successfully completed, the network connection unit informs the public key encryption unit of the success of the process. Furthermore, if required, necessary information is added to the link information (group information) indicating the link between person identification certificates (IDCs) and the public key certificates (PKCs) (S422, 423). However, the link information may be stored in various manners as described earlier, and thus the above-described process of generating and storing the group information is not necessarily required if the certificate includes link data therein. (12) After completion of the above process, the result of the process is displayed via the input/output unit, and the process is ended (S424, S425).

The flow of the process has been described above which is performed in connection with the service provider, such as user registration, erasure of user registration, making a service contract, in which user authentication is performed on the basis of a person identification certificate (IDC). Note that the process described above is performed in an easy situation in which a public key certificate (PKC) and a person identification certificate (IDC) are used, and these two certificates are stored in the SAM. FIGS. 60 to 62 also show processes which are performed when there is no certificate or when a certificate is not required. The processes performed in such situations are described below.

In FIG. 60, steps S426 to S430 are performed when a person identification certificate (IDC) corresponding to a user is not found in a user device. In this case, the user device displays a message via an input/output unit to inform user that the IDC is not found (S426) and to request the user to determine whether or not to make a request for issuing an IDC (S427). In the case where the user inputs a command indicating that the user does not want the request to be made, the user device informs the user that the process has failed (S430). On the other hand, if the user inputs a command indicating that the user wants the request for issuing an IDC to be generated, the user device terminates the process of downloading the content and informs the user via the input/output unit that a process of generating a request for issuing an IDC is started (S428). Thereafter, the user device executes the process of generating a request for issuing an IDC (S429). The details of this process have been described above in [Registration and Change of Template and Person Identification Certificate (IDC)].

In FIG. 61, step S431 and steps following that are performed when the public key certificate (PKC) is not stored in the user device. If acquisition of a public key certificate (PKC) from a certificate authority (CA) located outside is wanted (S431), it is determined whether the public key certificate (PKC) has already been registered (S432). If the registered public key certificate (PKC) is found, the public key certificate (PKC) is acquired from the certificate authority (CA) and stored in the user device (S443).

If the registered public key certificate (PKC) is not found, it is required to newly issue a public key certificate (PKC). In this case, a pair of a public key and a private key is generated and a request for newly issuing a public key certificate (PKC) is sent to a registration authority (RA), that is, an agency which issues public key certificates (PKCs) (S434). If a public key certificate (PKC) has been newly issued, group information indicating a link to a person identification certificate (IDC) is generated, and the public key certificate is stored (S436). However, the link information may be stored in various manners as described earlier, and thus the above-described process of generating and storing the group information is not necessarily required if the certificate includes link data therein.

Steps S437 and S438 are performed when user registration, erasure of user registration, or making a service contract is refused. In this case, the user device informs the user via the input/output unit that the process has failed and the user device terminates the process. Steps S439 and S440 are performed when issuing of a new public key certificate (PKC) is refused. In this case, the user device informs the user via the input/output unit that the process has failed and the user device terminates the process.

(Request for a Person Identification Certificate (IDC) to be Stored in a Device and Registration Process)

Figure 63:
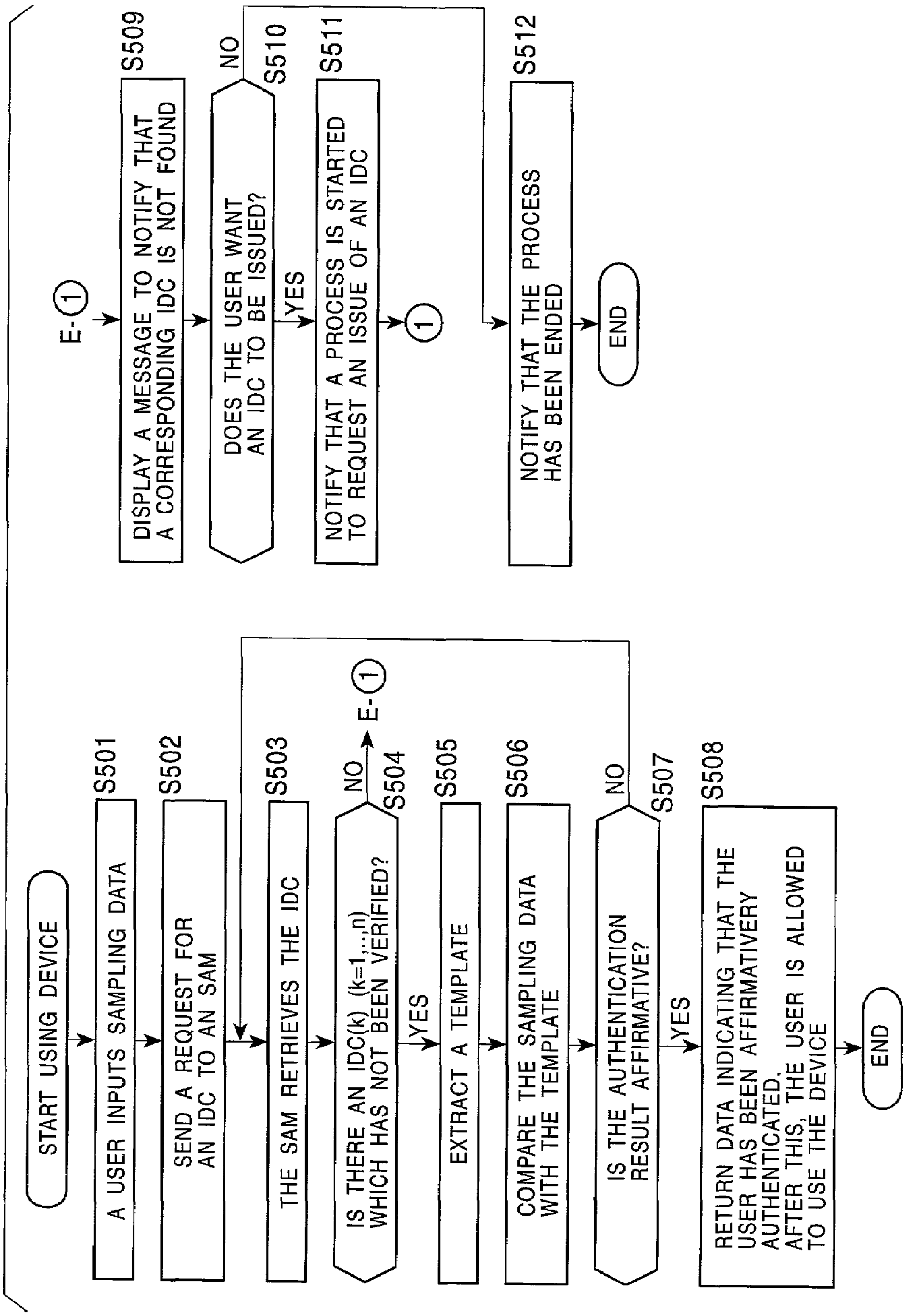
FIG. 63 is a diagram illustrating the details of the flow of data in the process of requesting the person identification certificate (IDC), which is to be stored in the device, to be issued.
Figure 64:
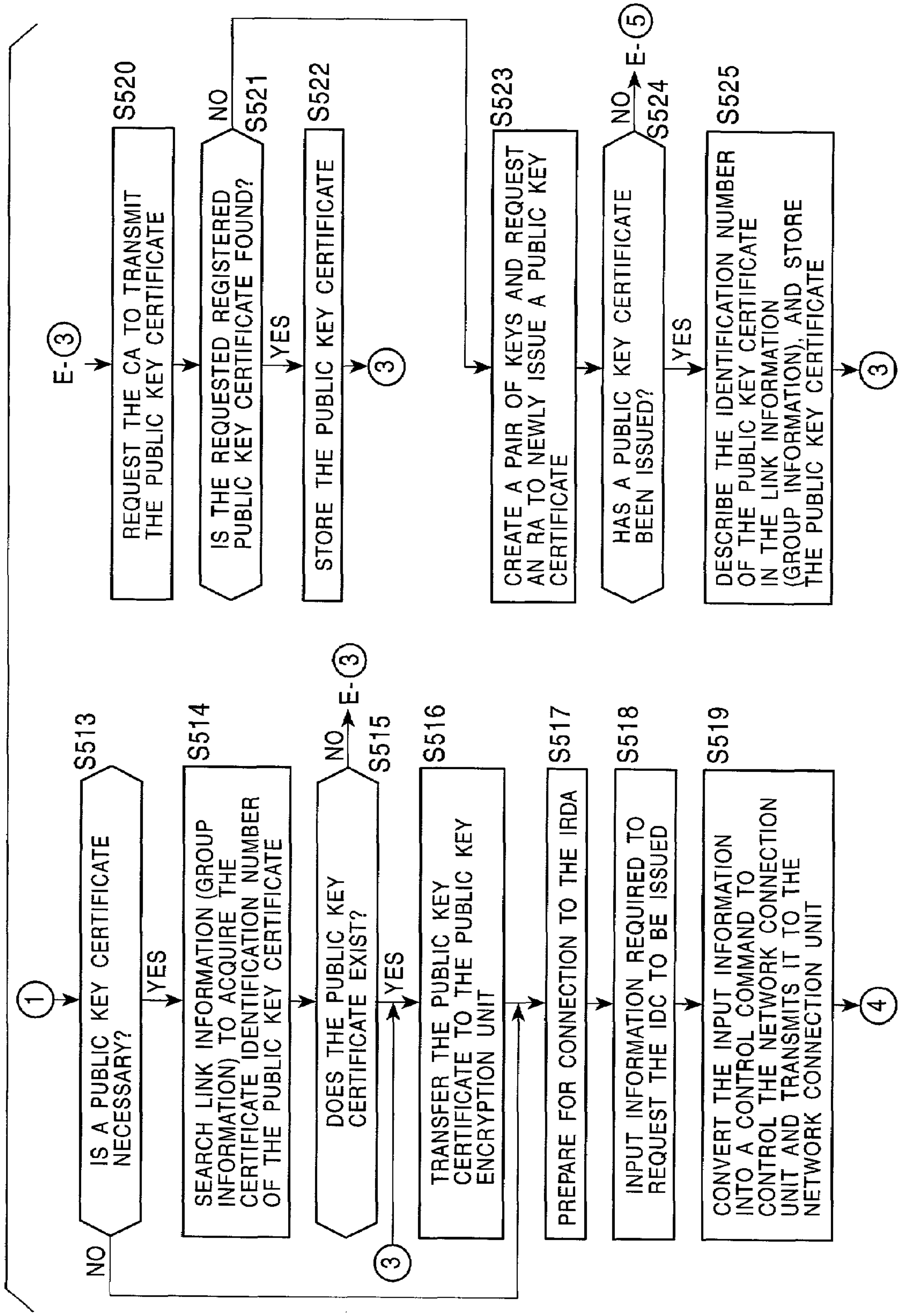
FIG. 64 is a diagram illustrating the details of the flow of data in the process of requesting the person identification certificate (IDC), which is to be stored in the device, to be issued.
Figure 65:
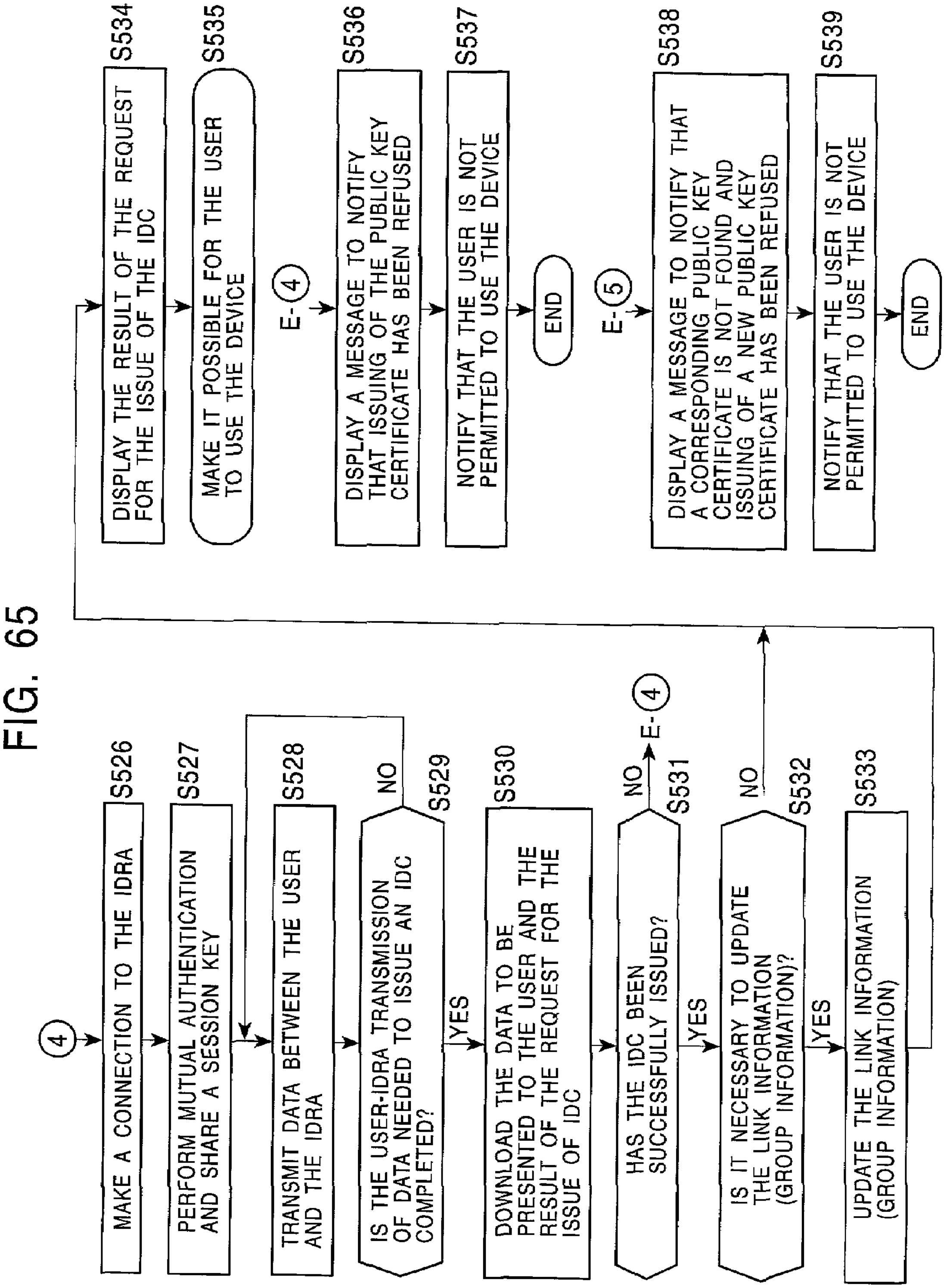
FIG. 65 is a diagram illustrating the details of the flow of data in the process of requesting the person identification certificate (IDC), which is to be stored in the device, to be issued.

A process of issuing and registering a person identification certificate (IDC) which is to be stored in a user device including a user identifying apparatus shown in FIG. 53 is described below. FIG. 62 illustrates a flow of data in the process of making a request for a person identification certificate (IDC) to be stored in the user device, wherein the details of the flow are shown in the FIGS. 63, 64, and 65. The process is described below with reference to these figures. Note that in the following description, the process numbers shown in FIG. 62 are denoted by (n) and the step numbers in FIGS. 63 to 65 are denoted by (Snnn).

(1) First, to use a device, a user inputs sampling data such as fingerprint information into the device (S501). (2) In order to compare the input sampling data with a template of a person identification certificate (IDC) which has already been stored in the SAM, the user identifying apparatus requests the SAM to provide the person identification certificate (IDC) (S502). Herein, it is assumed that there are n person identification certificates (IDCs) which have been issued to the user device and a process is performed to generate a request for issuing a new person identification certificate (IDC) including a template. Note that n=0 in the case where the user device does not have any person identification certificate (IDC).

(3) The user device sequentially retrieves n person identification certificates (IDCs) which have been already stored, and returns the retrieved IDCs or templates extracted from the IDCs to the user identifying apparatus (S503 to S505). (4) The user identifying apparatus compares the sampling data with the templates (S506). If the sampling data matches with a template, and thus if it is determined that the user is an authorized user, the user is informed of the success of the user authentication (S507, S508). However, in this specific example, it is assumed that the sampling data does not match with the template of any stored person identification certificate (IDC), and thus a request for newly issuing a person identification certificate (IDC) including template information is generated. That is, in the case where even when the sampling data has been compared with the templates of all stored IDCs, any IDC does not have a template which matches with the sampling data, the process goes to step S509.

If a person identification certificate (IDC) including a template which matches the sampling information is not found in the user device, the user device displays a message via an input/output unit to inform a user that the IDC is not found (S509) and to request the user to determine whether or not to make a request for issuing an IDC (S510). In the case where the user inputs a command indicating that the user does not want the request to be made, the user device informs the user that the process has failed (S512). On the other hand, if the user inputs a command indicating that the user wants the request for issuing an IDC to be generated, the user device informs the user via the input/output unit that a process of generating a request for issuing an IDC is started (S511).

In FIG. 64, step S513 and the following steps are performed to issue a public key certificate (PKC) used in a process of issuing person identification certificate (IDC).

In step S513, it is determined whether a public key certificate (PKC) is necessary in the process of issuing a person identification certificate (IDC). If the PKC is not necessary, the process goes to step S514 to acquire the identification number of the public key certificate (PKC) from an IDC or a PKC or link information (group information) stored in the public key encryption unit of the user device. (9) If the public key certificate (PKC) is found (Yes in S516), the public key certificate (PKC) is transferred to the public key encryption unit (S516), a preparation for connection with an IDRA (registration authority which issues a person identification certificate (IDC)) (S517), and information necessary to issue the person identification certificate (IDC) is input (S518).

If acquisition of a public key certificate (PKC) from a certificate authority (CA) located outside is wanted (S520), it is determined whether the public key certificate (PKC) has already been registered (S521). If the registered public key certificate (PKC) is found, the public key certificate (PKC) is acquired from the certificate authority (CA) and stored in the user device (S522).

If the registered public key certificate (PKC) is not found, it is required to newly issue a public key certificate (PKC). In this case, a pair of a public key and a private key is generated (FIG. 62(5)) and a request for newly issuing a public key certificate (PKC) is sent to a registration authority (RA), that is, an agency which issues public key certificates (PKCs) (FIG. 62(6),(7)) (S336). In the case where a public key certificate (PKC) has been newly issued (FIG. 62(8)) (Yes in S524), group information indicating a link to the person identification certificate (IDC) is generated and the public key certificate is stored (S525). However, the link information may be stored in various manners as described earlier, and thus the above-described process of generating and storing the group information is not necessarily required if the certificate includes link data therein.

FIG. 65 shows a process in which a person identification certificate (IDC) is issued by communicating with an IDRA (registration authority which accepts registration of issuing of a person identification certificate (IDC)).

(10) To acquire a person identification certificate (IDC) linked to the public key certificate (PKC), the public key encryption unit of the user device transfers the address of the IDRA and the sampling data (or the user name) to the network connection unit. Herein, it is assumed that the off-line procedure necessary for issue of the person identification certificate (IDC) has already been performed. If information (such as sampling data, PIN, or user name) is further necessary to compare with information (personal information) which has been registered in the off-line procedure and which is used by the IDRA to retrieve the IDC of the user, the information is also transferred at the same time to the network connection unit.

(11) The network connection unit of the user device makes a connection to the IDRA via a local network or the Internet (S526). Mutual authentication between the device and the IDRA is performed on the basis of public key certificates, and a shared session key is created thereby establishing a secret communication path (S527). The user device transmits necessary information (such as sampling data, PIN, name, address, or telephone number) to the IDRA. An interactive communication process between the user and the IDRA is performed as represented by (11)-1 to (11)-8 in FIG. 62. (11)-1 to (11)-4 are steps performed to transmit data from the IDRA to the user, and (11)-5 to (11)-8 are steps performed to transmit data from the user to the IDRA. In this data transmission/reception, it is desirable that data be encrypted as required using the session key, signatures be added using the respective private keys, and the signatures be verified using the public key. In the case where the person identification certificate (IDC) to be issued will include a template encrypted with the public key of the user device, the user device transmits the public key (public key certificate) to the IDRA.

After completion of transmission of all data, the network connection unit downloads necessary data and the result of the IDC issuing request (S530). (12) The IDRA verifies the IDC issuing request received from the user device. If it is determined that the request is valid, the IDRA requests an IDCA, which executes an IDC issuing procedure, to issue an IDC. The person identification certificate (IDC) issued by the IDCA is transmitted to the user device via the IDRA.

(13) Upon receiving the person identification certificate (IDC), the user device transmits the person identification certificate (IDC) to the public key encryption unit. (14) The public key encryption unit generates link information (group information) indicating the link between the person identification certificate (IDC) and the public key certificate (PKC) (S532) and updates the link information (group information) (S533). However, the link information may be stored in various manners as described earlier, and thus the above-described process of generating and storing the group information is not necessarily required if the certificate includes link data therein. (15) After completion of the above process, the result of the IDC issue request process is displayed via the input/output unit, and the process is ended (S534, S535).

Steps S536 and S537 are performed when issuing of the public key certificate (PKC) is refused. In this case, the user device informs the user via the input/output unit that the process has failed and the user device terminates the process. Steps S538 and S539 are performed when issuing of a new public key certificate (PKC) is refused. In this case, the user device informs the user via the input/output unit that the process has failed and the user device terminates the process.

[9. One-Time Public Key Certificate (One-Time PKC)]

Now, a process performed by a certificate authority (CA) to issue a public key certificate (PKC) in accordance with user authentication using a template of a person identification certificate authority (IDA) is described. Hereinafter, a public key certificate issued in such a manner is referred to as a one-time PKC. A one-time PKC is issued, for example, when a user wants to perform a transaction such as acquisition of a content from a service provider with which the user has not made a contract, wherein after performing user authentication on the basis of a person identification certificate (IDC) which has already been registered in the person identification certificate authority (IDA), the one-time PKC is issued without performing a rigorous examination of the certificate authority (CA). The one-time PKC is not regarded as an official public key certificate but regarded as valid only in a particular transaction such as a one-time transaction.

Figure 66:
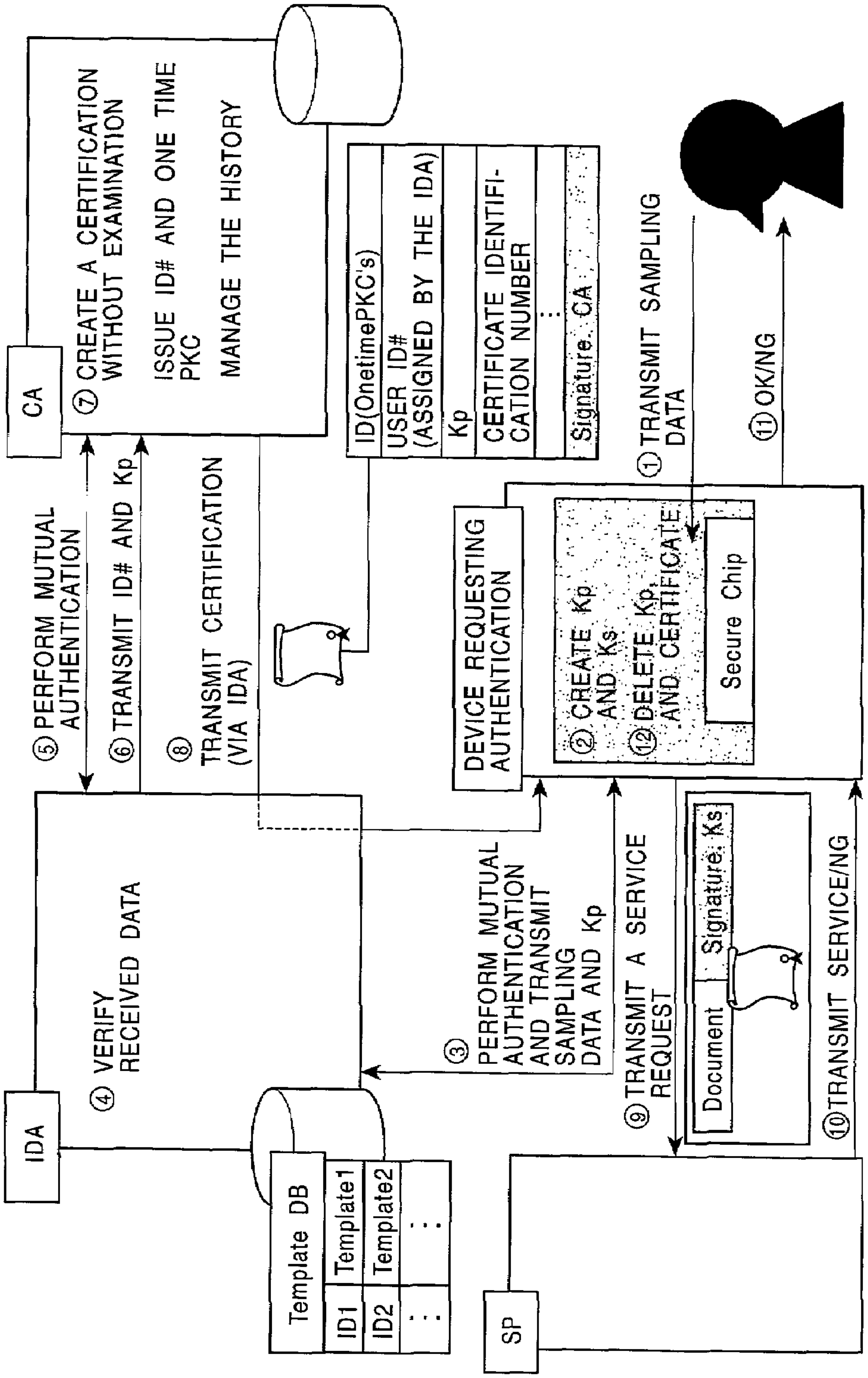
FIG. 66 is a diagram illustrating a procedure of issuing a one-time PKC.
Figure 67:
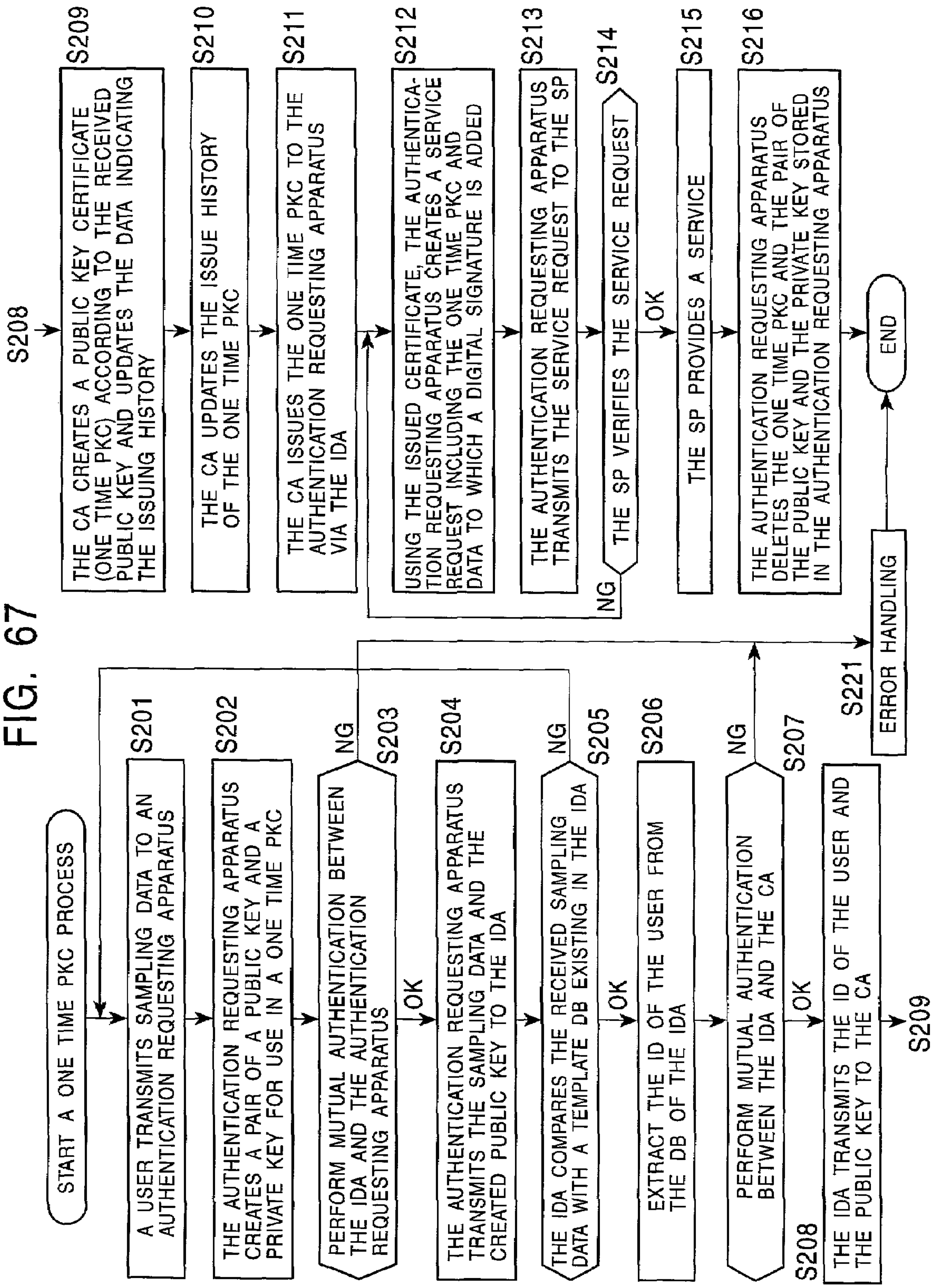
FIG. 67 is a flow chart of the procedure of issuing a one-time PKC.

FIG. 66 illustrates a procedure of issuing a one-time PKC. The process proceeds in the order of the numbers shown in FIG. 66. FIG. 67 is a flow chart illustrating the details of the procedure of issuing a one-time PKC. The process of issuing a one-time PKC is described below with reference to FIGS. 66 and 67.

First, an user, who wants to generate a request for issuing a one-time PKC, inputs sampling data such as fingerprint data to an identification request apparatus (FIG. 67, S201). The identification request apparatus generates a pair of the public key and the private key of the user who input the sampling data and employing it as a one-time PKC key set (S202).

Thereafter, the identification request apparatus performs mutual authentication with a person identification certificate authority (IDA) (S203). Provided that the mutual authentication is passed, the identification request apparatus transmits the sampling data, the generated public key, and the user identification data to the person identification certificate authority (IDA). In the transmission of the data, it is desirable that the data be encrypted using the session key, and a signature be attached to the data.

Upon receiving the data from the certificate requesting apparatus, the person identification certificate authority (IDA) extracts a template from the person identification certificate (IDC) which is identified by the user identification data and which has already been registered and compares the received sampling data with the extracted template for verification (S205). Thereafter, the person identification certificate authority (IDA) retrieves the user ID from a database (S206) and performs mutual authentication between the person identification certificate authority (IDA) and the certificate authority (CA) (S207). Provided that the mutual authentication is successfully passed, the person identification certificate authority (IDA) transmits the user ID and the public key to the certificate authority (CA) (S208). Also in this data transmission, it is desirable that data be encrypted and a signature be attached to the data.

The certificate authority (CA) generates a public key certificate corresponding to the received public key as a one-time PKC and updates the issue history (S209, 210). The certificate authority (CA) transmits the generated one-time PKC to the certificate requesting apparatus via the person identification certificate authority (IDA) (S211).

Using the received one-time PKC, for example, the certificate requesting apparatus requests a service provider to provide a service. More specifically, the certificate requesting apparatus adds a signature encrypted with the generated private key to, for example, a content request data or a settlement request data and transmits it together with the public key certificate (one-time PKC) to the service provider.

The service provider extracts the public key certificate (one-time PKC) from the received data, further extracts the public key of the user, and verifies the signature using the public key, thereby verifying the service request (S215). If the verification is successfully passed, the service provider provides the requested service (S215). Upon receiving the service, the certificate requesting apparatus deletes the public key and the private key generated in the certificate requesting apparatus and also deletes the issued one-time PKC (S216). Alternatively, only the public key certificate in the form a one-time PKC may be deleted without deleting the public key and the private key.

The sequence of steps shown in FIG. 67, that is, the process from step S201 in which sampling data is transmitted to step S216 in which data is deleted, is automatically executed in accordance with a particular processing program which may be provided by the service provider. Thus, the one-time PKC transmitted to the certificate requesting is deleted from the certificate requesting apparatus when the process is completed, thereby ensuring that the one-time PKC is prevented from being used for another transaction. However, it is not necessarily required to delete the one-time PKC, but the one-time PKC may be used repeatedly for particular limited transactions.

As described above, the template serving as user identification data of the user who generates a request for issuing a public key certificate (one-time PKC) is acquired from the person identification certificate and compared with the sampling information to verify the authenticity of the user, and, provided that the user authentication is successfully passed, the public key certificate of the user is issued, thereby making it possible to quickly issue the public key certificate via a simplified issuing procedure.

Furthermore, user authentication is performed at the person identification certificate authority, the certificate authority responsible for issuing public key certificates (one-time PKCs) issues a public key certificate, provided that the user authentication is successfully passed, thereby allowing a reduction in a processing load in terms of the user authentication upon the certificate authority.

Furthermore, because a public key certificate (one-time PKC), which is issued to a user provided that user authentication performed by a person identification certificate authority by comparing user's sampling information with a template stored in a person identification certificate is successfully passed, is deleted when the usage of the public key certificate by an information processing apparatus which has received the public key certificate (one-time PKC) is completed, it is ensured that the public key certificate (one-time PKC) issued via the user authentication performed by the person identification certificate authority can be used only for the particular purpose specified when the one-time PKC is issued.

[10. Verification Certificate]

When a template of a person identification certificate and sampling information match with each other in a verification process, a person identification certificate authority (IDA) certifies that a person who has provided the sampling information is the person corresponding to the person identification certificate. In the examples described above, the verification result is given in the form of a message indicating either OK or NG. Alternatively, the person identification certificate authority (IDA) may issue a verification certificate indicating that user authentication has been successfully passed. The process of issuing the verification certificate is described below.

Figure 68:
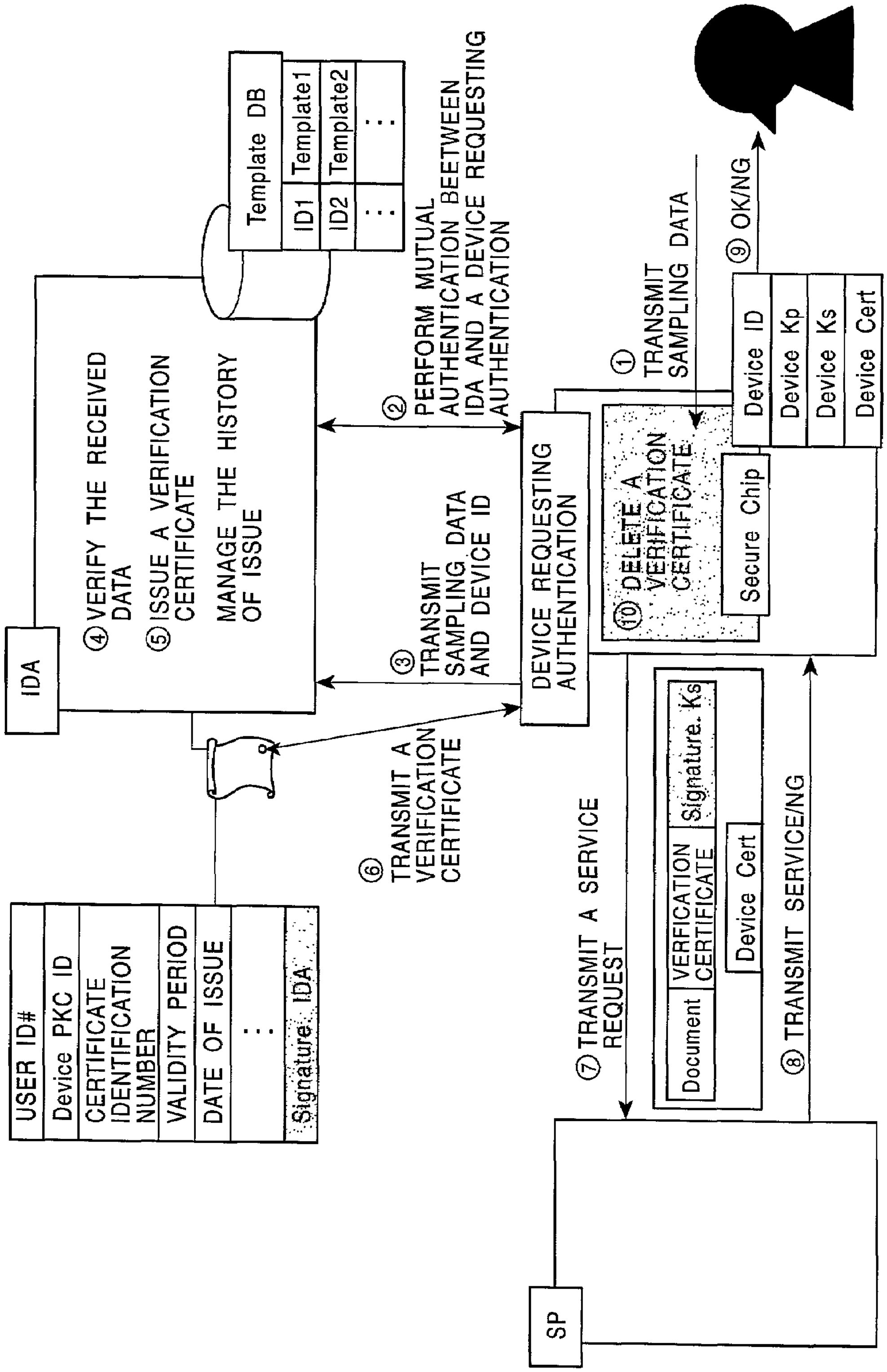
FIG. 68 is a diagram illustrating a first manner of using a verification certificate.
Figure 69:
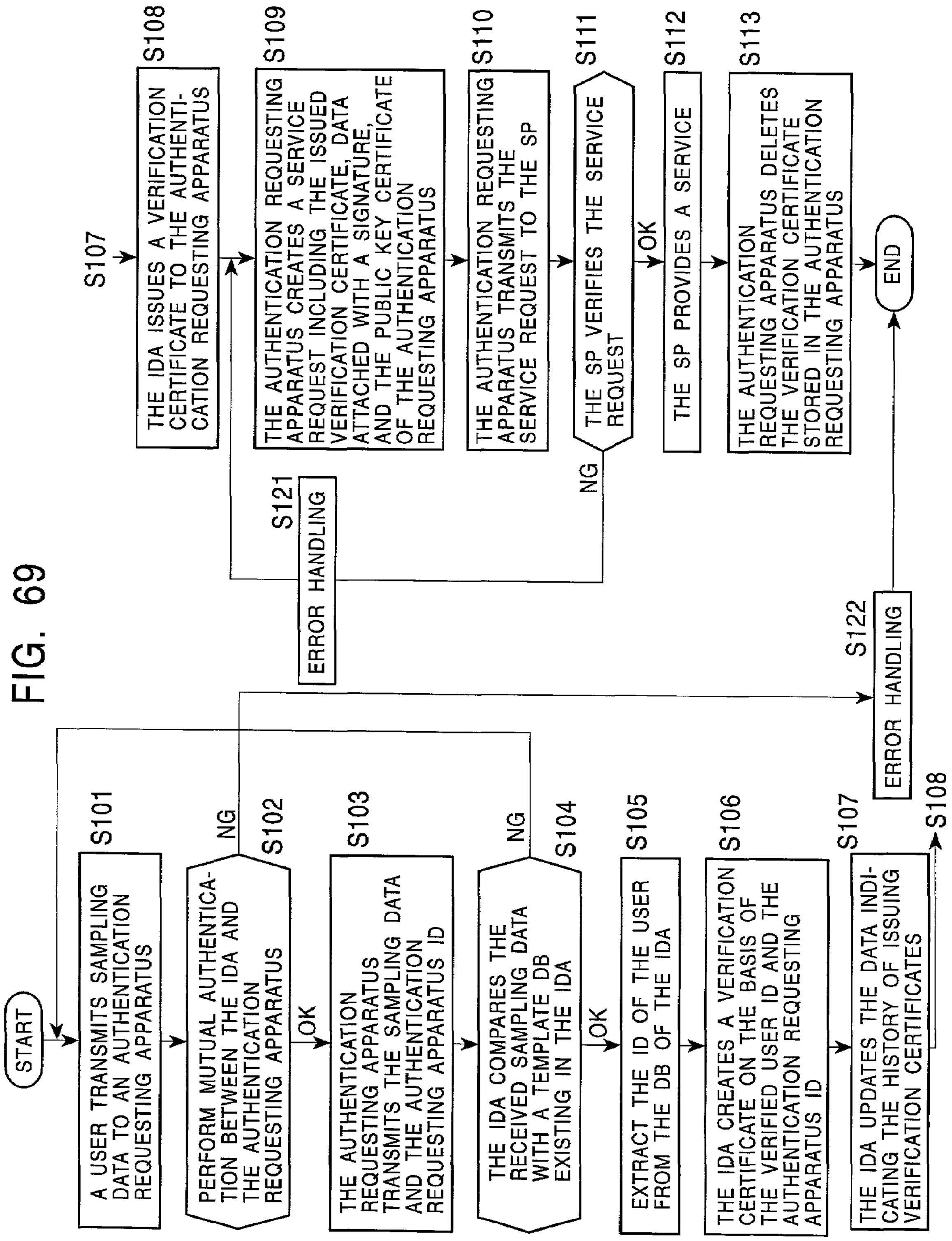
FIG. 69 is a flow chart of a process of using a verification certificate.

FIG. 68 illustrates a first usage manner in which a verification certificate is used. In FIG. 68, the process proceeds in the order of numbers from 1 to 10. The further detailed flow is shown in FIG. 69. The process is described below with reference to FIGS. 68 and 69.

When a user wants to be subjected to person authentication, the user first transmits sampling data to a person certificate requesting apparatus (FIG. 69, S101). Herein, the person certificate requesting apparatus is, for example, a user device or a system capable of communicating with a service provider.

Thereafter, the person certificate requesting apparatus performs mutual authentication with a person identification certificate authority (IDA) (S102). Provided that the mutual authentication is successfully passed, the user certificate requesting apparatus transmits sampling data and the identifier (ID) of the person certificate requesting apparatus to the person identification certificate authority (IDA) (S103). In this data transmission, it is desirable that the data is encrypted using a session key generated in the authentication process or using the public key of the person identification certificate authority (IDA). If the mutual authentication fails, error handling is performed (S122), but the following process is not performed.

Thereafter, the person identification certificate authority (IDA) extracts a template of the person identification certificate (IDC) of the user subjected to the person authentication, stored in a database of the person identification certificate authority (IDA) and compares it with the received sampling data. If the verification fails, the following process is not performed.

The person identification certificate authority (IDA) extracts the identifier (ID) of the user subjected to the person authentication from the database of the person identification certificate authority (IDA)(S105) and generates a verification certificate on the basis of the ID of the user whose authentication has been successfully passed (S106). Furthermore, the person identification certificate authority (IDA) updates the history of issuing verification certificates, that is, writes data indicating the date of issuing the certificate and the validity period thereof into the verification certificate issue history (S107). Thereafter, the person identification certificate authority (IDA) issues the verification certificate to the person certificate requesting apparatus.

Furthermore, the process described below is performed when the user requests a service provider to provide a service, using the issued verification certificate. The user, who has received the issued verification certificate, adds a signature to the verification certificate and to an electronic message such as service request data and further attaches the public key certificate thereby generating a service request (S109). The generated service request is transmitted to the service provider (S110).

The service provider extracts the public key from the received public key certificate and verifies the signature (S111). If it is determined that the data has not been tampered with, the service provider provides a service to the user (S112). Upon receiving the service, the person certificate requesting apparatus deletes the verification certificate (S113).

The sequence of steps shown in FIG. 69, that is, the process from step S101 in which sampling data is transmitted to step S113 in which the verification certificate is deleted, is automatically executed in accordance with a particular processing program which may be provided by the service provider. Thus, the verification certificate transmitted to the person certificate requesting apparatus is deleted from the person certificate requesting apparatus when the process is completed, thereby ensuring that the certificate is prevented from being used for another purpose. However, it is not necessarily required to delete the certificate, but the certificate may be used repeatedly for particular limited transactions.

Figure 70:
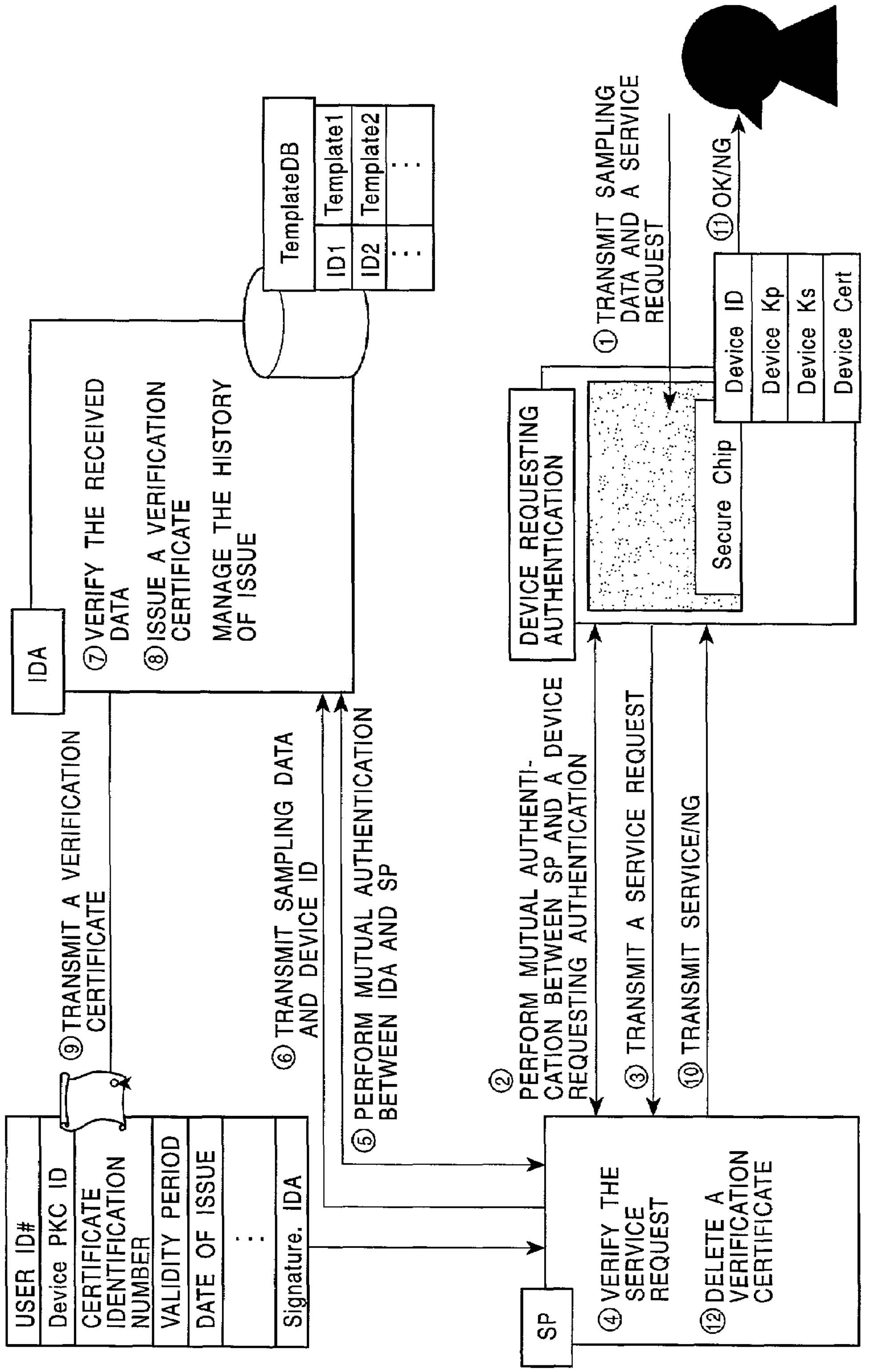
FIG. 70 is a diagram illustrating a second manner of using a verification certificate.

FIG. 70 illustrates a second manner of using a verification certificate. In this example, unlike the example shown in FIG. 68, a service provider acquires a verification certificate of a user to whom a service is to be provided.

A user, who wants to request a service provider to provide a service to the user, generates a request data including a service request and sampling data such as fingerprint using a certificate requesting apparatus and writes a signature therein. Thereafter, mutual authentication is performed between the certificate requesting apparatus and the service provider. If it is determined that the mutual authentication has been successfully passed, the service provider transmits the generated request data.

Upon receiving the request data, the service provider verifies the signature to check whether or not the data has been tampered with. If it is determined that the data has not been tampered with, mutual authentication is performed between the person identification certificate authority (IDA) and the service provider. Thereafter, the service provider transmits the sampling data received from the user and the ID of the certificate requesting apparatus together with an attached signature of the service provider.

The person identification certificate authority (IDA) verifies the received data to confirm that the data has not been tampered with. Thereafter, the person identification certificate authority (IDA) compares the received sampling data with the template. If it is determined that they match with each other, the person identification certificate authority (IDA) generates a verification certificate. Furthermore, the person identification certificate authority (IDA) generates issue history data and stores it.

The generated verification certificate is transmitted to the service provider. On the basis of the received verification certificate, the service provider determines that the authenticity of the user who has generated the service request has been certified, and the service provider notifies the certificate requesting apparatus and the user that the requested service is to be provided. The service provider deletes the verification certificate, and the process is ended.

FIG. 71 shows an example of a format of the verification certificate. Respective data items are described below.

Version indicates the version of the verification certificate format.

Serial Number indicates a serial number assigned by a person identification authority (IDA) to a verification certificate.

In Signature algorithm Identifier algorithm parameter, the signature algorithm of the verification certificate and parameters thereof are described. Either the elliptic curve cryptography or the RSA can be used as the signature algorithm, wherein in the case where the elliptic curve cryptography is employed, parameters and the key length are described, while the key length is described in the case where the RSA is employed.

Issuer is a field in which the issuer of the verification certificate, that is, the name of the person identification certificate authority (IDA) is described in the form of a distinguished name.

Validity is a field to describe a period during which the certificate is valid, wherein a start date and an expiration date are described.

Subject is a field in which the name of a subject or a user is described. In this field, more specifically, the ID or the name of the user is described.

In Subject IDA Info, person identification certificate information of the user, such as the certificate number of the person identification certificate and the unique ID of the person, is described.

In Subject PKC Infor, the public key certificate information of the person to be certificated, such as the certificate number of the public key certificate of the person to be certificated and the unique ID of the person of the public key certificate of the person to be certificate, is described.

The digital signature is data which is created by generating a hash value by applying a hash function to all fields of the certificate and then encrypting the resultant hash value using the public key of the person identification certificate authority (IDA).

As described above, the verification certificate includes the public key certificate information and the person identification certificate information so that links to the public key certificate and the person identification certificate can be formed. The identification data of the person to be certified is also included.

[11. Downloading of Person Identification Certificate (IDC) and Usage of a Content]

When a user uses a device in which a person identification certificate (IDC) of that user is not stored, the user can receive a service such as distribution of a content by performing user authentication using a person identification certificate (IDC) which has already been registered in a person identification certificate authority (IDA), as is described below.

A user, who wants to receive various contents such as music data or image data from a service provider, does not necessarily use a single user terminal (user device) but, in some cases, uses a plurality of devices. For example, the user may use a device installed in his/her home, a device installed in a company, and a device which is opened for use by a plurality of unspecified users.

To perform person authentication using the above-described person identification certificate (IDC), it is required to access the person identification certificate. For example, if a user device that a user A frequently uses includes a person identification certificate (IDC), person authentication can be performed using the stored IDC. However, it is not realistic that the device installed in the company or the device which is opened for use by a large number of unspecified users include person identification certificates (IDCs) of all possible users. In the device in such a situation, person authentication may be performed using person identification certificates (IDC) which have already been registered in a person identification certificate authority (IDA) to receive a content in accordance with the person authentication, as is described below.

Figure 72:
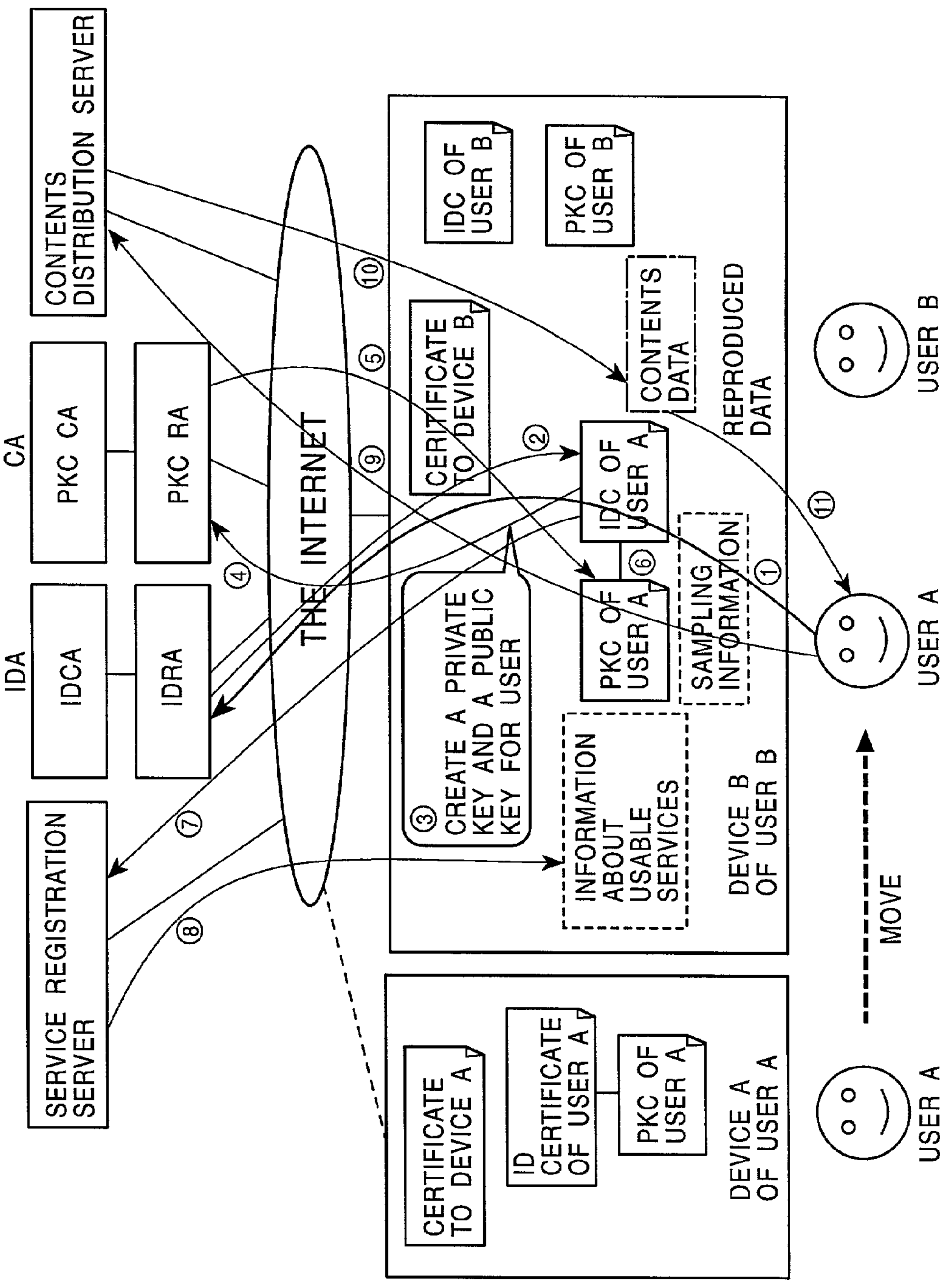
FIG. 72 is a diagram illustrating a process in which person authentication is performed using a person identification certificate (IDC) which has already been registered in a person identification certificate authority (IDA), and a content is distributed in accordance with the person authentication.
Figure 73:
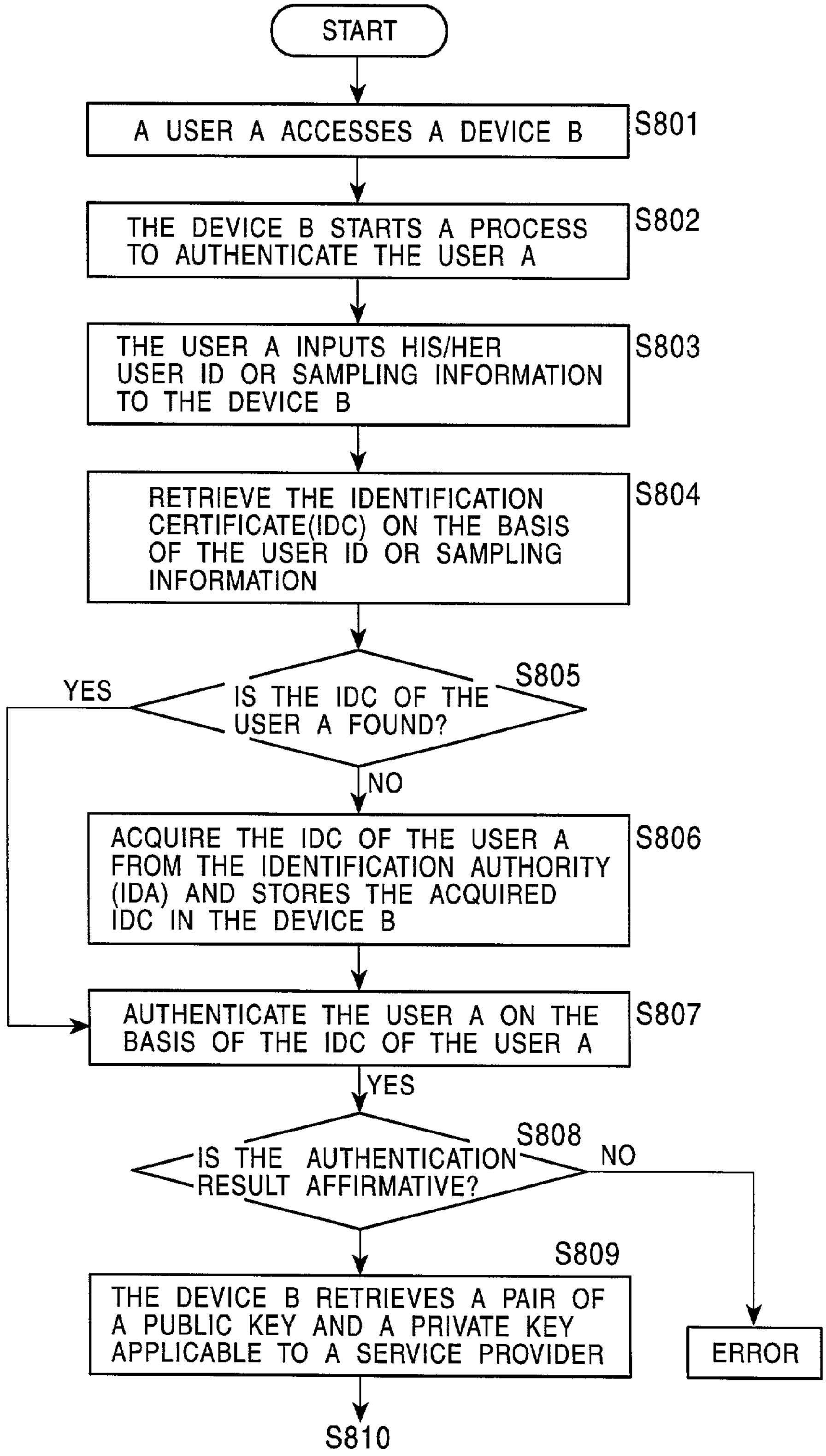
FIG. 73 is a flow chart of a process in which a content is distributed after performing person authentication using an IDC and performing mutual authentication using a PKC.
Figure 74:
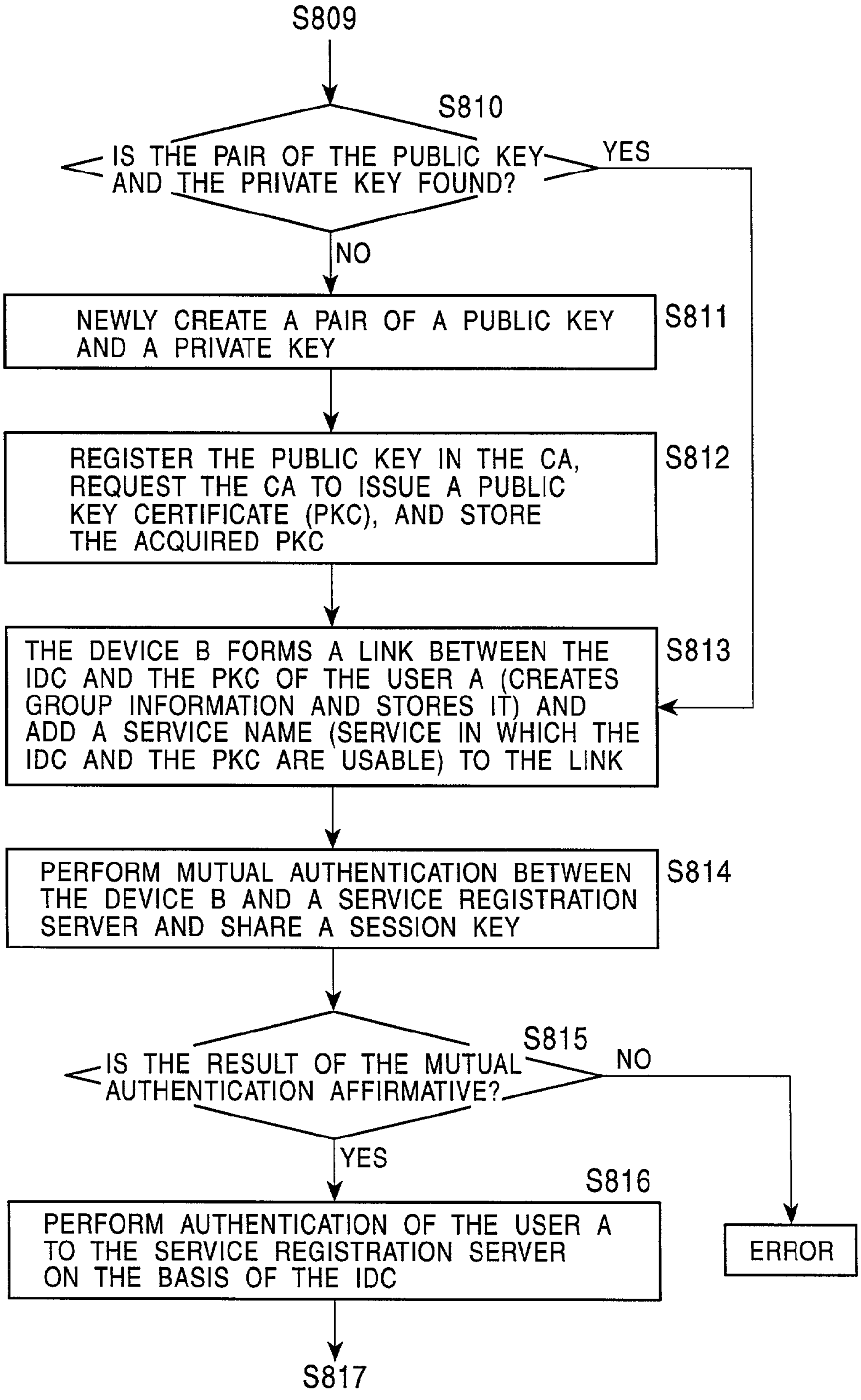
FIG. 74 is a flow chart of a process in which a content is distributed after performing person authentication using an IDC and performing mutual authentication using a PKC.
Figure 75:
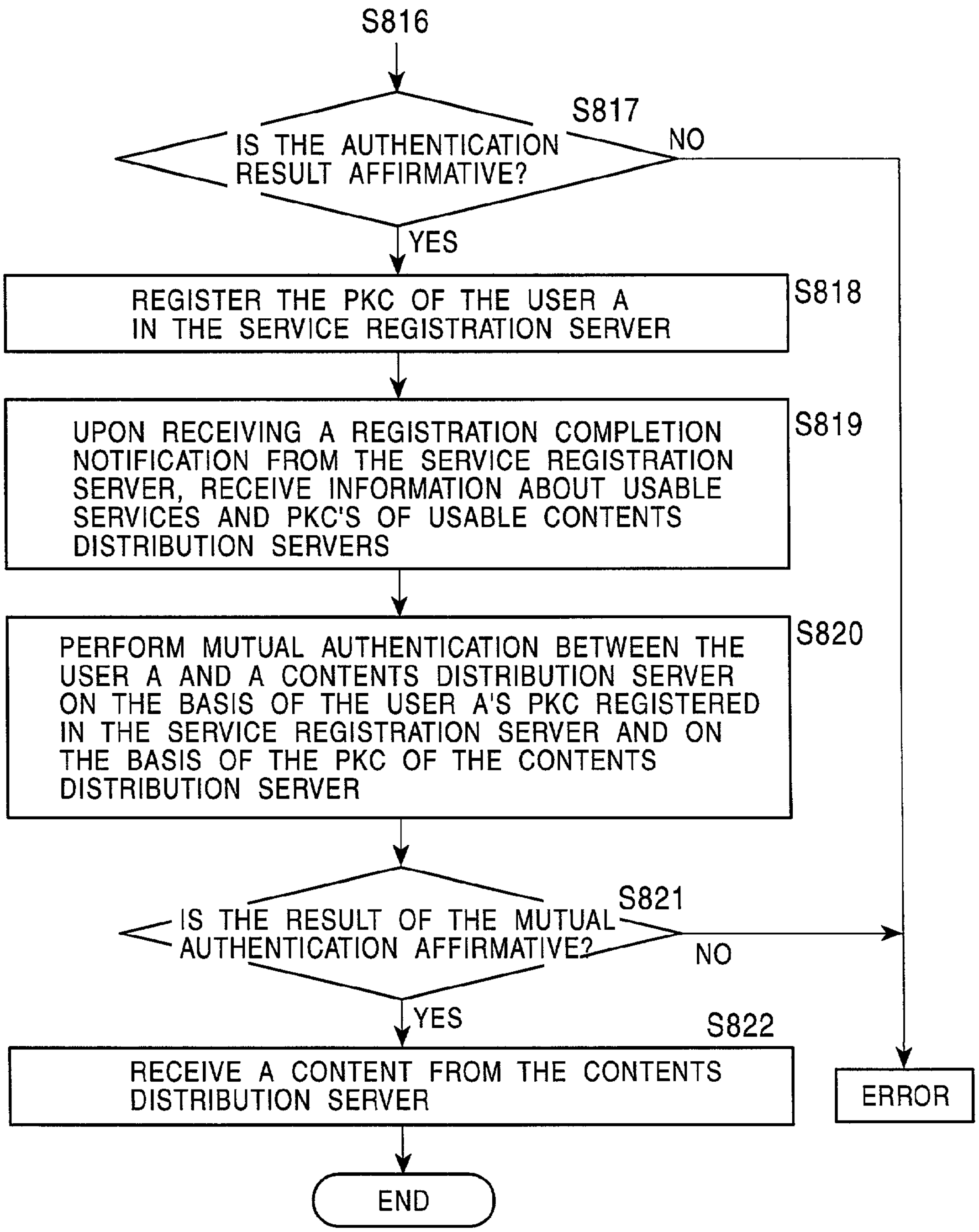
FIG. 75 is a flow chart of a process in which a content is distributed after performing person authentication using an IDC and performing mutual authentication using a PKC.

FIG. 72 shows a process in which person authentication is performed using a person identification certificate (IDC) which has already been registered in a person identification certificate authority (IDA), and, if the person authentication is successfully passed, a content is distributed to the user. In FIG. 72, the process proceeds in the order of numbers from 1 to 11. The further detailed flow is shown in FIGS. 73 to 75. The process is described below with reference to FIG. 72 and FIGS. 73 to 75.

As shown in FIG. 72, a user A executes a process such as reception of a content using a device A of the user A. To this end, the device A includes various certificates which are needed to receive a content. More specifically, a public key certificate (PKC) and a person identification certificate (IDC) of the user A and also a public key certificate (PKC)

of the device A are stored in the user device A. The user A can execute a mutual authentication process using various PKCs as required and also can execute a person authentication process using the IDC.

Herein, it is assumed that the user A receives a service such as distribution of a content using another device. In the specific example shown in FIG. 72, the user A uses a device B of a user B to receive a service. A public key certificate (PKC) and a person identification certificate (IDC) of the user B and a public key certificate (PKC) of the device B are stored in the user device B. Although the user B can execute mutual authentication and person authentication using these certificates, the user A, in some cases, cannot execute person authentication or mutual authentication using only the certificates stored in the device B. In such a case, the user A may receive a service of content distribution using the device B, if user authentication on the basis of an IDC and mutual authentication on the basis of a PKC are performed as described below.

When the user A wants to use the device B, the user A first accesses (activates) the device B (S801). To determine whether the access is from a user authorized to access the device B, the device B starts a person authentication process (S802). Thus, the user A is requested to input sampling information. In response, the user A inputs sampling information such as a fingerprint and a user ID to the device B (S803). The device B retrieves an IDC stored in a storage means in the device B on the basis of the user ID or the sampling information (S804). In this specific case, the IDC corresponding to the user A is not stored in the device B, and thus the IDC is not found. In this case, the device B requests a person identification certificate authority (IDA) to transmit the IDC of the user A. In this process, the device B executes mutual authentication with the person identification certificate authority (IDA) and transmits the user ID and the sampling information of the user A to the person identification certificate authority (IDA) after encrypting them using a session key created during the mutual authentication.

The person identification certificate authority (IDA) retrieves the person identification certificate (IDC) of the user A from a database of the person identification certificate authority (IDA) and transmits the retrieved person identification certificate (IDC) to the device B. The person identification certificate (IDC) includes template information which is stored in a form the device B can use. More specifically, for example, the template is encrypted using the public key of the device B. The device B stores the received person n identification certificate (IDC) of the user A in a memory of the device B (S806).

The device B makes a comparison with the sampling data using the person identification certificate (IDC) of the user A stored in the memory, that is, the device B performs person authentication (S807). If the comparison fails, error handling is performed but the following process is not performed.

If the person authentication is successfully passed, the device B retrieves a pair of a public key and a private key applicable to the service provided by the service provider (S809). In the data communication with various users for the user authentication or for other purposes, the service provider encrypts the data using a pair of a public key and a private key assigned to each user or each device. In this specific example, a pair of a public key and a private key solely for the user A is not stored in the device B, and thus the result of the decision step S810 becomes negative (No). Thus, the device B creates a new pair of a public key and a private key (S811).

Thereafter, the device B transmits the generated public key to a certificate authority (CA) to request it to issue a public key certificate, thereby acquiring the public key certificate (PKC) of the user A. The acquired PKC is stored in the device B (S812).

The device B then forms a link between the person identification certificate (IDC) and the public key certificate (PKC) of the user A. More specifically, for example, the link is formed by creating group information as is described earlier and stores it in the memory. In this process, the link information (group information) is related to service names which are allowed to be used using the IDC and the PKC and registered (S813). That is, to indicate which service provider or which content provider the set of the IDC and the PKC can be used to receive a service from, process identifiers such as provider identifiers or service identifiers are registered together with the link information.

Thereafter, the device B performs mutual authentication with a service registration server using the public key certificate (PKC) of the user A (S814). The service registration server is a server in which users of one or more service providers (such as a content distribution server) are registered. More specifically, public key certificates (PKCs) of respective users are registered so as to make it possible for a service provider connected to the service registration server to perform, using the registered PKCs, various encryption processes which are needed in, for example, authentication when a service is provided.

If the mutual authentication with the service registration server is successfully passed, authentication of the user A for the service registration server is performed using the person identification certificate (IDC) of the user A (S816). After completion of these steps, the service registration server registers the public key certificate (PKC) of the user A (S818). Note that, in the above process, the person authentication is executed as required, and it is not necessarily needed. For example, when a content is distributed, person authentication may be performed by a content distribution server.

The device B receives from the service registration server a message indicating that the public key certificate (PKC) of the user A has been registered, and furthermore the device B receives information about services which are available using the registered public key certificate (PKC) of the user A and also receives PKCs of content distribution servers (S819).

The following process is performed when a content is received from a content distribution server. In step S820, mutual authentication is performed using the PKC of the content distribution server and the PKC of the user A. If the mutual authentication is successfully passed, distribution of a content is performed (S822). In the above process, in response to receiving a request for a content from the device B, the content distribution server checks whether the PKC used in the mutual authentication performed in response to the request for the content is registered as a PKC for using the content in the service registration server. Only when the PKC is determined to be usable for the content, the distribution of the content is performed. In this specific example, because the public key certificate (PKC) of the user A has already been registered in the service registration server, the request for the content is accepted and the distribution of the content is performed.

As described above, even when a person identification certificate (IDC) and a public key certificate (PKC) of a user are not stored in a device, a user can receive a service from a service provider by downloading an IDC registered in the person identification certificate authority (IDA) into the device, receiving a public key certificate (PKC) from a certificate authority (CA) using a pair of a public key and a private key generated by the device, performing person authentication on the basis of the IDC, performing mutual authentication on the basis of the PKC, and performing encryption of data.

The process performed using the person identification certificate (IDC) and the public key certificate (PKC) assigned to a user has been described above. Now, a process performed using a person identification certificate (IDC) assigned to a user and a public key certificate (PKC) assigned to a device is described below.

Figure 76:
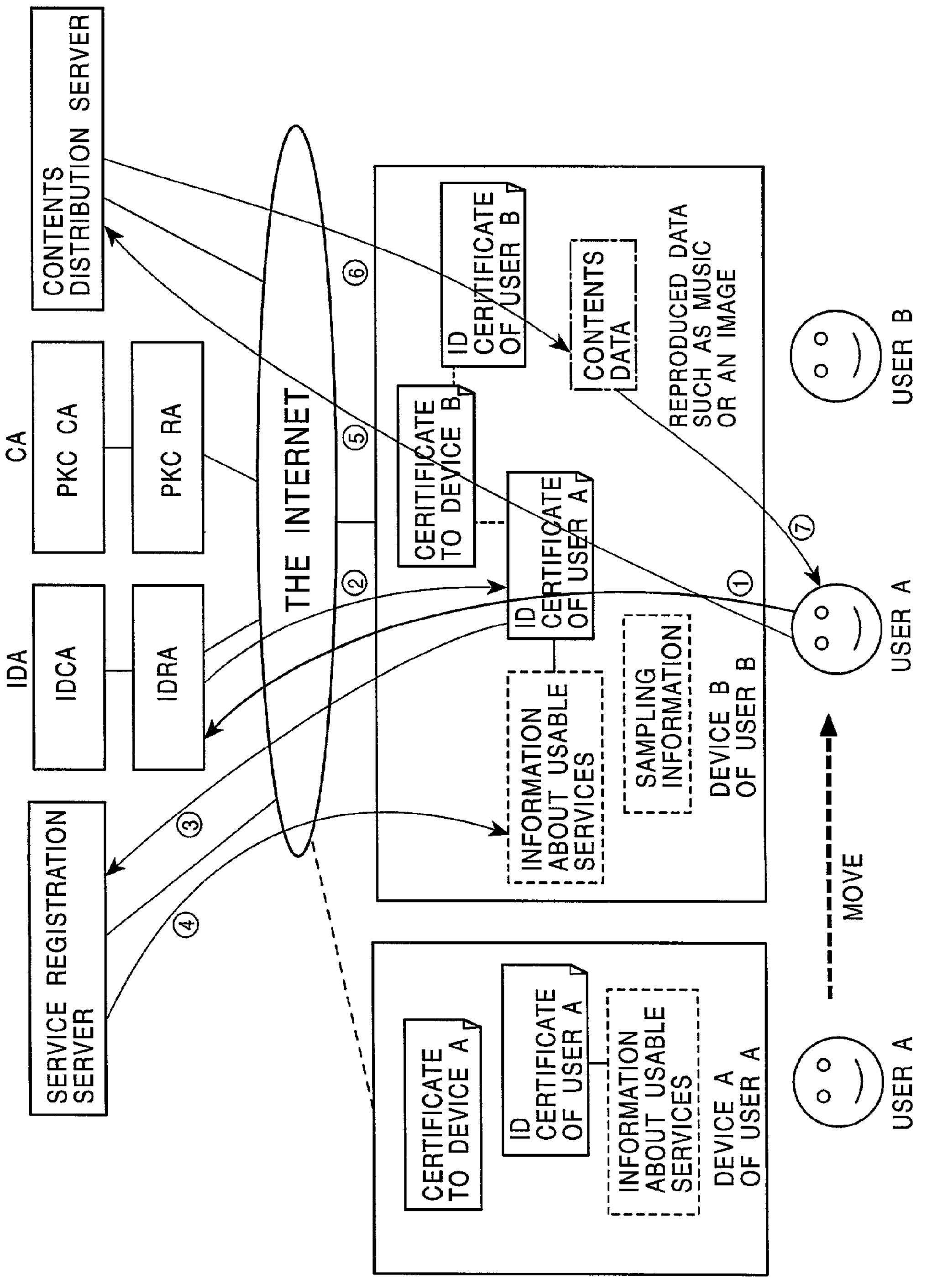
FIG. 76 is a diagram illustrating a process in which person authentication is performed using a user IDC and a device PKC and also using an IDC which has already been registered in a person identification certificate authority (IDA), and then a content is distributed to a user using the device PKC.
Figure 77:
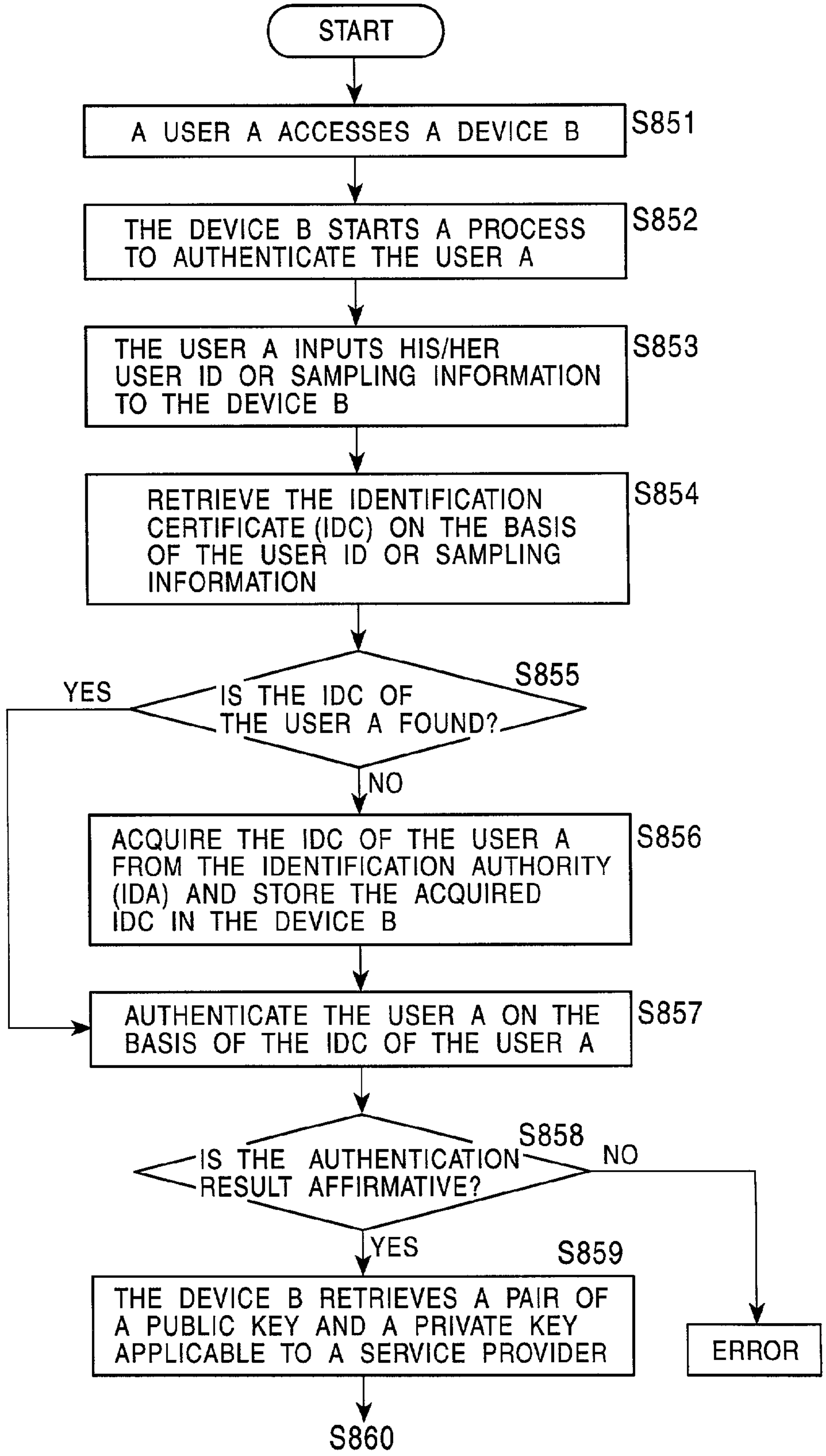
FIG. 77 is a flow chart illustrating a process in which person authentication is performed using a user IDC and a device PKC and also using an IDC which has already been registered in a person identification certificate authority (IDA), and then a content is distributed to a user using the device PKC.
Figure 78:
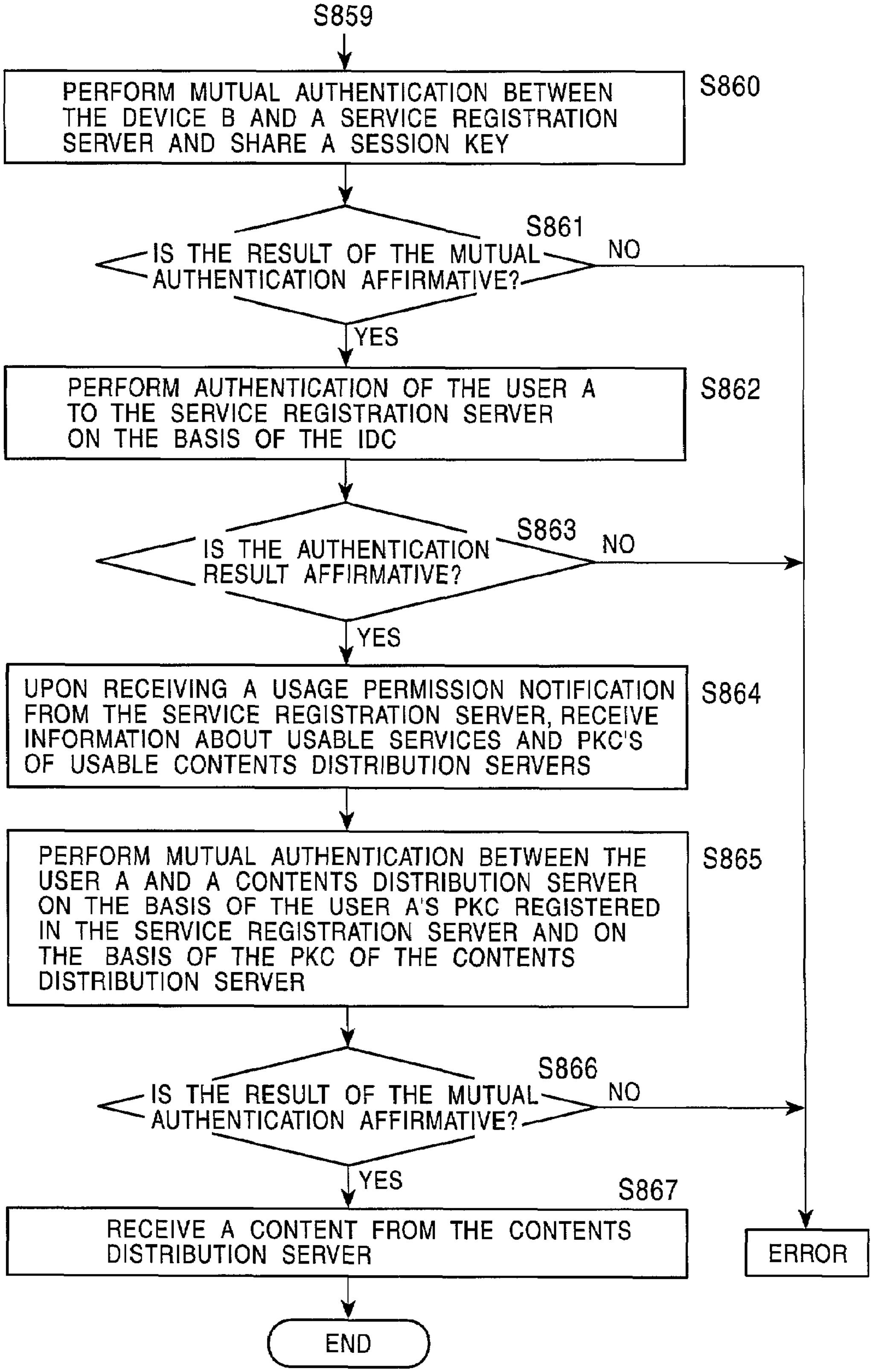
FIG. 78 is a flow chart illustrating a process in which person authentication is performed using a user IDC and a device PKC and also using an IDC which has already been registered in a person identification certificate authority (IDA), and then a content is distributed to a user using the device PKC.

FIG. 76 shows a process in which person authentication is performed using a person identification certificate (IDC) assigned to a user and a public key certificate (PKC) assigned to a device and also using a person identification certificate (IDC) which has already been registered in a person identification certificate authority (IDA), and then a content is distributed to the user using the public key certificate (PKC) assigned to the device. In FIG. 76, the process proceeds in the order of numbers from 1 to 6. The further detailed flow is shown in FIGS. 77 to 78. The process is described below with reference to FIG. 76 and FIGS. 77 to 78.

As shown in FIG. 76, a user A usually executes a process such as reception of a content using a device A of the user A. To this end, the device A includes various certificates which are needed to receive a content. More specifically, a public key certificate (PKC) and a person identification certificate (IDC) of the user A and also a public key certificate (PKC) of the device A are stored in the user device A. The user A can execute a mutual authentication process using various PKCs as required and also can execute a person authentication process using the IDC.

Herein, it is assumed that the user A receives a service such as distribution of a content using another device. In the specific example shown in FIG. 76, the user A uses a device B of a user B to receive a service. A person identification certificate (IDC) of the user B and a public key certificate (PKC) of the device B are stored in the user device B. Although the user B can mutual authentication and person authentication using these certificates, the user A cannot execute person authentication using only the certificates stored in the device B. Even in such a case, the user A can receive a content using the device B by performing a process shown in FIG. 77 and the following figure, in which person authentication is performed using an IDC and mutual authentication is performed using a PKC.

When the user A wants to use the device B, the user A first accesses (activates) the device B (S851). To determine whether the access is from a user authorized to access the device B, the device B starts a person authentication process (S852). Thus, the user A is requested to input sampling information. In response, the user A inputs sampling information such as a fingerprint and a user ID to the device B (S853). The device B retrieves an IDC stored in the device B on the basis of the user ID or the sampling information (S854). In this specific case, the IDC corresponding to the user A is not stored in the device B, and thus the IDC is not found. In this case, the device B requests a person identification certificate authority (IDA) to transmits the IDC of the user A. In this process, the device B executes mutual authentication with the person identification certificate authority (IDA) and transmits the user ID and the sampling information of the user A to the person identification certificate authority (IDA) after encrypting them using a session key created during the mutual authentication.

The person identification certificate authority (IDA) retrieves the person identification certificate (IDC) of the user A from a database of the person identification certificate authority (IDA) and transmits the retrieved person identification certificate (IDC) to the device B. The person identification certificate (IDC) includes template information which is stored in a form the device B can use. More specifically, for example, the template is encrypted using the public key of the device B. The device B stores the received person n identification certificate (IDC) of the user A in a memory of the device B (S856).

The device B makes a comparison with the sampling data using the person identification certificate (IDC) of the user A stored in the memory, that is, the device B performs person authentication (S857). If the verification fails, an error is returned and the following process is not performed.

If the person authentication is successfully passed, the device B retrieves a pair of a public key and a private key applicable to the service provided by the service provider (S859). In the data communication with various users for the user authentication or for other purposes, the service provider encrypts the data using a pair of a public key and a private key assigned to each user or each device. Herein, a pair of a public key and a private key of the device B is usable. The device B performs mutual authentication with a service registration server using the public key certificate (PKC) of the user A (S814). The service registration server is a server in which users of one or more service providers (such as a content distribution server) are registered. More specifically, public key certificates (PKCs) of respective users are registered so as to make it possible for a service provider connected to the service registration server to perform, using the registered PKCs, various encryption processes which are needed in, for example, authentication when a service is provided. Herein, it is assumed that the service registration server registers public key certificates (PKCs) of respective devices, or public key certificates (PKCs) of respective devices and person identification certificates (IDCs) of respective users.

If the mutual authentication with the service registration server is successfully passed, authentication of the user A for the service registration server is performed using the person identification certificate (IDC) of the user A (S862). After completion of the above process, the device B receives from the service registration server a message indicating that services are now available and further receives information about what services are available and also receives PKCs of content distribution servers (S864).

The following process is performed when a content is received from a content distribution server. In step S865, mutual authentication is performed using the PKC of the content distribution server and the PKC of the device B. If the mutual authentication is successfully passed, distribution of a content is performed (S867). In the above process, in response to receiving a request for a content from the device B, the content distribution server checks whether the PKC used in the mutual authentication performed in response to the request for the content is registered as a PKC for using the content in the service registration server. Only when the PKC is determined to be usable for the content, the distribution of the content is performed. In this specific example, because the public key certificate (PKC) of the device B has already been registered in the service registration server, the request for the content is accepted and the distribution of the content is performed.

As described above, even when a person identification certificate (IDC) and a public key certificate (PKC) of a user is not stored in a device, a user can receive a service from a service provider by downloading an IDC registered in the person identification certificate authority (IDA) into the device, performing person authentication on the basis of the IDC using the public key certificate (PKC) of the device stored in that device, performing mutual authentication on the basis of the PKC, and performing encryption of data.

[12. Setting the Validity Period of Person Identification Certificate (IDC)]

As described above, a person identification certificate (IDC) includes template information for identifying a person, such as fingerprint information, a password, or other personal information. Although the template information is encrypted, there is still a non-zero possibility that the template information may be decrypted or tampered with. From this viewpoint, it is undesirable that there are a large number of uncontrolled person identification certificates (IDCs). It is important to control the person identification certificates (IDCs) which are issued by person identification certificate authorities (IDAs) and used by user devices (UDs) or service providers (SPs).

Now, there is described a method of managing IDCs so as to prevent an IDC and a template from remaining in a state in which the IDC or the template can be used for a limitless period, by setting the validity information of a person identification certificate (IDC), and more particularly, by setting the period during which the IDC is valid or the maximum number of times the IDC is allowed to be used. By setting the validity period, it becomes possible to examine a user at scheduled intervals, and it also becomes possible to easily check the validity of a user to whom a person identification certificate (IDC) has issued.

Figure 79:
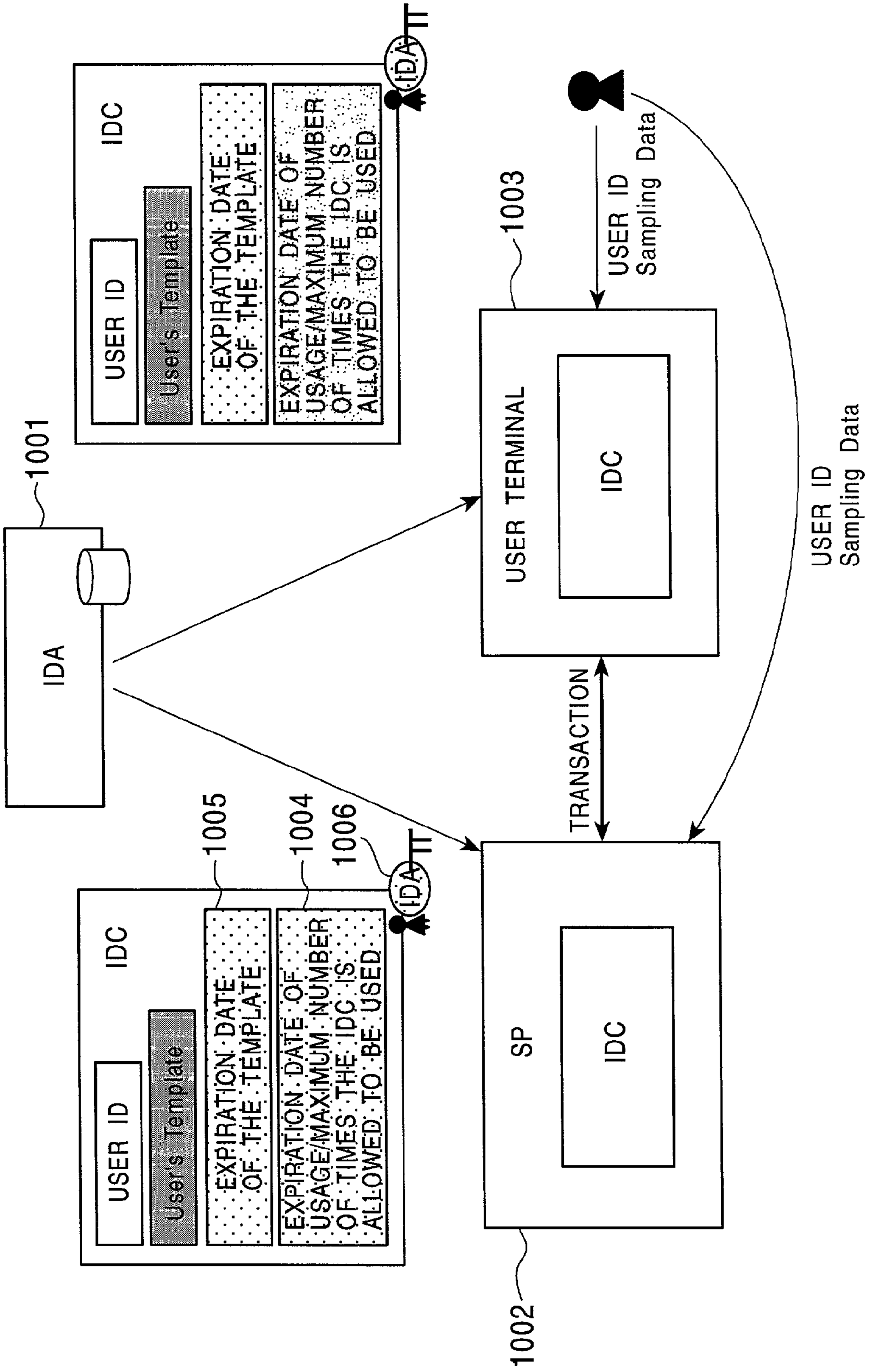
FIG. 79 is a diagram illustrating a person identification certificate (IDC) in which validity information (expiration date and the number of times the IDC is allowed to be used) of the person identification certificate (IDC) and also the expiration date of template information stored in the IDC are set.

FIG. 79 illustrates a person identification certificate (IDC) in which validity information (expiration date and the number of times the IDC is allowed to be used) of the person identification certificate (IDC)) and also the expiration date of template information stored in the IDC are set. A person identification certificate authority (IDA) 1001 issues a person identification certificate (IDC) of an user and distributes it to an entity which executes person authentication, such as a service provider (SP)1002 and a user terminal 1003. In the service provider (SP) 1002 and the user terminal 1003, the person identification certificate (IDC) issued by the IDA is stored and is used in person authentication in which sampling information given by a user is compared with information described in the IDC.

As shown in FIG. 79, the person identification certificate (IDC) issued by the person identification certificate authority (IDA) 1001 includes “expiration date or number of times the IDC is allowed to be used” 1004 and “expiration date of template” 1005, wherein a signature 1006 using a private key of the person identification certificate authority (IDA) is attached to the whole of the IDC. When a service provider 1002 or a user device 1003 receives a person identification certificate (IDC), the service provider 1002 or the user device 1003 verifies the signature 1006 using the public key of the person identification certificate authority (IDA) 1001 to check whether or not the person identification certificate (IDC) has been tampered with.

The “expiration date or the number of times the IDC is allowed to be used” 1004 stored in the person identification certificate (IDC) is data indicating the validity of the IDC itself. The expiration date or the number of times the IDC is allowed to be used is set by the person identification certificate authority (IDA) 1001 which issues the person identification certificate (IDC) and is stored in the IDC. Even for IDCs in which the template information of the same user is stored, the person identification certificate authority (IDA) 1001 may set different “expiration date or the number of times the IDC is allowed to be used” depending upon service provider or user devices to which the IDCs are provided. When a service provider or a user device performs person authentication using an IDC, the “expiration date or the number of times the IDC is allowed to be used” stored in the person identification certificate (IDC) is verified before making a comparison with sampling information. Only when the expiration date or the number of times the IDC is allowed to be used is met, the comparison is performed.

The “expiration date of template” 1005 stored in the person identification certificate (IDC) is data indicating the expiration date of the template information stored in the IDC. The “expiration date of template” is set by the person identification certificate authority (IDA) 1001 which issues the person identification certificate (IDC) or by a user himself/herself who provides personal data on the basis of which the template information is generated. In the case where the expiration date of the template information is set by an user, the user sends the expiration date information together with the person identification data to the person identification certificate authority (IDA) 1001, which in turn sets the expiration date of the template information in accordance with the received expiration date information and stores it in the IDC. When a service provider or a user device performs person authentication using an IDC, the “expiration date or the number of times the IDC is allowed to be used” stored in the person identification certificate (IDC) and also the “expiration date of template” of the template information are verified before comparing sampling information with the template stored in the IDC. Only when the expiration date of the IDC and the expiration date of the template are met, the comparison is performed.

Figure 80A:
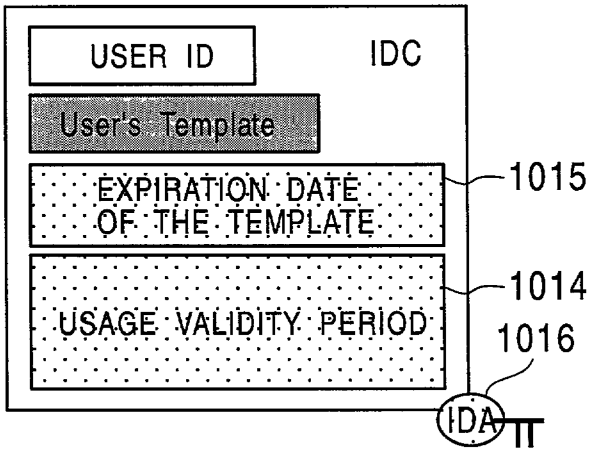
FIGS. 80A and 80B are diagrams illustrating manners of managing the "expiration date or the number of times the IDC is allowed to be used" and the "expiration date of template" of the template information stored in a person identification certificate (IDC)
Figure 80B:
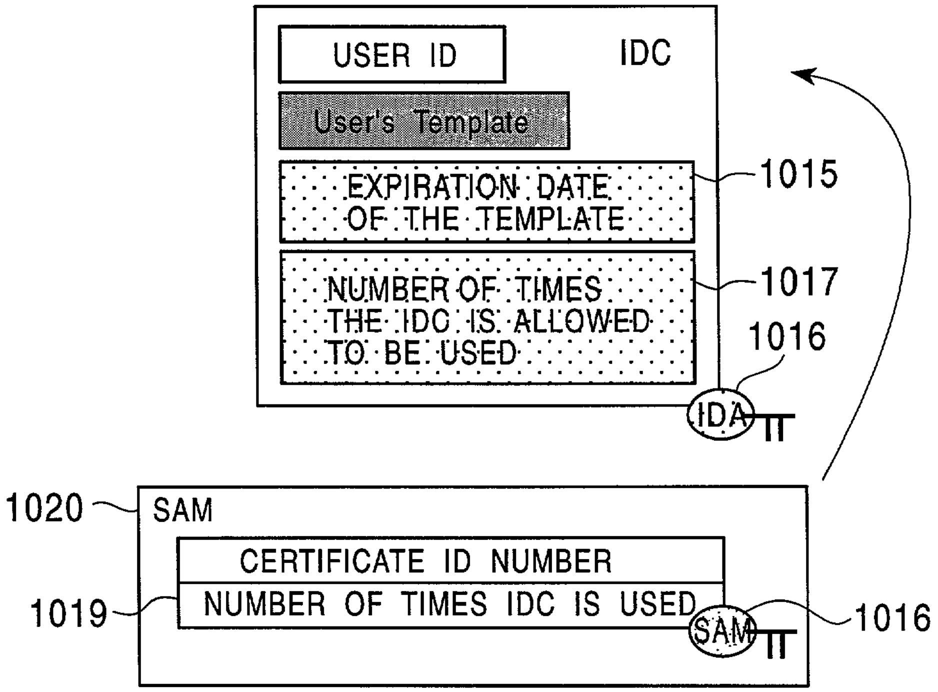

FIGS. 80A and 80B illustrate manners of managing the “expiration date or the number of times the IDC is allowed to be used” and the “expiration date of template” of the template information stored in the person identification certificate (IDC). FIG. 80A illustrates an example in which the expiration date of the IDC 1014 and the expiration date of the template 1015 are stored, and FIG. 80B illustrates an example in which the number of times the IDC is allowed to be used 1017 and the expiration date of the template 1015 are stored.

When a service provider or a user device stores into a storage device thereof an IDC, shown in FIG. 80A, in which the expiration date of the IDC 1014 and the expiration date of the template 1015 are stored, the IDC is stored after verifying the signature 1016 of the IDC to confirm that the data has not been tampered with. On the other hand, when person authentication is performed using the stored IDC, the expiration date of the IDC 1014 and the expiration date of the template 1015 stored in the IDC are verified before making a comparison with sampling information given by an user. Only in the case where the expiration dates have not been reached, the following process is performed. In the case where either expiration date has been exceeded, error handling is performed and the comparison with the sampling information is not performed.

When a service provider or a user device stores into a storage device thereof an IDC, shown in FIG. 80B, in which the number of times the IDC is allowed to be used 1917 and the expiration date of the template 1015 are stored, the IDC is stored after verifying the signature 1016 of the IDC to confirm that the data has not been tampered with. Furthermore, the SAM information indicating the count of usage of the IDC 1019 set in the IDC is stored in a SAM (Secure Application Module) of the device. In the data stored therein, a signature 1018 is written using a private key of the SAM so as to prevent the data from being tampered with. On the other hand, when person authentication is performed using the stored IDC, the expiration date of template 1015 stored in the IDC and also the SAM information indicating the count of times the IDC is used 1019 stored in the SAM 1020 are verified before making a comparison with sampling information given by an user. Only when the expiration date of the template has not been reached and when the count of usage of the IDC is not equal to zero, the comparison is performed. If the expiration date has been exceeded, or if the count of usage of the IDC is equal to zero, error handing is performed and the comparison with the sampling information is not performed. In the case where the comparison with the sampling information was performed, the count of usage of the IDC stored in the SAM is reduced (decremented) by one.

Figure 81:
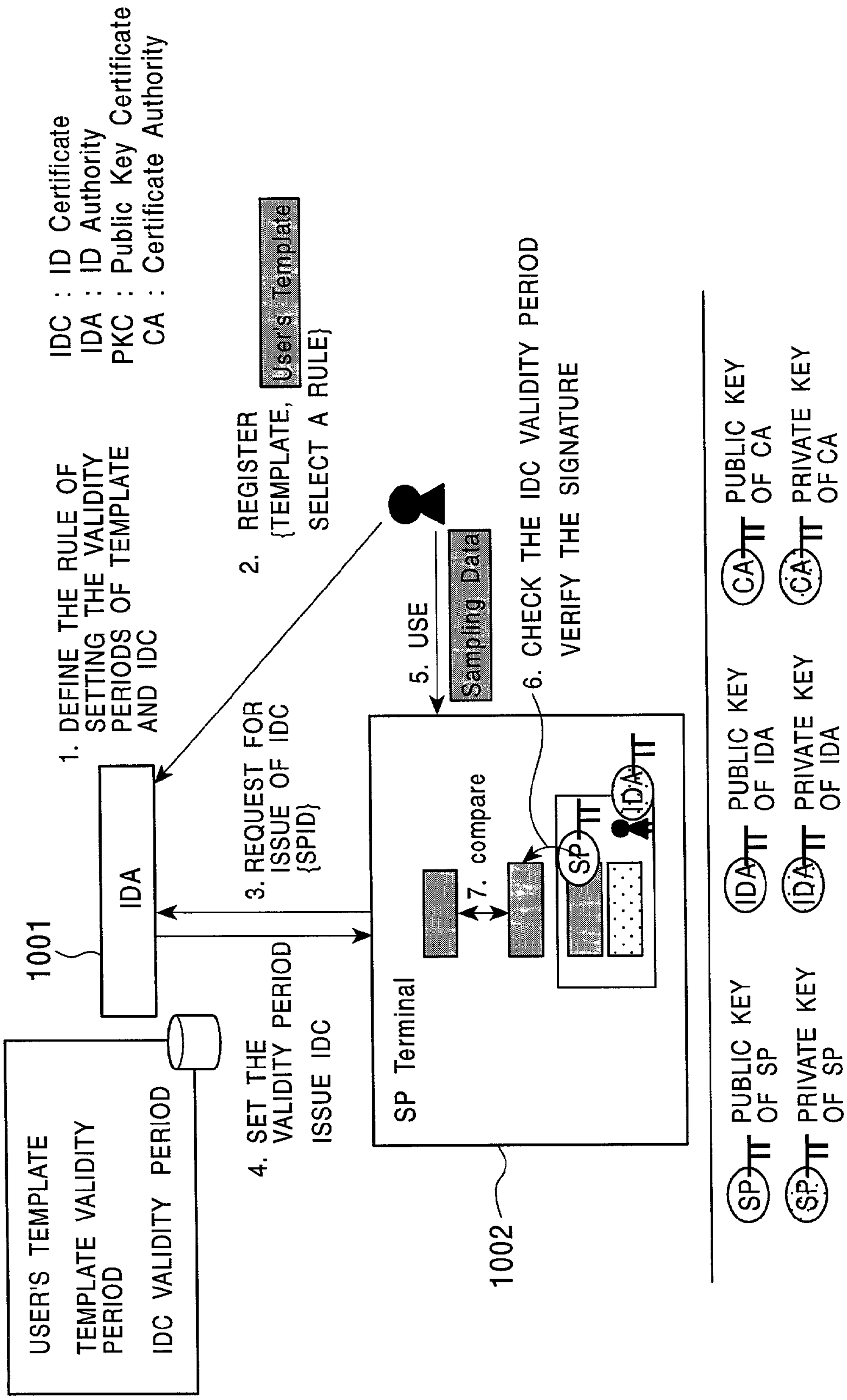
FIG. 81 is a diagram illustrating a manner of managing the expiration date of the IDC and the expiration date of the template.

FIG. 81 illustrates a manner of managing the expiration date of the IDC and the expiration date of the template. First, a person identification certificate authority (IDA) 1001 which issues a person identification certificate (IDC) determines the rule of setting the expiration date of the IDC and the expiration date of the template. A user, who wants a person identification certificate (IDC) to be issued, provides person identification information and personal information needed to issue an IDC to the person identification certificate authority (IDA) 1001. The person identification certificate authority (IDA) 1001 performs user authentication and verifies the data. If it is determined that the IDC issue request is valid, the person identification certificate authority (IDA) newly issues a person identification certificate (IDC). In the case where the process is performed online, mutual authentication is performed, a signature is added to data to be transmitted, and verification is performed. When a user wants to specify the expiration date of the template, the user sends his/her personal information to the IDA and furthermore informs the IDA of the desired date to be set as the expiration date. The IDA sets the expiration date of the template in the IDC in accordance with the specified date.

When a service provider 1002 has a transaction with an user, the service provider 1002 requests a person identification certificate authority (IDA) 1001 to issues an IDC for use in user authentication. The person identification certificate authority (IDA) 1001 issues to the service provider 1002 a person identification certificate (IDC) in which the expiration date of the IDC and the expiration date of the template are set. The issued person identification certificate (IDC) includes a signature written using a private key of the person identification certificate authority (IDA) 1001. When communication is performed between the service provider 1002 and the person identification certificate authority (IDA) 1001, mutual authentication is performed, a signature is added to data to be transmitted, and verification is performed.

After verifying the signature using the public key, stored in the service provider 1002, of the person identification certificate authority (IDA) 1001, the service provider 1002 stores the IDC in a memory. To authenticate an user, the IDC expiration date and the template expiration date described in the IDC are verified before making a comparison with sampling information. Only when the expiration dates have not been reached, the service provider 1002 accepts sampling information from a user and performs a comparison process. In the example shown in FIG. 81, the template information of the person identification certificate (IDC) is encrypted using the public key of the service provider, and thus the template is extracted from the IDC by performing decryption using the private key of the service provider and is used for comparison. If the user authentication is successfully passed, transaction with the user, such as providing of a content, is performed.

Figure 82:
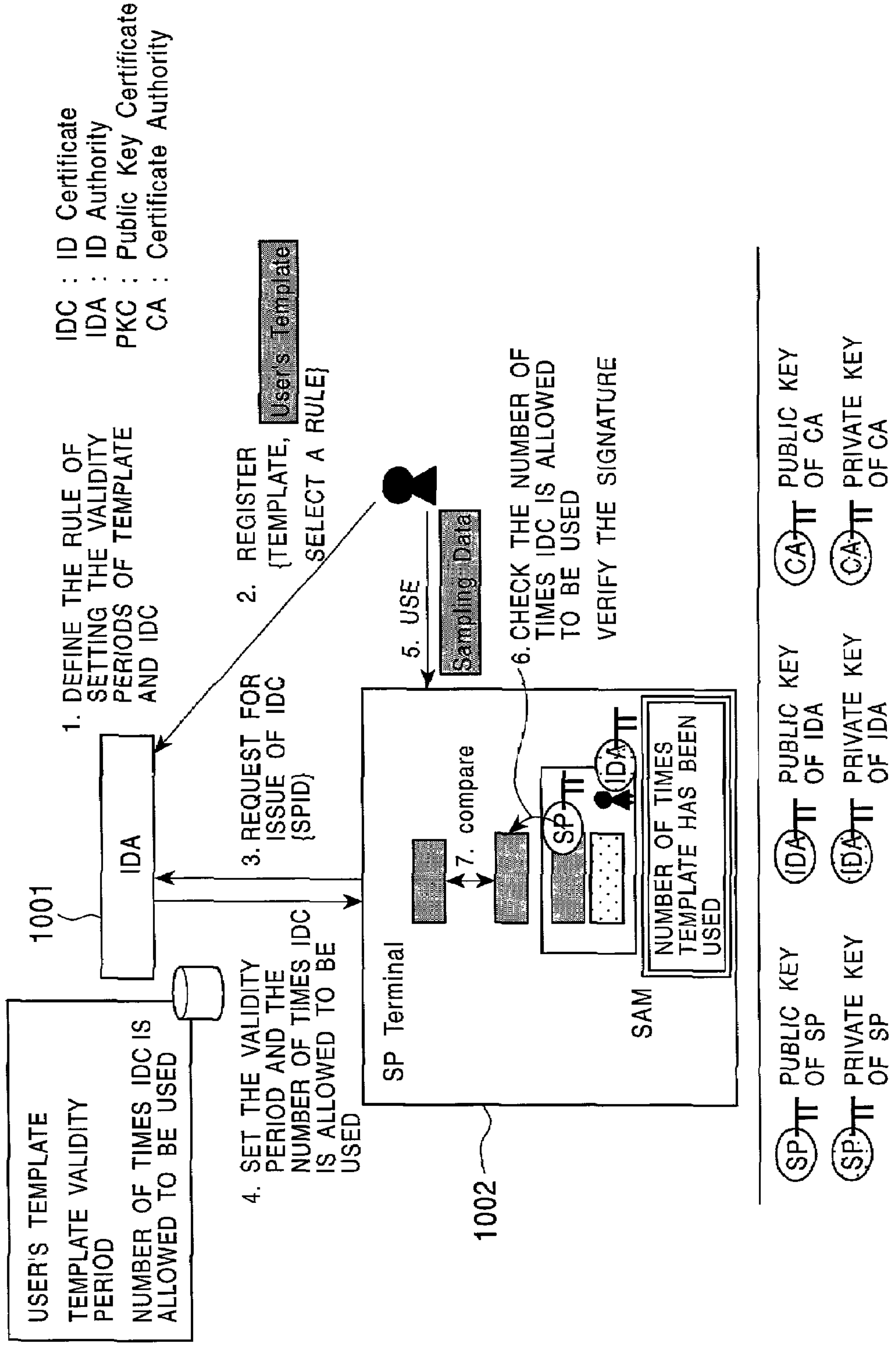
FIG. 82 is a diagram illustrating a manner of managing the number of times the IDC is allowed to be used and the template expiration date.

FIG. 82 illustrates a manner of managing the number of times the IDC is allowed to be used and the template expiration date. First, a person identification certificate authority (IDA) 1001 which issues a person identification certificate (IDC) determines the rule of setting the expiration date of the IDC and the expiration date of the template. A user, who wants issue of a person identification certificate (IDC), provides personal information needed to issue an IDC to the person identification certificate authority (IDA) 1001. The person identification certificate authority (IDA) 1001 performs user authentication and verifies the data. If it is determined that the IDC issue request is valid, the person identification certificate authority (IDA) newly issues a person identification certificate (IDC). When a user wants to specify the expiration date of the template, the user sends his/her personal information to the IDA and furthermore informs the IDA of the desired date to be set as the expiration date. The IDA sets the expiration date of the template in the IDC in accordance with the specified date.

When a service provider 1002 has a transaction with an user, the service provider 1002 requests a person identification certificate authority (IDA) 1001 to issues an IDC for use in user authentication. The person identification certificate authority (IDA) 1001 issues to the service provider 1002 a person identification certificate (IDC) in which the number of times the IDC is allowed to be used and the template expiration date are set. The issued person identification certificate (IDC) includes a signature written using a private key of the person identification certificate authority (IDA) 1001.

After verifying the signature using the public key, stored in the service provider 1002, of the person identification certificate authority (IDA) 1001, the service provider 1002 stores the IDC in a memory. Furthermore, the count of usage of the IDC, set in the IDC, is stored in a SAM (Secure Application Module) of the service provider 1002. On the other hand, when person authentication is performed using the stored IDC, the template expiration date stored in the IDC is verified and furthermore the count of usage of the IDC stored in the SAM of the service provider 1002 is verified before making a comparison with sampling information given by an user. Only when the expiration date of the template has not been reached and when the count of usage of the IDC is not equal to zero, the comparison is performed. If the expiration date has been exceeded, or if the count of usage of the IDC is equal to zero, error handing is performed and the comparison with the sampling information is not performed. In the case where the comparison with the sampling information was performed, the count of usage of the IDC stored in the SAM is reduced (decremented) by one. In the example shown in FIG. 82, in the process of acquiring the person identification certificate (IDC), the user template is encrypted using the public key of the service provider, and thus the template is extracted from the IDC by performing decryption using the private key of the service provider and is used for comparison. If the user authentication is successfully passed, transaction with the user, such as providing of a content, is performed.

Figure 83:
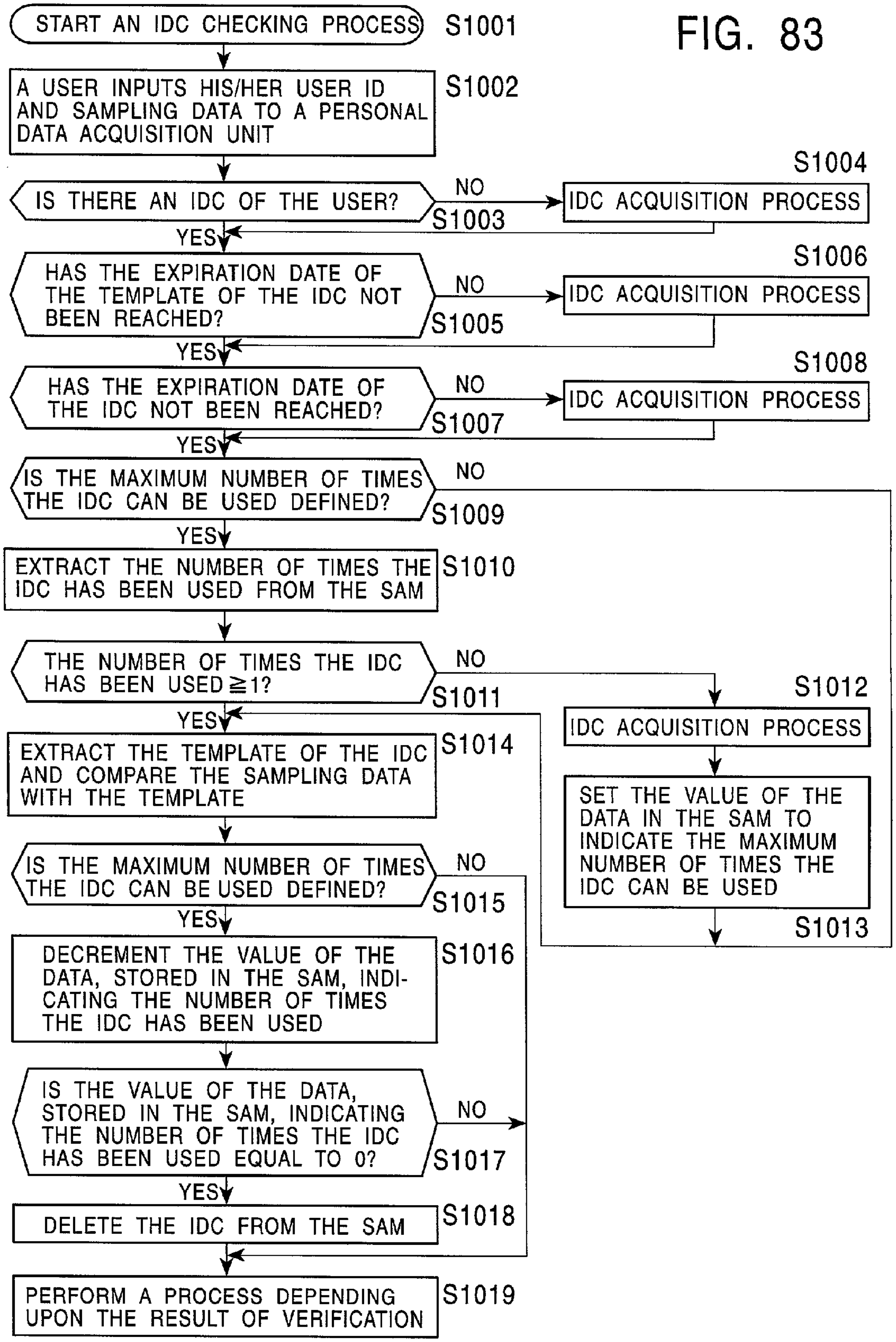
FIG. 83 is a flow chart illustrating a process of controlling the usage of an IDC in accordance with the "expiration date or number of times the IDC is allowed to be used" and "expiration date of template" described in a person identification certificate (IDC)

Referring to FIG. 83, the process of controlling the usage of an IDC in accordance with the "expiration date or number of times the IDC is allowed to be used" and "expiration date of template" of the person identification certificate (IDC) is described.

If a service provider or a user device starts to user authentication on the basis of an IDC (S1001), a user inputs or transmits a user ID and sampling data (S1002). The service provider or the user device which performs the person authentication retrieves an IDC on the basis of the user ID and determine whether or not the IDC exists (S1003). If the IDC is not found, the service provider or the user device generates an IDC issue request to a person identification certificate authority (IDA) to acquire the IDC (S1004).

Thereafter, the "template expiration date" information is extracted from the person identification certificate (IDC) and verifies the template expiration date (S1005). If the expiration date has been reached, the service provider or the user device requests the person identification certificate authority (IDA) to issue an IDC in which a new "template expiration date" is set, thereby acquiring the IDC (S1006).

The "IDC expiration date" information is then extracted from the person identification certificate (IDC) and verifies the IDC expiration date (S1007). If the expiration date has been reached, the service provider or the user device requests the person identification certificate authority (IDA) to issue an IDC in which a new "IDC expiration date" is set, thereby acquiring the IDC (S1008).

Thereafter, it is determined whether the "number of times the IDC is allowed to be used" is set in the person identification certificate (IDC) (S1009). If it is set, the count of IDC usage stored in the SAM of the service provider or the user device is read, and it is determined whether the count of IDC usage is equal to zero (S1010). If the count of IDC usage is equal to zero, the service provider or the user device requests the person identification certificate authority (IDA) to issue an IDC in which a new "count of IDC usage" is set, thereby acquiring the IDC (S1011). After acquiring the IDC, the count of IDC usage described in the newly issues IDC is set in the SAM (S1012).

Thereafter, a template is extracted from the IDC and compared with sampling information given by the user (S1014). After completion of the comparison, if the number of times the IDC is allowed to be used is set in the IDC (Yes in S1015), the count of IDC usage stored in the DAM is decremented by one (S1016). If the count of IDC usage becomes equal to zero (Yes in S1017), the IDC is deleted from the SAM (S1018), and the process is performed depending upon the comparison result (S1019).

Figure 84:
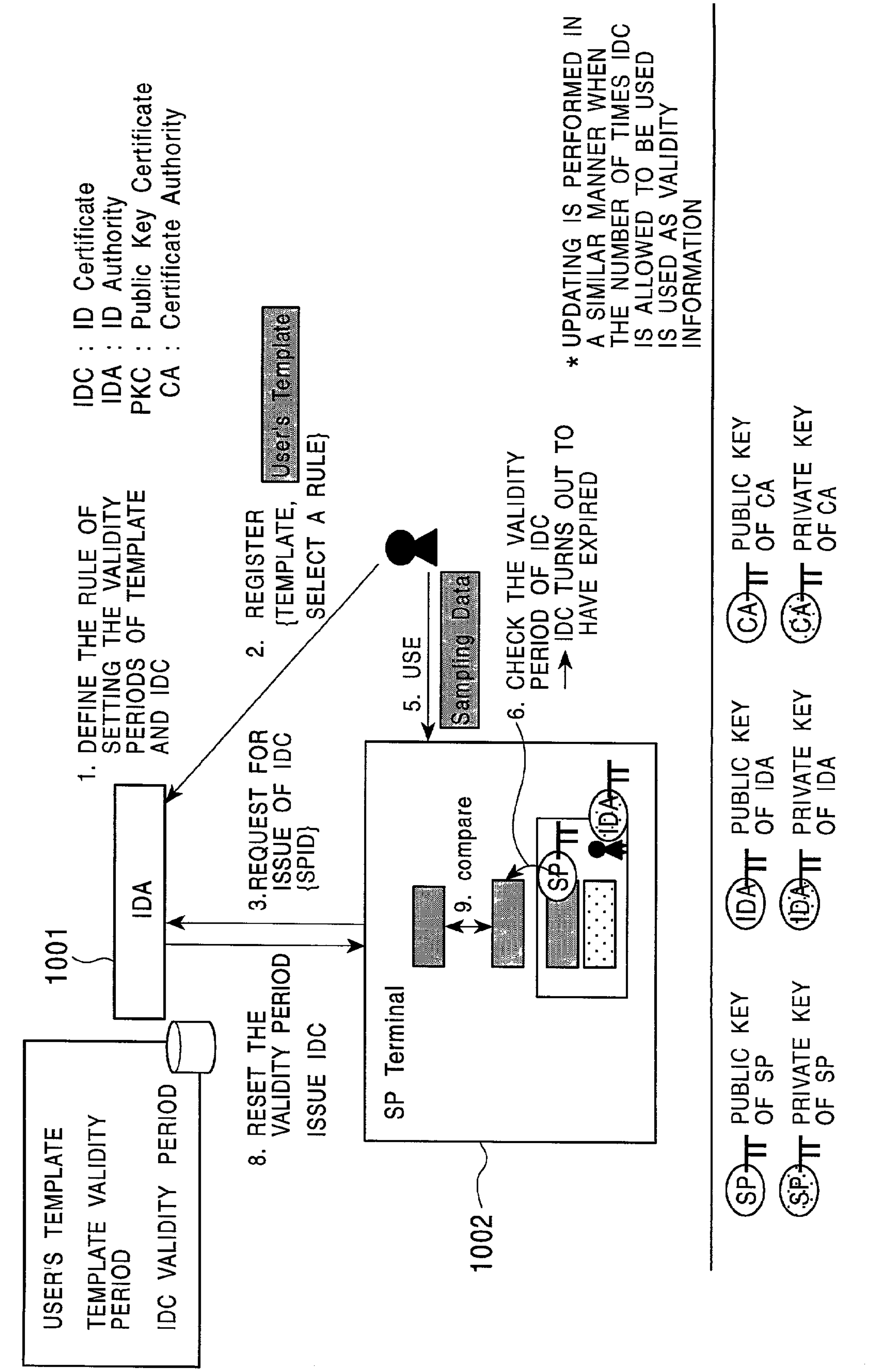
FIG. 84 is a diagram illustrating a process in which when a person identification certificate (IDC) is used, if it turns out that the "IDC expiration date" has been reached, the person identification certificate (IDC) is updated.

Referring to FIG. 84, there is provided a process which is performed to update a person identification certificate (IDC) when a person identification certificate (IDC) is used if it turns out that the "IDC expiration date" has been reached.

Herein, it is assumed that a person identification certificate (IDC) of a user has been created by a person identification certificate authority (IDA) 1001 and has been transmitted, in response to a request from a service provider 1002, from the person identification certificate authority (IDA) 1001 to the service provider 1002 and stored in a storage means of the service provider 1002. The "IDC expiration date" is defined in the person identification certificate (IDC).

When user authentication is performed before starting a transaction with an user, the service provider 1002 reads the IDC and checks the "IDC expiration date" described in the IDC. If it is detected that the "IDC expiration date" has been reached, the service provider 1002 requests the person identification certificate authority (IDA) 1001 to issue a new IDC. In this case, the service provider 1002 transmits the user ID corresponding to the IDC to be updated to the person identification certificate authority (IDA) 1001. In the data communication, mutual authentication, addition of a signature, and verification are performed.

In accordance with the user ID, the person identification certificate authority (IDA) 1001 creates a person identification certificate (IDC) in which a new expiration date is set using the user template information which has already been stored. The created person identification certificate (IDC) is transmitted to the service provider 1002. The service provider stores the updated IDC in the storage means of the service provider, extracts a template from the updated IDC, decrypts the template, and compares the template with sampling information.

In a similar manner to the above-described process of updating the IDC expiration date, it is possible to update the number of times the IDC is allowed to be used, and it is also possible to update the template expiration date set by the person identification certificate authority (IDA) when the expiration data has been reached.

Figure 85:
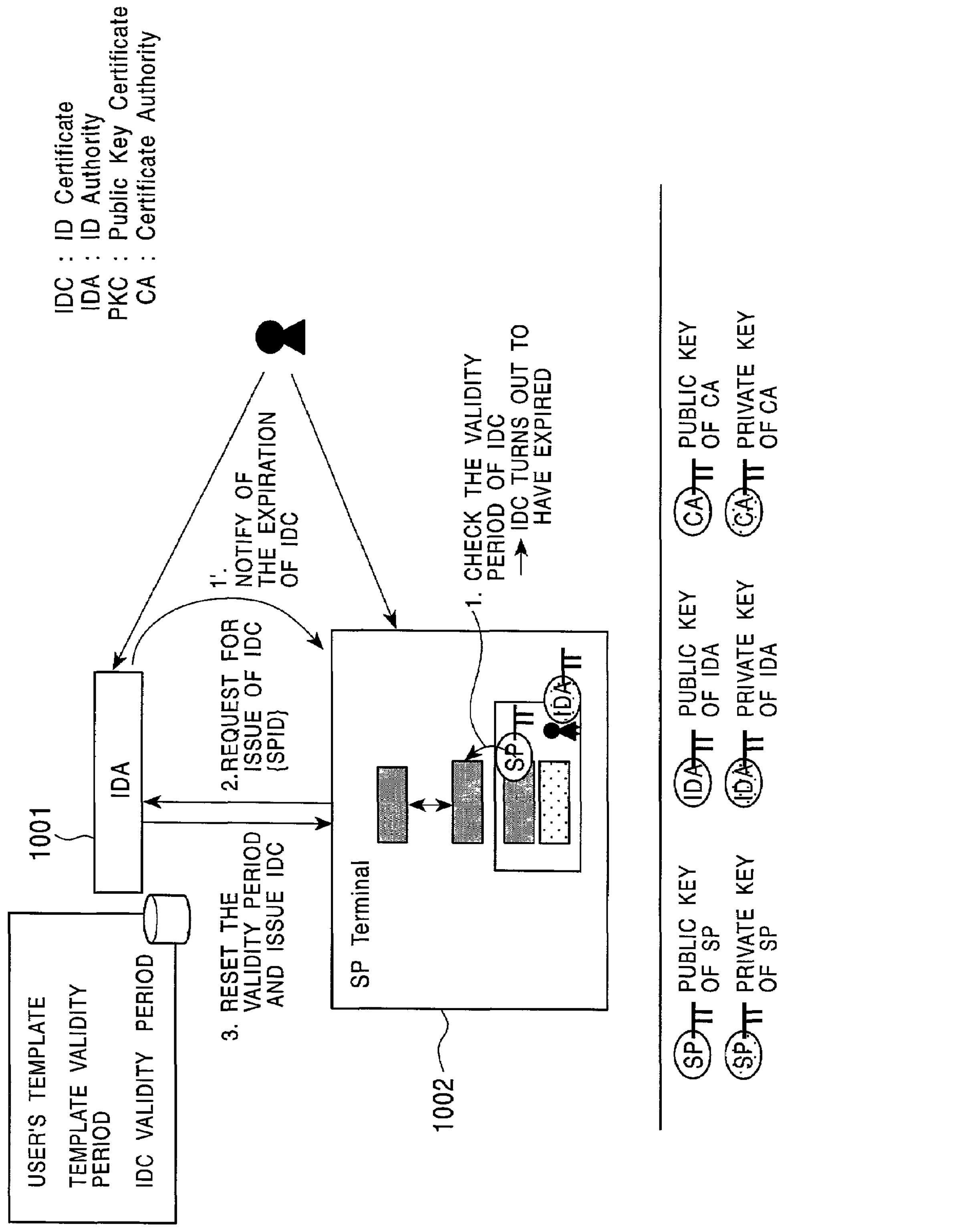
FIG. 85 is a diagram illustrating a process in which the expiration date of a person identification certificate (IDC) is checked at scheduled intervals, and if it turns out that the "IDC expiration date" has been reached, the IDC is updated.

Referring to FIG. 85, there is described a process which is performed to update a person identification certificate (IDC) when the checking of the expiration date of the person identification certificate (IDC) reveals that the "IDC expiration date" has been reached.

Herein, it is assumed that a person identification certificate (IDC) of a user has been created by a person identification certificate authority (IDA) 1001 and has been transmitted, in response to a request from a service provider 1002, from the person identification certificate authority (IDA) 1001 to the service provider 1002 and stored in a storage means of the service provider 1002. The "IDC expiration date" is defined in the person identification certificate (IDC).

The service provider 1002 checks, at scheduled intervals, the expiration date of the person identification certificate (IDC) stored in the service provider 1002. If it is detected, in the checking at scheduled intervals, that the IDC expiration date has been reached, the service provider 1002 requests the person identification certificate authority (IDA) 1001 to issue a new IDC. In this case, the service provider 1002 transmits the user ID corresponding to the IDC to be updated to the person identification certificate authority (IDA) 1001. In the data communication, mutual authentication, addition of a signature, and verification are performed.

In accordance with the user ID, the person identification certificate authority (IDA) 1001 creates a person identification certificate (IDC) in which a new expiration date is set using the user template information which has already been stored. The created person identification certificate (IDC) is transmitted to the service provider 1002. The service provider stores the updated IDC in the storage means of the service provider.

In a similar manner to the above-described process of updating the IDC expiration date, it is possible to update the number of times the IDC is allowed to be used, and it is also possible to update the template expiration date set by the person identification certificate authority (IDA) when the expiration data has been reached.

Now, a process of updating template information is described. Updating of template information may be performed such that the expiration date of the template information which has already been registered in a person identification certificate authority (IDA) 1001 is simply updated, or such that the template information which has already been registered is deleted and then template information is created in accordance with personal information such as fingerprint information which is newly given by an user. In the case where the existing registered template information is used and only the expiration date is simply updated, updating may be performed in a similar manner as in the updating of the IDC expiration date or the number of times the IDC is allowed to be used. In the case where the expiration date of the template information has been set in accordance with the date specified by an user, the person identification certificate authority (IDA) 1001 may create a person identification certificate (IDC) in which the template expiration date is reset with the approval of the user.

However, in the case where the existing registered template information is deleted and template information is newly created in accordance with personal information such as fingerprint information which is newly given by an user, it is required to acquire new person identification information from the user. The processes are described below with reference to FIGS. 86 and 87.

Figure 86:
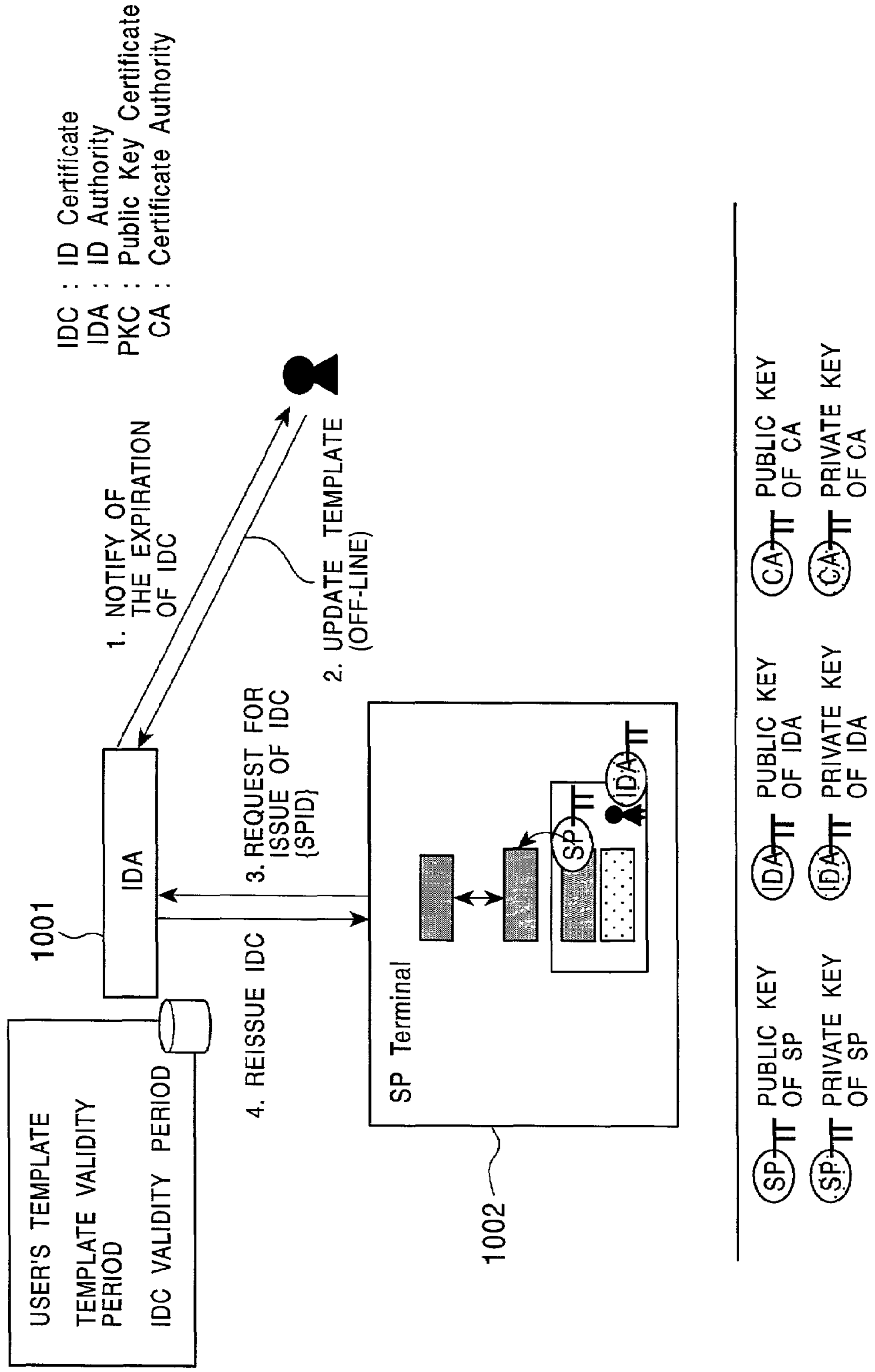
FIG. 86 is a diagram illustrating a process in which the expiration date of template information which has already been registered in a person identification certificate authority (IDA) is checked by the IDA and updated if the expiration date has been reached, after informing a user that the expiration date has been reached.

FIG. 86 illustrates a process in which the expiration date of the template information which has already been registered in the person identification certificate authority (IDA) 1001 is checked by the person identification certificate authority (IDA) 1001 and updated if the expiration date has been reached, after informing the user that the expiration date has been reached.

If the user receives a message indicating that the expiration date of the template information has been reached, the user transmits his/her personal information such as fingerprint data to the person identification certificate authority (IDA) 1001. Because this process results in re-execution of verification of the identification of the user, it is desirable that the process be performed offline. However, the process may be performed online if it is possible to verify the identification of the user. In this case, mutual authentication between the user device and the person identification certificate authority (IDA) 1001, addition of a signature to data to be transmitted, and verification are performed.

The person identification certificate authority (IDA) 1001 verifies the identification of the user and creates a person identification certificate (IDC) in which the person identification data is stored as template information and a new template expiration date is set. The expiration date may be set in accordance with a request from the user. The person identification certificate (IDC) in which the template expiration date has been newly set by the person identification certificate authority (IDA) 1001 is transmitted to a service provider or the like in response to a request, for use in person authentication.

Figure 87:
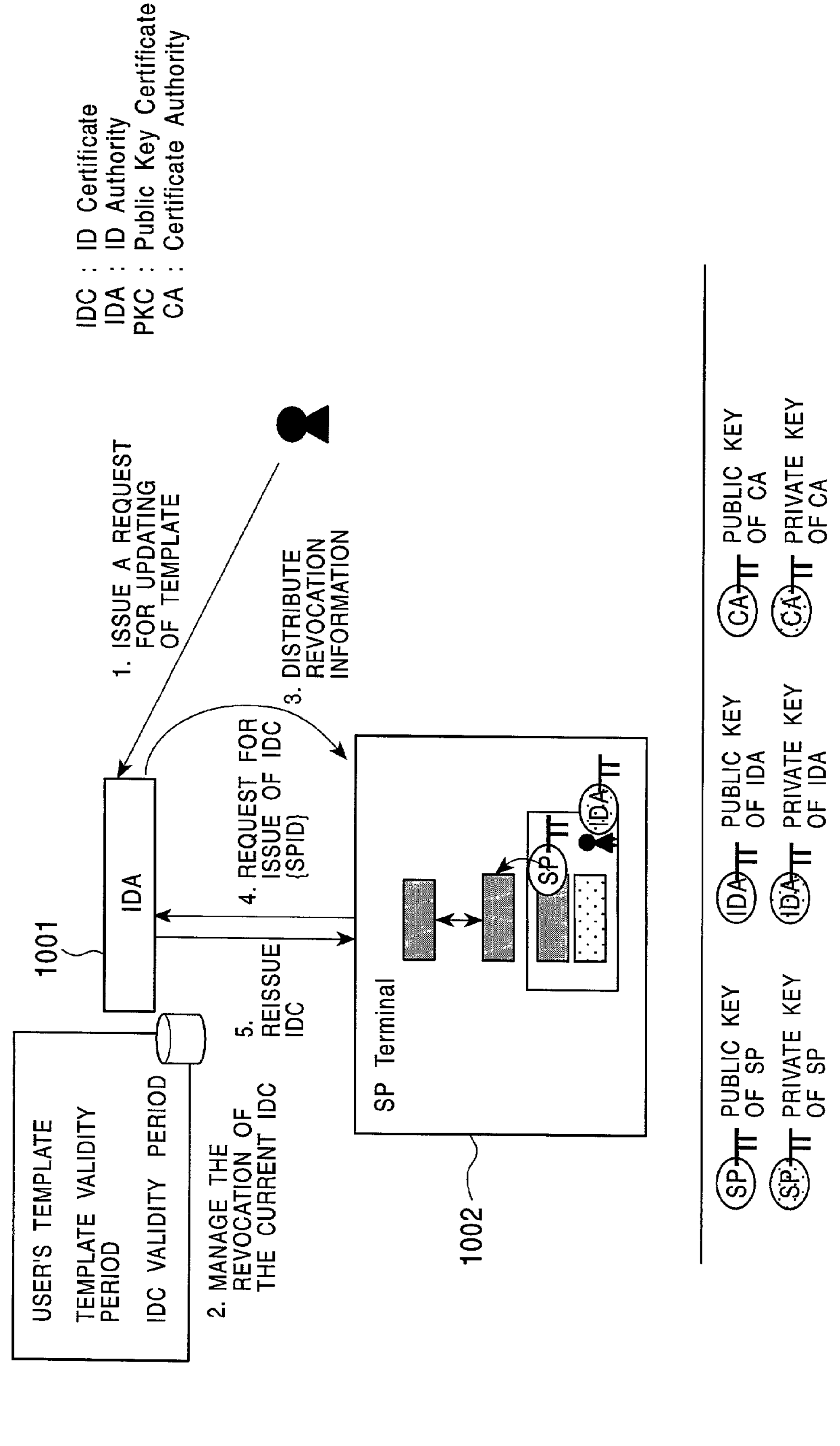
FIG. 87 is a diagram illustrating a process in which template information which has already been registered in a person identification certificate authority (IDA) is updated in response to an updating request from an user.

FIG. 87 illustrates a process in which template information which has already been registered in a person identification certificate authority (IDA) 1001 is updated in response to an updating request from an user.

To make a request for updating template information, a user transmits his/her personal information such as fingerprint data to the person identification certificate authority (IDA) 1001. Because this process results in re-execution of verification of the identification of the user, it is desirable that the process be performed offline. However, the process may be performed online if it is possible to verify the identification of the user. In this case, mutual authentication between the user device and the person identification certificate authority (IDA) 1001, addition of a signature to data to be transmitted, and verification are performed.

The person identification certificate authority (IDA) 1001 verifies the identification of the user and creates a person identification certificate (IDC) in which the person identification data is stored as template information and a new template expiration date is set. The expiration date may be set in accordance with a request from the user. Furthermore, as required, for example, in response to a request from an user, the person identification certificate authority (IDA) 1001 may revoke a person identification certificate (IDC) which has already been issued and whose expiration date has not been reached yet. More specifically, revocation of an IDC is performed by issuing an IDC revocation list to a service provider or a user device to which the IDC has been issued. In the IDC revocation list, identification data of revoked IDCs is described. The service provider or the user device, which has received the IDC revocation list, checks whether the IDC revocation list includes an IDC identifier of an IDC which is going to be used in user authentication. If the IDC is included in the IDC revocation list, the IDC is not used. If necessary, the service provider or the user device requests the person identification certificate authority (IDA) to update the IDC and executes user authentication using the updated IDC.

As described above, when a person authentication execution entity executes person authentication on the basis of a person identification certificate in which a template serving as person identification data is stored, the person authentication execution entity verifies the validity of the person identification certificate on the basis of the certificate expiration date, a certificate usage number limit which is the number of times the certificate is allowed to be used, or the template expiration date. Only when it is determined that the person identification certificate is valid, person authentication is performed by comparing the template stored in the person identification certificate with sampling information input by an user. This makes it possible for a person identification certificate authority to manage the validity of person identification certificates. The person identification certificate authority may update a person identification certificate or a template in response to a request from an authentication execution entity or a person certified by the person identification certificate. Thus, it becomes possible to update a person identification certificate or a template at an arbitrary desired time. Furthermore, setting the expiration date makes it possible to examine users at scheduled intervals and to easily check the validity of persons certified by person identification certificates (IDCs).

The present invention has been described in detail above with reference to particular embodiments. It will be apparent to those skilled in the art that various modifications and substitution to those embodiments may be made in the embodiment chosen for illustration without departing from the spirit and scope of the invention. That is, the embodiments have been described above by way of example and not limitation. The scope of the invention is to be determined solely by the appended claims.

What is claimed is:

1. A person authentication system for executing person authentication by comparing a template with sampling information, the template being person authentication data, and the sampling information being input by a user, the person authentication system comprising:

a person authentication authority for issuing an electronic person authentication certificate including the template; and a person authentication execution entity for obtaining the template from the electronic person authentication certificate issued by said person authentication authority and executing person authentication on the basis of the obtained template;

wherein the electronic person authentication certificate issued by said person authentication authority stores usage restriction information which includes at least either a certificate expiration date or a certificate usage number limit and includes a template expiration date, wherein when a service provider has a transaction with a user, the person authentication authority issues the electronic person authentication certificate including a signature written using a private key of the person authentication authority, and the signature is verifiable using a public key of the person authentication authority that is stored by the service provider, wherein the template is encrypted using a public key of the service provider and extractable from the electronic person authentication certificate using a private key of the service provider, and after the template is successfully extracted, the person authentication execution entity checks the validity of the template on the basis of the template expiration date when the person authentication is executed on the basis of the electronic person authentication certificate, and then executes the person authentication by comparing the template, stored in the electronic person authentication certificate, with sampling information input by the user on the condition that the validity of the template expiration date has been confirmed, wherein said person authentication execution entity checks the validity of the electronic person authentication certificate on the basis of the certificate expiration date or the certificate usage number limit when the person authentication is executed on the basis of the electronic person authentication certificate, and wherein said person authentication authority receives a request for updating the issued electronic person authentication certificate from an entity that received the electronic person authentication certificate, makes a second electronic person authentication certificate in which an updated certificate expiration date or an updated certificate usage number limit is set according to the request, and then issues the second electronic person authentication certificate.

2. A person authentication system according to claim 1, wherein said person authentication execution entity checks the validity of the electronic person authentication certificate on the basis of the certificate expiration date or the certificate usage number limit in person authentication on the basis of the electronic person authentication certificate, and then executes the person authentication by comparing the template, stored in the electronic person authentication certificate, with sampling information input by the user on the condition that the validity of the electronic person authentication certificate has been confirmed on the basis of the certificate expiration date or the certificate usage number limit.

3. A person authentication system according to claim 1, wherein said person authentication execution entity has a person authentication executing device, and the person authentication executing device executes the following processing when usage restriction information of the certificate usage number limit is stored in the electronic person authentication certificate:

storing a set usage count in a memory of the person authentication executing device;

updating usage count data stored in the memory every time the electronic person authentication certificate is used;

determining whether the usage count data is within the limits of the set usage count of the electronic person authentication certificate; and executing person authentication by comparing user input sampling information with the template stored in the electronic person authentication certificate if the usage count data is within the certificate usage number limit.

4. A person authentication system according to claim 1, wherein the electronic person authentication certificate issued by said person authentication authority stores the template expiration date which is information on an expiration date of the template stored in the electronic person authentication certificate; and said person authentication execution entity checks the validity of the template on the basis of the template expiration date in person authentication on the basis of the electronic person authentication certificate.

5. A person authentication system according to claim 1, wherein said person authentication execution entity functions as an information processing apparatus, and the information processing apparatus checks the validity of the template expiration date or the certificate expiration date of an electronic person authentication certificate which is set in the certificate stored in the information processing apparatus and then outputs a request for issuing the electronic person authentication certificate to said person authentication authority which issues the electronic person authentication certificate when the validity can not be confirmed;

said person authentication authority makes the electronic person authentication certificate in which an expiration date is set and then issues the electronic person authentication certificate to the information processing apparatus; and the information processing apparatus has storage means and stores the electronic person authentication certificate, which is issued by said person identification certificate authority, in the storage means.

6. A person authentication system according to claim 1, wherein said person authentication authority checks the validity of the template expiration date or an expiration date of an issued electronic person authentication certificate, and then gives notice to an entity receiving the electronic person authentication certificate that the template expiration date or the certificate expiration date is approaching.

7. A person authentication system according to claim 1, wherein said person authentication authority receives a request for updating the template, stored in the electronic person authentication certificate which has been issued, from an authenticated user of the electronic person authentication certificate; and wherein said person authentication authority nullifies the electronic person authentication certificate according to the request and then makes the second electronic person authentication certificate on the basis of an updated template.

8. A person authentication system according to claim 1, wherein said person authentication authority receives data of a request for setting the template expiration date from an authenticated user of the electronic person authentication certificate, and then makes the second electronic person authentication certificate in which the template expiration date is set on the basis of the data of the request for setting the template expiration date.

9. A person authentication system according to claim 1, wherein said person authentication authority and said person authentication executing entity execute mutual authentication, when data communication is performed therebetween, a data transmitter puts a digital signature on transmitted data, and a data receiver verifies the digital signature.

10. A person authentication system according to claim 1, wherein the template is at least one of personal biotic information, personal nonbiotic information, and a password, wherein the personal biotic information is selected from at least one of the group consisting of fingerprint information, retina pattern information, iris pattern information, voice print information, and handwriting information, and wherein the personal nonbiotic information is selected from at least one of the group consisting of seal information, passport information, driver's license information, and card information.

11. A person authentication system according to claim 1, wherein said person authentication authority puts a digital signature on the electronic person authentication certificate issued by said person authentication authority.

12. A person authentication method for executing person authentication by comparing a template with sampling information, the template being person authentication data, and the sampling information being input by a user, the person authentication method comprising:

causing a person authentication authority to issue an electronic person authentication certificate including the template;

causing a person authentication execution entity to obtain the template from the electronic person authentication certificate issued by the person authentication authority and to execute person authentication on the basis of the obtained template;

storing usage restriction information, which includes at least either a certificate expiration date or a certificate usage number limit, in the electronic person authentication certificate issued by the person authentication authority, the electronic person authentication certificate including a template expiration date; and causing the person authentication execution entity to check the validity of the electronic person authentication certificate on the basis of the certificate expiration date or the certificate usage number limit in person authentication on the basis of the electronic person authentication certificate, wherein the person authentication authority receives a request for updating the issued electronic person authentication certificate from an entity receiving the electronic person authentication certificate, then makes a second electronic person authentication certificate in which an expiration date or an updated certificate usage number limit is set according to the request, and issues the second electronic person authentication certificate, wherein when a service provider has a transaction with a user, the person authentication authority issues the electronic person authentication certificate including a signature written using a private key of the person authentication authority, and the signature is verifiable using a public key of the person authentication authority that is stored by the service provider, and wherein the template is encrypted using a public key and extractable from the electronic person authentication certificate using a private key, and after the template is successfully extracted, the person authentication execution entity checks the validity of the template on the basis of the template expiration date when the person authentication is executed on the basis of the electronic person authentication certificate, and then executes the person authentication by comparing the template, stored in the electronic person authentication certificate, with sampling information input by the user on the condition that the validity of the template expiration date has been confirmed.

13. A person authentication method according to claim 12, wherein the person authentication execution entity checks the validity of the electronic person authentication certificate on the basis of the certificate expiration date or the certificate usage number limit in person authentication on the basis of the electronic person authentication certificate, and then executes the person authentication by comparing the template, stored in the electronic person authentication certificate, with sampling information input by the user on the condition that the validity of the electronic person authentication certificate has been confirmed on the basis of the certificate expiration date or the certificate usage number limit.

14. A person authentication method according to claim 12, wherein the person authentication execution entity has a person authentication executing device, and the person authentication executing device executes the following processing when usage restriction information of the certificate usage number limit is stored in the electronic person authentication certificate:

storing a set usage count in a memory of the person authentication executing device;

updating usage count data stored in the memory every time the electronic person authentication certificate is used;

determining whether the usage count data is within the limits of the set usage count of the electronic person authentication certificate; and executing person authentication by comparing sampling information, input by a user, with the template stored in the electronic person authentication certificate if the usage count data is within the limits.

15. A person authentication method according to claim 12, wherein the person authentication authority stores the template expiration date, which is information on an expiration date of the template stored in the electronic person identification certificate made by the person authentication authority; and a person authentication execution entity checks the validity of the template on the basis of the template expiration date in person authentication on the basis of the electronic person authentication certificate.

16. A person authentication method according to claim 12, wherein said person authentication execution entity functions as an information processing apparatus;

the information processing apparatus checks the validity of the template expiration date or a certificate expiration date of the electronic person authentication certificate which is set in the electronic person authentication certificate stored in the information processing apparatus, and then outputs a request for issuing the electronic person authentication certificate to the person authentication authority which issues the electronic person authentication certificate when the validity can not be confirmed;

the person authentication authority makes the electronic person authentication certificate in which a new certificate expiration date is set and then issues the electronic person authentication certificate to the information processing apparatus; and the information processing apparatus has storage means and stores the electronic person authentication certificate, which is issued by the person authentication authority, in the storage means.

17. A person authentication method according to claim 12, wherein the person authentication authority checks the validity of the template expiration date or an expiration date of the issued electronic person authentication certificate, and then gives notice to an entity receiving the electronic person authentication certificate that the template expiration date or the certificate expiration date is approaching.

18. A person authentication method according to claim 12, wherein the person authentication authority receives a request for updating the template, stored in the electronic person identification certificate which issued, from an authenticated user of the electronic person authentication certificate; and wherein the person authentication authority nullifies the electronic person authentication certificate according to the request and then makes the second electronic person authentication certificate on the basis of the updated template.

19. A person authentication method according to claim 12, wherein the person authentication authority receives data of a request for setting the template expiration date from an authenticated user of the electronic person authentication certificate, and then makes the second electronic person authentication certificate in which the template expiration date is set on the basis of the data of the request for setting the template expiration date.

20. A person authentication method according to claim 12, wherein the person authentication authority and the person authentication executing entity execute mutual authentication, when data communication is performed therebetween, a data transmitter puts a digital signature on transmitted data, and a data receiver verifies the digital signature.

21. An information processing apparatus for executing person authentication by comparing a template with sampling information, the template being person authentication data, and the sampling information being input by a user, the information processing apparatus comprising:

a section for storing the template in an electronic person authentication certificate to execute person authentication on the basis of the electronic person authentication certificate issued by a person authentication certificate authority which is a third party, the electronic person authentication certificate storing at least one of a certificate expiration date and a certificate usage number limit and stores a template expiration date; and a section for checking the validity of the electronic person authentication certificate on the basis of the certificate expiration date or the certificate usage number limit in person authentication on the basis of the electronic person authentication certificate, and then executing the person authentication by comparing the template, stored in the electronic person authentication certificate, with the sampling information input by the user on the condition that the validity of the electronic person authentication certificate has been confirmed on the basis of the certificate expiration date or the certificate usage number limit, wherein the person authentication authority receives a request for updating the issued electronic person authentication certificate from an entity that received the electronic person authentication certificate, makes a second electronic person authentication certificate in which an updated certificate expiration date or an updated certificate usage number limit is set according to the request, and then issues the second electronic person authentication certificate, wherein when a service provider has a transaction with a user, the person authentication authority issues the electronic person authentication certificate including a signature written using a private key of the person authentication authority, and the signature is verifiable using a public key of the person authentication authority that is stored by the service provider, and wherein the template is encrypted using a public key and extractable from the electronic person authentication certificate using a private key, and after the template is successfully extracted, the person authentication execution entity checks the validity of the template on the basis of the template expiration date when the person authentication is executed on the basis of the electronic person authentication certificate, and then executes the person authentication by comparing the template, stored in the electronic person authentication certificate, with sampling information input by the user on the condition that the validity of the template expiration date has been confirmed.

22. An information processing apparatus for executing person authentication by comparing a template with sampling information, the template being person authentication data, and the sampling information being input by a user, the information processing apparatus comprising:

a section for storing the template in an electronic person authentication certificate to execute person authentication on the basis of the electronic person authentication certificate issued by a person authentication certificate authority which is a third party, the electronic person authentication certificate storing at least one of a certificate expiration date and a certificate usage number limit and storing a template expiration date;

a section for executing the following processing when usage restriction information of a valid certificate usage number limit is stored in the electronic person authentication certificate;

storing a set usage count in a memory of the information processing apparatus;

updating the usage count stored in the memory every time the electronic person authentication certificate is used; determining whether the usage count is within the limits of the certificate usage number limit of the electronic person authentication certificate; and executing person authentication by comparing user input sampling information with the template stored in the electronic person authentication certificate if the usage count in memory is within the limits of the certificate usage number limit, wherein the person authentication authority receives a request for updating the issued electronic person authentication certificate from an entity that received the electronic person authentication certificate, makes a second electronic person authentication certificate in which an updated certificate expiration date or an updated certificate usage number limit is set according to the request, and then issues the second electronic person authentication certificate, wherein when a service provider has a transaction with a user, the person authentication authority issues the electronic person authentication certificate including a signature written using a private key of the person authentication authority, and the signature is verifiable using a public key of the person authentication authority that is stored by the service provider, and wherein the template is encrypted using a public key and extractable from the electronic person authentication certificate using a private key, and after the template is successfully extracted, the person authentication execution entity checks the validity of the template on the basis of the template expiration date when the person authentication is executed on the basis of the electronic person authentication certificate, and then executes the person authentication by comparing the template, stored in the electronic person authentication certificate, with sampling information input by the user on the condition that the validity of the template expiration date has been confirmed.

23. An information processing apparatus for executing person authentication by comparing a template with sampling information, the template being person authentication data, and the sampling information being input by a user, the information processing apparatus comprising:

a section for storing the template in an electronic person authentication certificate to execute person authentication on the basis of the electronic person authentication certificate issued by a person authentication certificate authority which is a third party, the electronic person authentication certificate storing at least one of a certificate expiration date and a certificate usage number limit and stores a template expiration date; and a section for checking the validity of the template on the basis of a template expiration date in person authentication on the basis of the electronic person authentication certificate, and then executing the person authentication by comparing the template, which is stored in the electronic person authentication certificate, with the sampling information input by the user on a condition that validity of the template expiration date has been confirmed, wherein the person authentication authority receives a request for updating the issued electronic person authentication certificate from an entity that received the electronic person authentication certificate, makes a second electronic person authentication certificate in which an updated certificate expiration date or an updated certificate usage number limit is set according to the request, and then issues the second electronic person authentication certificate, wherein when a service provider has a transaction with a user, the person authentication authority issues the electronic person authentication certificate including a signature written using a private key of the person authentication authority, and the signature is verifiable using a public key of the person authentication authority that is stored by the service provider, and wherein the template is encrypted using a public key and extractable from the electronic person authentication certificate using a private key, and after the template is successfully extracted, the person authentication execution entity checks the validity of the template on the basis of the template expiration date when the person authentication is executed on the basis of the electronic person authentication certificate, and then executes the person authentication by comparing the template, stored in the electronic person authentication certificate, with sampling information input by the user on the condition that the validity of the template expiration date has been confirmed.

24. A program providing medium for proving a computer program which executes person authentication on the computer program by comparing a template stored in an electronic person authentication certificate with sampling information, the template being person authentication data, and the sampling information being input by a user, the computer program comprising:

a step of confirming whether usage restriction information, which includes either a certificate expiration date, a certificate usage number limit, or a template expiration date, is stored in the electronic person authentication certificate issued by a person authentication authority;

a step of checking the validity of the electronic person authentication certificate on the basis of the certificate expiration date, the certificate usage number limit, or the template expiration date in person authentication on the basis of the electronic person authentication certificate; and a step of executing the person authentication by comparing the template, which is stored in the electronic person authentication certificate, with the sampling information input by the user on a condition that the validity of the electronic person authentication certificate has been confirmed on the basis of the certificate expiration date, certificate usage number limit, or the template expiration date, wherein the person authentication authority receives a request for updating the issued electronic person authentication certificate from an entity that received the electronic person authentication certificate, makes a second electronic person authentication certificate in which an updated certificate expiration date or an updated certificate usage number limit is set according to the request, and then issues the second electronic person authentication certificate, wherein when a service provider has a transaction with a user, the person authentication authority issues the electronic person authentication certificate including a signature written using a private key of the person authentication authority, and the signature is verifiable using a public key of the person authentication authority that is stored by the service provider, and wherein the template is encrypted using a public key and extractable from the electronic person authentication certificate using a private key, and after the template is successfully extracted, the person authentication execution entity checks the validity of the template on the basis of the template expiration date when the person authentication is executed on the basis of the electronic person authentication certificate, and then executes the person authentication by comparing the template, stored in the electronic person authentication certificate, with sampling information input by the user on the condition that the validity of the template expiration date has been confirmed.

* * * * *